US012650664B2

(12) United States Patent
Kashiide et al.

(10) Patent No.: US 12,650,664 B2
(45) Date of Patent: Jun. 9, 2026

(54) CARTRIDGE AND ELECTROPHOTOGRAPHIC IMAGE FORMING APPARATUS

(71) Applicant: CANON KABUSHIKI KAISHA, Tokyo (JP)

(72) Inventors: Yosuke Kashiide, Tokyo (JP); Masaaki Sato, Yokohama (JP); Hiroyuki Munetsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/031,966

(22) Filed: Jan. 18, 2025

(65) Prior Publication Data

US 2025/0164927 A1 May 22, 2025

Related U.S. Application Data

(60) Division of application No. 18/603,393, filed on Mar. 13, 2024, now Pat. No. 12,346,059, which is a (Continued)

(30) Foreign Application Priority Data

Nov. 28, 2014 (JP) ................................ 2014-242586

(51) Int. Cl.
*G03G 21/16* (2006.01)
*G03G 21/18* (2006.01)

(52) U.S. Cl.
CPC ....... *G03G 21/186* (2013.01); *G03G 21/1647* (2013.01); *G03G 21/1814* (2013.01); (Continued)

(58) Field of Classification Search
CPC ............... G03G 21/1647; G03G 21/18; G03G 21/1814; G03G 21/1821; G03G 21/1842; (Continued)

(56) References Cited

U.S. PATENT DOCUMENTS

| | | | |
|---|---|---|---|
| 6,088,555 | A | 7/2000 | Mizuno |
| 7,190,921 | B2 | 3/2007 | Ishii et al. |

(Continued)

FOREIGN PATENT DOCUMENTS

| | | | |
|---|---|---|---|
| AU | 2011250736 | A1 | 12/2011 |
| CN | 100388135 | C | 5/2008 |

(Continued)

OTHER PUBLICATIONS

Feb. 22, 2019 Office Action in Chilean Patent Application No. 201701326.

(Continued)

*Primary Examiner* — Sophia S Chen
(74) *Attorney, Agent, or Firm* — Venable LLP

(57) ABSTRACT

An image forming apparatus comprises a photosensitive drum, and developing cartridge a developing roller configured to supply toner to the photosensitive drum and to rotate about a rotational axis. The image forming apparatus also includes a main assembly to which the developing cartridge is mountable in a mounting direction crossing the rotational axis and from which the developing cartridge is dismountable in a dismounting direction opposite to the mounting direction.

9 Claims, 75 Drawing Sheets

Related U.S. Application Data division of application No. 18/106,584, filed on Feb. 7, 2023, now Pat. No. 11,960,239, which is a division of application No. 17/665,624, filed on Feb. 7, 2022, now Pat. No. 11,662,687, which is a division of application No. 17/348,880, filed on Jun. 16, 2021, now Pat. No. 11,353,822, which is a division of application No. 16/986,602, filed on Aug. 6, 2020, now Pat. No. 11,067,950, which is a division of application No. 16/274,409, filed on Feb. 13, 2019, now Pat. No. 10,782,647, which is a division of application No. 15/605,167, filed on May 25, 2017, now Pat. No. 10,459,402, which is a continuation of application No. PCT/JP2015/084223, filed on Nov. 30, 2015.

(52) U.S. Cl.
CPC ..... *G03G 21/1821* (2013.01); *G03G 21/1842* (2013.01); *G03G 21/1853* (2013.01); *G03G 21/1864* (2013.01)

(58) Field of Classification Search
CPC ............. G03G 21/1853; G03G 21/186; G03G 21/1864
See application file for complete search history.

(56) References Cited

U.S. PATENT DOCUMENTS

| | | | | |
|---|---|---|---|---|
| 7,565,094 | B2 | 7/2009 | Ishiwaka et al. | |
| 7,899,364 | B2 | 3/2011 | Chadani et al. | |
| 8,280,278 | B2 | 10/2012 | Ueno et al. | |
| 8,644,732 | B2 | 2/2014 | Kikuchi et al. | |
| 8,682,215 | B1 | 3/2014 | Ueno et al. | |
| 8,688,004 | B2 | 4/2014 | Asanuma et al. | |
| 8,818,235 | B2 | 8/2014 | Kishi | |
| 8,855,534 | B2 | 10/2014 | Jung et al. | |
| 8,874,004 | B2 | 10/2014 | Takasaka et al. | |
| 9,052,673 | B2 | 6/2015 | Kondo et al. | |
| 9,280,121 | B2 | 3/2016 | Xiao et al. | |
| 10,459,402 | B2 | 10/2019 | Kashiide et al. | |
| 11,067,950 | B2 | 7/2021 | Kashiide et al. | |
| 2004/0184835 | A1 | 9/2004 | Park | |
| 2005/0008391 | A1 | 1/2005 | Ueno et al. | |
| 2005/0019070 | A1 | 1/2005 | Suda et al. | |
| 2006/0054679 | A1 | 3/2006 | Ruping | |
| 2007/0223962 | A1 | 9/2007 | Shiraki | |
| 2008/0152388 | A1 | 6/2008 | Ueno et al. | |
| 2008/0159772 | A1 | 7/2008 | Koishi et al. | |
| 2008/0240796 | A1 | 10/2008 | Morioka et al. | |
| 2008/0260428 | A1 | 10/2008 | Ueno et al. | |
| 2008/0317500 | A1 | 12/2008 | Lee et al. | |
| 2009/0196655 | A1 | 8/2009 | Takigawa et al. | |
| 2009/0202270 | A1 | 8/2009 | Brown et al. | |
| 2009/0317129 | A1 | 12/2009 | Abe et al. | |
| 2009/0317131 | A1 | 12/2009 | Morioka et al. | |
| 2009/0317132 | A1 | 12/2009 | Asanuma et al. | |
| 2009/0317134 | A1 | 12/2009 | Miyabe et al. | |
| 2010/0054823 | A1 | 3/2010 | Takasaka et al. | |
| 2010/0221036 | A1 | 9/2010 | Hara et al. | |
| 2011/0038649 | A1 | 2/2011 | Miyabe et al. | |
| 2011/0058851 | A1 | 3/2011 | Okabe | |
| 2011/0103812 | A1 | 5/2011 | Takasaka et al. | |
| 2011/0229197 | A1 | 9/2011 | Tada et al. | |
| 2011/0243601 | A1* | 10/2011 | Furuya | G03G 21/1842 399/111 |
| 2012/0056954 | A1 | 3/2012 | Asauchi et al. | |
| 2012/0114390 | A1 | 5/2012 | Ozawa et al. | |
| 2012/0121290 | A1 | 5/2012 | Asanuma | |
| 2013/0251402 | A1 | 9/2013 | Yamashita et al. | |
| 2013/0287437 | A1 | 10/2013 | Miyabe et al. | |
| 2013/0322930 | A1 | 12/2013 | Chino | |
| 2015/0050042 | A1* | 2/2015 | Sato | G03G 21/1842 399/110 |
| 2016/0216637 | A1 | 7/2016 | Maeshima et al. | |
| 2016/0246250 | A1 | 8/2016 | Kamoshida et al. | |
| 2017/0261926 | A1 | 9/2017 | Kashiide et al. | |
| 2017/0317129 | A1 | 11/2017 | Ishida | |
| 2018/0253055 | A1 | 9/2018 | Chino | |
| 2021/0311431 | A1 | 10/2021 | Kashiide et al. | |

FOREIGN PATENT DOCUMENTS

| | | | |
|---|---|---|---|
| CN | 100498591 | C | 10/2009 |
| CN | 101595433 | A | 12/2009 |
| CN | 102057333 | A | 5/2011 |
| CN | 102132219 | A2 | 7/2011 |
| CN | 102467019 | A | 5/2012 |
| CN | 103324072 | A | 9/2013 |
| CN | 104007641 | A | 8/2014 |
| CO | 12092444 | A | 10/2012 |
| EP | 1 178 370 | A2 | 2/2002 |
| EP | 2 259 156 | A2 | 12/2010 |
| EP | 2 595 004 | A2 | 5/2013 |
| JP | H10-268734 | A | 10/1998 |
| JP | 2003-058020 | A | 2/2003 |
| JP | 2005-049524 | A | 2/2005 |
| JP | 2006-337502 | A | 12/2006 |
| JP | 2007-199440 | A | 8/2007 |
| JP | 2007-256653 | A | 10/2007 |
| JP | 2007-256663 | A | 10/2007 |
| JP | 2008-185737 | A | 8/2008 |
| JP | 2008-233867 | A | 10/2008 |
| JP | 2009-104101 | A | 5/2009 |
| JP | 2009-181002 | A | 8/2009 |
| JP | 2009-271288 | A | 11/2009 |
| JP | 2010-079284 | A | 4/2010 |
| JP | 2010-197893 | A | 9/2010 |
| JP | 2011-197271 | A | 10/2011 |
| JP | 2012-103516 | A | 5/2012 |
| JP | 2012-212185 | A | 11/2012 |
| JP | 2012-226278 | A | 11/2012 |
| JP | 2013-164630 | A | 8/2013 |
| JP | 2013-231996 | A | 11/2013 |
| JP | 2013-250342 | A | 12/2013 |
| JP | 2013-250518 | A | 12/2013 |
| JP | 5362086 | A | 12/2013 |
| JP | 2014-098935 | A | 5/2014 |
| JP | 2014-115535 | A | 6/2014 |
| JP | 2014-206770 | A | 10/2014 |
| KR | 2011-0015451 | A | 2/2011 |
| RU | 2011129069 | A | 5/2010 |
| RU | 2011111541 | A | 10/2012 |
| RU | 2 488 869 | C1 | 7/2013 |
| RU | 2488870 | C2 | 7/2013 |
| TW | 201009520 | A | 3/2010 |
| TW | 201333644 | A | 8/2013 |
| TW | 201433889 | A | 9/2014 |
| WO | 2009/154312 | A | 12/2009 |
| WO | 2010/024457 | A1 | 3/2010 |

OTHER PUBLICATIONS

Communication in European Patent Application No. 15 863 854.4, dated Feb. 14, 2019.

Mar. 27, 2019 Office Action in Korean Patent Application No. 10-2017-7011727.

Decision to Grant in Russian Patent Application No. 2017122526, mailed May 30, 2019 (with English translation).

Office Action in Chinese Patent Application No. 201580071588.2, dated Aug. 13, 2019 (with English translation).

Notice of Allowance in Korean Patent Application No. 10-2017-7011727, mailed Nov. 25, 2019.

Dec. 17, 2019 Search Report in Russian Patent Application No. 2019124002 (with Engish translation).

Jan. 24, 2020 Decision to Grant in Russian Patent Application No. 2019124002 (with English translation).

Apr. 6, 2020 Office Action in Canadian Patent Application No. 2,971,802.

(56) References Cited

OTHER PUBLICATIONS

Apr. 6, 2020 Office Action in Korean Patent Application No. 10-2019-7034063.
Mar. 18, 2020 Office Action in Taiwanese Patent Application No. 107122063.
Jun. 7, 2020 Search Report in United Arab Emirates Patent Application No. UAE/P/6000622/2017.
Jun. 23, 2020 Office Action in Brazilian Patent Application No. BR112017010397-4 (with English translation).
Jun. 23, 2020 Office Action in Brazilian Patent Application No. BR122018074829-0 (with English translation).
Jun. 23, 2020 Office Action in Brazilian Patent Application No. BR122018074830-3 (with English translation).
Jun. 23, 2020 Office Action in Brazilian Patent Application No. BR122018074833-8 (with English translation).
Jun. 23, 2020 Office Action in Brazilian Patent Application No. BR122018074834-6 (with English translation).
Jun. 20, 2020 Extended Search Report in European Patent Application No. 20 158 782.1.
May 6, 2020 Examination Report in Indonesian Patent Application No. P002010703610 (with English translation).
Aug. 3, 2020 Extended Search Report in European Patent Application No. 20 166 178.2.
Jul. 24, 2020 Office Action in Chinese Patent Application No. 201580071588.2 (with English translation).
Oct. 12, 2020 Notice of Allowance in Korean Patent Application No. 10-2019-7034063.
Office Action dated Dec. 2, 2020 in counterpart Canadian Application No. 3057630.
Jan. 20, 2021 Office Action in Colombian Patent Application No. NC2018/0014409 (with English translation).
Feb. 22, 2021 Office Action in Indian Patent Application No. 201747022354.
Mar. 29, 2021 Notice of Allowance in Korean Patent Application No. 10-2021-7000841.
Notice of Acceptance dated Dec. 10, 2020 in counterpart Russian Patent Application No. 2020125308/28 (with English translation).
International Search Report and Written Opinion for International Patent Application No. PCT/JP2015/084223, dated Feb. 9, 2016.
English translation of Japanese Patent Application Pub. No. 2003-058020 A (published Feb. 28, 2003).
Office Action in Taiwanese Patent Application No. 106120400, dated May 28, 2018.
Aug. 6, 2018 Office Action in Chilean Patent Application No. 201701326.
English translation of Aug. 6, 2018 Office Action in Chilean Patent Application No. 20701326.
Office Action in Taiwanese Patent Application No. 104139938, dated Nov. 4, 2016.
Communication in European Patent Application No. 15 883 854.4, dated Apr. 23, 2018.
Notice of Acceptance in Australian Patent Application No. 2015354571, mailed Jul. 6, 2018.
Office Action in Colombian Patent Application No. NC2017/0005154, dated Jun. 18, 2018.
Office Action in Russian Patent Application No. 2017122526, dated Jan. 14, 2019 (with English translation).
Office Action dated Dec. 2, 2020 in counterpart Canadian Application No. 305630.
Notice of Acceptance dated Dec. 10, 2020 in counterpart Russian Application No. 202012508/28, together with English translation thereof.
Jun. 29, 2021 Notice of Allowance in Colombian Patent Application No. NC2018/0014409.
Jul. 20, 2021 Office Action in German Patent Application No. 11 2015 005 334.4 (with English translation).
Aug. 30, 2021 Decision to Grant in Russian Patent Application No. 2021103408 (with English translation).
Jan. 13, 2022 Notice of Allowance in Korean Patent Application No. 10-2021-7041376.
Mar. 23, 2022 Notice of Acceptance in Australian Patent Application No. 2020244588.
Mar. 10, 2022 Notice of Allowance in Columbian Patent Application No. NC2019/0011752.
Feb. 22, 2022 Office Action in Japanese Patent Application No. 2020-159242.
Sep. 11, 2025 Office Action in Mexican Patent Application No. MX/a/2022/008778.
Sep. 12, 2025 Office Action in Mexican Patent Application No. MX/a/2022/012347.
Sep. 9, 2025 Office Action in Mexican Patent Application No. MX/a/2022/008610.
Jun. 15, 2022 Search Report in Russian Patent Application No. 2021131373/28.
Jun. 28, 2022 Office Action in Taiwanese Patent Application No. 110141001.
Jul. 15, 2022 Office Action in European Patent Application No. 20 158 782.1.
Jul. 27, 2022 Communication in European Patent Application No. 20 166 178.2.
Aug. 2, 2022 Office Action in Brazilian Patent Application No. 112017010397-4 (with English translation).
Sep. 20, 2022 Notice of Allowance in Korean Patent Application Pub. No. 10-2021-7041526.
Aug. 9, 2022 Office Action in Japanese Patent Application No. 2022-102730.
Oct. 21, 2022 Search and Examination Report in United Arab Emirates Patent Application No. P6000622/2017.
Oct. 11, 2022 Office Action in Brazilian Patent Application Pub. No. 122018074833.8 (with English translation).
Oct. 11, 2022 Office Action in Brazilian Patent Application Pub. No. 122018074834.6 (with English translation).
Nov. 3, 2022 Office Action in Chinese Patent Application Pub. No. 202011268338.7 (with English translation).
Oct. 11, 2022 Office Action in Brazilian Patent Application Pub. No. 122018074829.0 (with English translation).
Oct. 11, 2022 Office Action in Brazilian Patent Application Pub. No. 122018074830.3 (with English translation).
Nov. 3, 2022 Office Action in Chinese Patent Application Pub. No. 202011271339.7 (with English translation).
Feb. 13, 2023 Examination Report in Australian Patent Application No. 2022201081.
Mar. 22, 2023 Office Action in Japanese Patent Application No. 2022-098024 (with English translation).
May 29, 2023 Office Action in Indian Patent Application No. P002007552.
Aug. 14, 2023 Search Report in Singapoare Patent Application No. 10202100914W.
Sep. 28, 2023 Office Action in Chinese Patent Application No. 202110408938.7.
Sep. 27, 2023 Office Action in United Arab Emirates Patent Application No. P600622/2017.
Feb. 5, 2024 Notice of Acceptance in Australian Patent Application No. 2022201081.
May 22, 2024 Office Action in Chinese Patent Application No. 202110408938.7.
Jul. 15, 2024 Examination Report in Philippines Patent Application No. 1/2017/500984.
Oct. 1, 2023 Notice of Allowance in Philippines Patent Application No. 1/2017/500984.
May 1, 2025 Office Action in Singapore Patent Application Pub. No. 10202011914P.

* cited by examiner (a)

(b)

(a)

(b)

(a)

(b)

(a)

(b)

(a)

(b)

(a)

(b)

(a)

(b)

(c)

(a)

(a)

(b)

(a)

(b)

(ATTITUDE IN MAIN ASSEMBLY IN PRINTING OPERATION)

(ATTITUDE IN MAIN ASSEMBLY IN SPACING OPERATION)

(a)

(b)

(ATTITUDE OUTSIDE OF MAIN ASSEMBLY)

(a)

(b)

(ATTITUDE IN MAIN ASSEMBLY IN SPACING OPERATION)

(ATTITUDE IN MAIN ASSEMBLY IN SPACING OPERATION)

(ATTITUDE OUTSIDE OF MAIN ASSEMBLY)

(ATTITUDE IN MAIN ASSEMBLY IN PRINTING OPERATION)

(ATTITUDE IN MAIN ASSEMBLY IN SPACING OPERATION)

(a)

(b)

(ATTITUDE OUTSIDE OF MAIN ASSEMBLY)

(a)

(b)

(ATTITUDE IN MAIN ASSEMBLY IN PRINTING OPERATION)

(ATTITUDE IN MAIN ASSEMBLY IN SPACING OPERATION)

(a)

(b)

(ATTITUDE OUTSIDE OF MAIN ASSEMBLY)

(ATTITUDE IN MAIN ASSEMBLY IN PRINTING OPERATION)

(ATTITUDE IN MAIN ASSEMBLY IN SPACING OPERATION)

(ATTITUDE OUTSIDE OF MAIN ASSEMBLY)

(a)

(b)

(ATTITUDE IN MAIN ASSEMBLY IN PRINTING OPERATION)

(ATTITUDE IN MAIN ASSEMBLY IN SPACING OPERATION)

(ATTITUDE OUTSIDE OF MAIN ASSEMBLY)

(a)

(b)

(a)

(b)

CARTRIDGE AND ELECTROPHOTOGRAPHIC IMAGE FORMING APPARATUS

FIELD OF THE INVENTION

The present invention relates to an electrophotographic image forming apparatus (image forming apparatus) and a cartridge detachably mountable to a main assembly of the image forming apparatus.

Here, the image forming apparatus forms an image on a recording material using an electrophotographic image forming process. Examples of the image forming apparatus includes an electrophotographic copying machine, an electrophotographic printer (laser beam printer, LED printer or the like), a facsimile machine and a word processor, for example.

A cartridge contains an electrophotographic photosensitive drum (photosensitive drum) as a photosensitive member which is an image bearing member, and at least one of process means (developer carrying member (developing roller) for example) actable on the photosensitive drum, which are unified into a unit detachably mountable to a main assembly of the image forming apparatus. In examples of the cartridge, the photosensitive drum and the developing roller are unified into a cartridge, or the photosensitive drum and the developing roller are unified into respective cartridges. The former comprising the photosensitive drum and the developing roller is called a process cartridge. One of the latter which comprises the photosensitive drum is called a drum cartridge, and the other comprising the developing roller is called a developing cartridge.

The main assembly of the image forming apparatus is the part of the image forming apparatus excluding the cartridge or cartridges.

BACKGROUND ART

In a conventional image forming apparatus, a process cartridge type is employed in which the photosensitive drum and process means actable on the photosensitive drum and the developing roller are unified into a cartridge which is detachably mountable to the main assembly of the image forming apparatus.

With the process cartridge type, maintenance operations for the image forming apparatus can be carried out by the user without relying on a service person, and therefore, the operationality is remarkably improved.

For this reason, the process cartridge type is widely used in the image forming apparatuses.

Japanese Laid-open Patent Application 2008-233867, for example, discloses a process cartridge which is usable an electrophotographic image formation type electrophotographic image forming apparatus and which is capable of being mounted and dismounted relative to a main assembly of the electrophotographic image forming apparatus provided with a driving shaft, in a direction substantially perpendicular to an axis of the driving shaft.

SUMMARY OF THE INVENTION

Problem to be Solved by the Invention

The present invention provides an improvement of the prior-art and provides a cartridge which is detachably mountable to a main assembly of the electrophotographic image forming apparatus in which a developer carrying member is capable of being contacted to and spaced from the photosensitive member.

It is an object of the present invention to provide a cartridge in which a coupling member is engageable with a main assembly driving shaft when the cartridge is mounted to a main assembly and when the developer carrying member is moved from a retracted position to a developing position.

It is another object of the present invention to provide a cartridge in which a coupling member is disengageable from a main assembly driving shaft when the cartridge is dismounted from a main assembly and when the developer carrying member is moved from a developing position to a retracted position.

It is a further object of the present invention to provide a cartridge in which a coupling member is engageable with a main assembly driving shaft when the developer carrying member moves from a retracted position to a developing position, and in which the coupling member is disengageable from the main assembly driving shaft when the cartridge is dismounted from the main assembly.

Means for Solving the Problem

According to an aspect of the present invention, there is provided a cartridge mountable, along a predetermined mounting path, to a main assembly of the electrophotographic image forming apparatus including a photosensitive member on which a latent image is capable of being formed and including a main assembly driving shaft, wherein the cartridge is movable in the main assembly between a developing position at a terminal end of the mounting path and a retracted position retracted from the developing position in a direction different from the mounting path, the cartridge comprising:

- a developer carrying member capable of developing the latent image while being in contact with the photosensitive member when the cartridge is in the developing position; and
- a coupling member capable of inclining relative to a rotational axis of the developer carrying member, wherein the coupling member is capable of taking a reference attitude in which a drive transmission is capable from the main assembly driving shaft to the developer carrying member when the cartridge is in the developing position, an at-mounting attitude inclined relative to the rotational axis of the developer carrying member to engage with the main assembly driving shaft when the cartridge moves along the mounting path, and an at-spaced attitude inclined relative to the rotational axis of the developer carrying member in a direction different from that in the at-mounting attitude.

According to another aspect of the present invention, there is provided a cartridge mountable, along a predetermined mounting path, to a main assembly of the electrophotographic image forming apparatus including a main assembly driving shaft, the cartridge comprising:

- a photosensitive member on which a latent image is capable of being formed;
- a developer carrying member capable of developing the latent image and the movable between a developing position contacting the photosensitive member to develop the latent image and a retracted position retracted from the contacting position; and
- a coupling member capable of inclining relative to a rotational axis of the developer carrying member, wherein the coupling member is capable of taking a reference attitude in which the drive transmission is capable from the main assembly driving shaft to the developer carrying member when the developer carrying member is in the developing position in a state that the cartridge is mounted at a terminal end of the mounting path, an at-mounting attitude inclined relative to the rotational axis of the developer carrying member to engage with the main assembly driving shaft when the cartridge moves along the mounting path, an at-spaced attitude inclined relative to the rotational axis of the developer carrying member in a direction different from that in the at-mounting attitude to engage with the main assembly side driving shaft when the developer carrying member moves from the retracted position to the developing position in the state that the cartridge is mounted at the end portion of the mounting path.

According to a further aspect of the present invention, there is provided a cartridge detachably mountable to an electrophotographic image forming apparatus, the cartridge comprising:

i) a rotatable developer carrying member;

ii) a coupling member for transmitting a rotational force to the developer carrying member and capable of taking a reference attitude parallel with a rotational axis of the developer carrying member and offset therefrom, a first inclination attitude inclined toward the developer carrying member, and a second inclination attitude inclined in a direction different from that in the first inclination attitude;

iii) an urging portion for urging the coupling member to incline rotational axis of the coupling member relative to the rotational axis of the developer carrying member; and iv) a movable portion capable of taking a first movement position for causing the coupling member to take the first inclination attitude and a second movement position for causing the coupling member to take the second inclination attitude.

According to a further aspect of the present invention, there is provided a cartridge detachably mountable to an electrophotographic image forming apparatus, the cartridge comprising:

i) a rotatable developer carrying member;

ii) a coupling member for transmitting a rotational force to the developer carrying member and capable of taking a reference position in parallel with a rotational axis of the developer carrying member, a first inclination attitude inclined from the reference position in a predetermined direction, a second inclination attitude inclined in a direction different from the predetermined direction of the first inclination attitude;

iii) an urging portion for urging the coupling member to incline rotational axis of the coupling member relative to the rotational axis of the developer carrying member; and iv) a movable portion capable of taking a first movement position for causing the coupling member to take the first inclination attitude and a second movement position for causing the coupling member to take the second inclination attitude.

According to a further aspect of the present invention, there is provided a cartridge detachably mountable to an electrophotographic image forming apparatus, the cartridge comprising:

i) a rotatable developer carrying member;

ii) a coupling member for transmitting a rotational force to the developer carrying member and capable of taking a reference attitude parallel with a rotational axis of the developer carrying member and offset therefrom, a first inclination attitude inclined toward the developer carrying member, and a second inclination attitude inclined in a direction different from that in the first inclination attitude;

iii) an urging member for urging the coupling member to incline it to the first inclination attitude; and iv) a movable member movable to cause the coupling member to take the first inclination attitude or the second inclination attitude.

According to a further aspect of the present invention, there is provided an electrophotographic image forming apparatus for forming an image on a recording material, the apparatus comprising:

i) a main assembly including a photosensitive member and which a latent image is capable of being formed, and including a main assembly driving shaft; and ii) a cartridge mountable, along a predetermined mounting path, to the main assembly, wherein the cartridge is movable in the main assembly between a developing position at a terminal end of the mounting path and a retracted position retracted from the developing position in a direction different from the mounting path, the cartridge including, ii-i) a developer carrying member capable of developing the latent image while being in contact with the photosensitive member when the cartridge is in the developing position; and ii-ii) a coupling member capable of inclining relative to a rotational axis of the developer carrying member, wherein the coupling member is capable of taking a reference attitude in which a drive transmission is capable from the main assembly driving shaft to the developer carrying member when the cartridge is in the developing position, an at-mounting attitude inclined relative to the rotational axis of the developer carrying member to engage with the main assembly driving shaft when the cartridge is moved along the mounting path, and an at-spaced attitude inclined relative to the rotational axis of the developer carrying member in a direction different from that in the at-mounting attitude when the cartridge is moved from the retracted position to the developing position.

According to a further aspect of the present invention, there is provided an electrophotographic image forming apparatus for forming an image on a recording material, the apparatus comprising:

i) a main assembly including a main assembly driving shaft; and ii) a cartridge mountable to the main assembly along a predetermined mounting path;

ii-i) a photosensitive member on which a latent image is capable of being formed;

ii-ii) a developer carrying member capable of developing the latent image and the movable between a developing position in which the developer carrying member contacts the photosensitive member to develop the latent image and a retracted position retracted from the contacting position, in a state that the cartridge is mounted to the main assembly; and ii-iii) a coupling member capable of inclining relative to a rotational axis of the developer carrying member, wherein the coupling member is capable of taking a reference attitude in which the drive transmission is capable from the main assembly driving shaft to the developer carrying member when the developer carrying member is in the developing position, an at-mounting attitude inclined relative to the rotational axis of the developer carrying member to engage with the main assembly side driving shaft when the cartridge is moved along the mounting path, and an at-spaced attitude inclined relative to the rotational axis of the developer carrying member in a direction different from that in the at-mounting attitude to engage with the main assembly side driving shaft when the developer carrying member is moved from the retracted position to the developing position.

According to a further aspect of the present invention, there is provided a cartridge mountable, along a predetermined mounting path, to a main assembly of the electrophotographic image forming apparatus including a photosensitive member on which a latent image is capable of being formed and including a main assembly driving shaft, wherein the cartridge is movable in the main assembly between a developing position at a terminal end of the mounting path and a retracted position retracted from the developing position in a direction different from the mounting path, the cartridge comprising:

a developer carrying member capable of developing the latent image while being in contact with the photosensitive member when the cartridge is in the developing position; and a coupling member capable of inclining relative to a rotational axis of the developer carrying member, wherein the coupling member is capable of taking a reference attitude in which a drive transmission is capable from the main assembly driving shaft to the developer carrying member when the cartridge is in the developing position, an at-dismounting attitude inclined relative to the rotational axis of the developer carrying member to disengage from the main assembly side driving shaft when the cartridge is dismounted from the main assembly by being moved along the mounting path from the developing position in the direction opposite from that in the mounting, and at-spaced attitude inclined relative to the rotational axis of the developer carrying member in a direction different from that in the at-dismounting attitude to disengage from the main assembly side driving shaft when the cartridge is moved from the developing position to the retracted position.

According to a further aspect of the present invention, there is provided a cartridge mountable, along a predetermined mounting path, to a main assembly of the electrophotographic image forming apparatus including a main assembly driving shaft, the cartridge comprising:

a photosensitive member on which a latent image is capable of being formed;

a developer carrying member capable of developing the latent image and the movable between a developing position contacting the photosensitive member to develop the latent image and a retracted position retracted from the contacting position; and a coupling member capable of inclining relative to a rotational axis of the developer carrying member, wherein the coupling member is capable of taking a reference attitude in which a drive transmission is capable from the main assembly driving shaft to the developer carrying member when the cartridge is in the developing position in a state that the cartridge is mounted to a terminal end of the mounting path, an at-dismounting attitude inclined relative to the rotational axis of the developer carrying member to disengage from the main assembly side driving shaft when the cartridge is dismounted from the main assembly by being moved along the mounting path from the terminal end in the direction opposite from that in the mounting, and an at-spaced attitude inclined relative to the rotational axis of the developer carrying member in a direction different from that in the at-dismounting attitude to disengage from the main assembly side driving shaft when the developer carrying member is moved from the developing position to the retracted position in the state that the cartridge is mounted to the terminal end.

According to a further aspect of the present invention, there is provided a cartridge mountable, along a predetermined mounting path, to a main assembly of the electrophotographic image forming apparatus including a photosensitive member on which a latent image is capable of being formed and including a main assembly driving shaft, wherein the cartridge is movable in the main assembly between a developing position at a terminal end of the mounting path and a retracted position retracted from the developing position in a direction different from the mounting path, the cartridge comprising:

a developer carrying member capable of developing the latent image while being in contact with the photosensitive member when the cartridge is in the developing position; and a coupling member capable of inclining relative to a rotational axis of the developer carrying member, wherein the coupling member is capable of taking a reference attitude in which a drive transmission is capable from the main assembly driving shaft to the developer carrying member when the cartridge is in the developing position, an at-dismounting attitude inclined relative to the rotational axis of the developer carrying member to disengage from the main assembly side driving shaft when the cartridge is dismounted from the main assembly by being moved along the mounting path from the developing position in the direction opposite from that in the mounting, and an at-spaced attitude inclined relative to the rotational axis of the developer carrying member in a direction different from that in the at-dismounting attitude to engage with the main assembly side driving shaft when the cartridge is moved from the retracted position to the developing position.

According to a further aspect of the present invention, there is provided a cartridge mountable, along a predetermined mounting path, to a main assembly of the electrophotographic image forming apparatus including a main assembly driving shaft, the cartridge comprising:

a photosensitive member on which a latent image is capable of being formed;

a developer carrying member capable of developing the latent image and the movable between a developing position contacting the photosensitive member to develop the latent image and a retracted position retracted from the contacting position; and a coupling member capable of inclining relative to a rotational axis of the developer carrying member, wherein the coupling member is capable of taking a reference attitude in which a drive transmission is capable from the main assembly driving shaft to the developer carrying member when the cartridge is in the developing position in a state that the cartridge is mounted to a terminal end of the mounting path, an at-dismounting attitude inclined relative to the rotational axis of the developer carrying member to disengage from the main assembly side driving shaft when the cartridge is dismounted from the main assembly by being moved along the mounting path from the terminal end in the direction opposite from that in the mounting, and an at-spaced attitude inclined relative to the rotational axis of the developer carrying member in a direction different from that in the at-dismounting attitude to engage with the main assembly side driving shaft when the developer carrying member is moved from the retracted position to the developing position in the state that the cartridge is mounted to the terminal end.

Effect of the Invention

According to the present invention, there is provided a cartridge in which a coupling member is engageable with a main assembly driving shaft when the cartridge is mounted to a main assembly and when the developer carrying member is moved from a retracted position to a developing position.

According to another aspect of the present invention, there is provided a cartridge in which a coupling member is disengageable from a main assembly driving shaft when the cartridge is dismounted from a main assembly and when the developer carrying member is moved from a developing position to a retracted position.

According to a further aspect of the present invention, there is provided a cartridge in which a coupling member is engageable with a main assembly driving shaft when the developer carrying member moves from a retracted position to a developing position, and in which the coupling member is disengageable from the main assembly driving shaft when the cartridge is dismounted from the main assembly.

Figure 6:
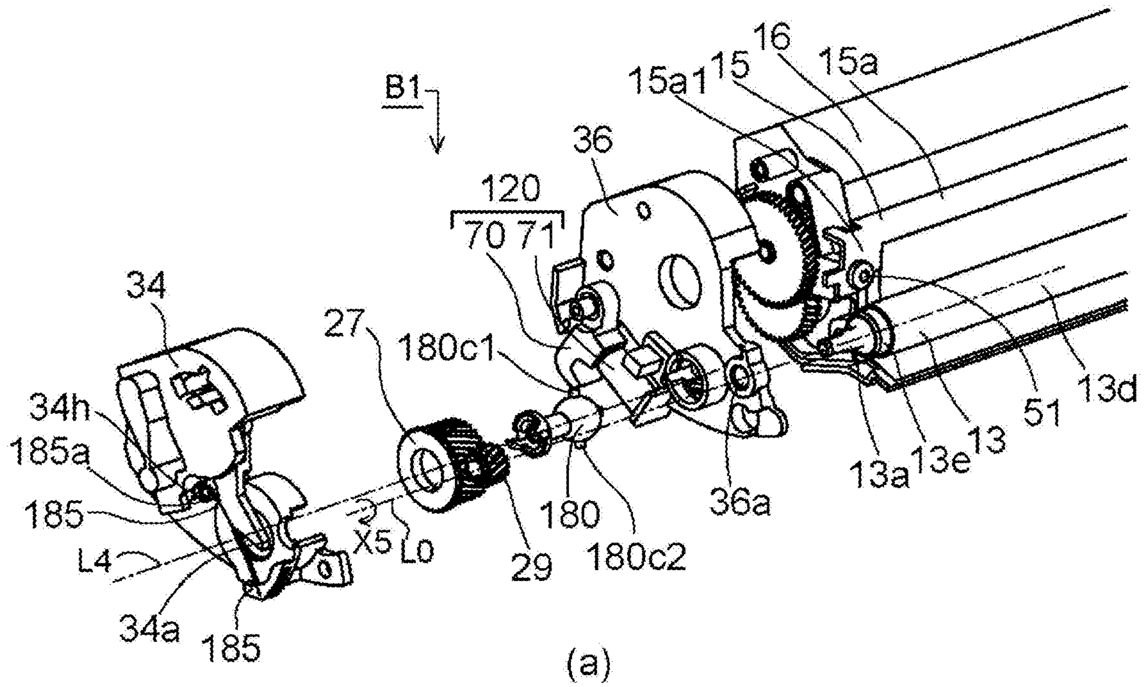
Figure 6:
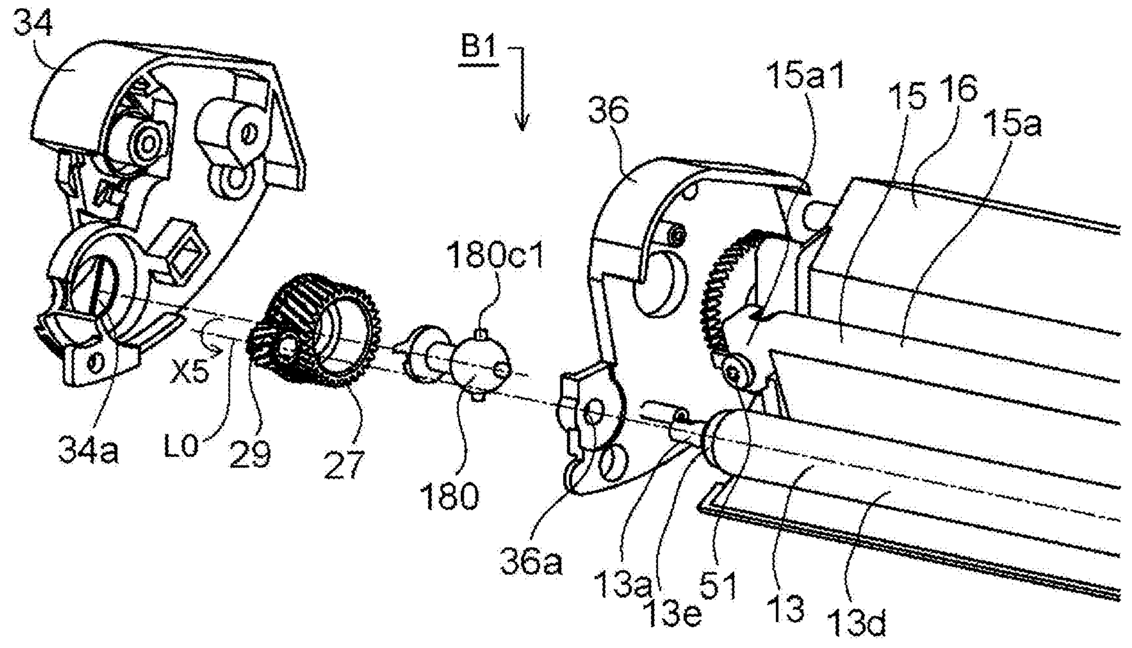

Part (a) of FIG. 6 is a schematic perspective view as seen from driving side according to the first embodiment of the present invention, in which the driving side of the developing cartridge B1 is exploded, and part (b) of FIG. 6 is a schematic perspective view as seen from the non-driving side according to the first embodiment of the present invention, in which the driving side of the developing cartridge B1 is exploded.

Figure 7:
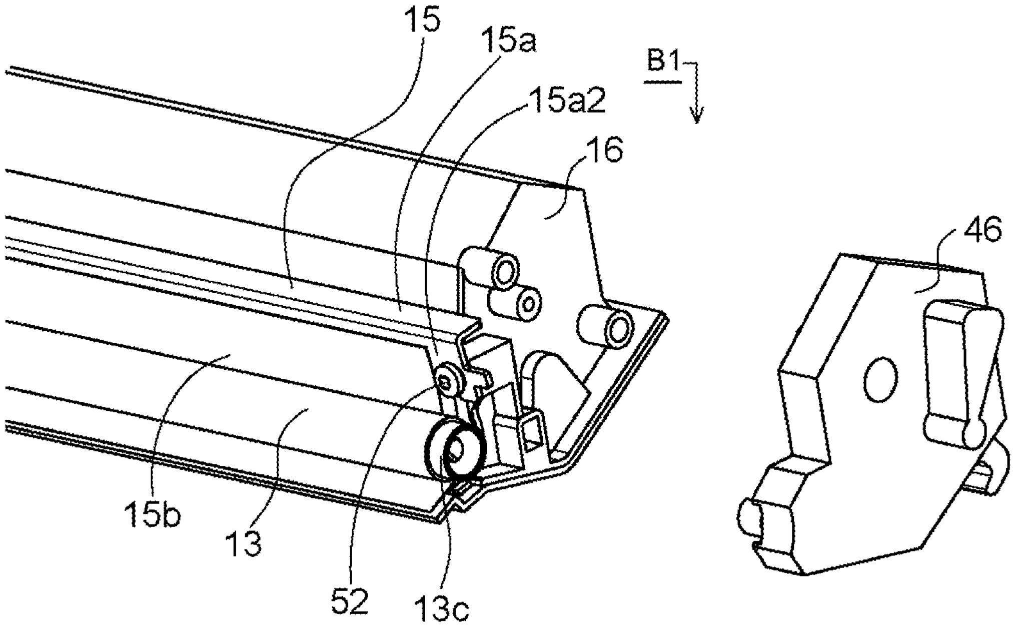
Figure 7:
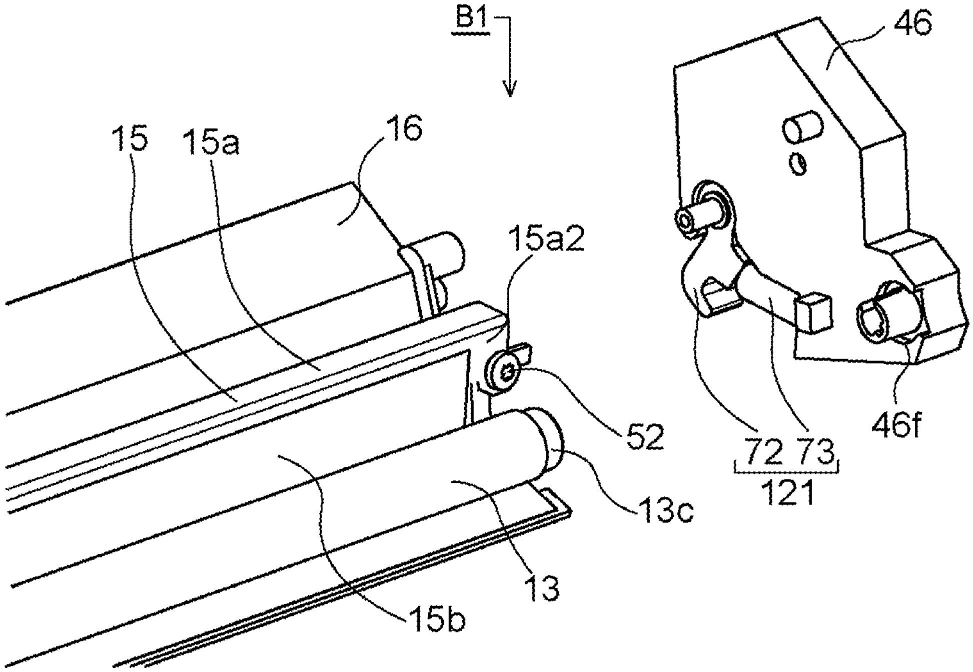

Part (a) of FIG. 7 is a schematic perspective view as seen from the non-driving side, in which the non-driving side of the developing cartridge B1 is exploded, and part (b) of FIG. 7 is a schematic perspective view as seen from the non-driving side according to the first embodiment of the present invention, in which the driving side of the developing cartridge B1 is exploded.

Figure 8:
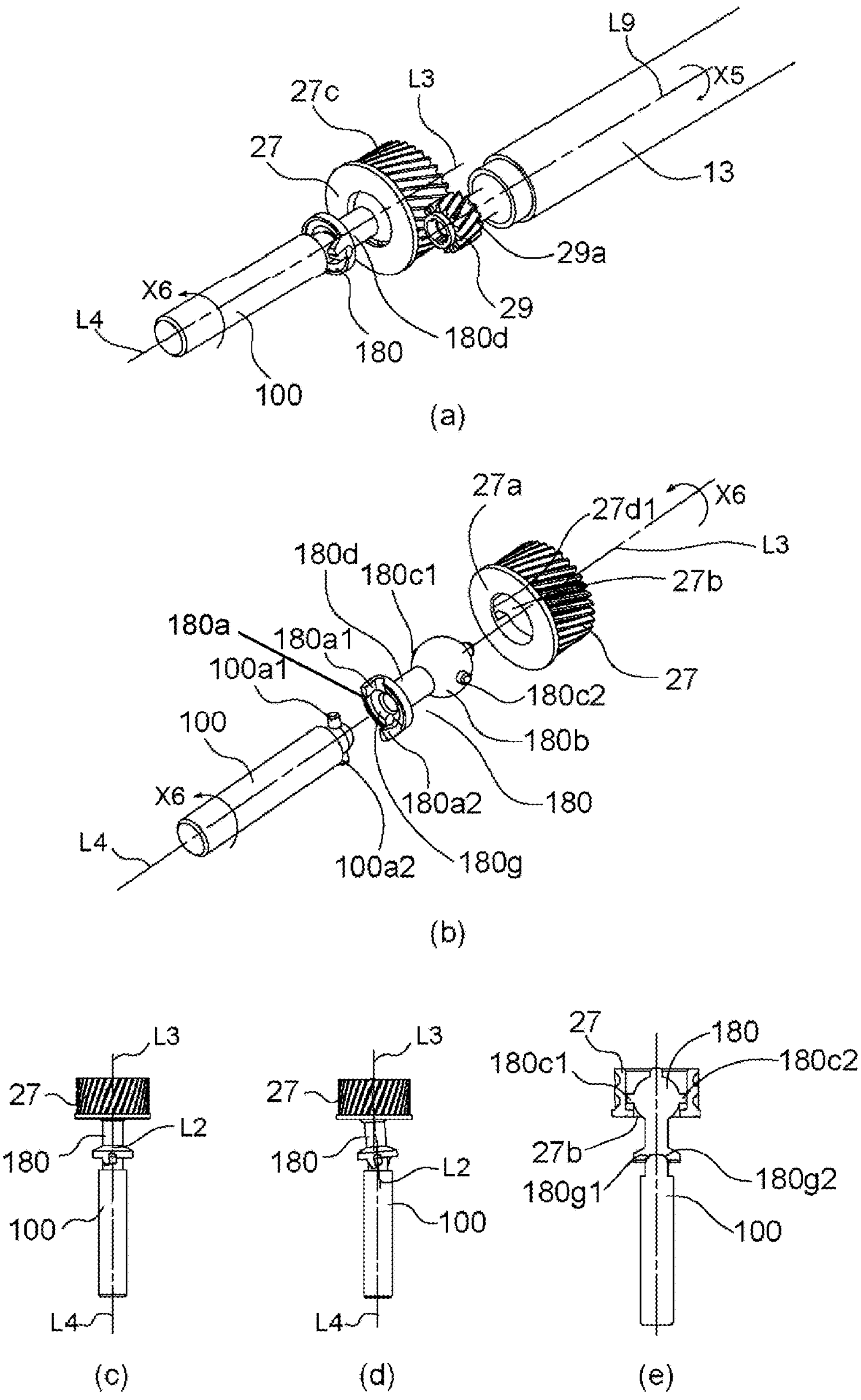

Part (a) of FIG. 8 is an illustration of peripheral parts of a coupling member 180 in an embodiment of the present invention, part (b) of FIG. 8 is an illustration of peripheral parts of the coupling member 180 in an embodiment of the present invention, part (c) of FIG. 8 is an illustration of engagement between the coupling member 180 and a main assembly side driving member 100 in an embodiment of the present invention, and (d) is an illustration of the engagement between the coupling member 180 and the main assembly side driving member 100 in an embodiment of the present invention, and part (e) illustrates an engagement state between the coupling member 180 and the main assembly side driving member 100 according to the first embodiment of the present invention.

Figure 9:
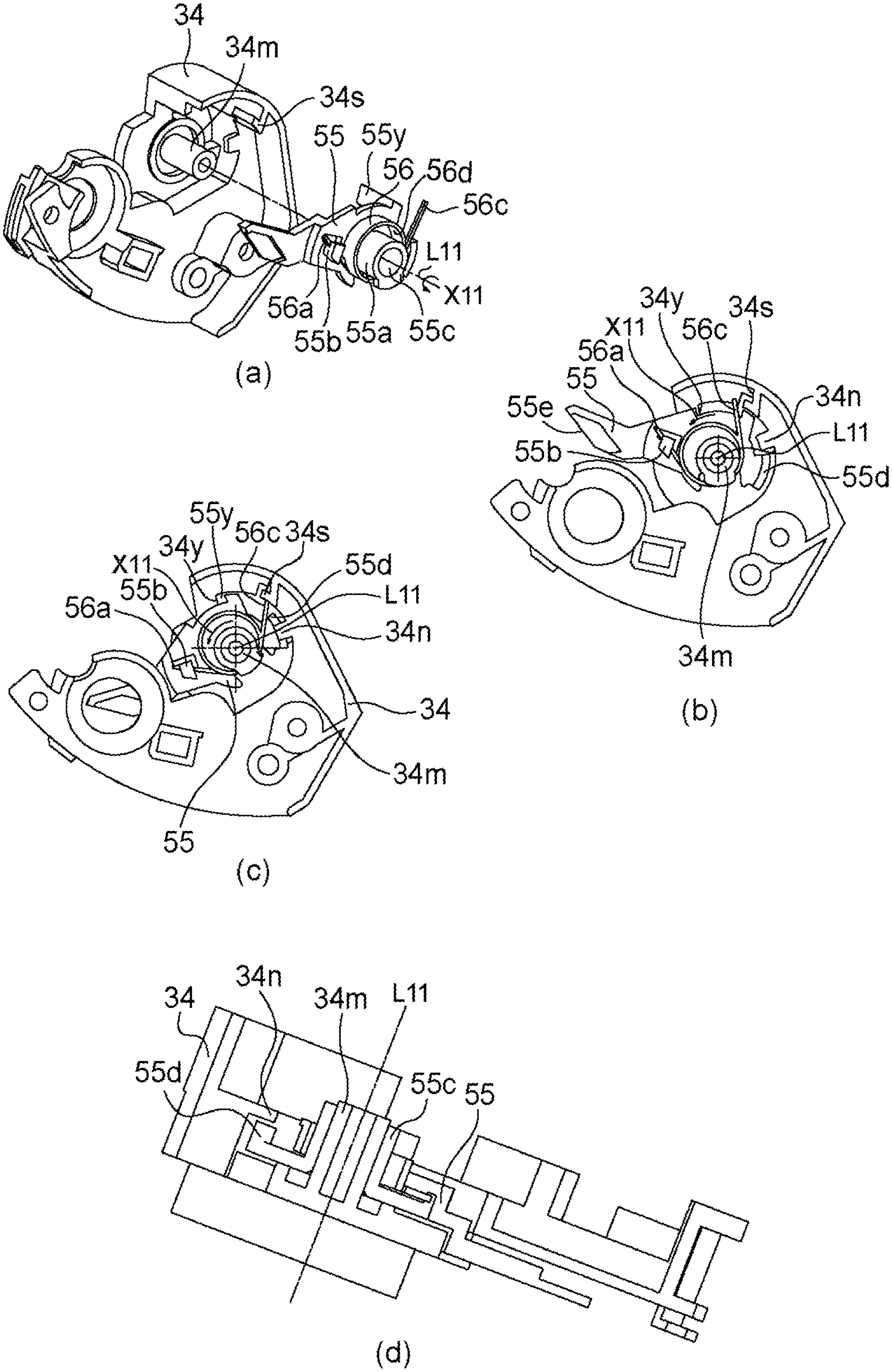

FIG. 9, parts (a) through (d), are schematic perspective views and side views illustrating assembling of a coupling lever 55 and a coupling lever spring 56 to a development side cover 34 according to the first embodiment of the present invention.

Figure 10:
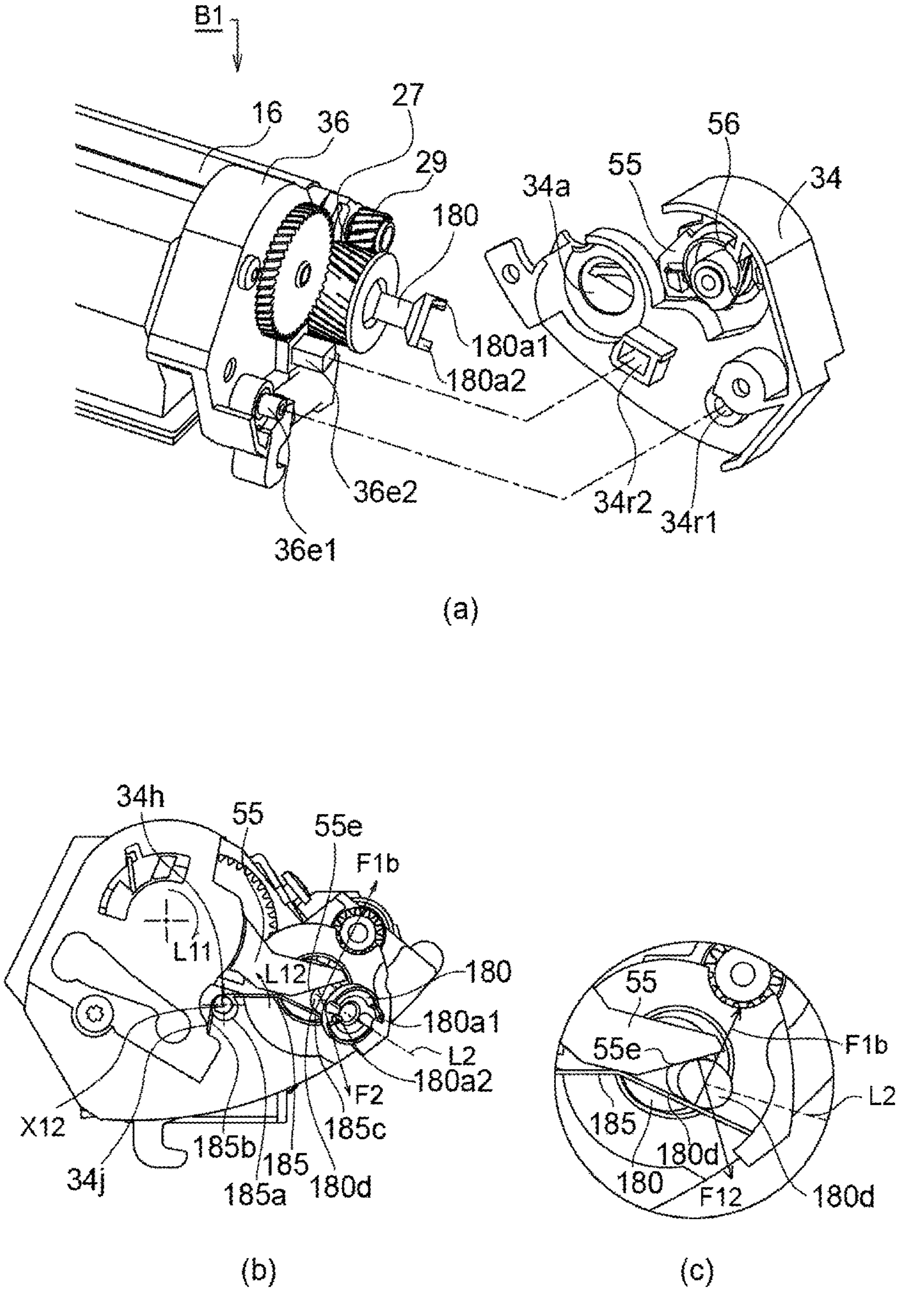

FIG. 10, parts (a) through (c), are schematic perspective views and side views illustrating assembling of the development side cover 34 according to the first embodiment of the present invention.

Figure 11:
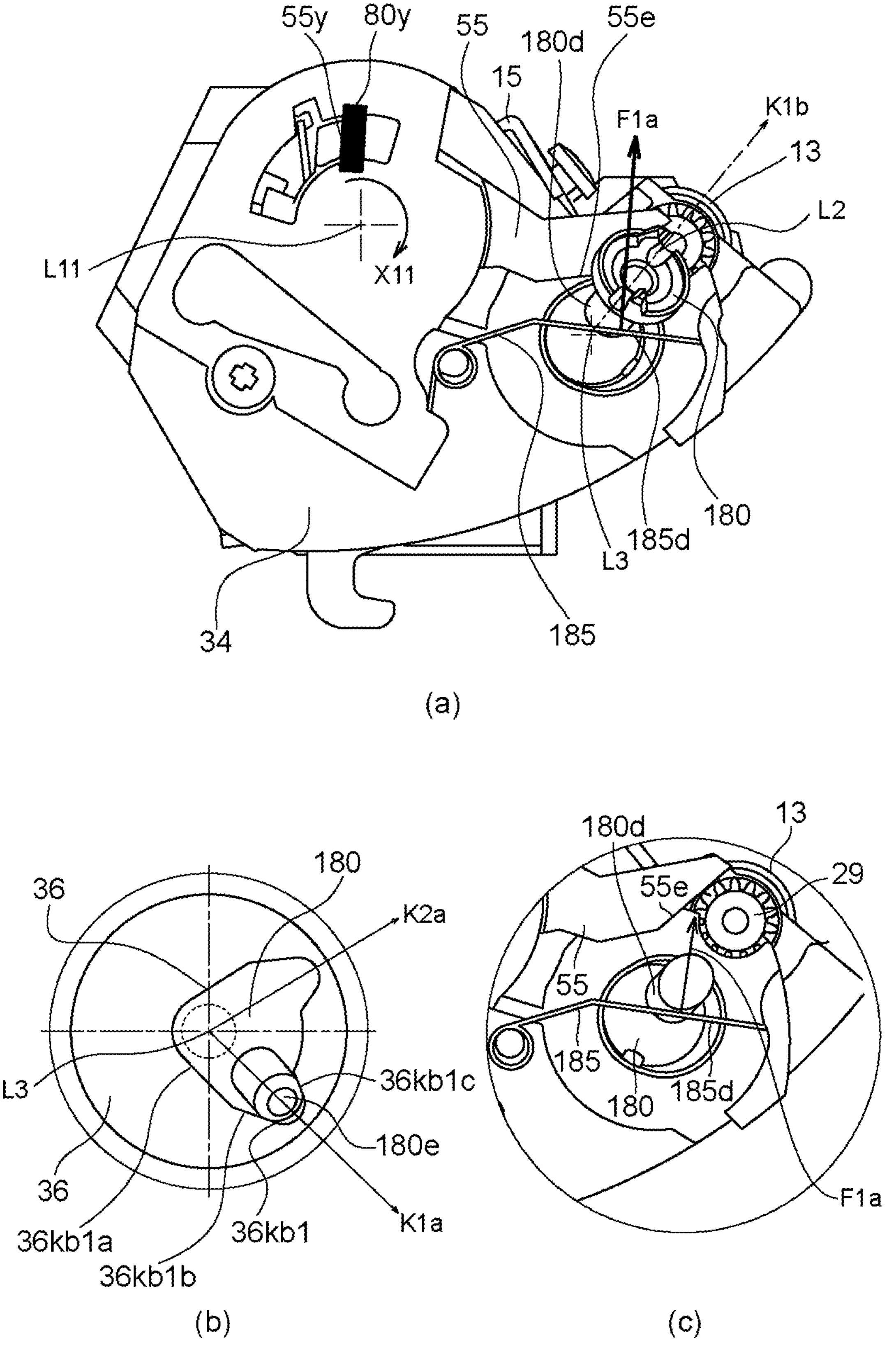

FIG. 11, parts (a) through (c) are illustrations of the developing cartridge B1 according to the first embodiment of the present invention in the state that the developing cartridge B1 is mounted in the main assembly A1, and a photosensitive drum 10 and the developing roller 13 are spaced from each other (spaced state).

Figure 12:
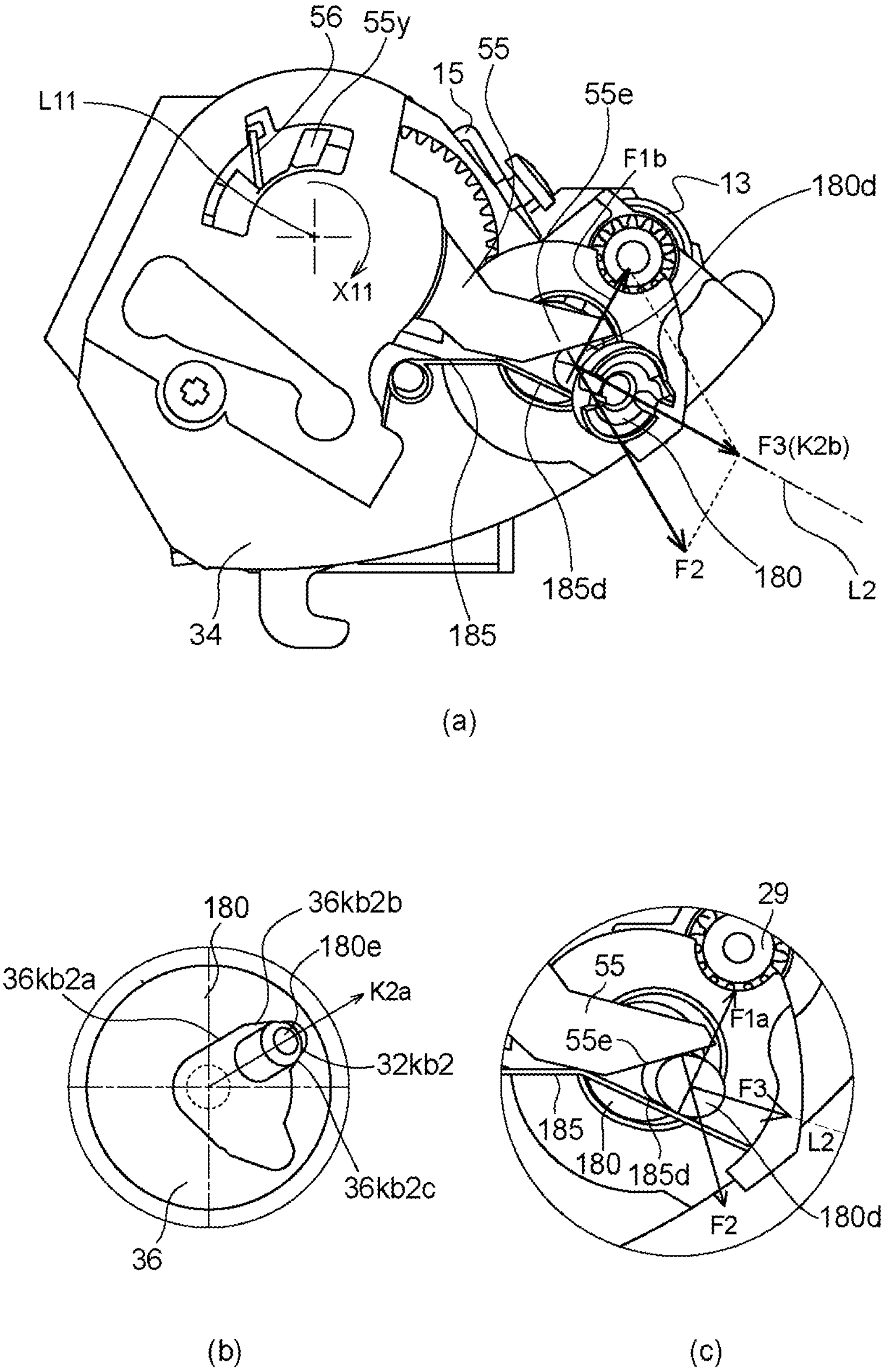

FIG. 12, parts (a) through (c), are illustrations of the developing cartridge B1 according to the first embodiment of the present invention in the state before the developing cartridge B1 is mounted to the main assembly A1, that is, the developing cartridge B1 per se is in the spontaneous state.

Figure 13:
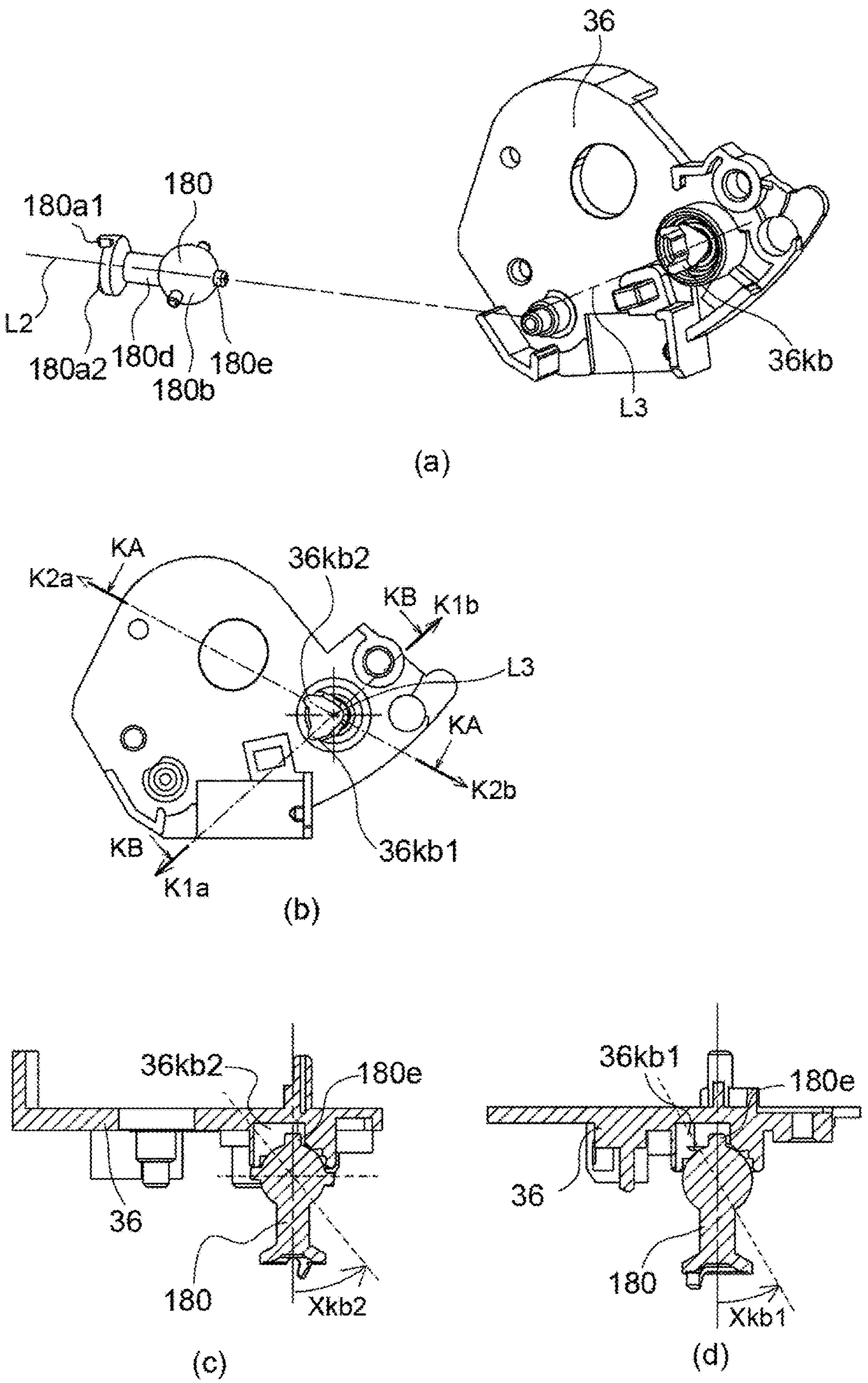

FIG. 13, parts (a) through (d), include views as seen from a longitudinal section illustrating the engagement state between the coupling member 180 and the main assembly side driving member 100, in the first embodiment of the present invention.

Figure 14:
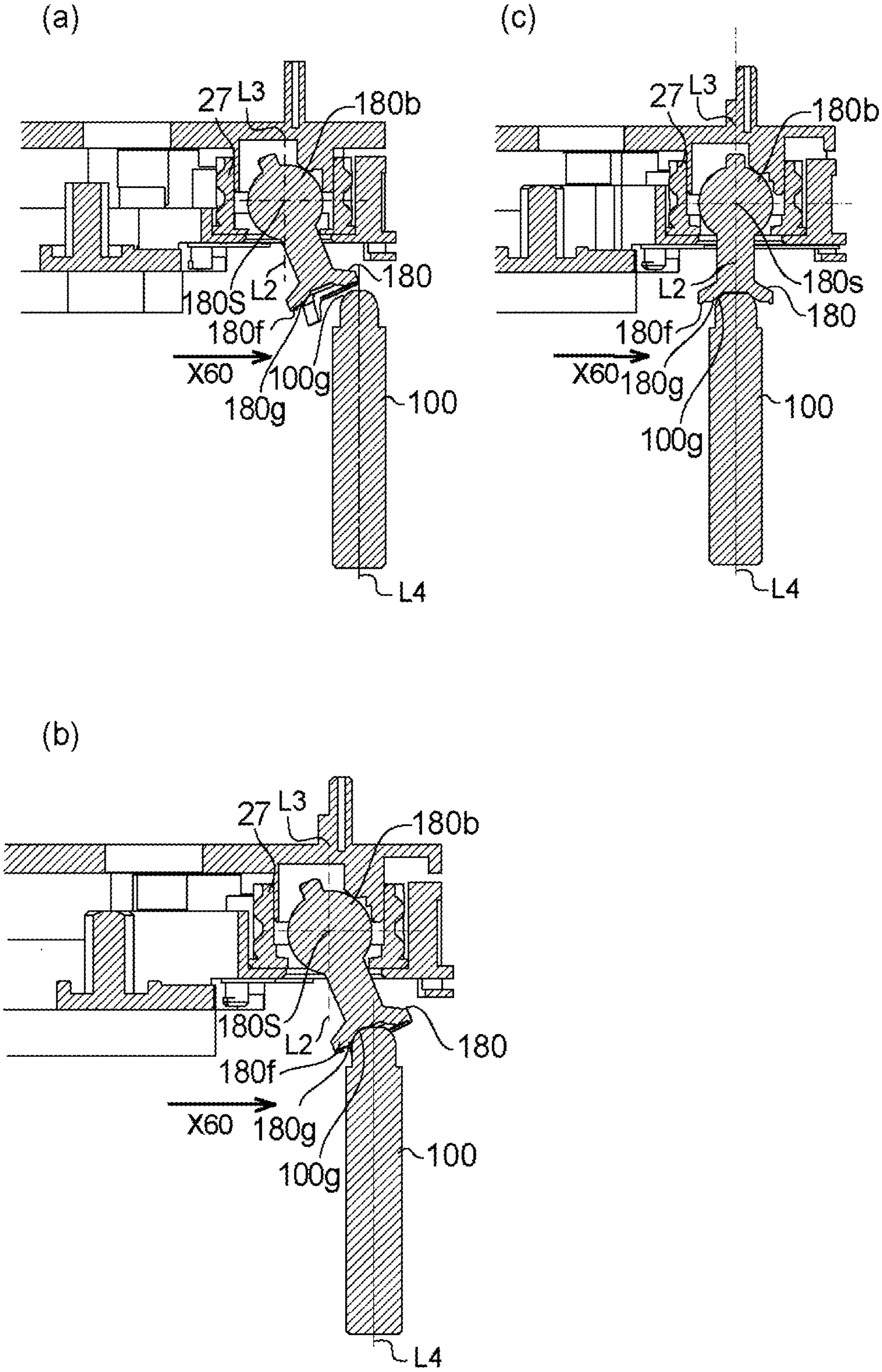

FIG. 14, parts (a) through (c), are sectional views illustrating attitudes of the coupling member until the coupling member 180 becomes coaxial with a main assembly driving member 100 in the first embodiment of the present invention.

Figure 15:
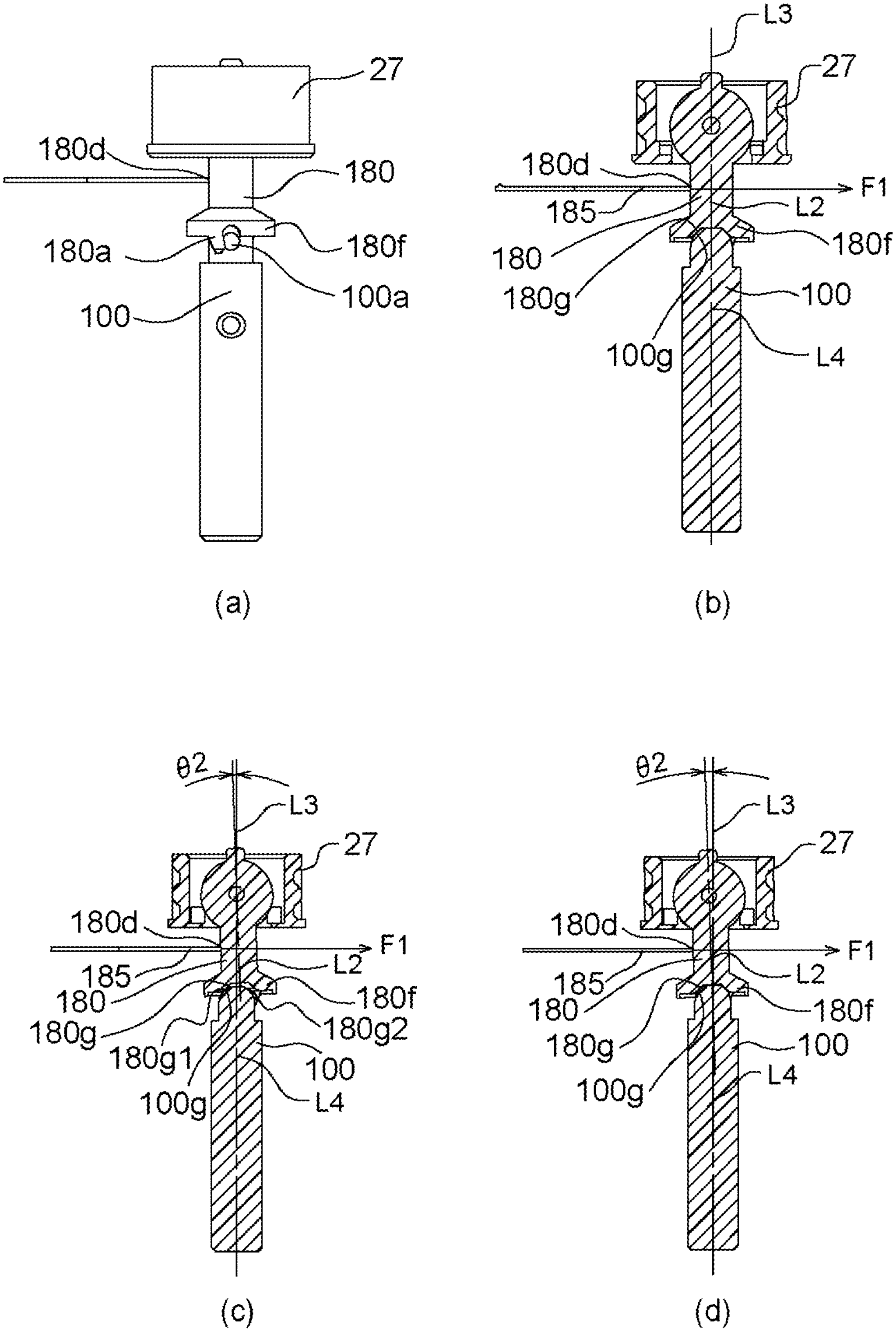

FIG. 15, parts (a) through (d), are illustrations of an inclination attitude (reference attitude D0) of a development coupling 180 when the mounting of the developing cartridge B1 to the main assembly A1 is completed, in the first embodiment of the present invention.

Figure 16:
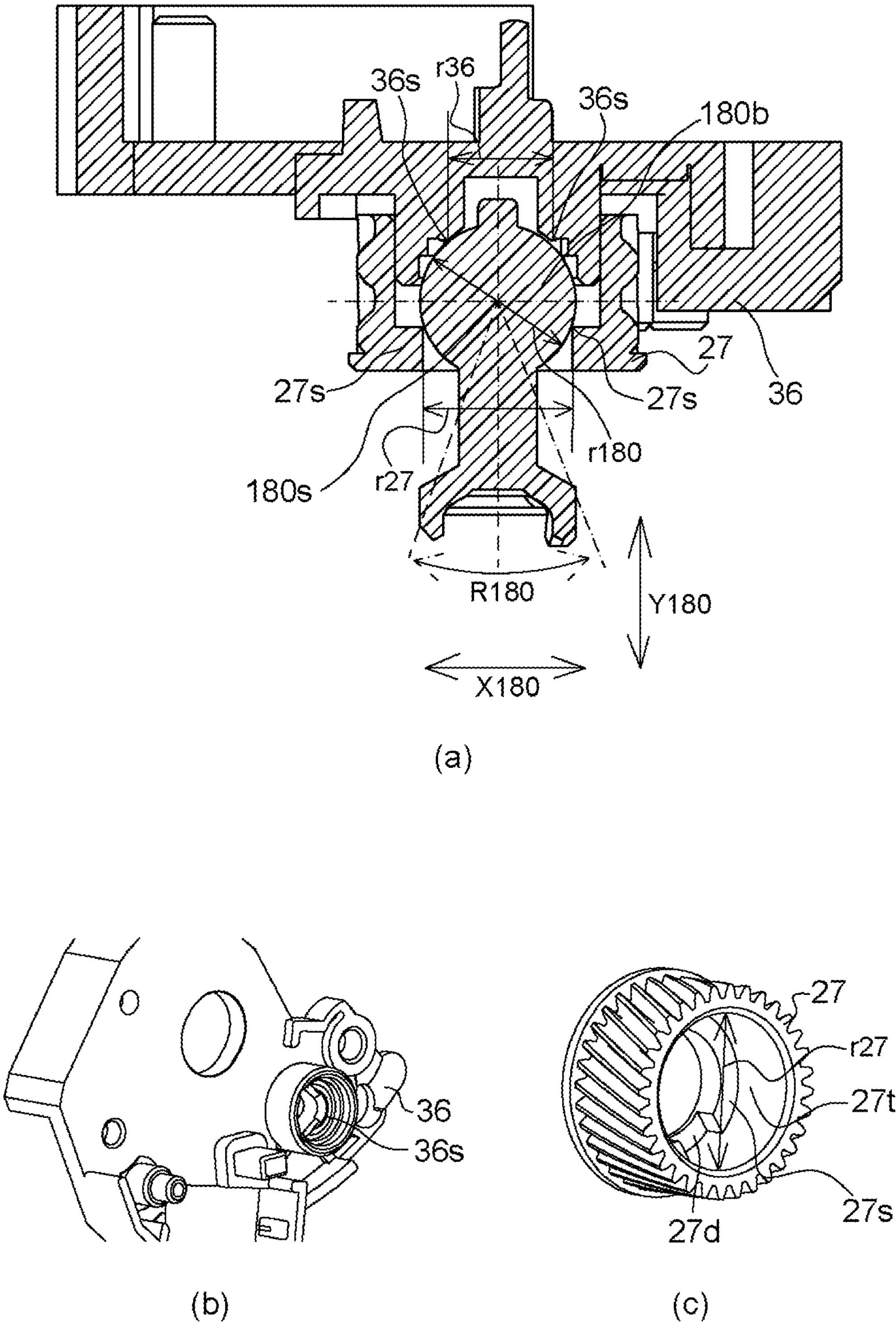

FIG. 16, parts (a) through (c), illustrate a relationship between the coupling member 180, a drive input gear 27 and a driving side development bearing 36 in the first embodiment of the present invention.

Figure 17:
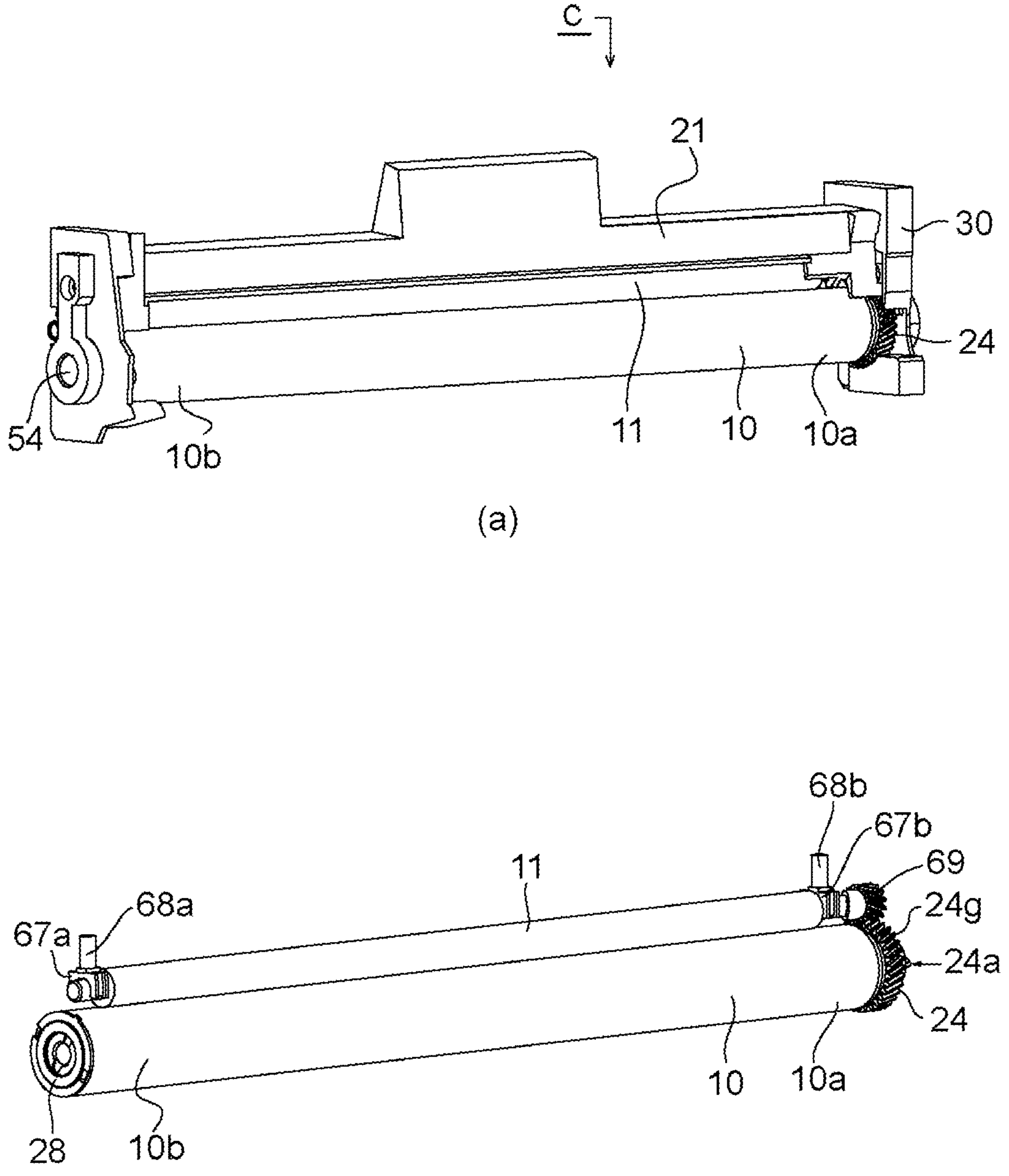

Part (a) of FIG. 17 is a schematic perspective view of the drum cartridge C as seen from the non-driving side, according to the first embodiment of the present invention, and part (b) of FIG. 17 is a schematic perspective view of the drum cartridge C with a drum frame 21, a drum shaft reception 30 and a drum shaft 54 and so on are omitted, according to the first embodiment of the present invention.

Figure 18:
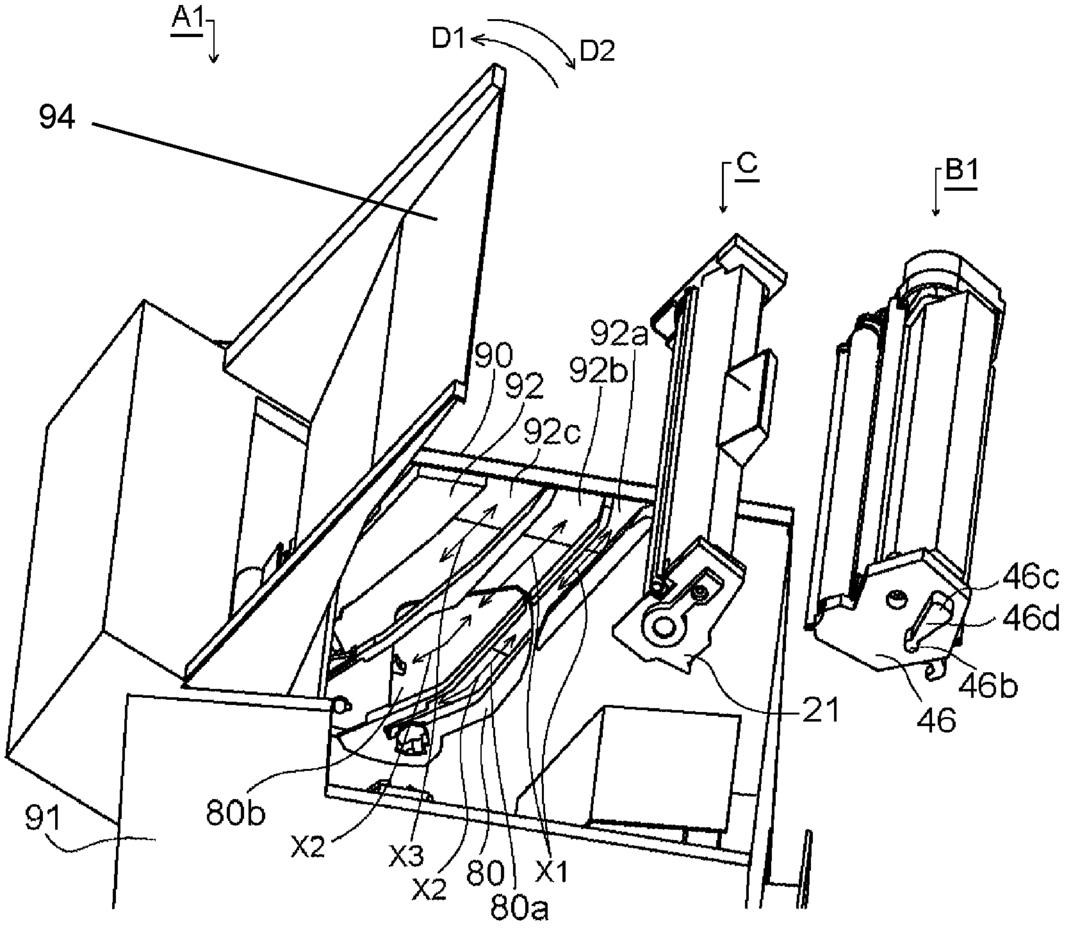

FIG. 18 is a schematic perspective view of the main assembly A1 as seen from the non-driving side according to the first embodiment of the present invention.

Figure 19:
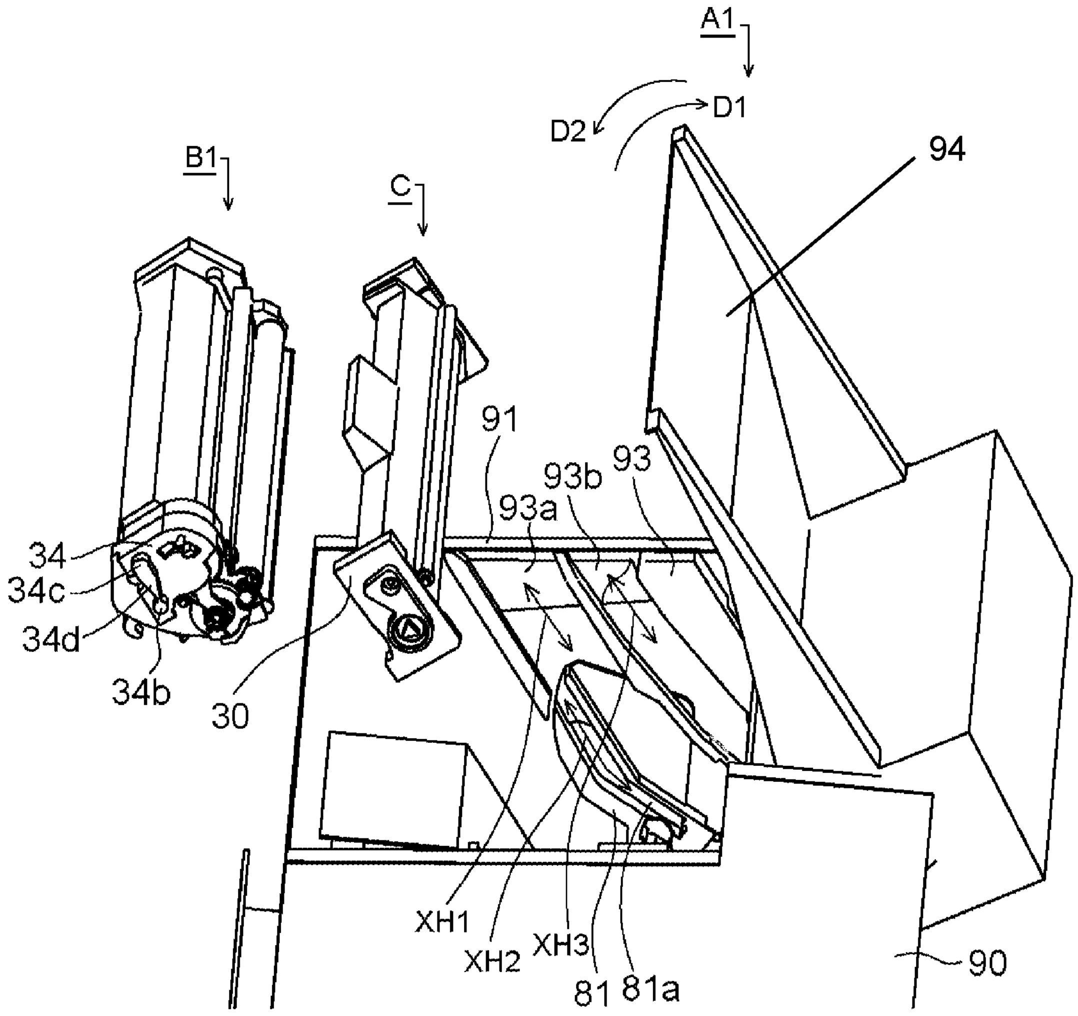

FIG. 19 is a schematic perspective view of the main assembly A1 as seen from the driving side, according to the first embodiment of the present invention.

Figure 20:
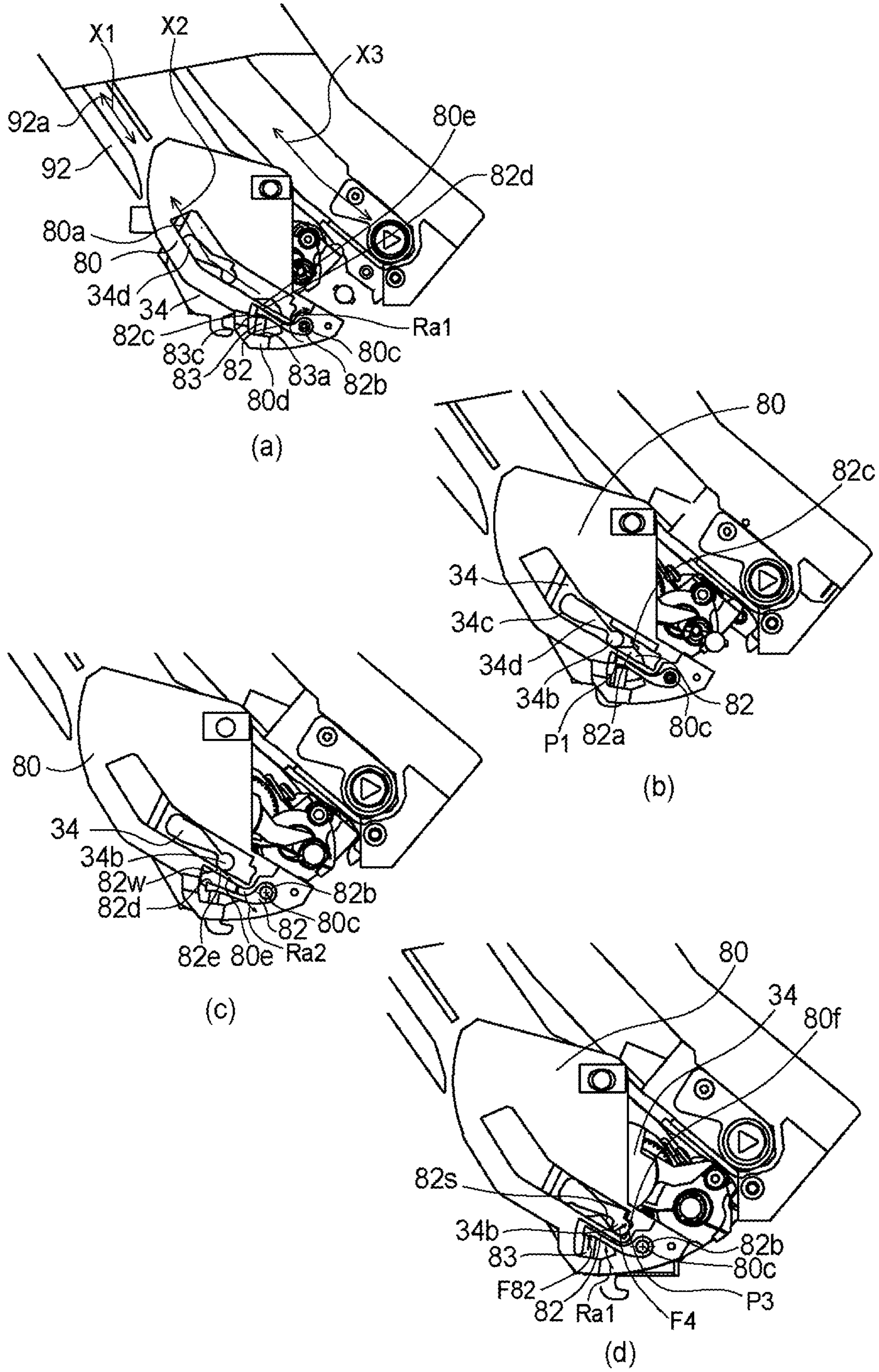

FIG. 20, parts (a) through (d), are illustrations of a mounting process of the developing cartridge B1 to the main assembly A1 according to the first embodiment of the present invention.

Figure 21:
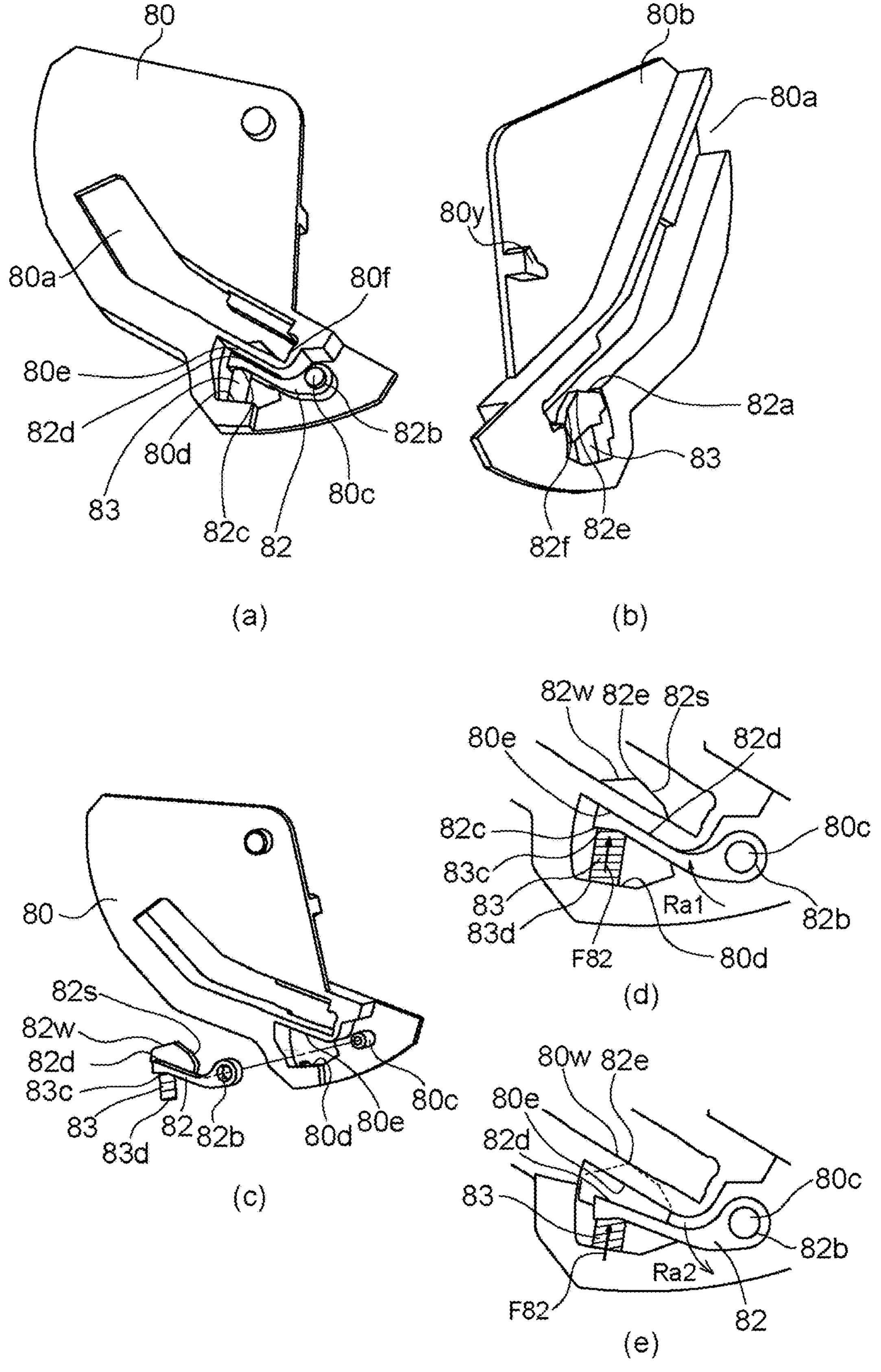

FIG. 21, parts (a) through (e), are schematic perspective views of peripheral configurations of a driving side swing guide 80 and a driving side urging member 82 in the first embodiment of the present invention.

Figure 22:
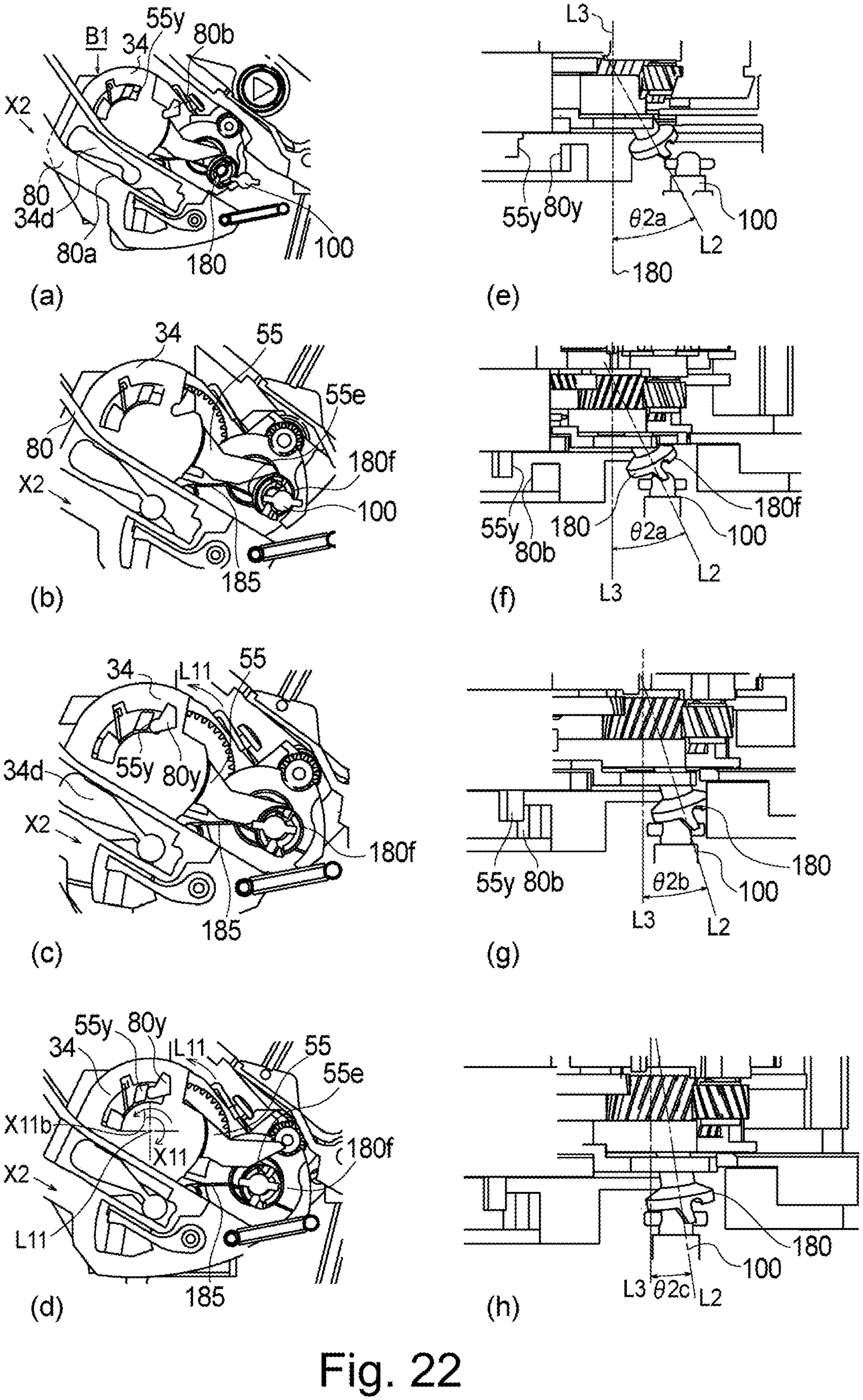

FIG. 22, parts (a) through (h), are sectional views illustrating operations of the coupling lever 55 and the coupling member 180 in the process of mounting the developing cartridge B1 to the main assembly A1 in the first embodiment of the present invention.

Figure 23:
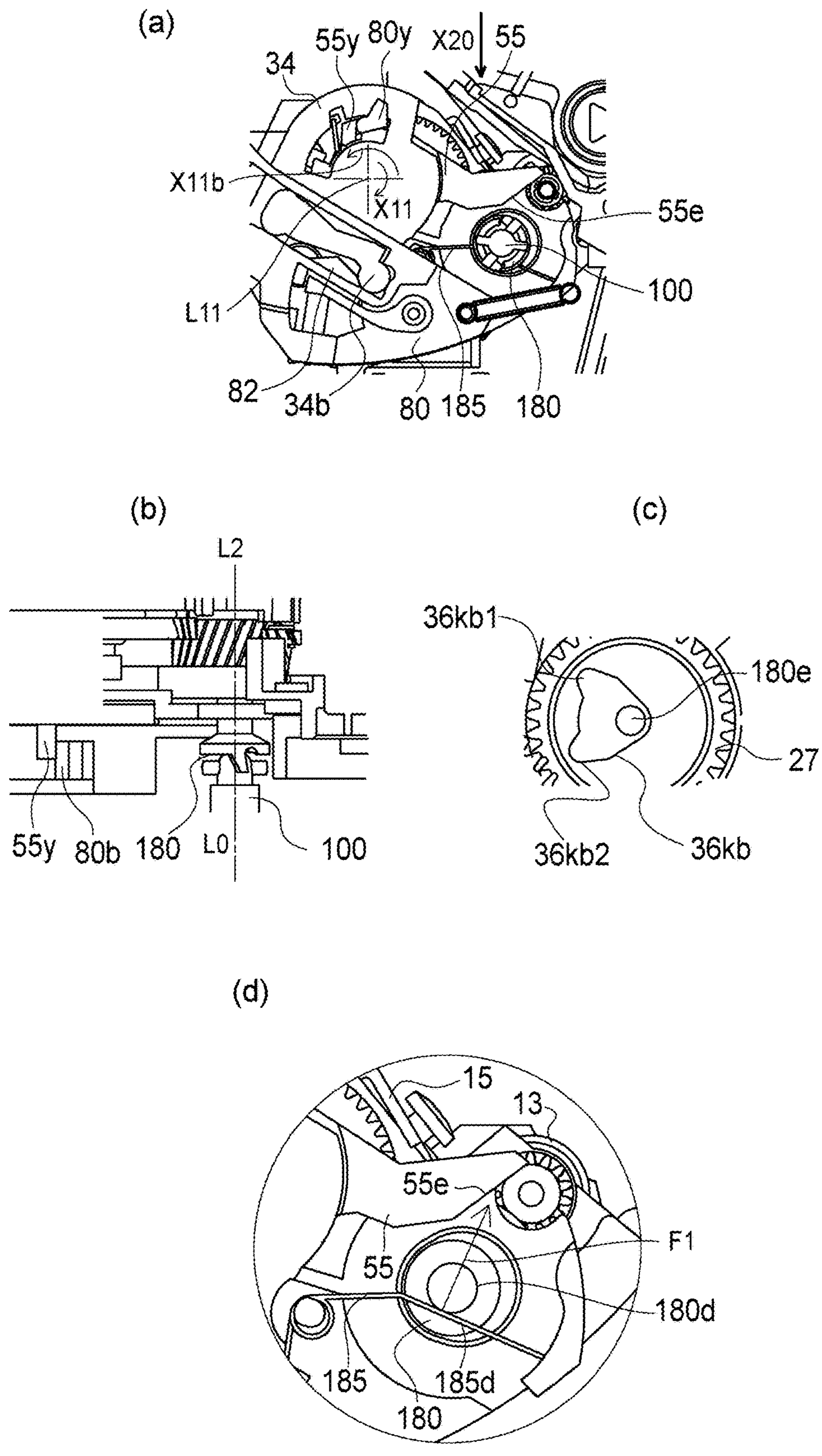

FIG. 23, parts (a) through (d), are illustrations of positions of the coupling lever 55 and the coupling member 180 when the mounting of the developing cartridge B1 to the main assembly A1 is completed.

Figure 24:
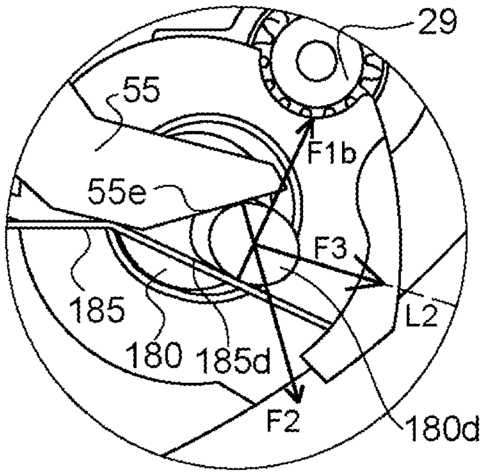
Figure 24:
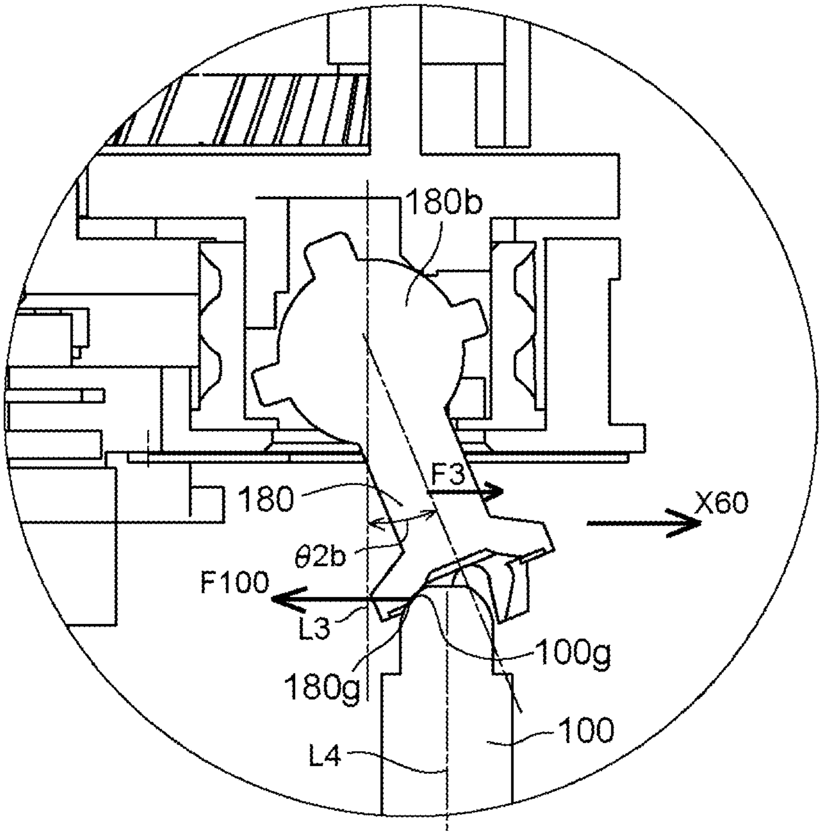

FIG. 24, parts (a) and (b), are sectional views showing the relationship of the forces around the coupling member 180 when an annular portion 180*f* of the coupling member 180 contacts the main assembly side driving member 100.

Figure 25:
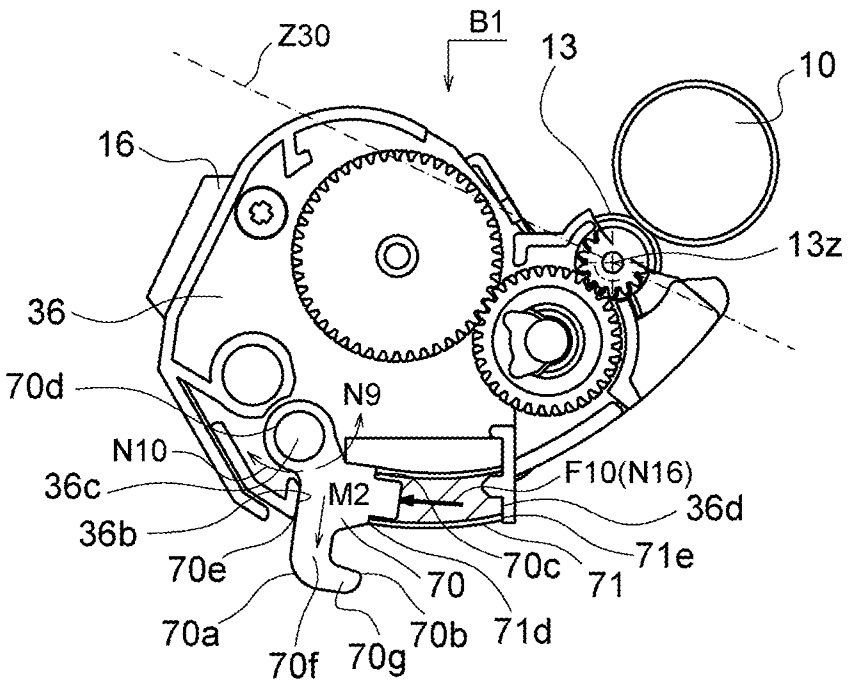
Figure 25:
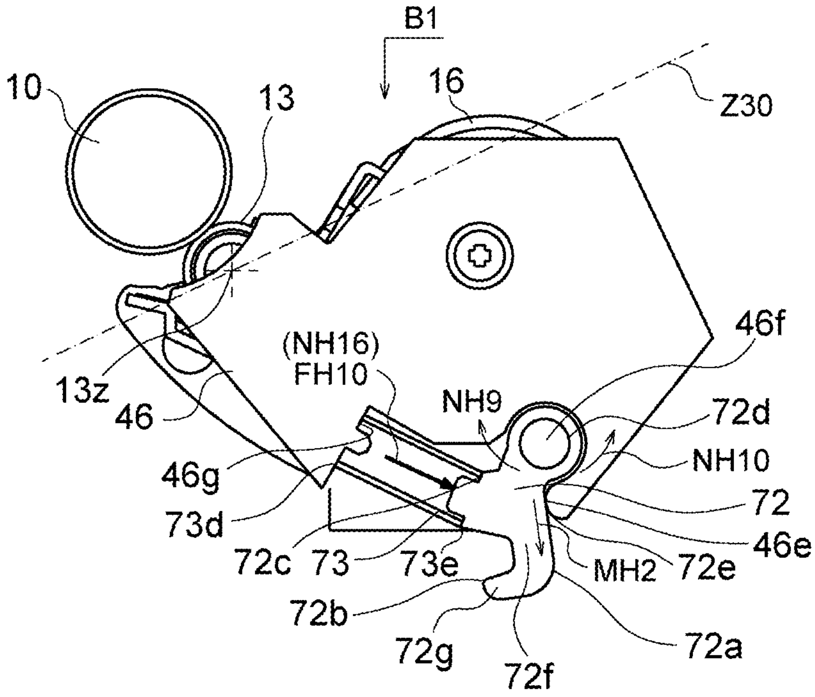

FIG. 25, parts (a) and (b), are illustrations of a driving side contacting/spacing lever 70 and peripheral configurations thereof in the first embodiment of the present invention.

Figure 26:
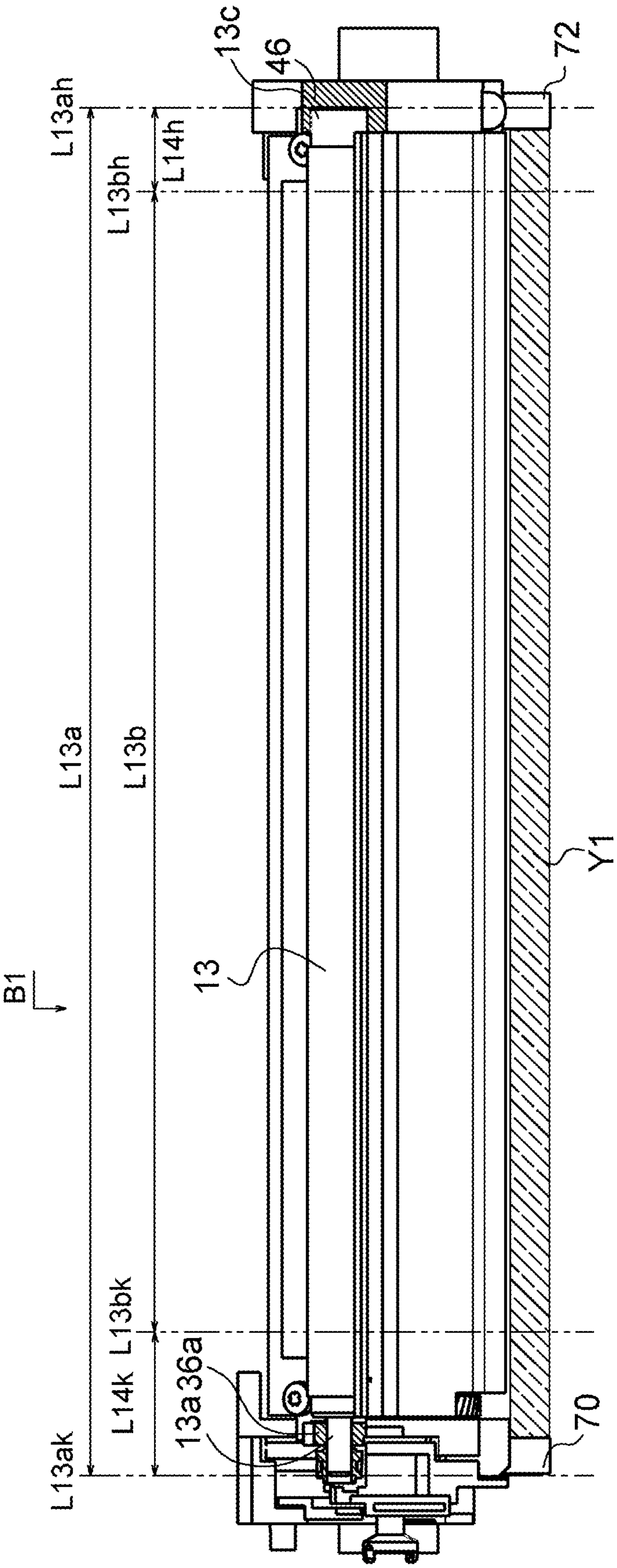

FIG. 26 is a front view of a developing cartridge according to the first embodiment of the present invention.

Figure 27:
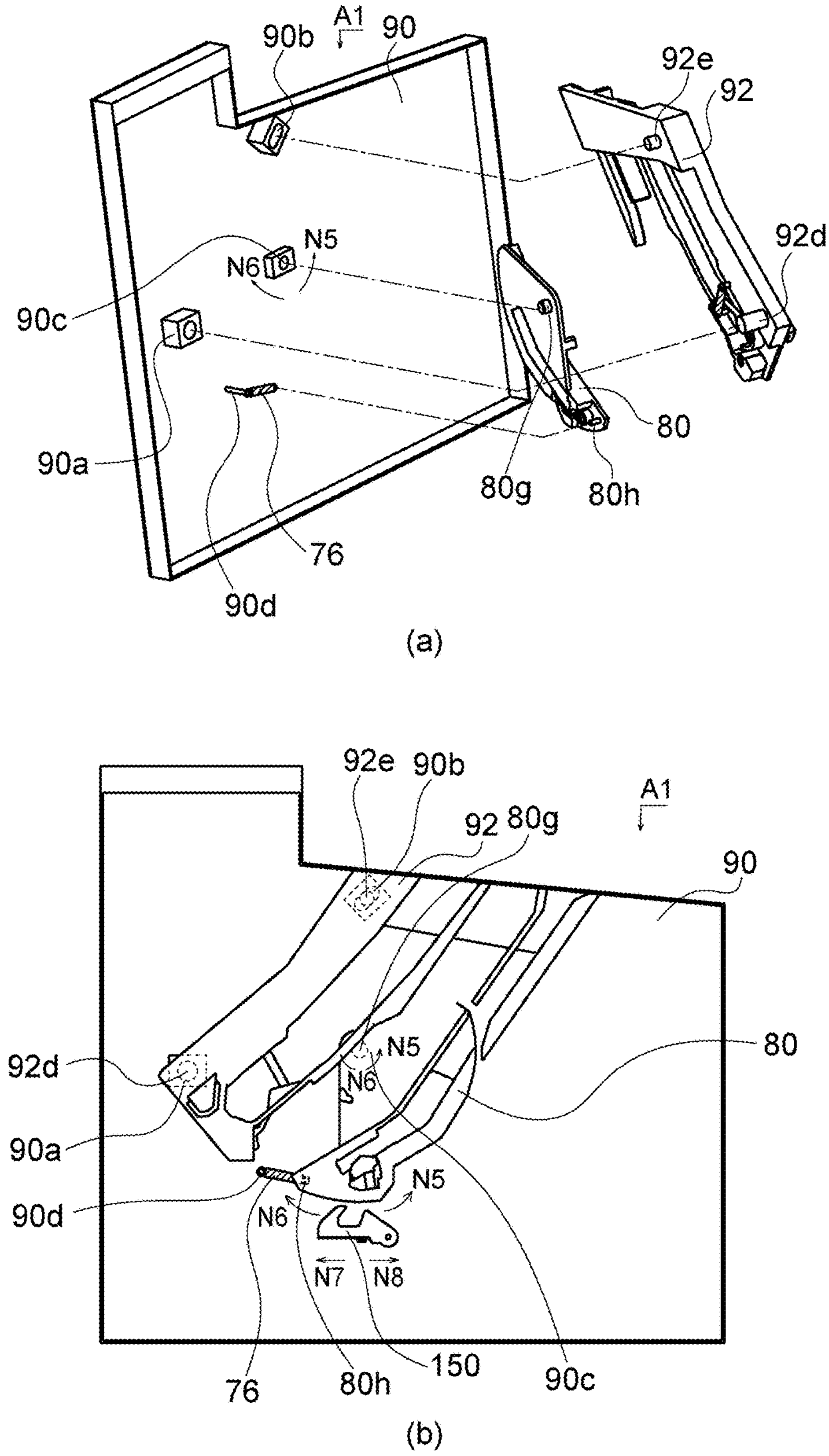

FIG. 27, parts (a) and (b), are views of a driving-side side plate in the first embodiment of the present invention.

Figure 28:
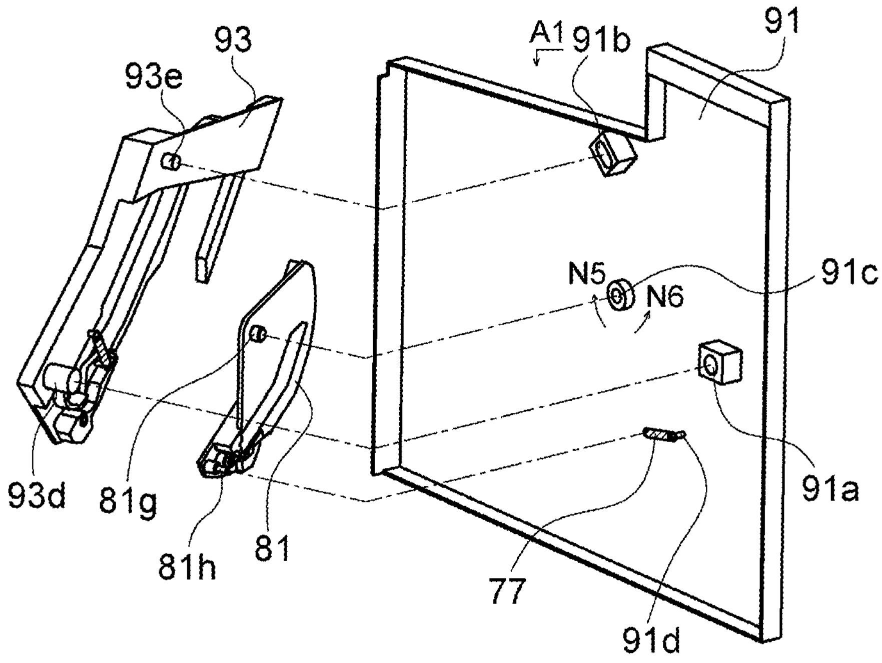
Figure 28:
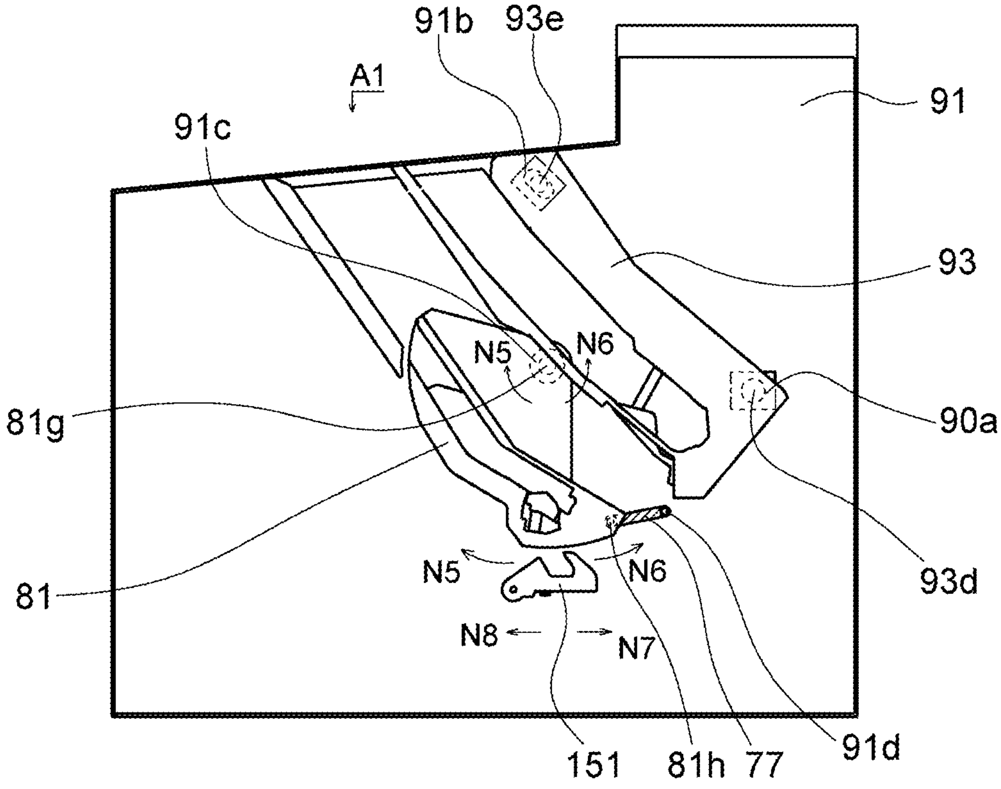

FIG. 28, parts (a) and (b), are views of a non-driving-side side plate in the first embodiment of the present invention.

Figure 29:
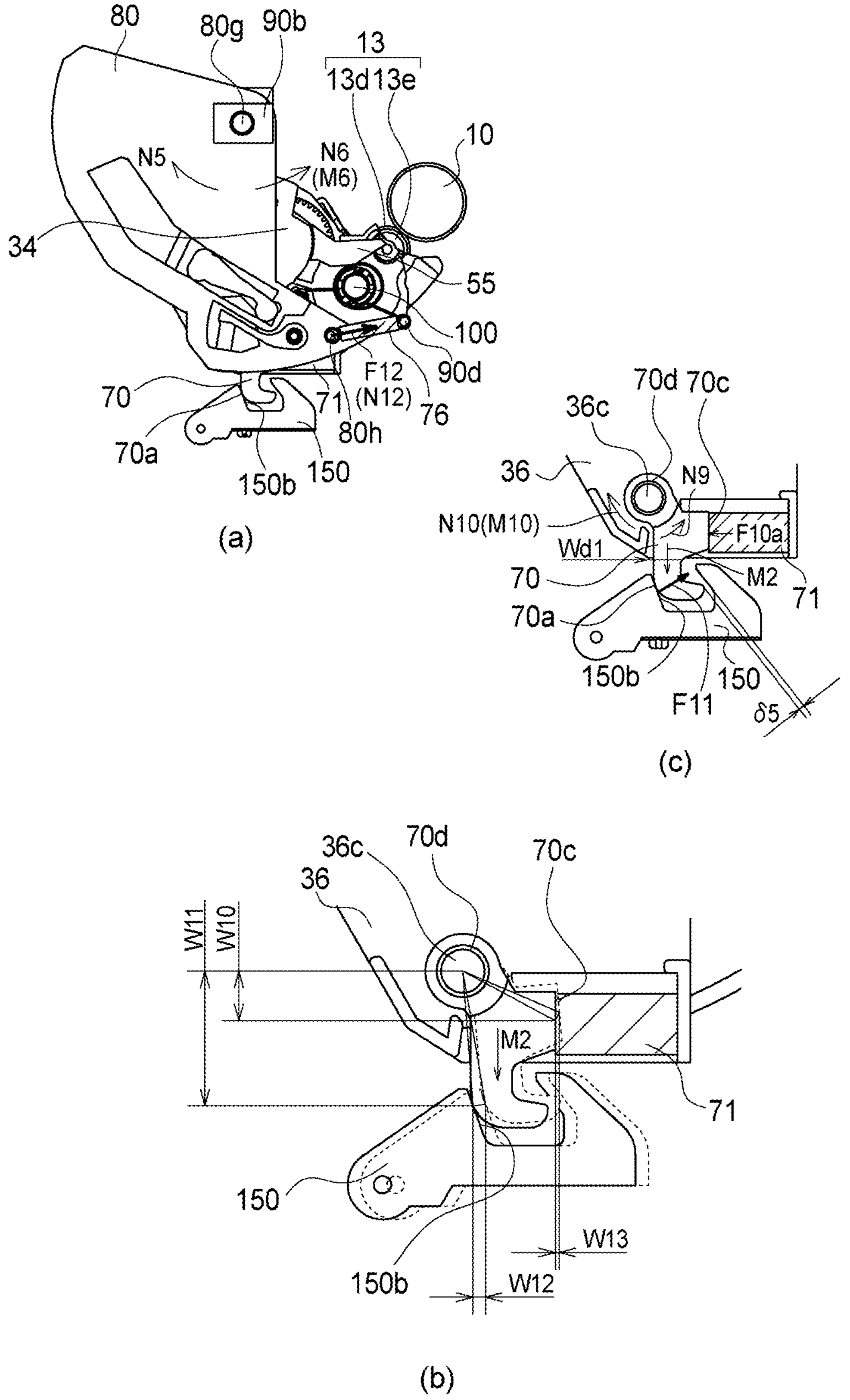

FIG. 29, parts (a) through (c), are side views of driving sides of the developing cartridge and a driving side swing guide in the first embodiment of the present invention.

Figure 30:
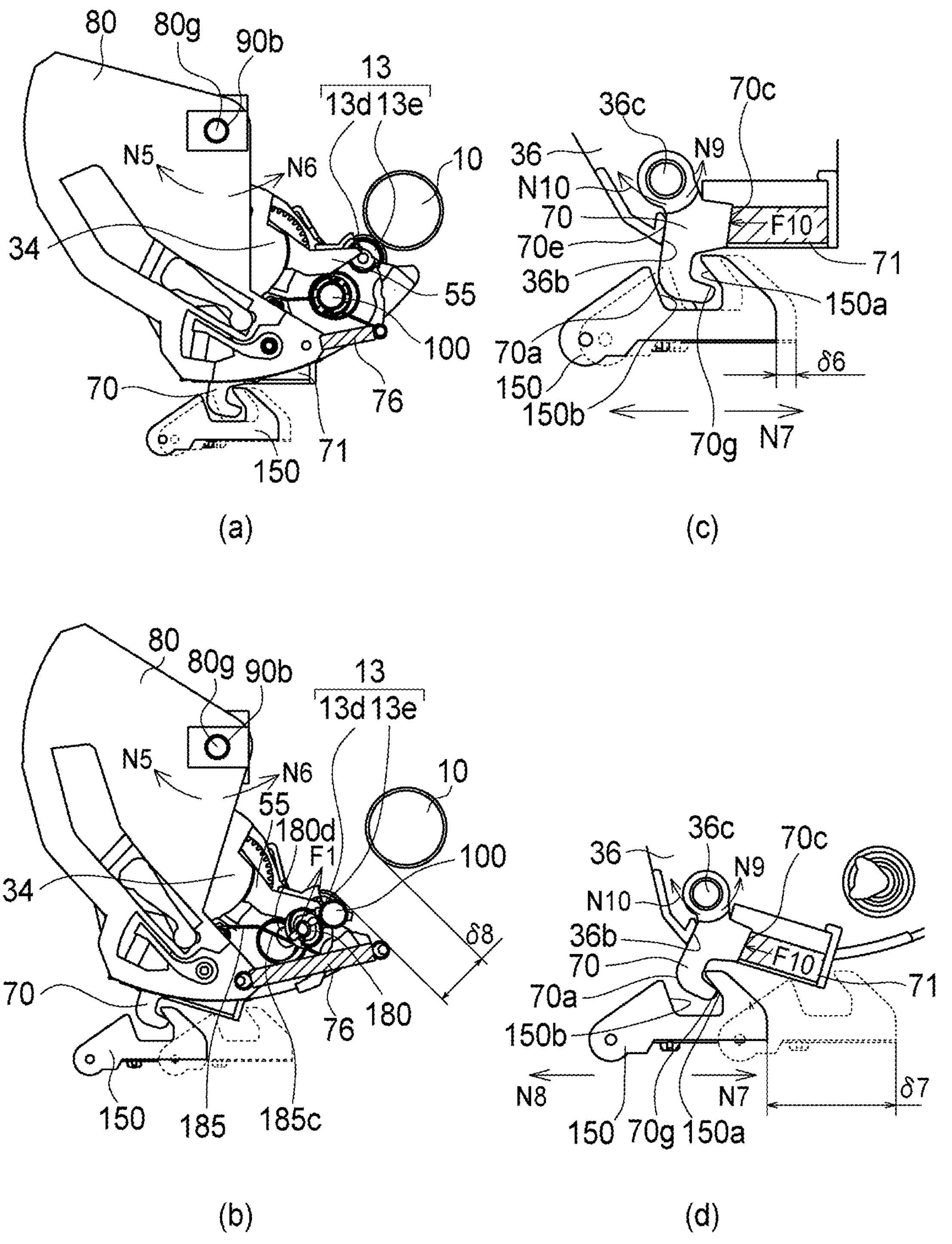

FIG. 30, parts (a) through (d), are side views of driving sides of the developing cartridge and a driving side swing guide in the first embodiment of the present invention.

Figure 31:
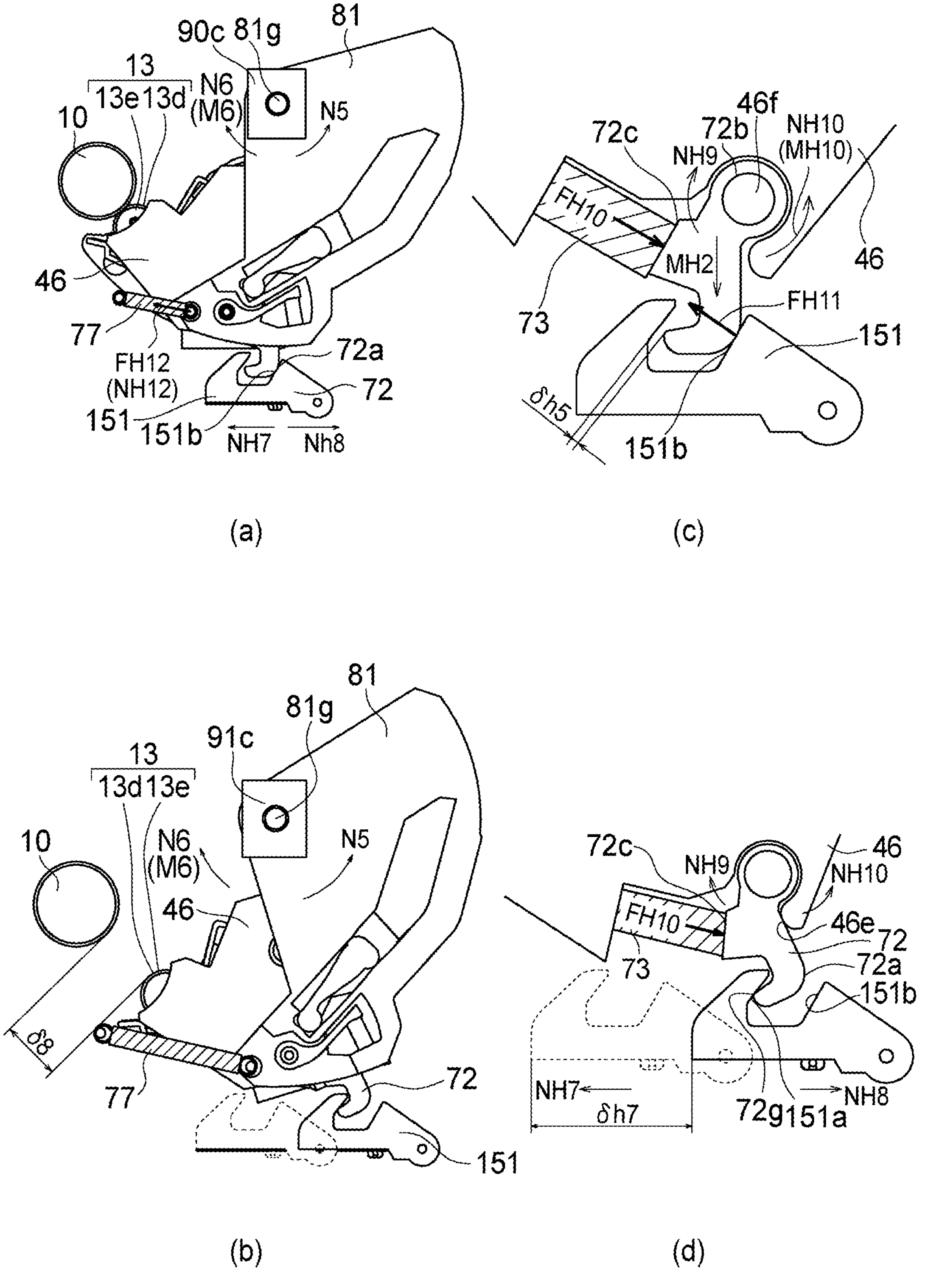

FIG. 31, parts (a) through (d), are side views of a non-driving side of the developing cartridge and a non-driving side swing guide in the first embodiment of the present invention.

Figure 32:
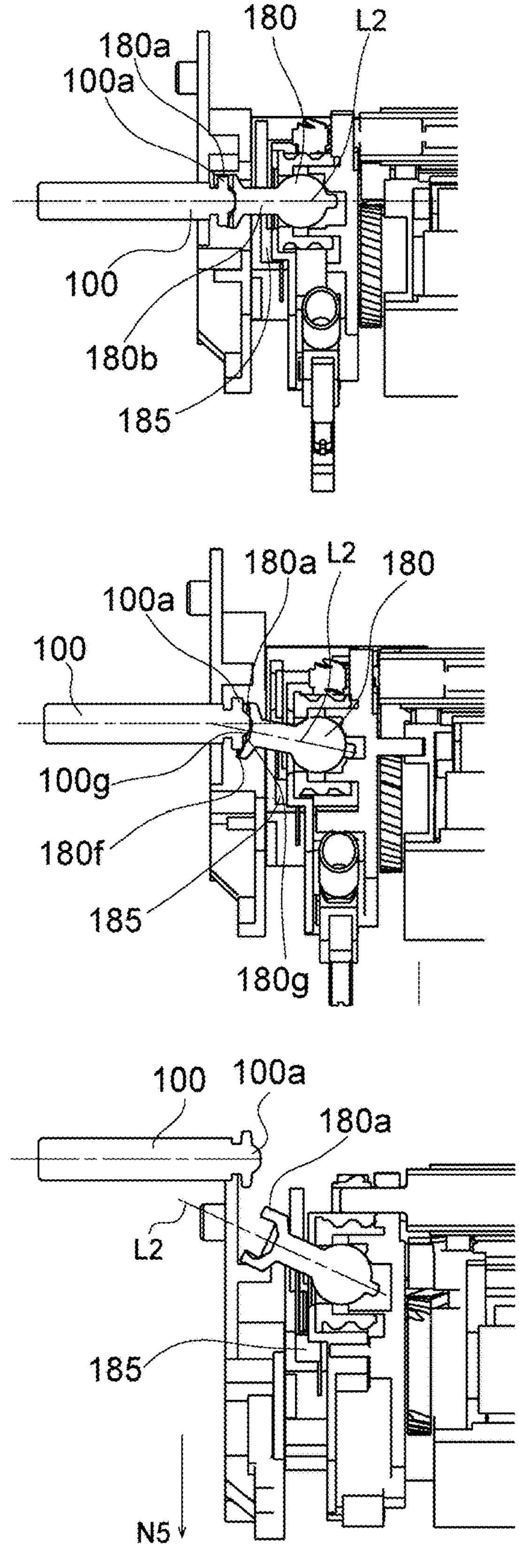

FIG. 32, parts (a) through (c), are illustrations of engagement states between the coupling member 180 and the main assembly driving member 100 in a contacted-developing-device-state in the spaced-developing-device-state in the first embodiment of the present invention.

Figure 33:
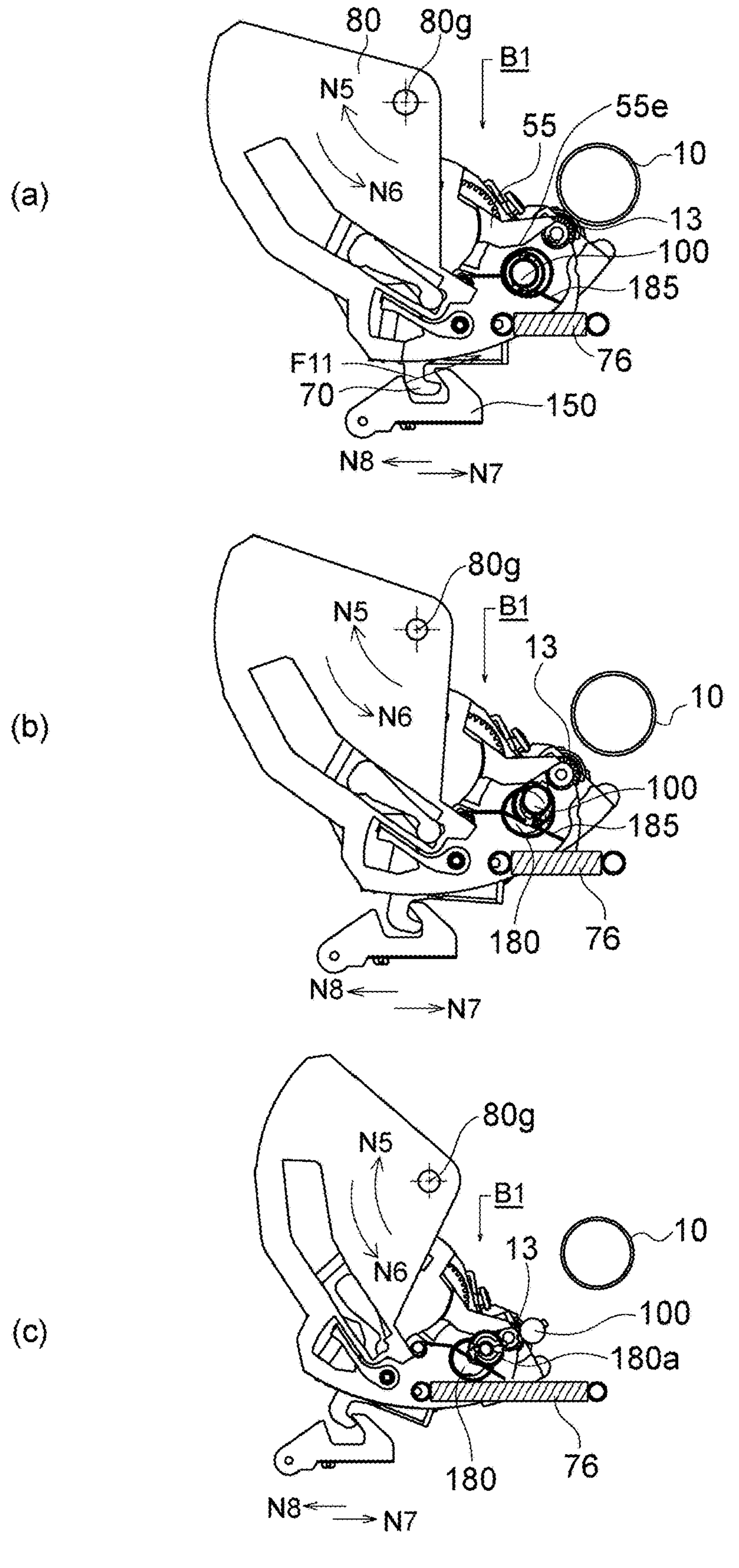

FIG. 33, parts (a) through (c), are illustrations of engagement states between the coupling member 180 and the main assembly driving member 100 in a contacted-developing-device-state in the spaced-developing-device-state in the first embodiment of the present invention, as seen from a driving-side side surface.

Figure 34:
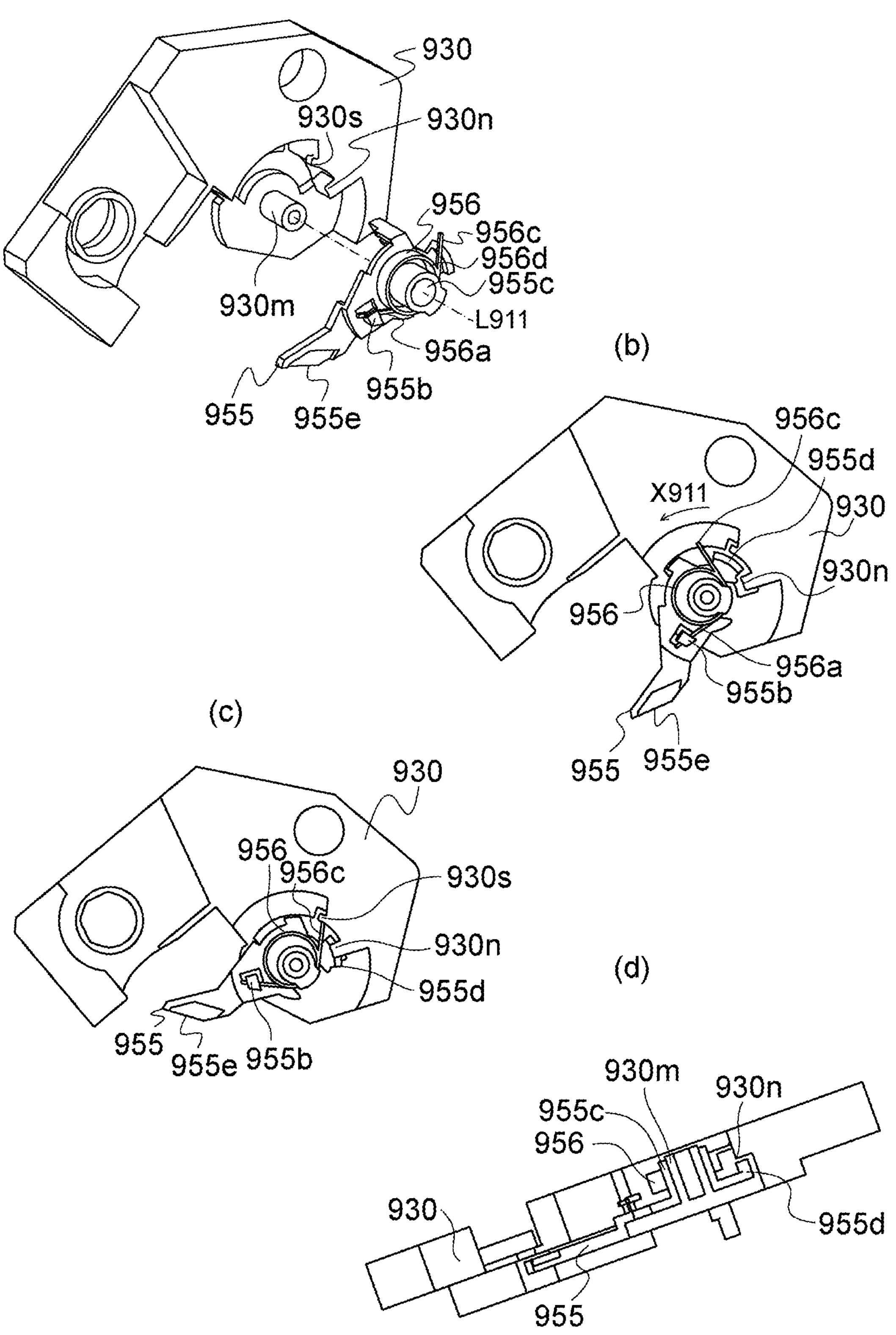

FIG. 34, parts (a) through (d), illustrate a coupling lever 955 and a coupling lever spring 956 mounted to a driving side drum bearing 930, in a second embodiment of the present invention.

Figure 35:
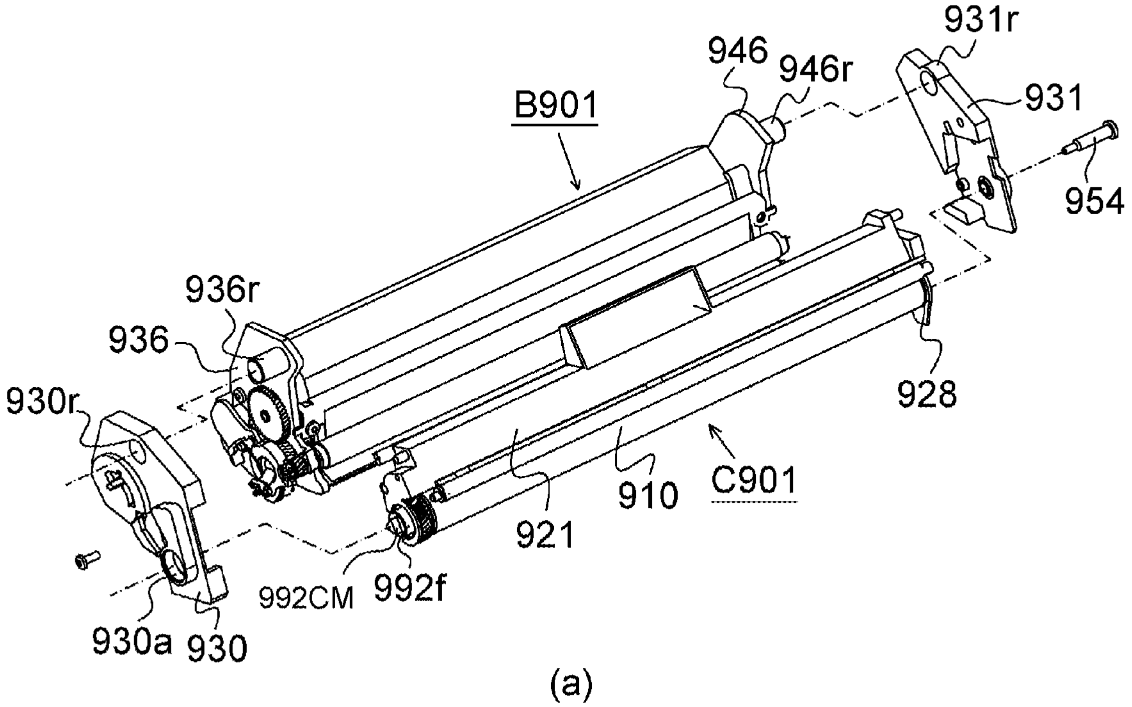
Figure 35:
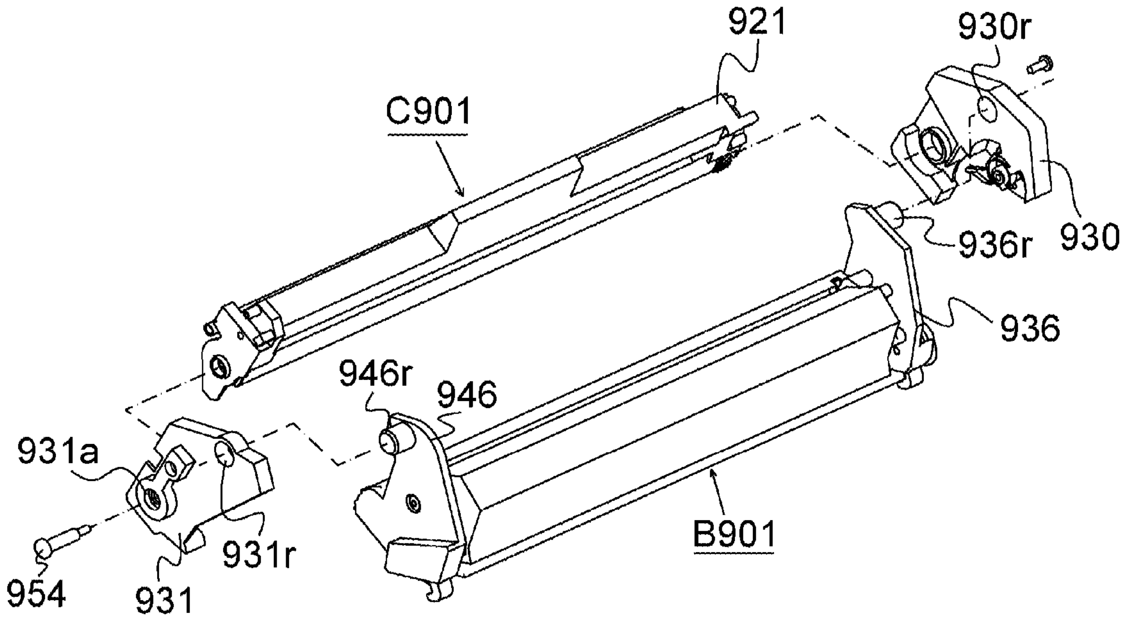

FIG. 35, parts (a) and (b), are perspective views illustrating the developing cartridge B1 and the drum cartridge C a unified into a combined process cartridge P, according to the second embodiment of the present invention.

Figure 36:
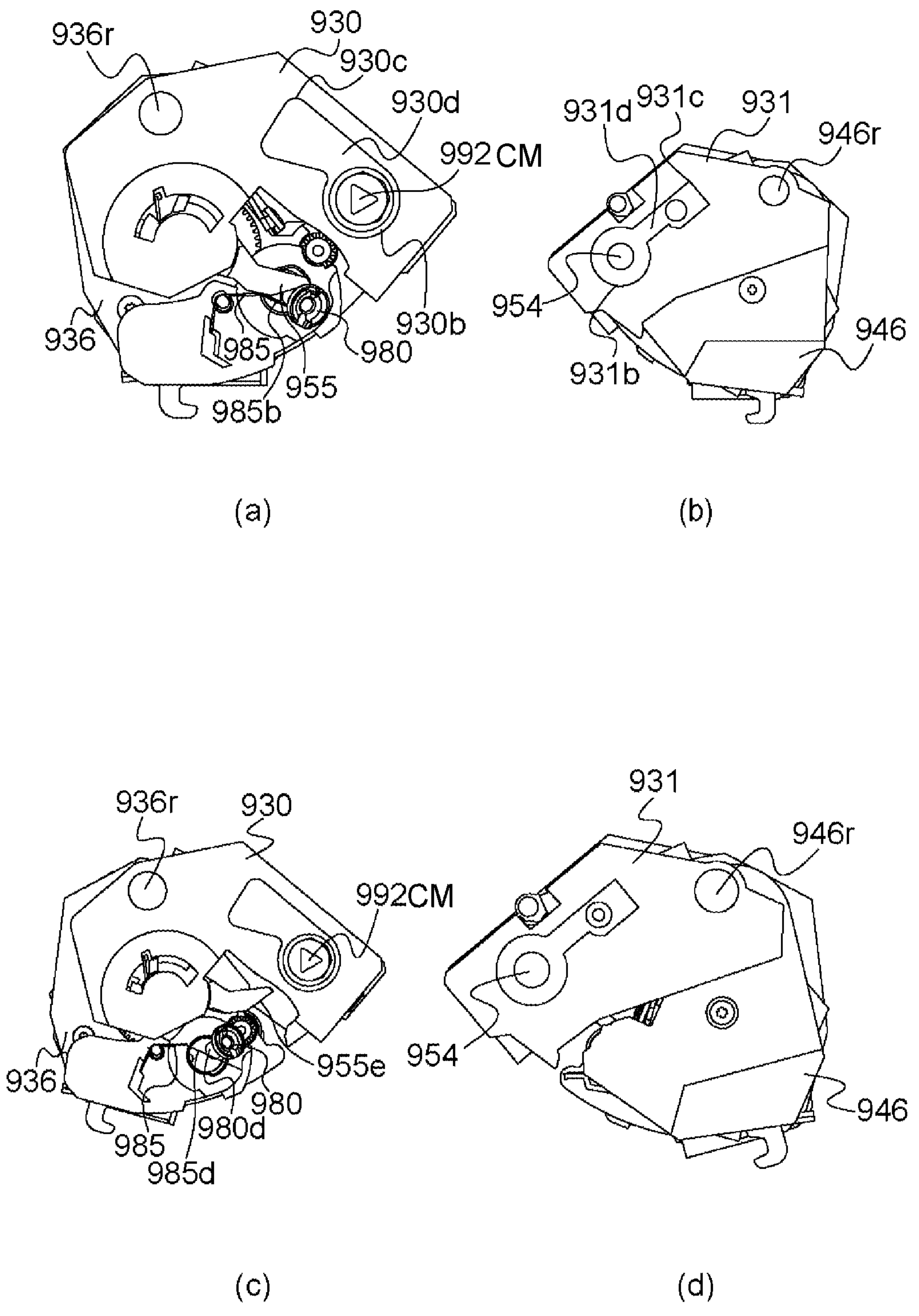

FIG. 36, parts (a) through (d), are views of the developing cartridge B1 swing relative to the drum cartridge C, as seen from the driving side, according to the second embodiment of the present invention.

Figure 37:
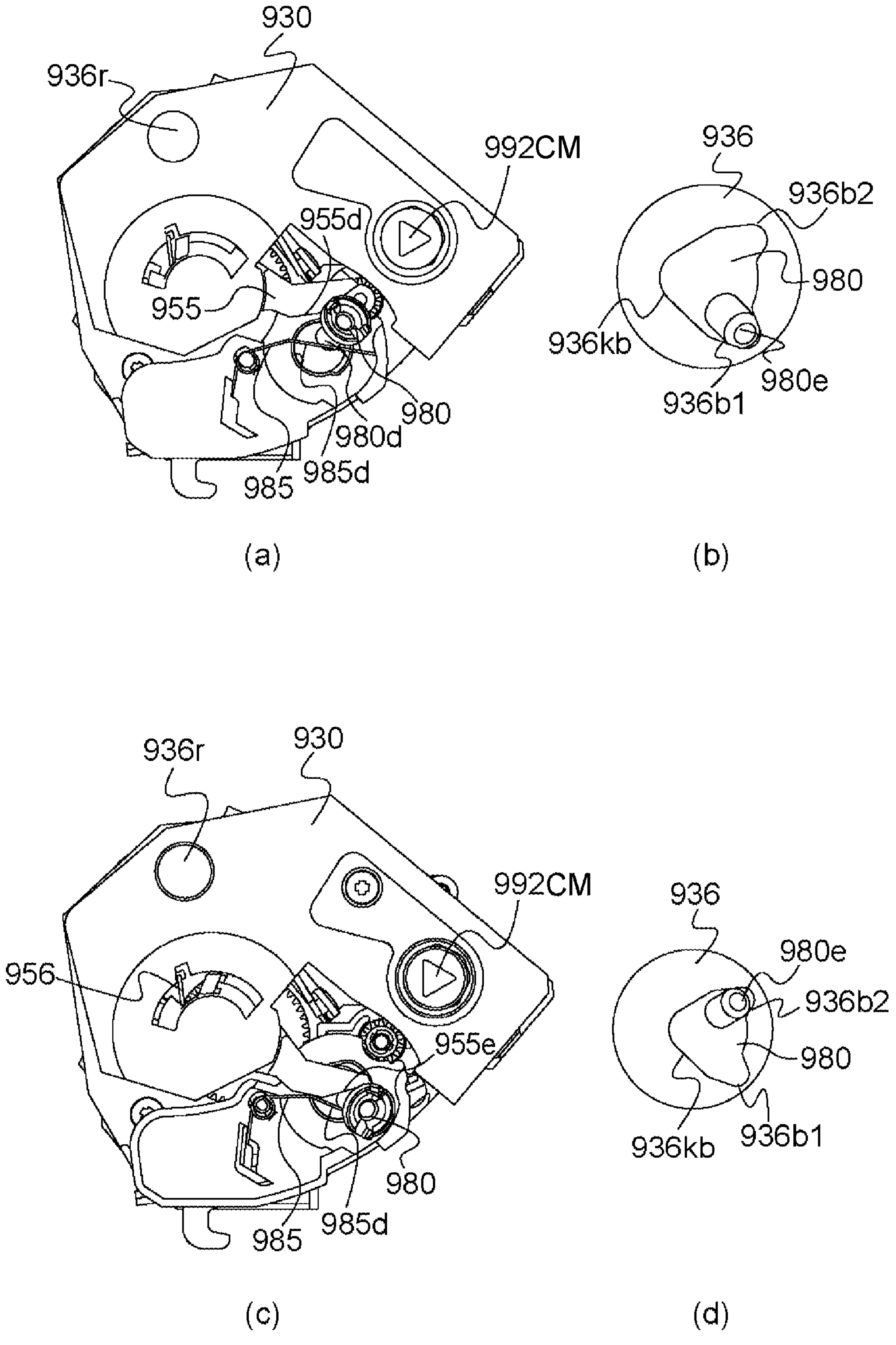

FIG. 37, parts (a) through (d), show attitudes of the coupling lever 955 and the coupling member 180 in a process cartridge P according to the second embodiment of the present invention.

Figure 38:
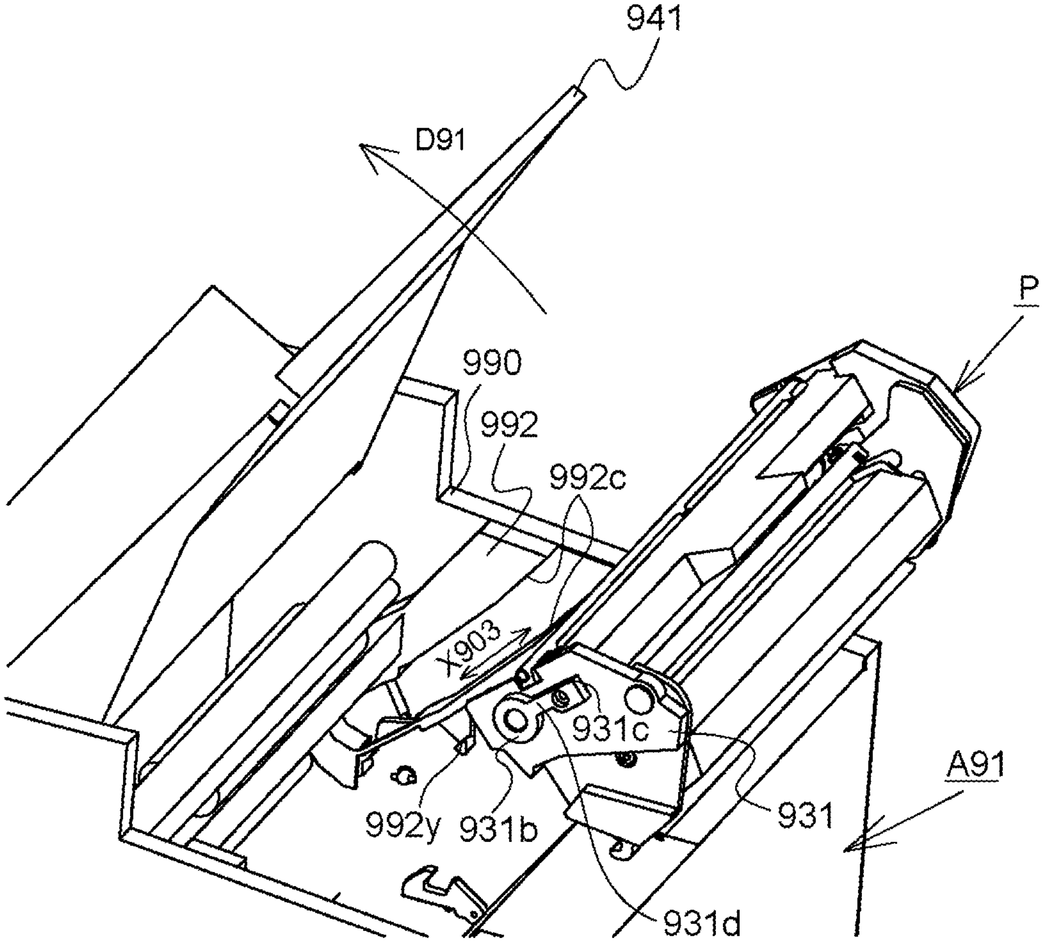

FIG. 38 is a schematic perspective view of the main assembly A1 seen from the non-driving side according to the second embodiments of the present invention.

Figure 39:
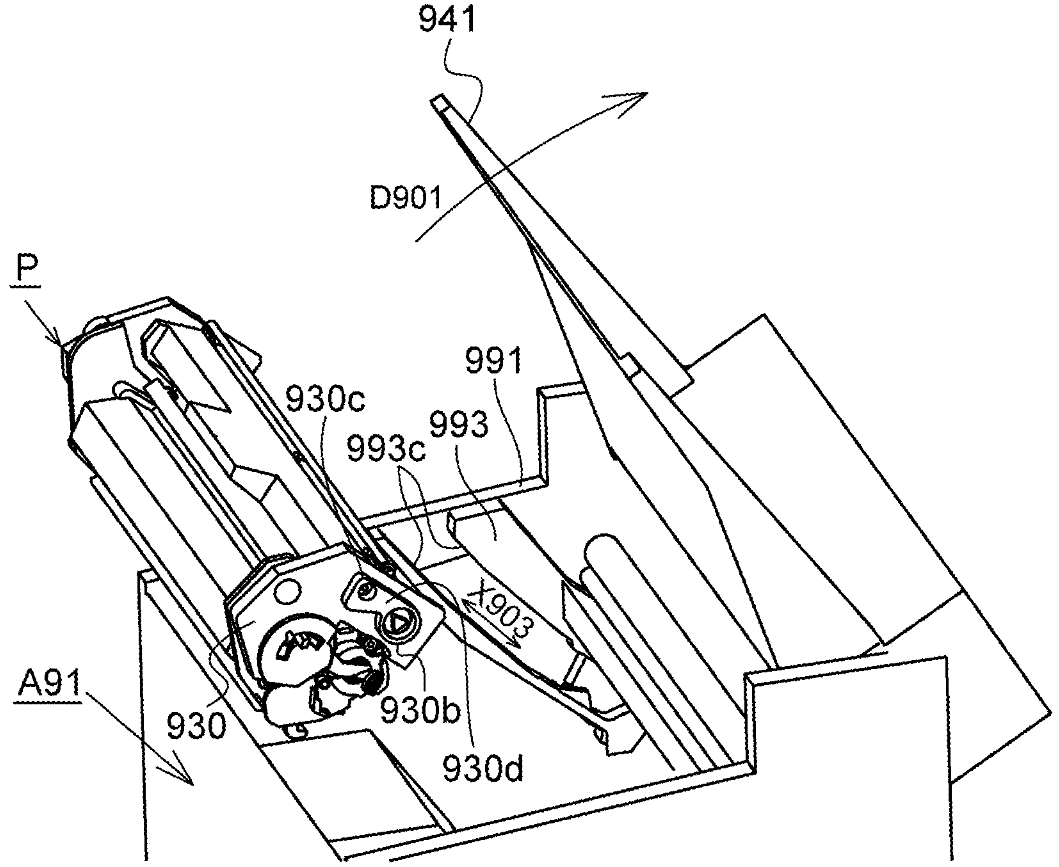

FIG. 39 is a schematic perspective view of the main assembly A1 as seen from the driving side, according to the second embodiment of the present invention.

Figure 40:
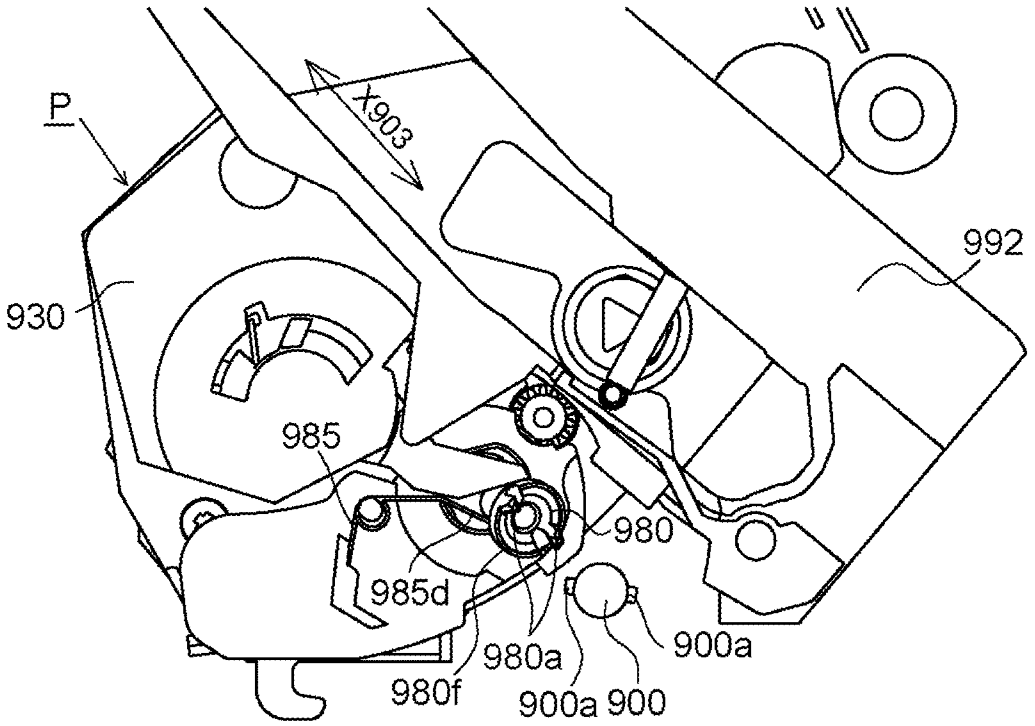

FIG. 40 is an illustration of the process cartridge P according to the second embodiment of the present invention when it is being mounted to the main assembly A1.

Figure 41:
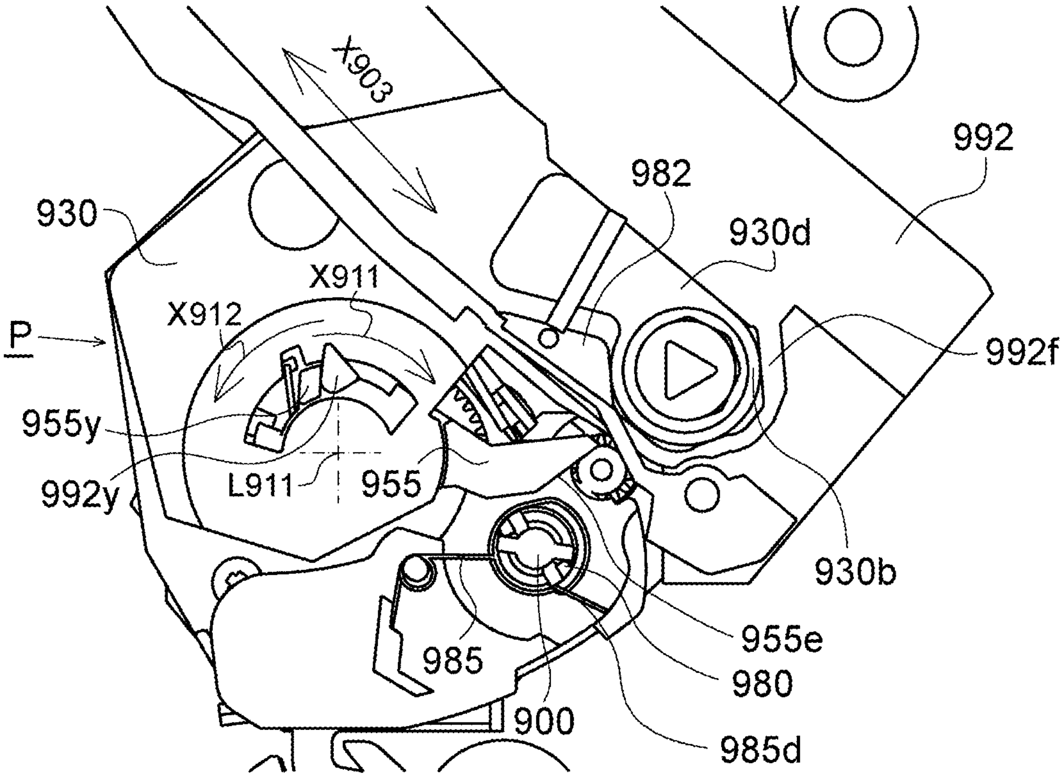

FIG. 41 is an illustration of the process cartridge P mounted completely to the main assembly A1, according to the second embodiment of the present invention.

Figure 42:
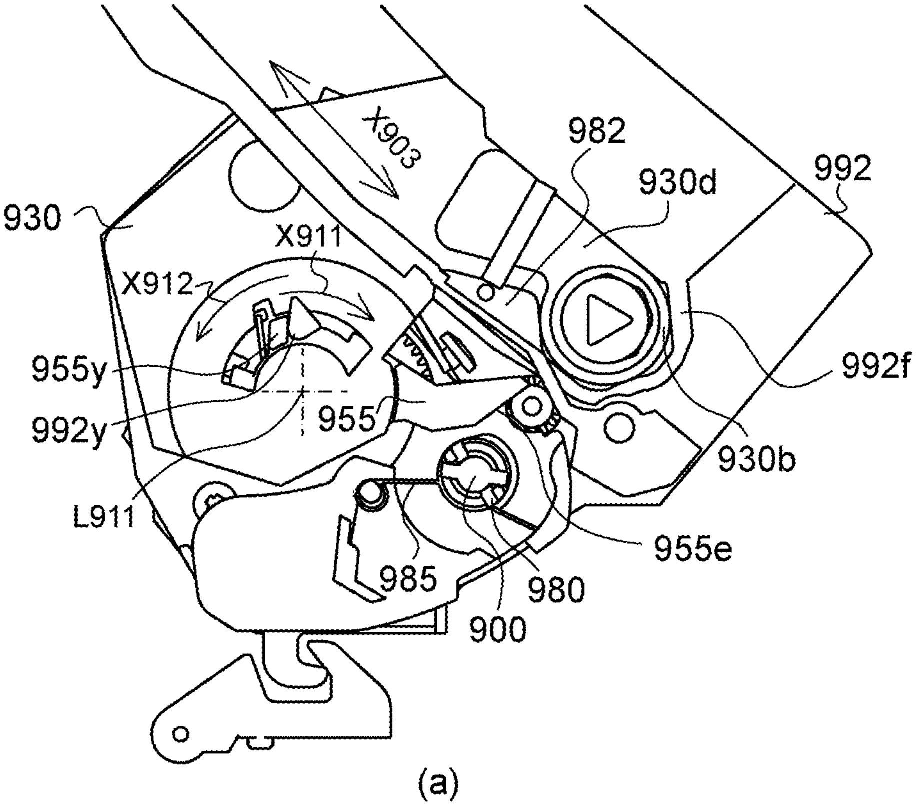
Figure 42:
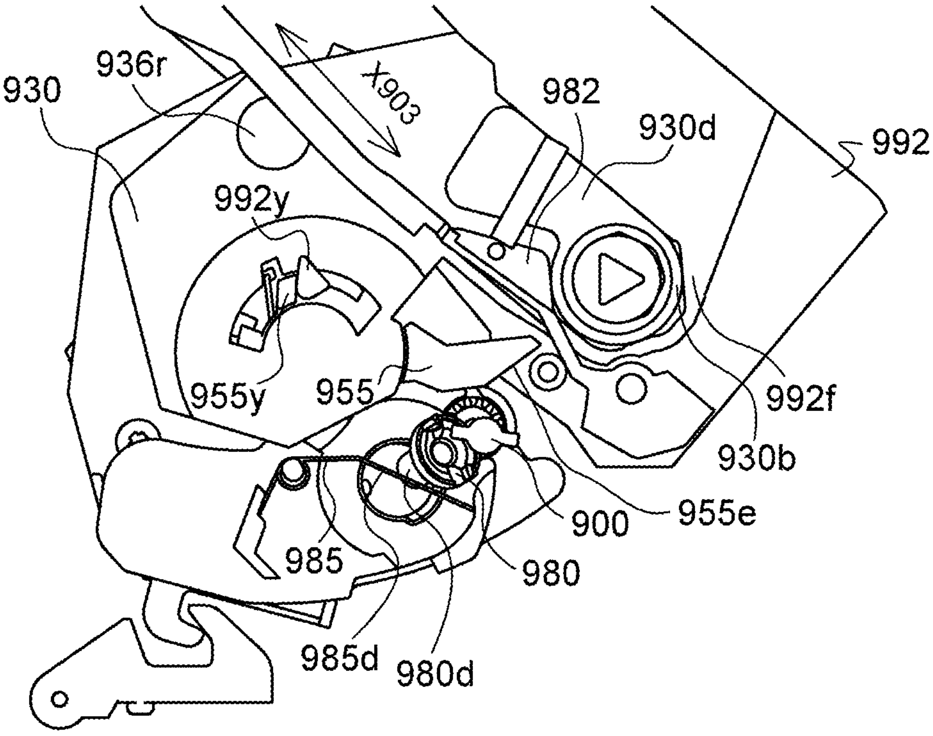

FIG. 42, parts (a) and (b), are views of the developing cartridge B1 of the process cartridge P and the photosensitive drum 10 in which the developing cartridge B1 is in a development pressing state and in a spaced-developing-device-state.

Figure 43:
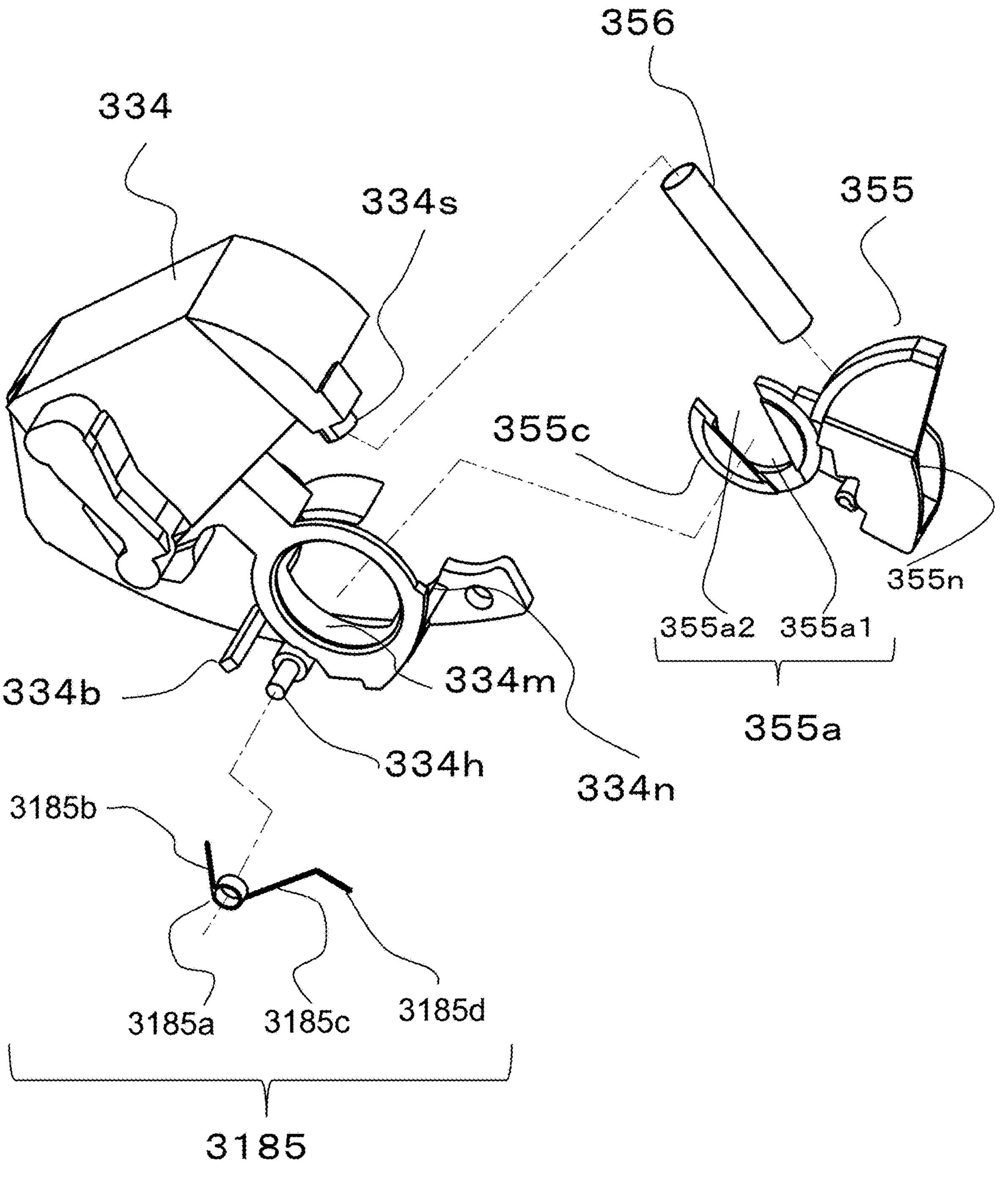

FIG. 43 is a schematic perspective view in the state for mounting a coupling spring 3185, a coupling lever 355 and a coupling lever spring 356 to a development side cover 334, according to a third embodiment of the present invention.

Figure 44:
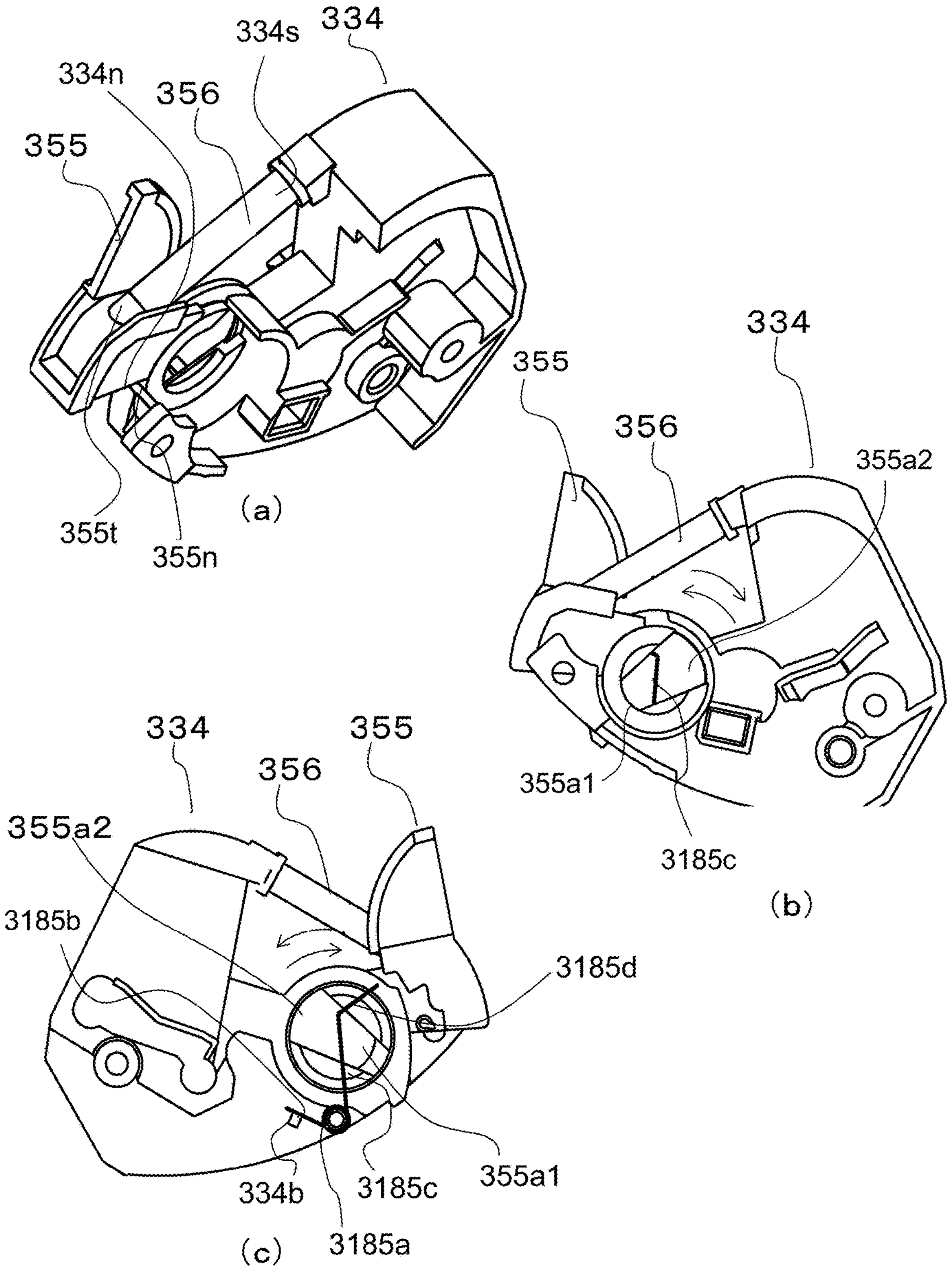

FIG. 44, parts (a) through (c), are schematic perspective views in the state that the coupling lever 355, the coupling lever spring 356 and the coupling spring 3185 are mounted to the development side cover 334, according to the third embodiment of the present invention.

Figure 45:
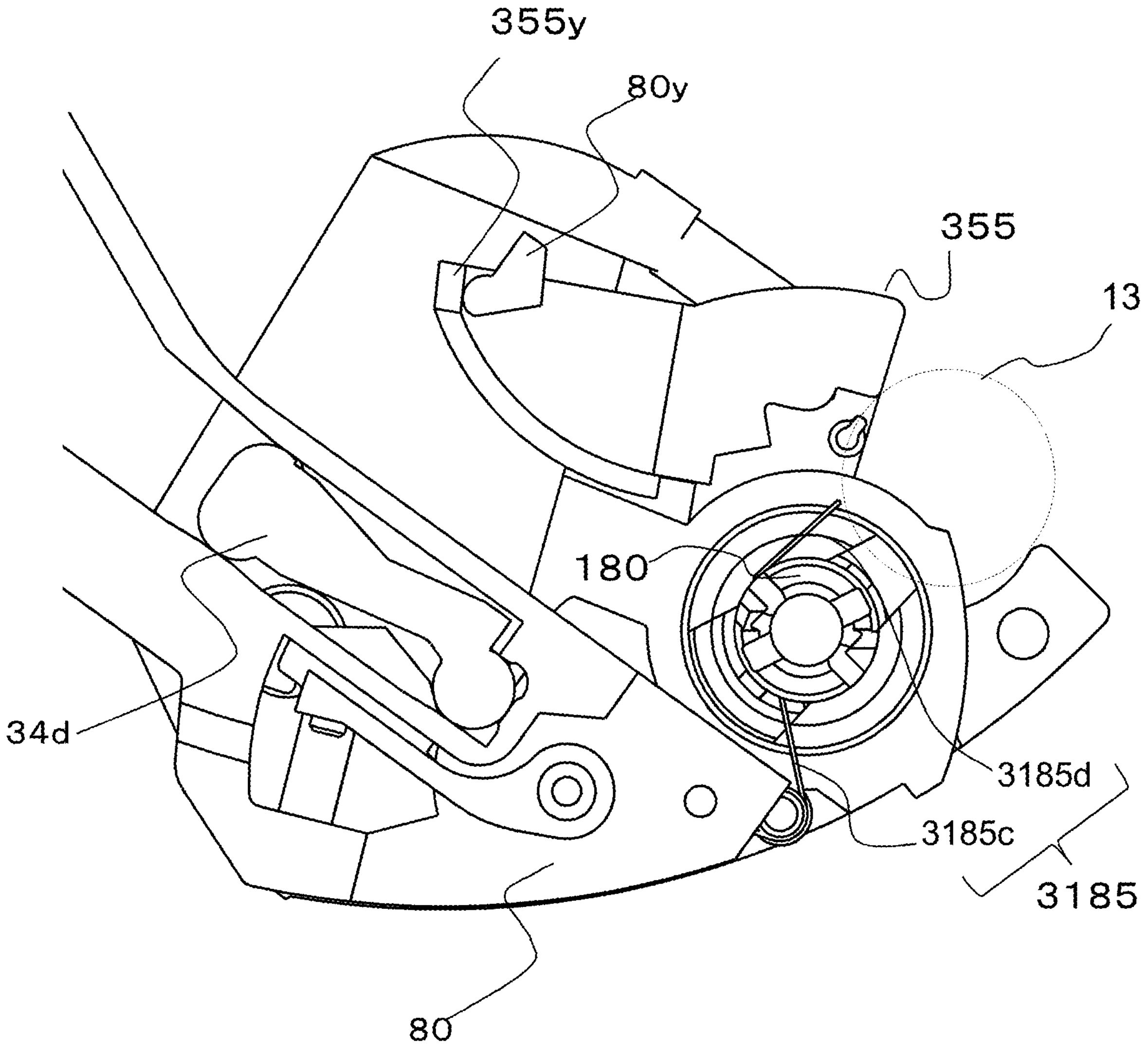

FIG. 45 is a view of the developing cartridge B1 according to the third embodiment of the present invention, as seen from the driving side when the image forming operation can be carried out in the main assembly A1.

Figure 46:
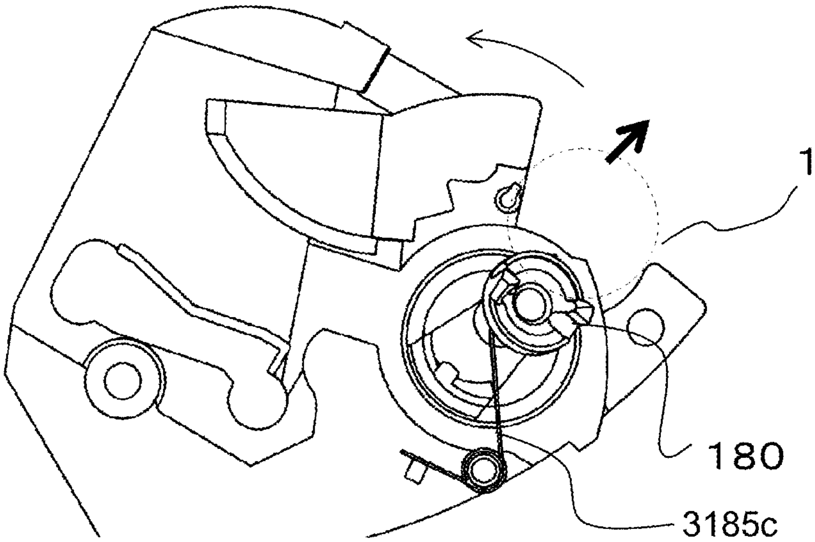
Figure 46:
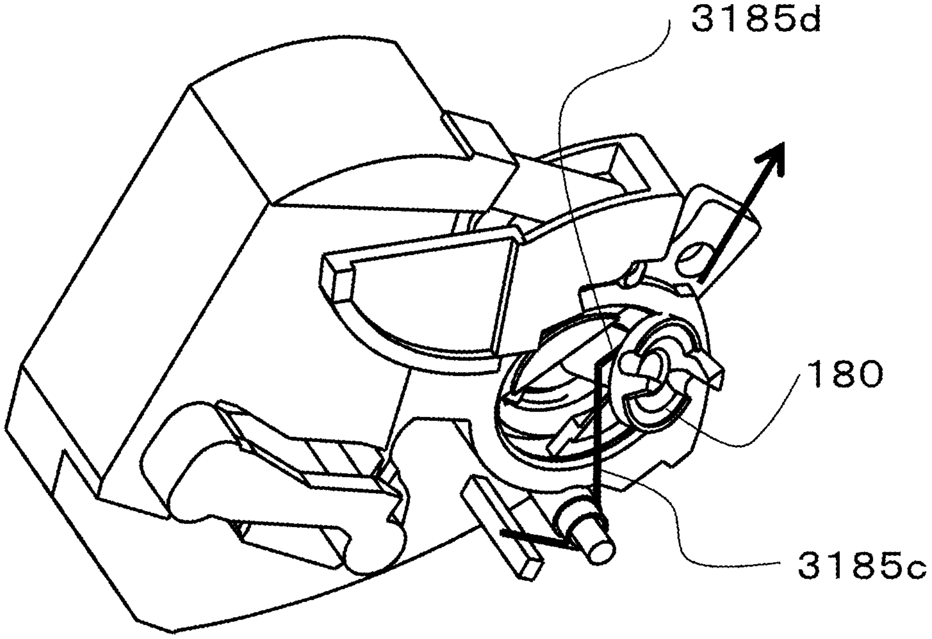

FIG. 46, parts (a) and (b), show a first inclination attitude D1 of the coupling member 180 according to the third embodiment of the present invention.

Figure 47:
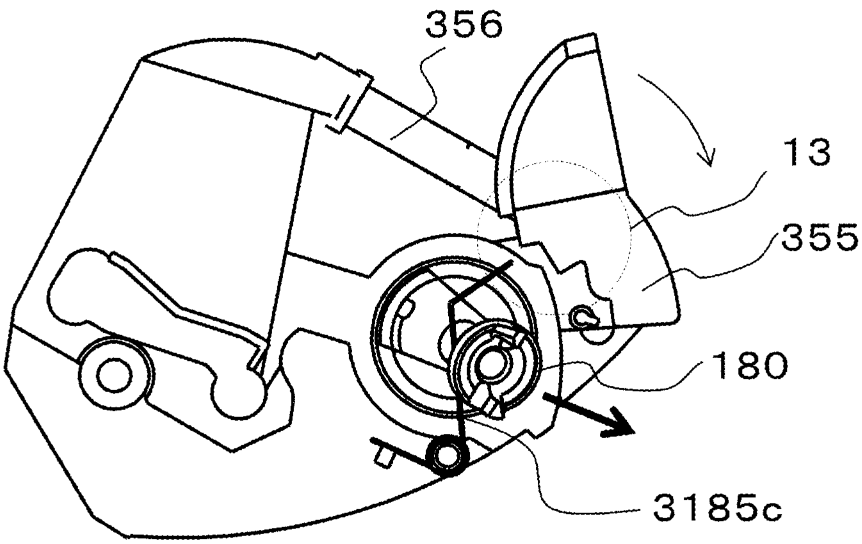
Figure 47:
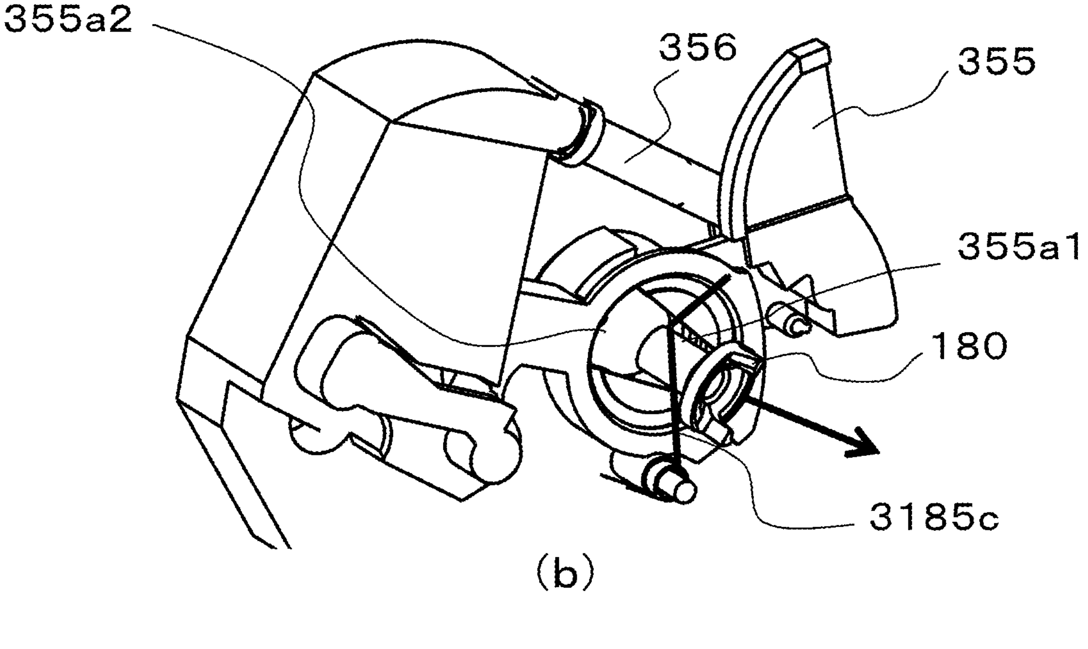

FIG. 47, parts (a) and (b), show a second inclination attitude D2 of the coupling member 180 according to the third embodiment of the present invention.

Figure 48:
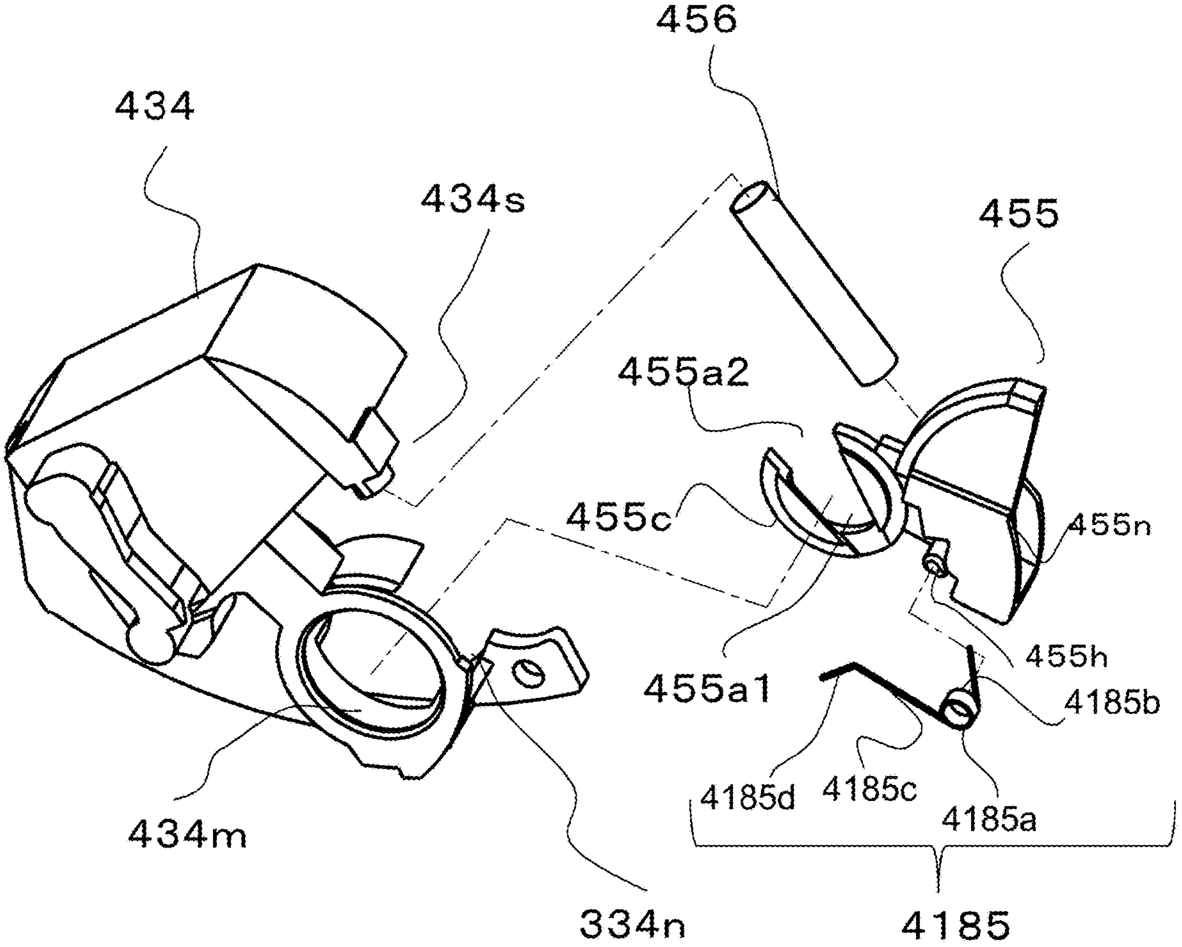

FIG. 48 is a schematic perspective view of the state for mounting a coupling lever spring 456, a coupling lever 455 and a coupling spring 4185 to a development side cover 434 according to a fourth embodiment of the present invention.

Figure 49:
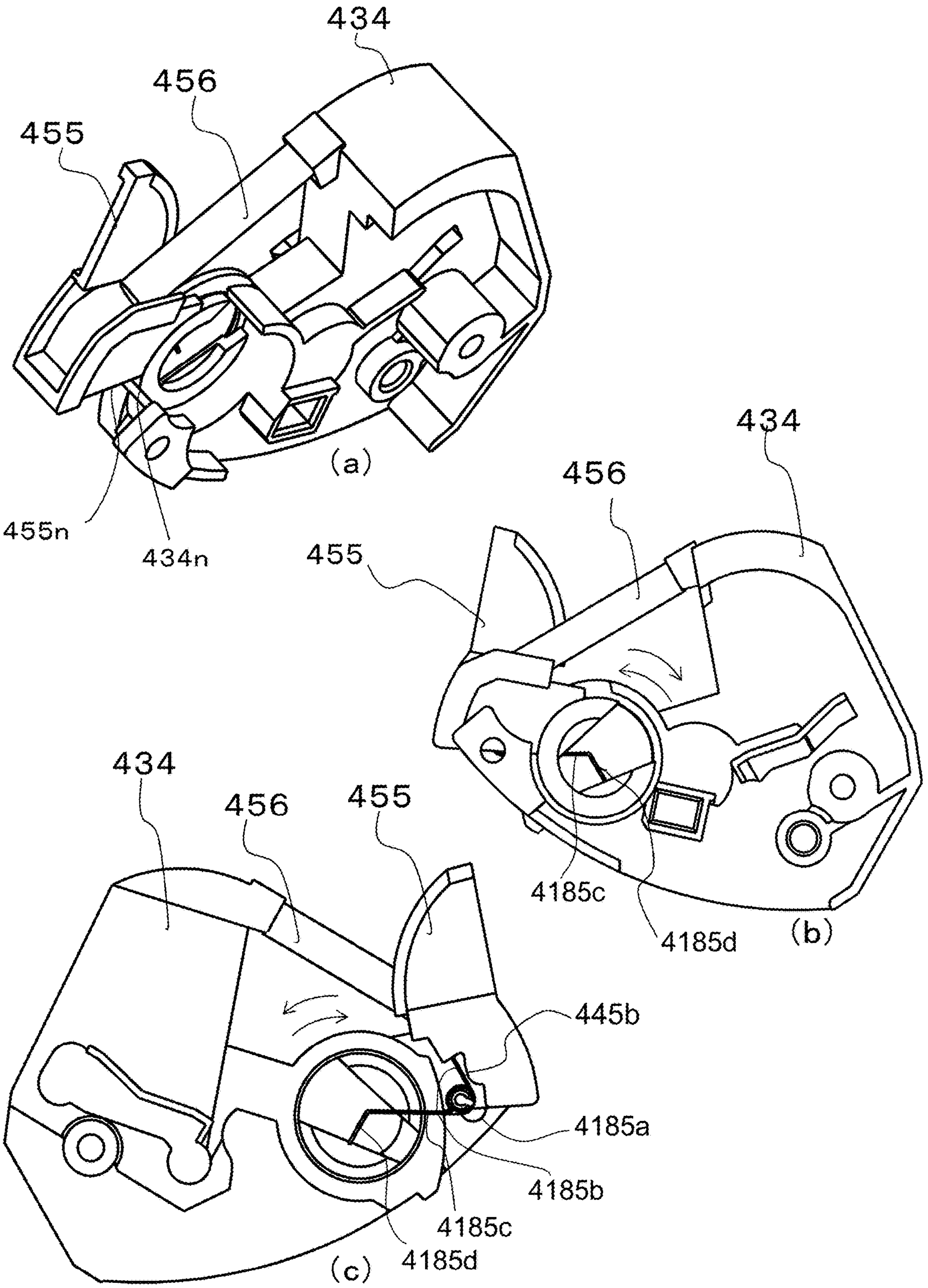

FIG. 49, parts (a) and (c), are views of the coupling lever 455, the coupling lever spring 456 and the coupling spring 4185 mounted to the development side cover 434 in the fourth embodiment the present invention.

Figure 50:
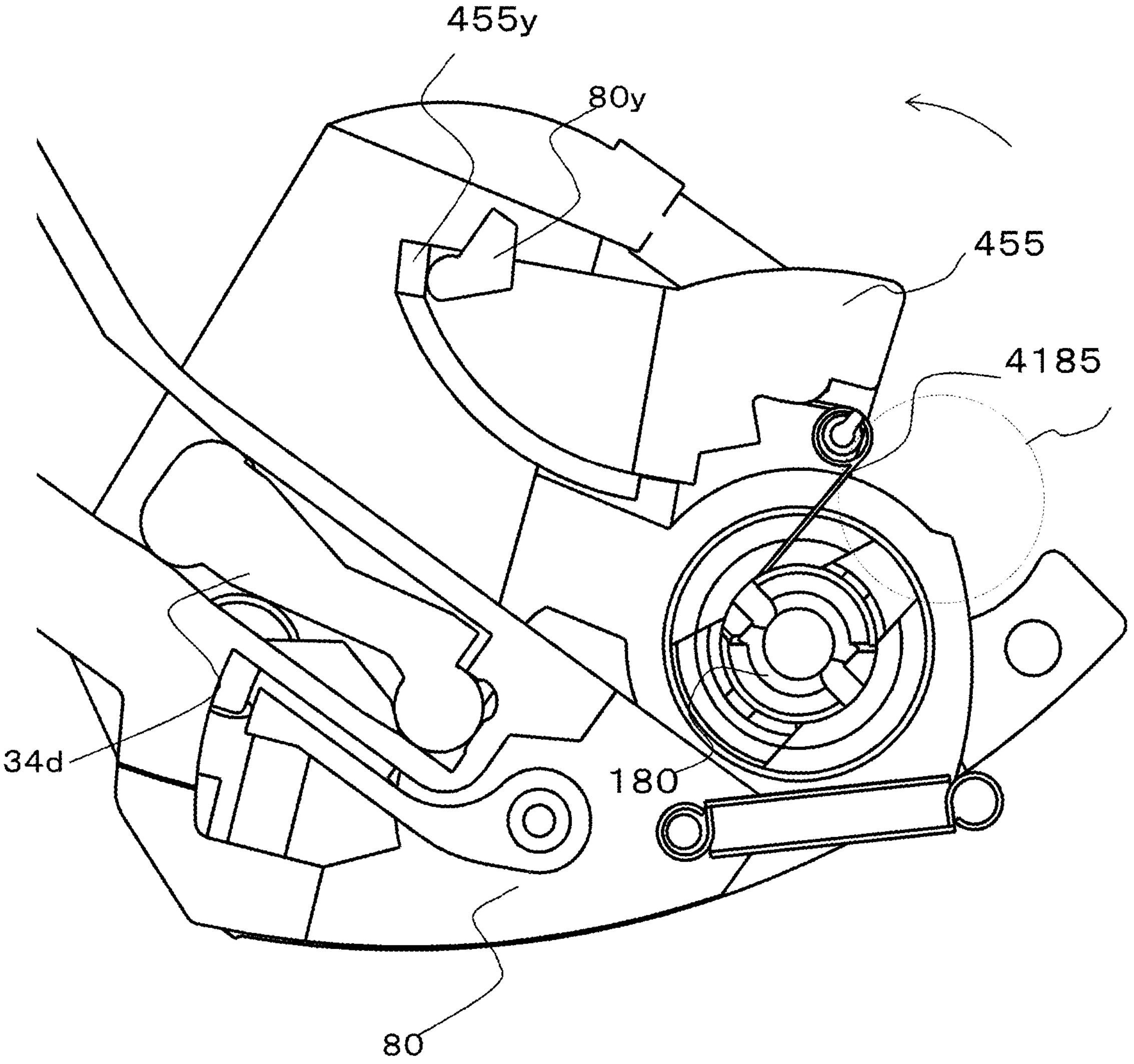

FIG. 50 is a view of the developing cartridge B1 according to the fourth embodiment of the present invention as seen from the driving side in the state that the image formation can be carried out in the main assembly A1.

Figure 51:
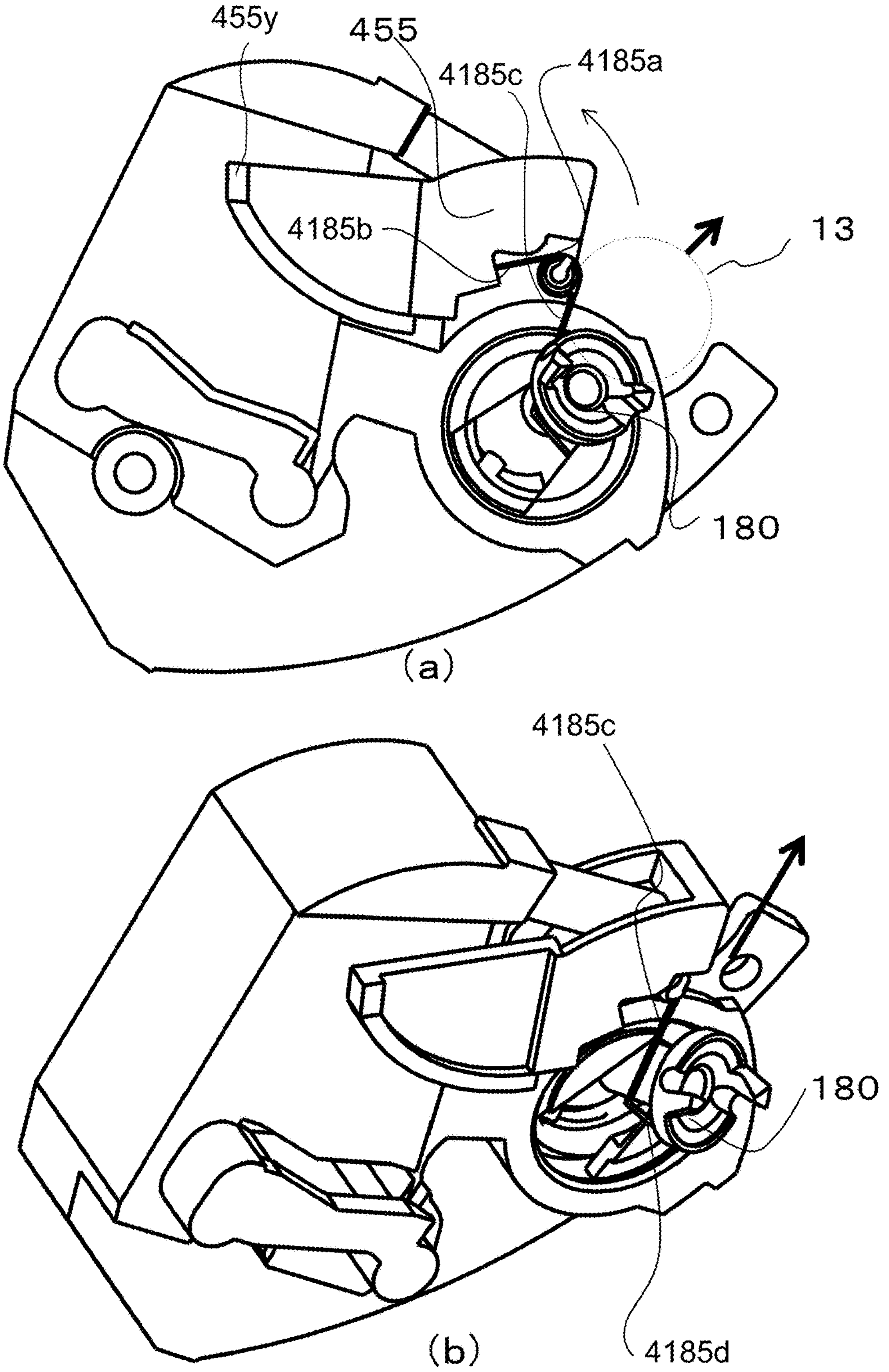

FIG. 51, parts (a) and (b), show a first inclination attitude D1 of the coupling member 180 according to the fourth embodiment of the present invention.

Figure 52:
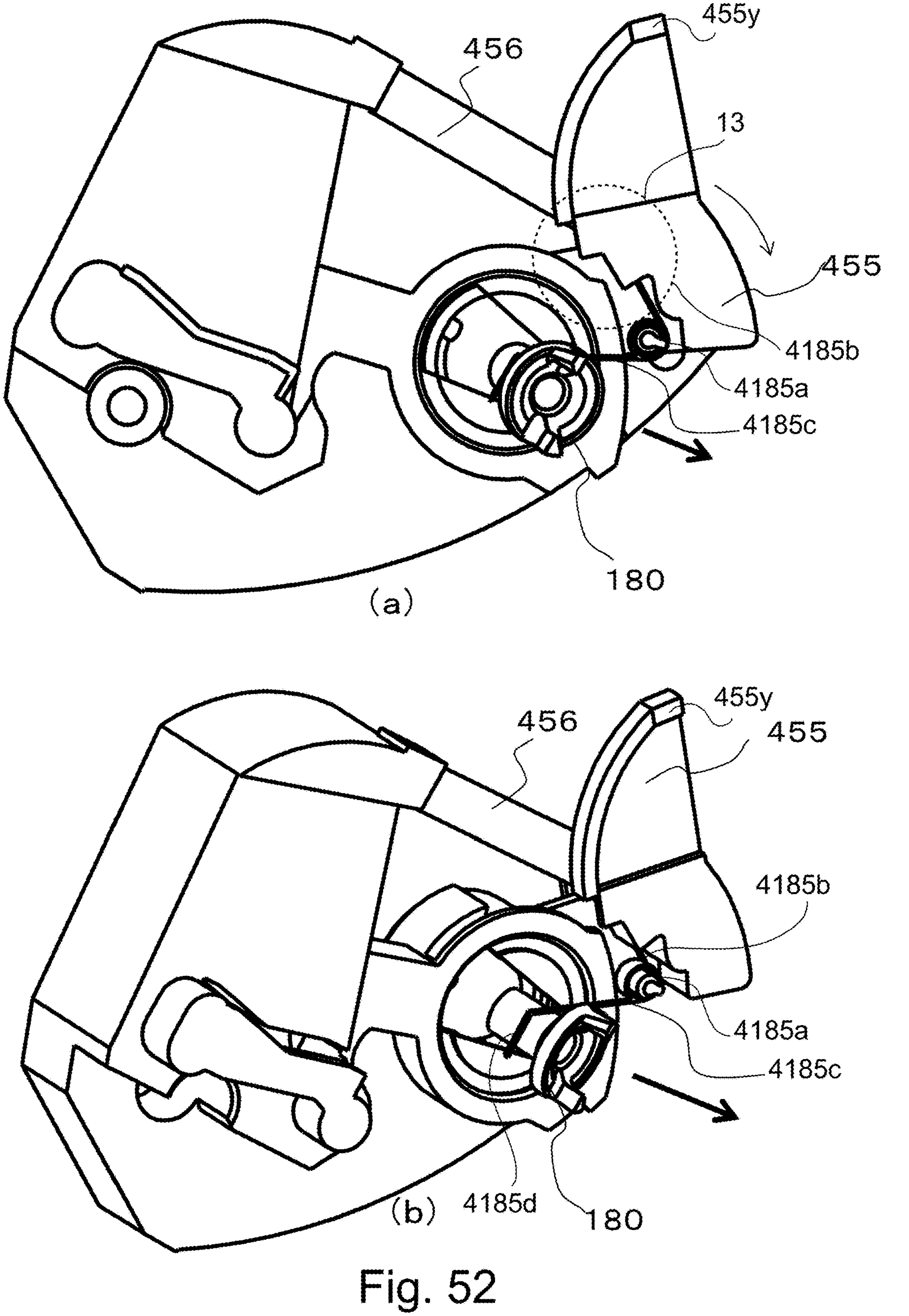

FIG. 52, parts (a) and (b), show a second inclination attitude D2 of the coupling member 180 according to the fourth embodiment of the present invention.

Figure 53:
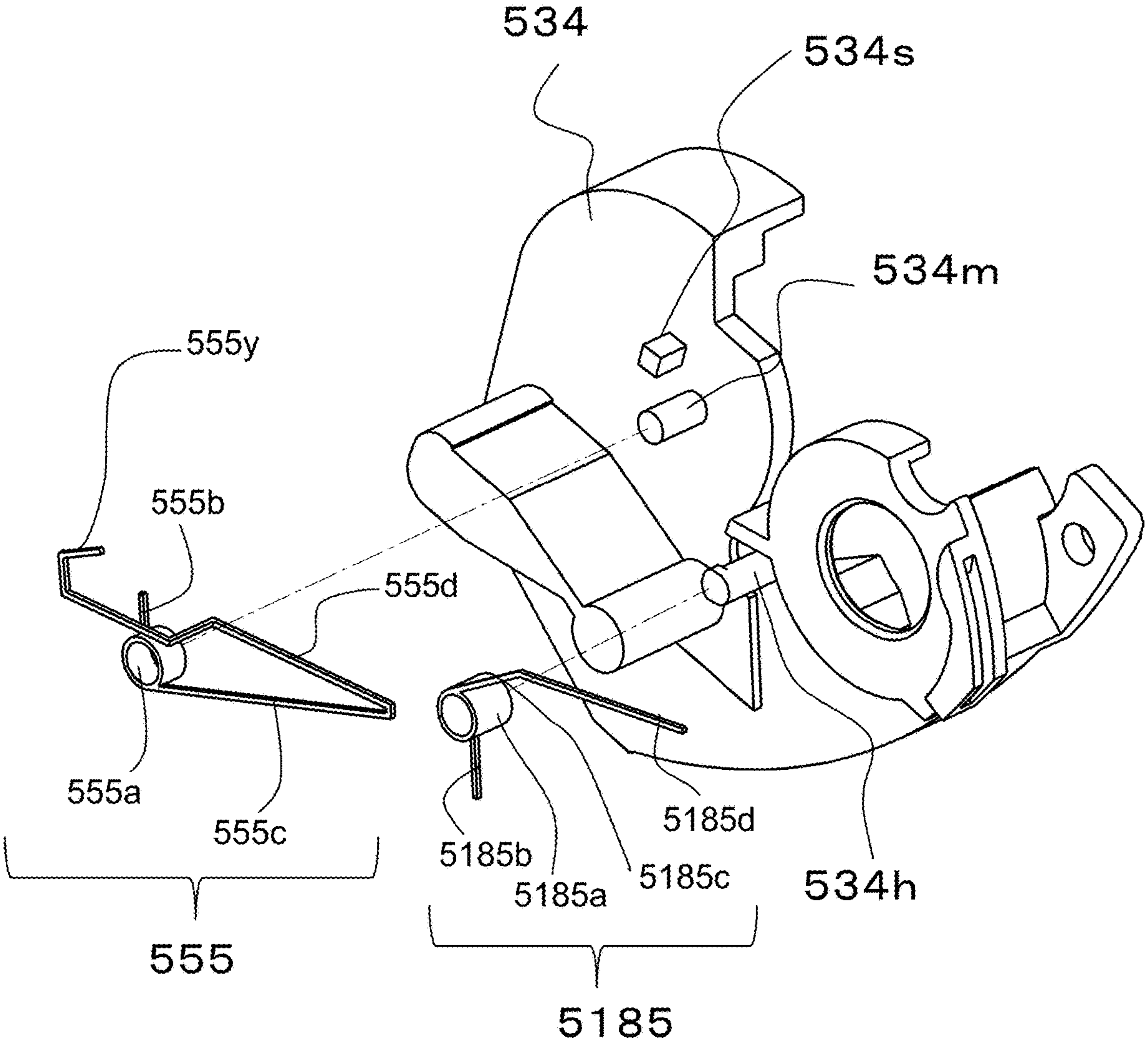

FIG. 53 is a schematic perspective view in the state before a spring 5185 and a spring 555 are assembled to a development side cover 534 in a fifth embodiment of the present invention.

Figure 54:
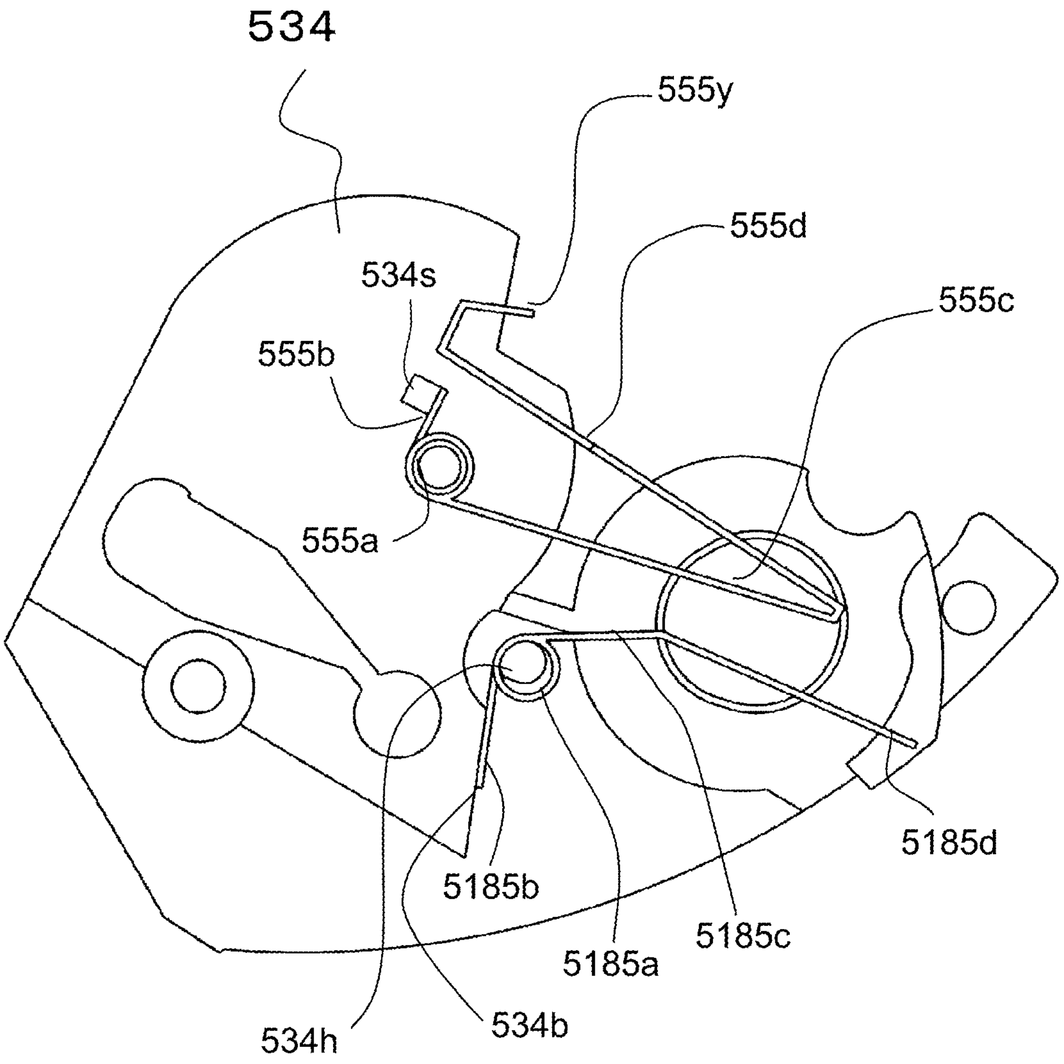

FIG. 54 is a view of the spring 555 and the spring 5185 mounted to the development side cover 534 in the fifth embodiment of the present invention, as seen from the driving side.

Figure 55:
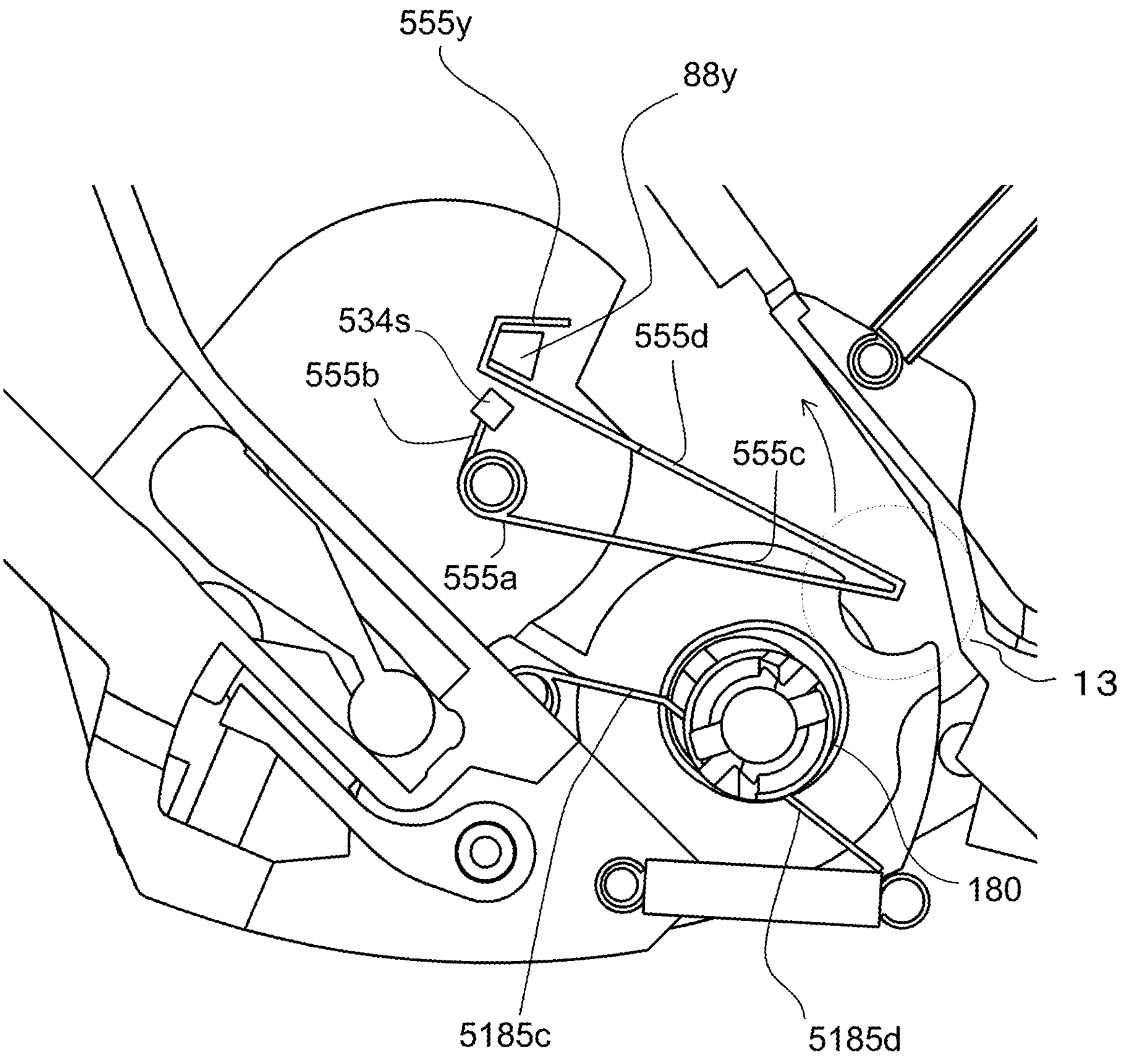

FIG. 55 shows a state in which the developing cartridge B1 is operable for image formation in the main assembly A1, in the fifth embodiment of the present invention.

Figure 56:
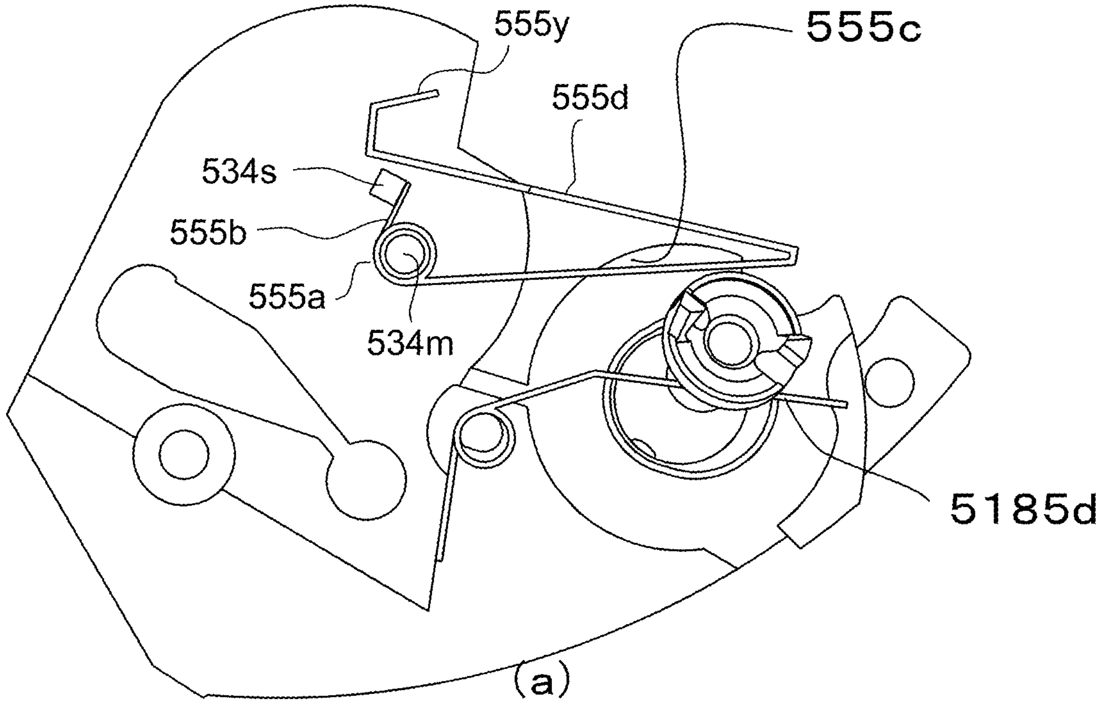
Figure 56:
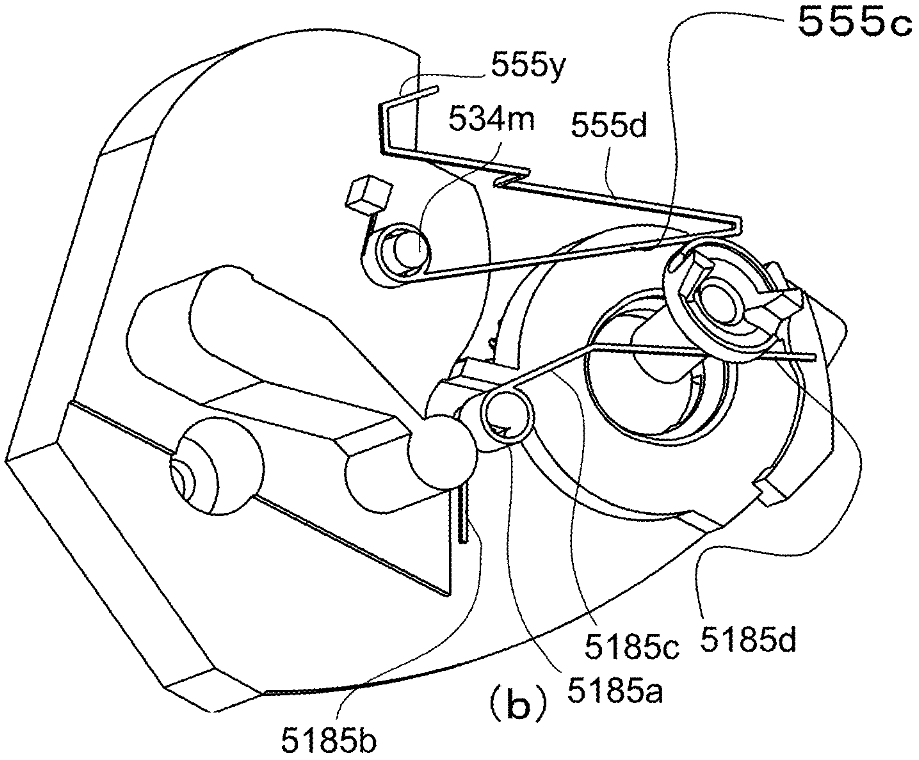

FIG. 56, parts (a) and (b), show the first inclination attitude D1 of the coupling member 180 in the fifth embodiment of the present invention.

Figure 57:
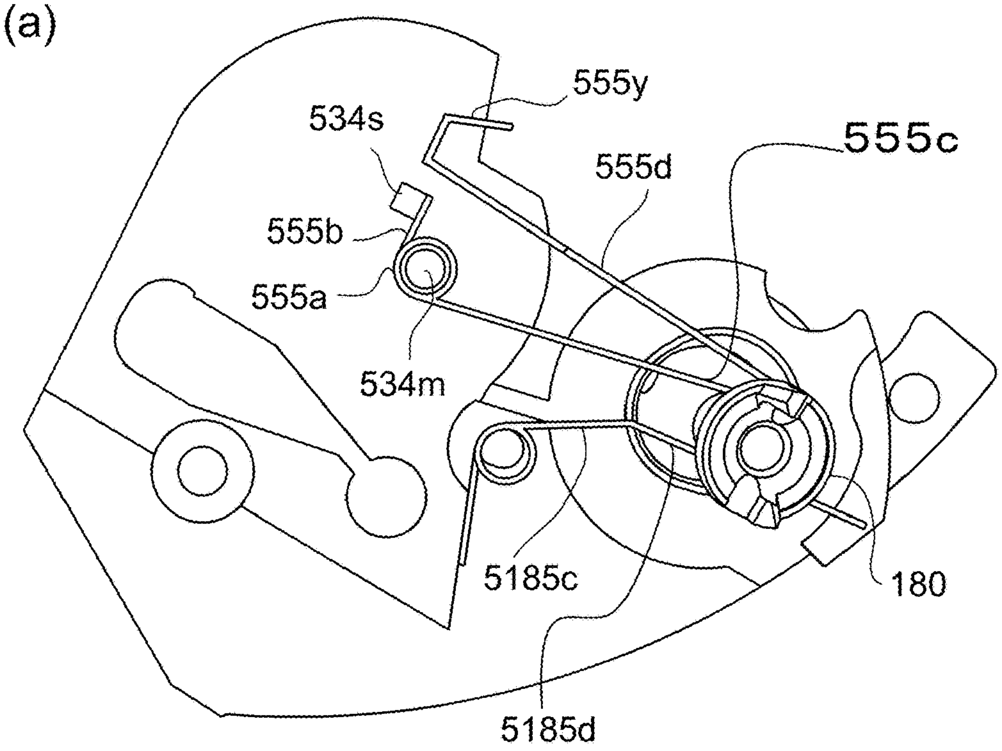
Figure 57:
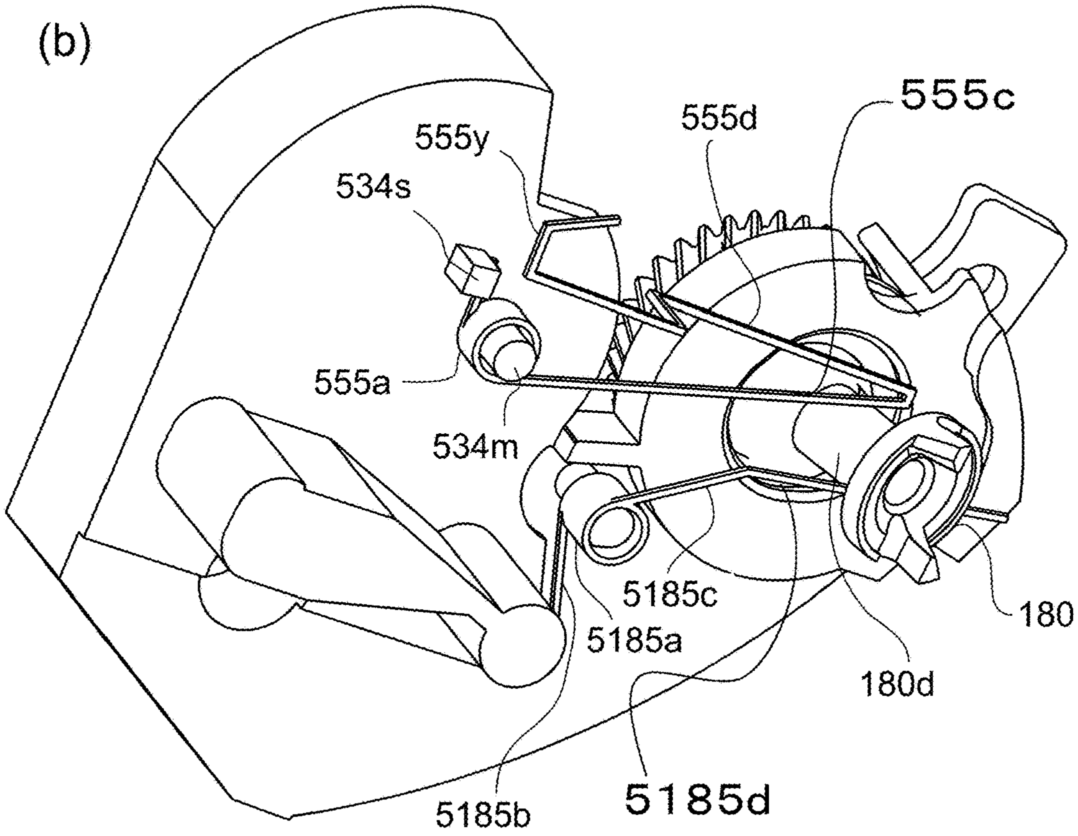

FIG. 57, parts (a) and (b), show the second inclination attitude D2 of the coupling member 180 in the fifth embodiment of the present invention.

Figure 58:
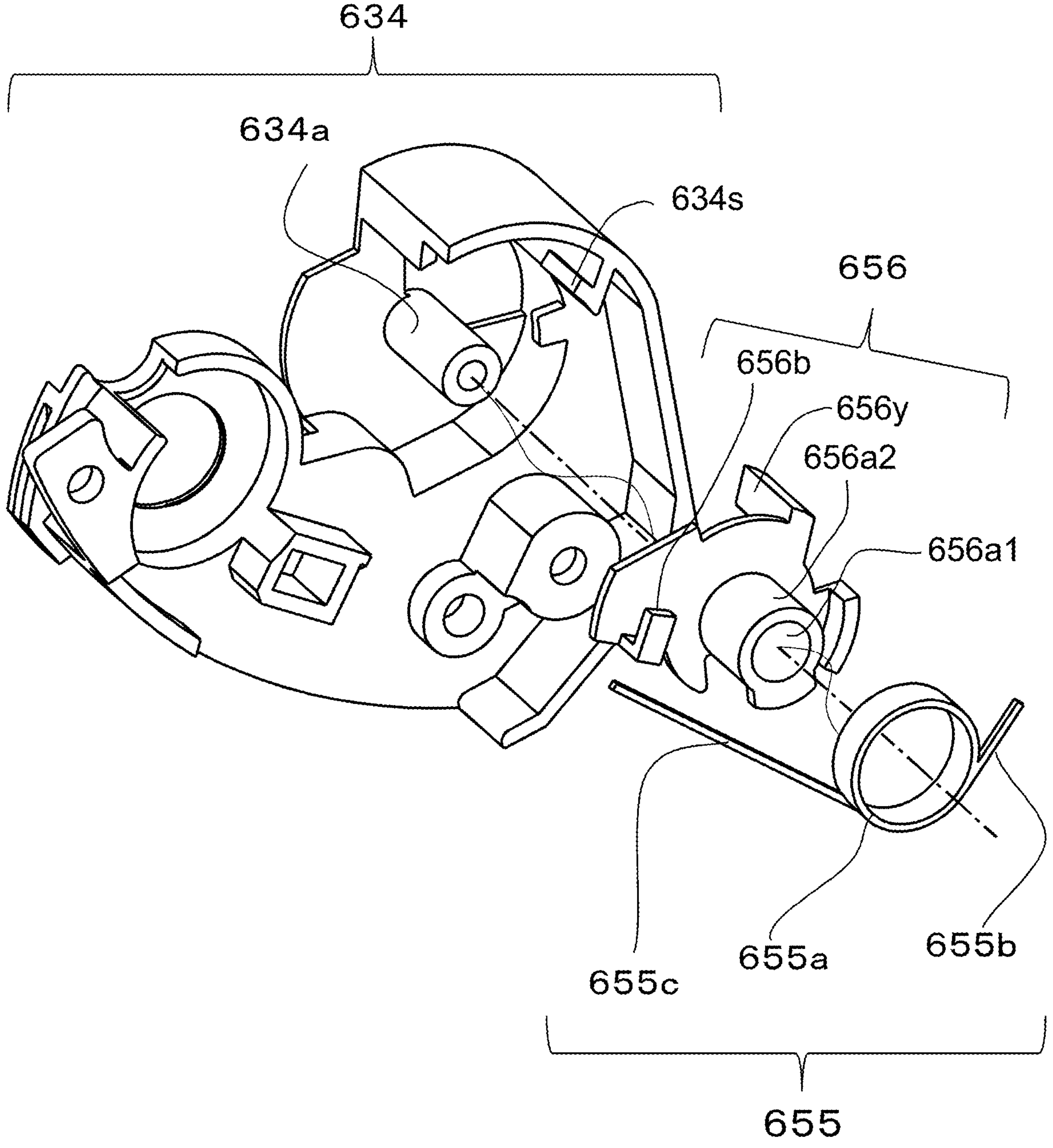

FIG. 58 is a schematic perspective view illustrating a state for assembling a spring 6185 and a spring 655 to a development side cover 634 in a sixth embodiment of the present invention.

Figure 59:
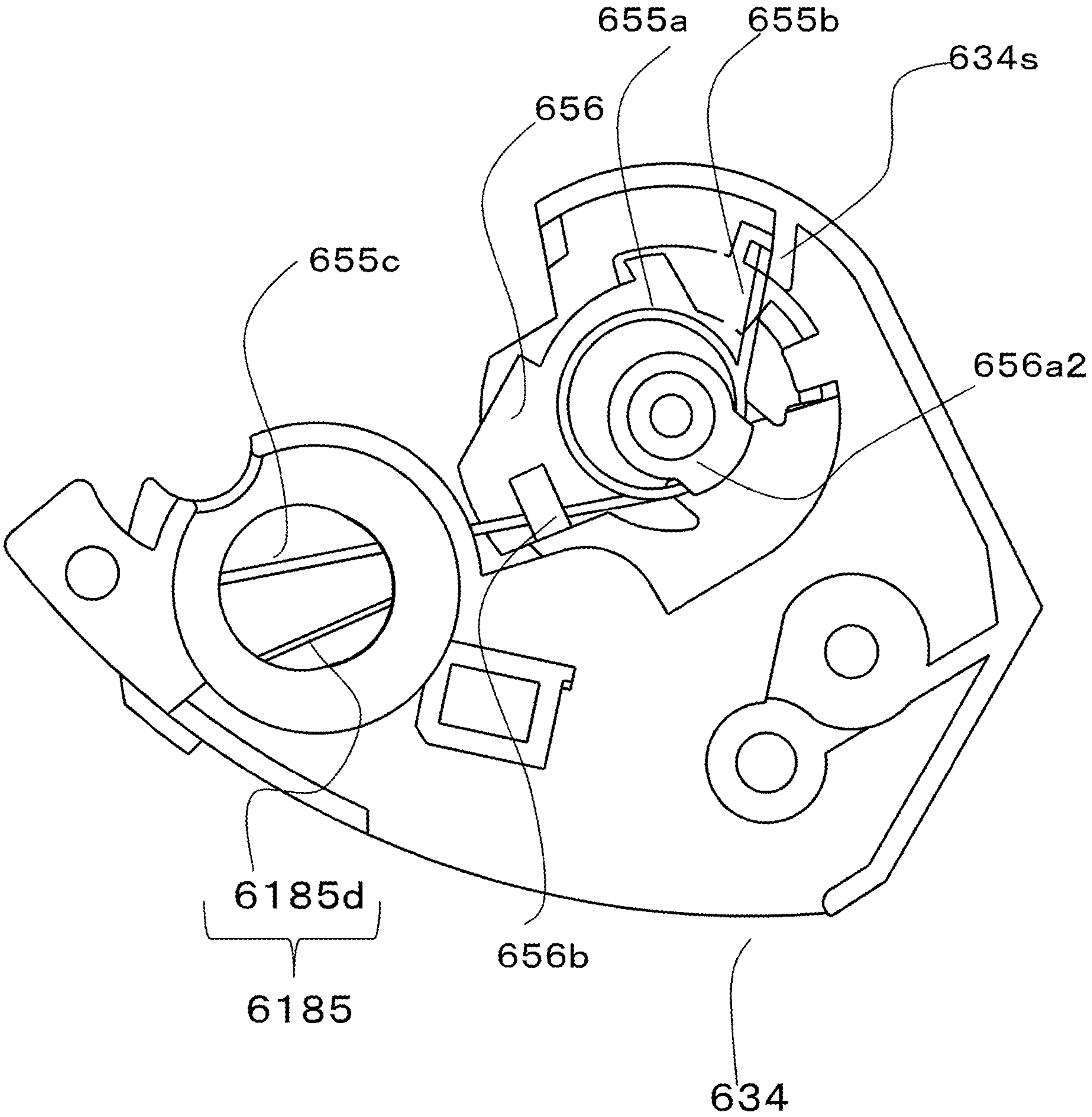

FIG. 59 is a view of a spring 655, a rotatable member 656 and the spring 6185 mounted to the side cover 634, as seen from the non-driving side, in the sixth embodiment of the present invention.

Figure 60:
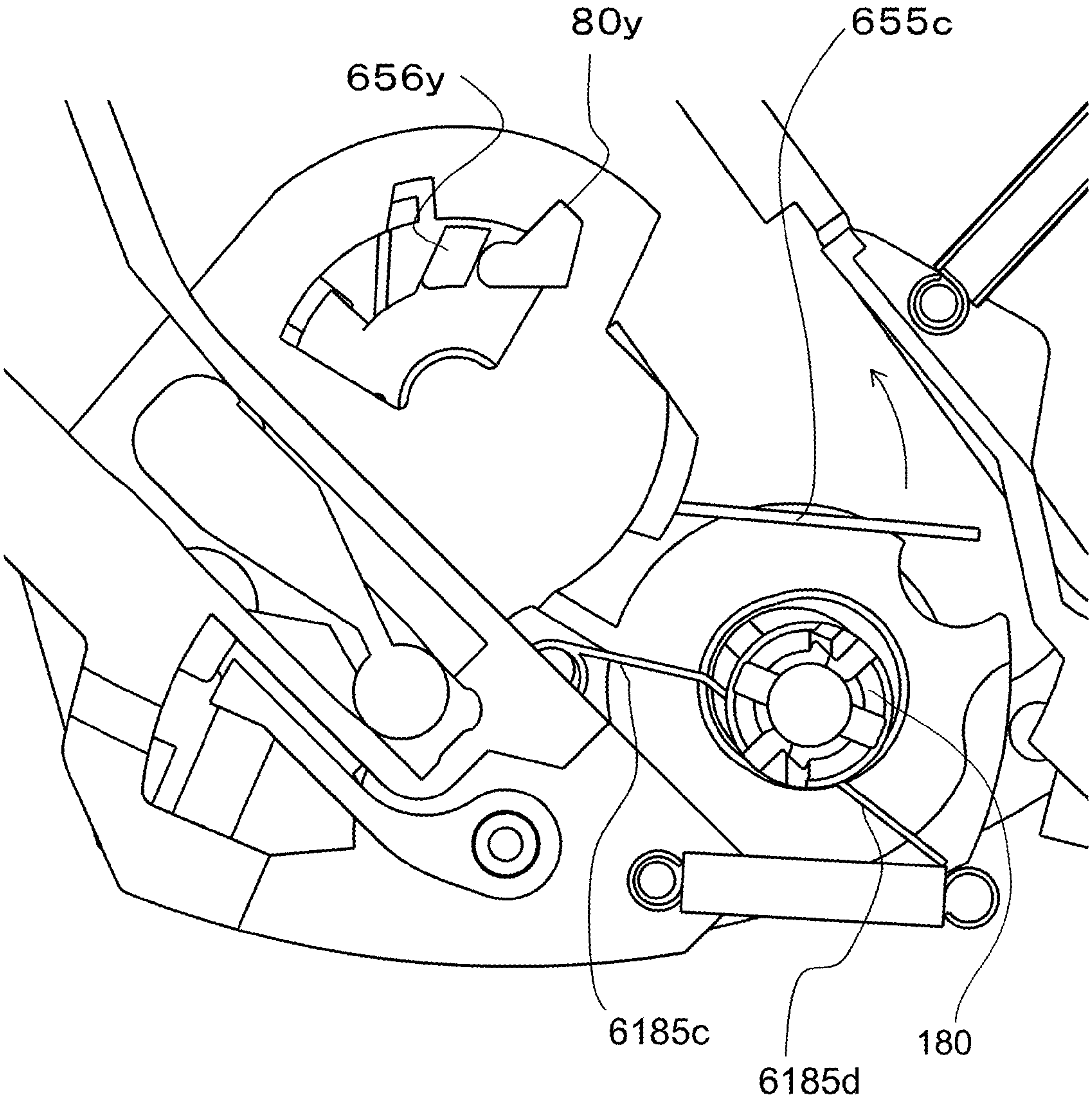

FIG. 60 is a view of the developing cartridge B1 in the state that it is capable of image forming operation in the main assembly A1 in the sixth embodiment of the present invention.

Figure 61:
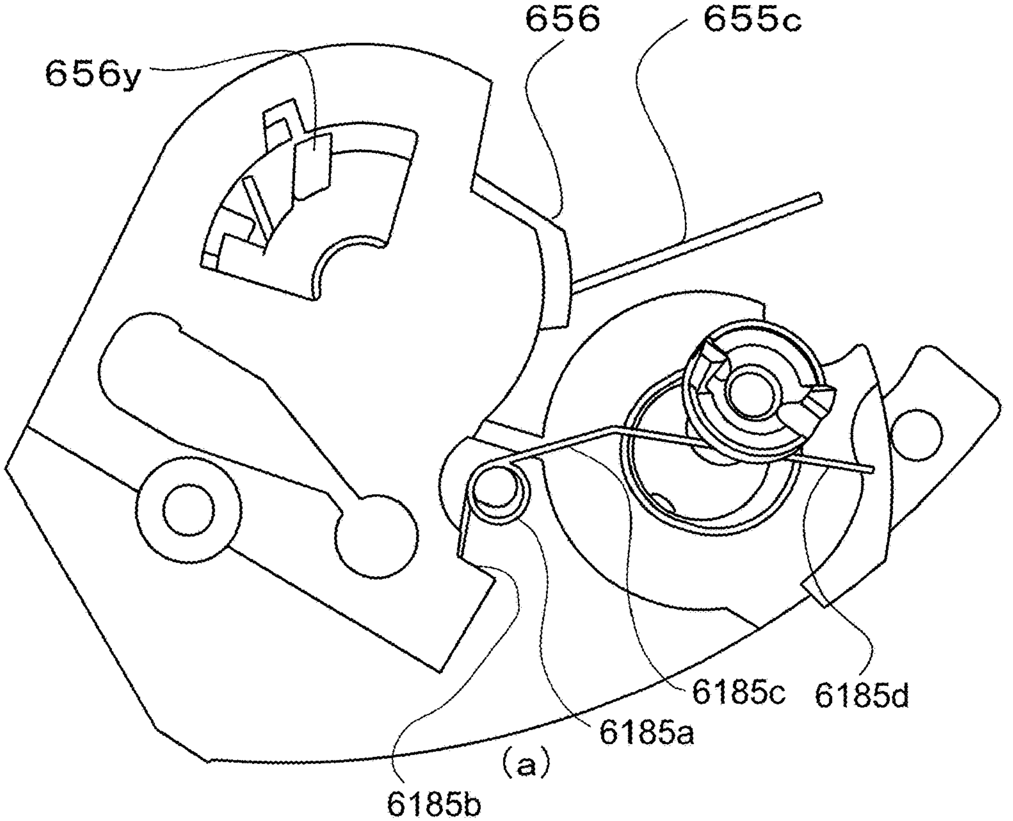
Figure 61:
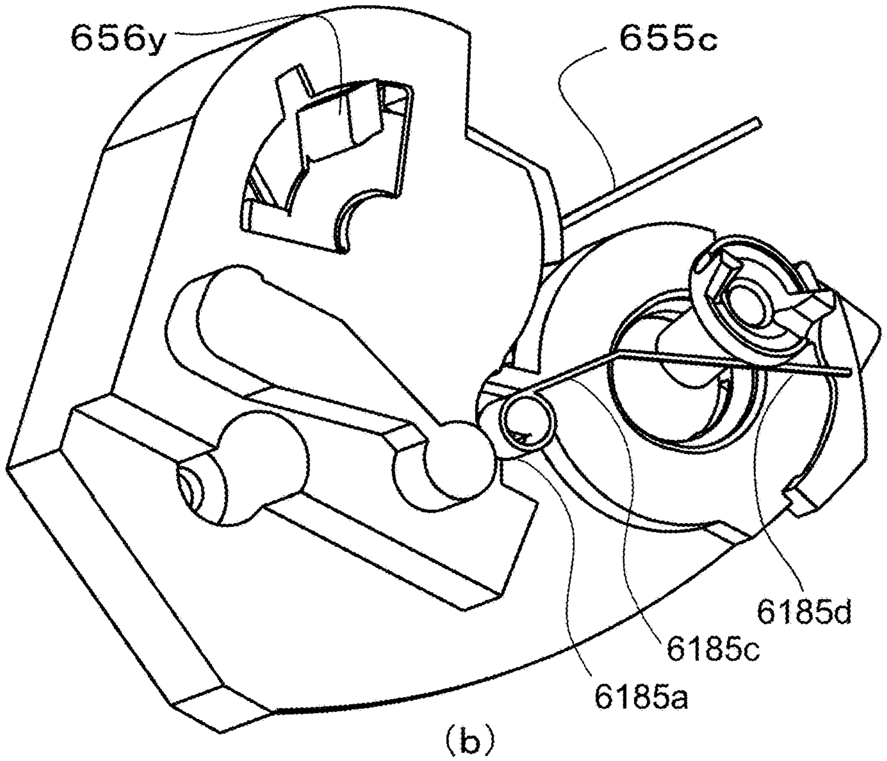

FIG. 61, parts (a) and (b), show the first inclination attitude D1 of the coupling member 180 in the sixth embodiment of the present invention.

Figure 62:
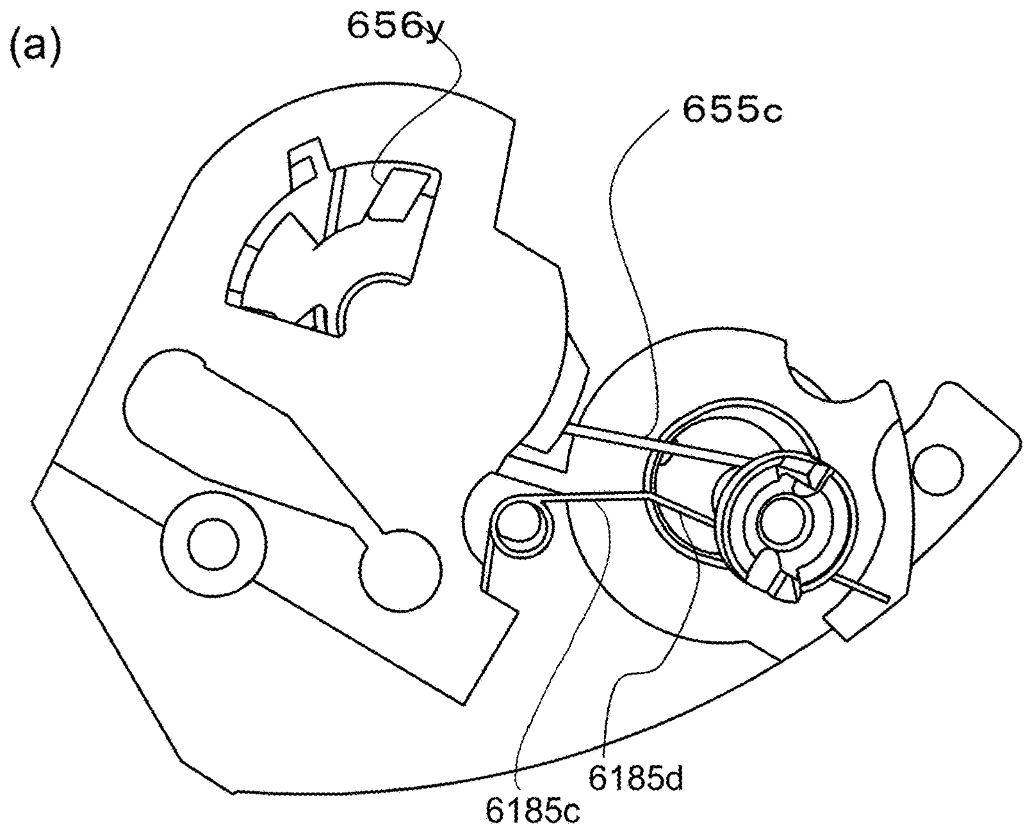
Figure 62:
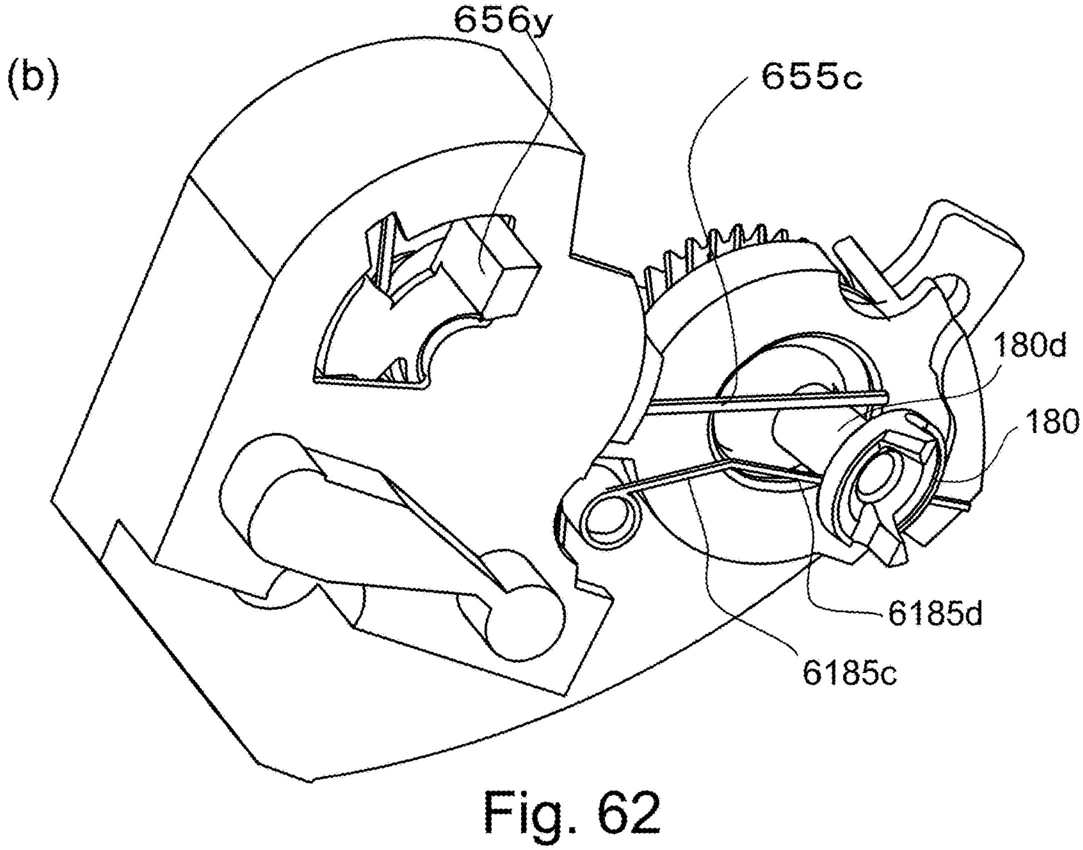

FIG. 62, parts (a) and (b), show a state in which the coupling member 180 takes the second inclination attitude D2 in the sixth embodiment of the present invention.

Figure 63:
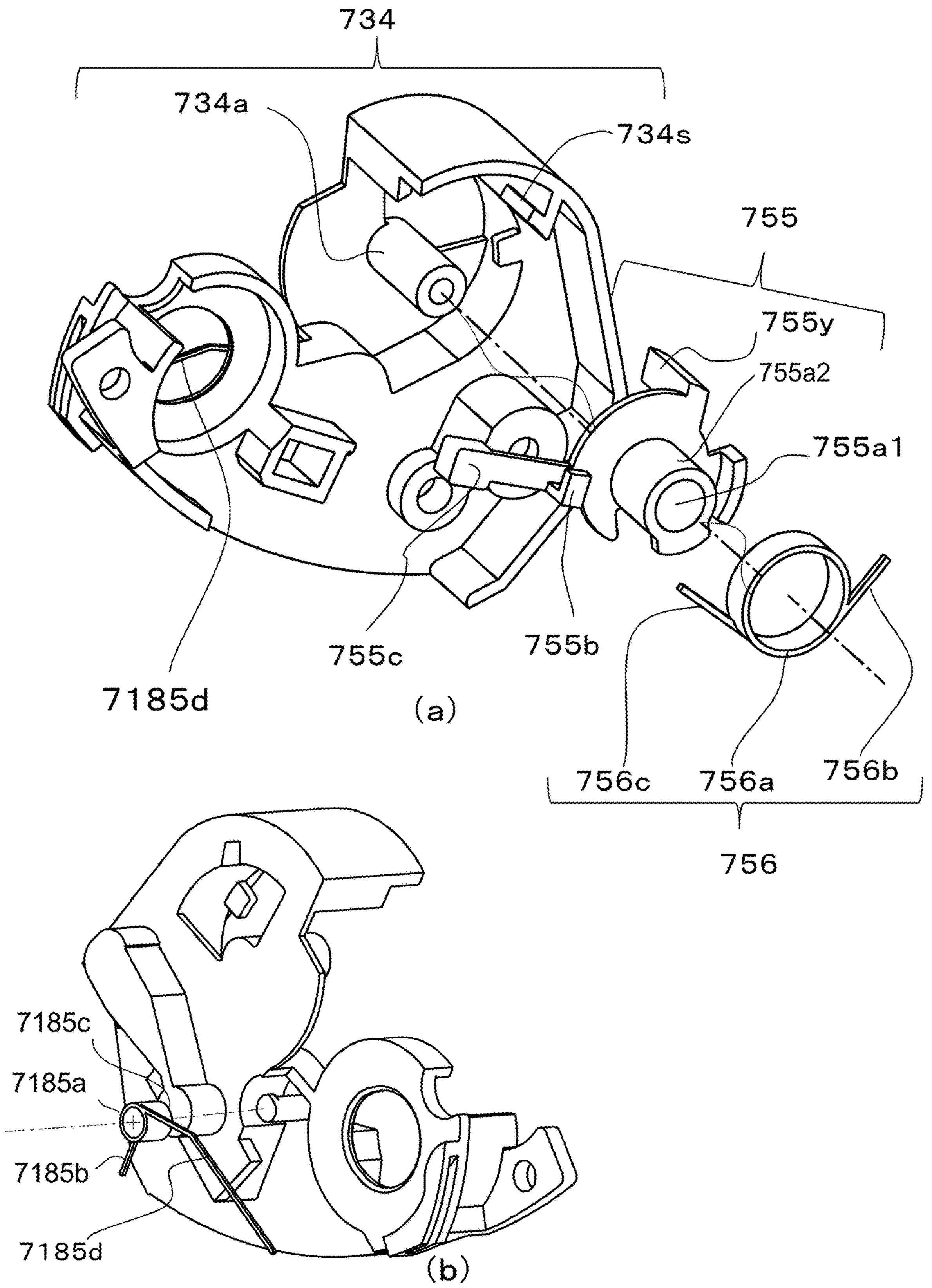

FIG. 63, parts (a) and (b), are schematic perspective views showing a state for mounting a coupling spring 7185, a coupling lever 755 and a coupling lever spring 756 to a development side cover 734 in a seventh embodiment of the present invention.

Figure 64:
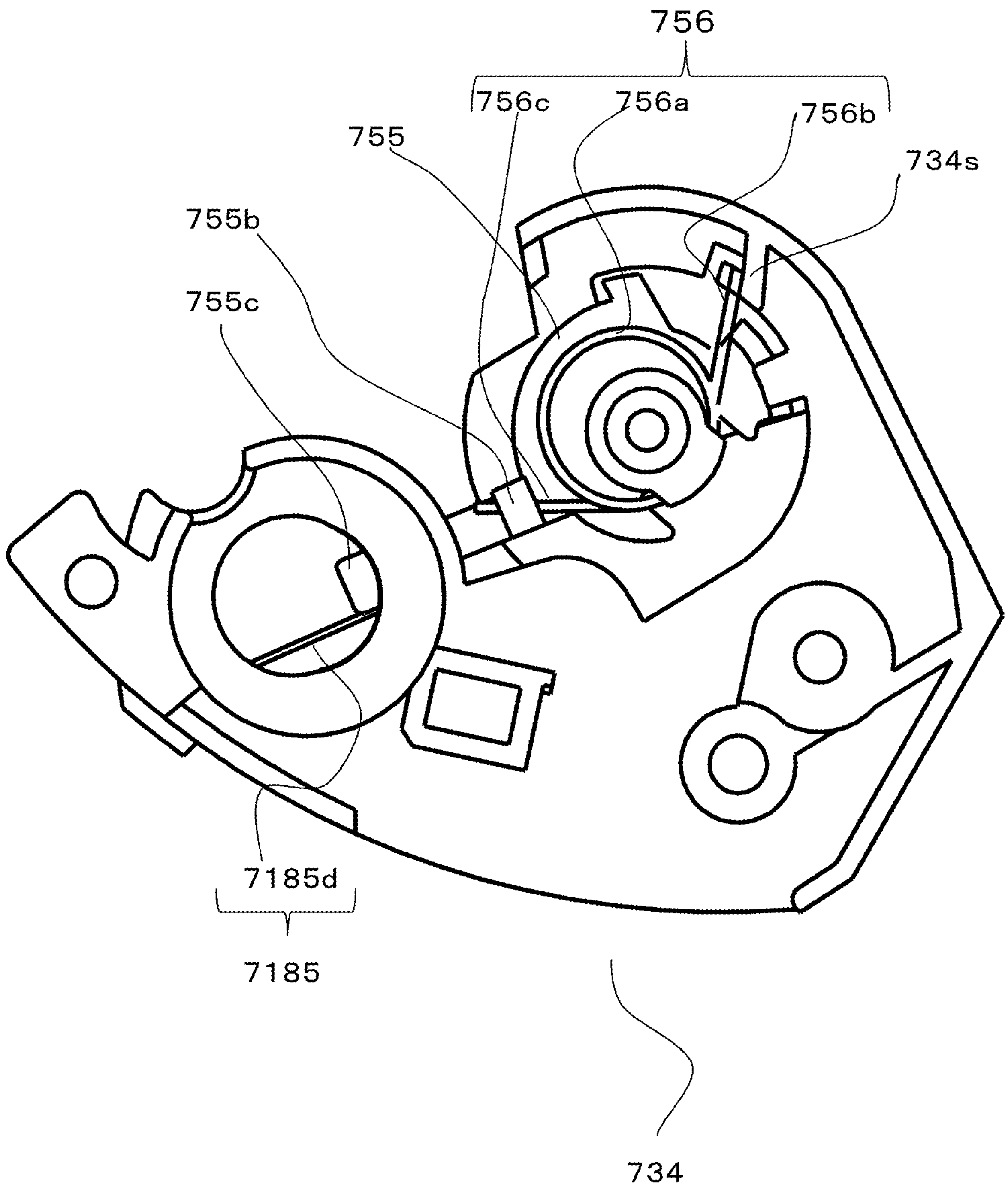

FIG. 64 shows a state in which a lever 755, a spring 756 and a spring 7185 are mounted to a side cover 734, as seen from the non-driving side, in the seventh embodiment of the present invention.

Figure 65:
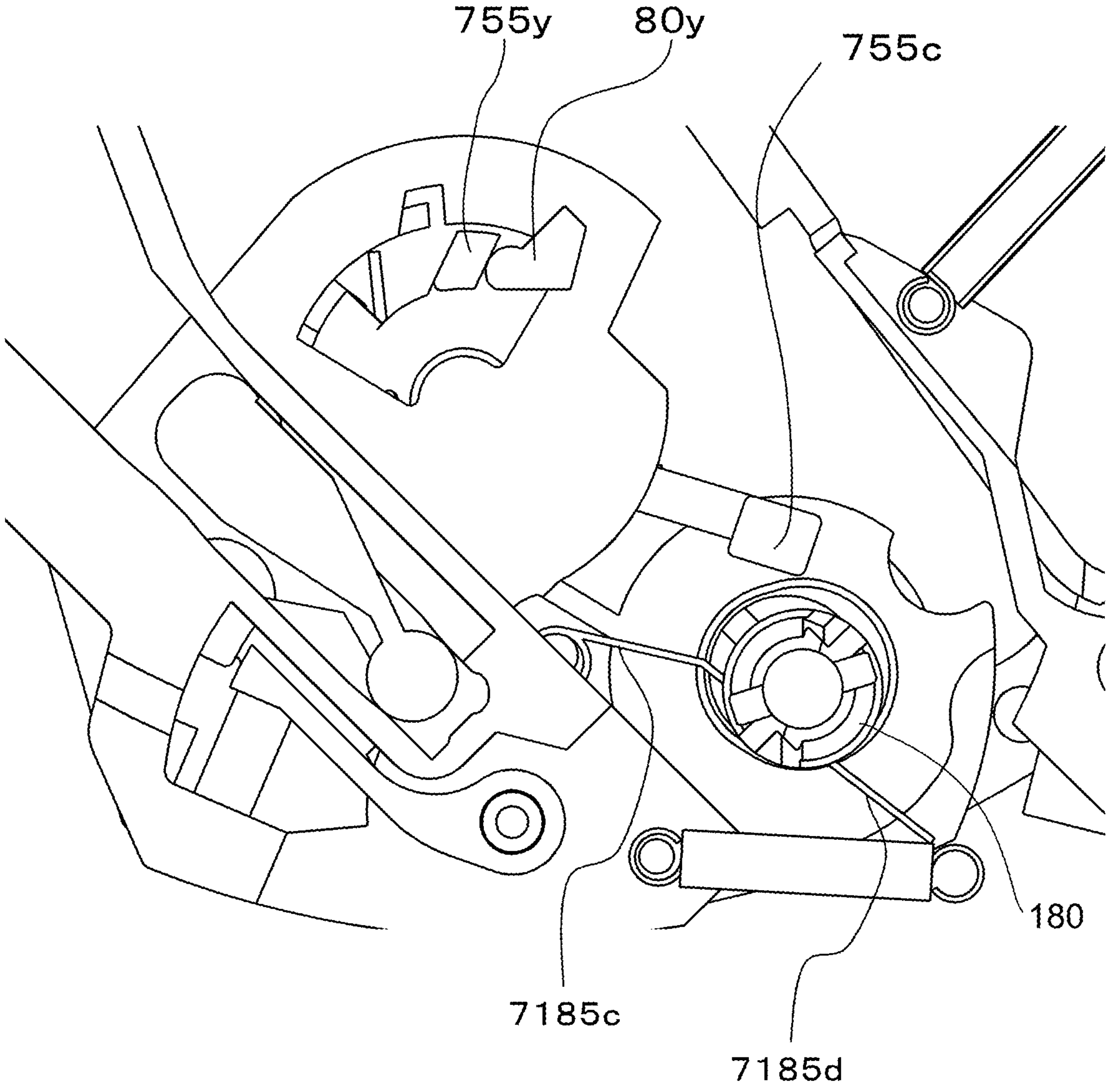

FIG. 65 shows a state in which the developing cartridge B1 is operable for image formation in the main assembly A1 in the seventh embodiment of the present invention.

Figure 66:
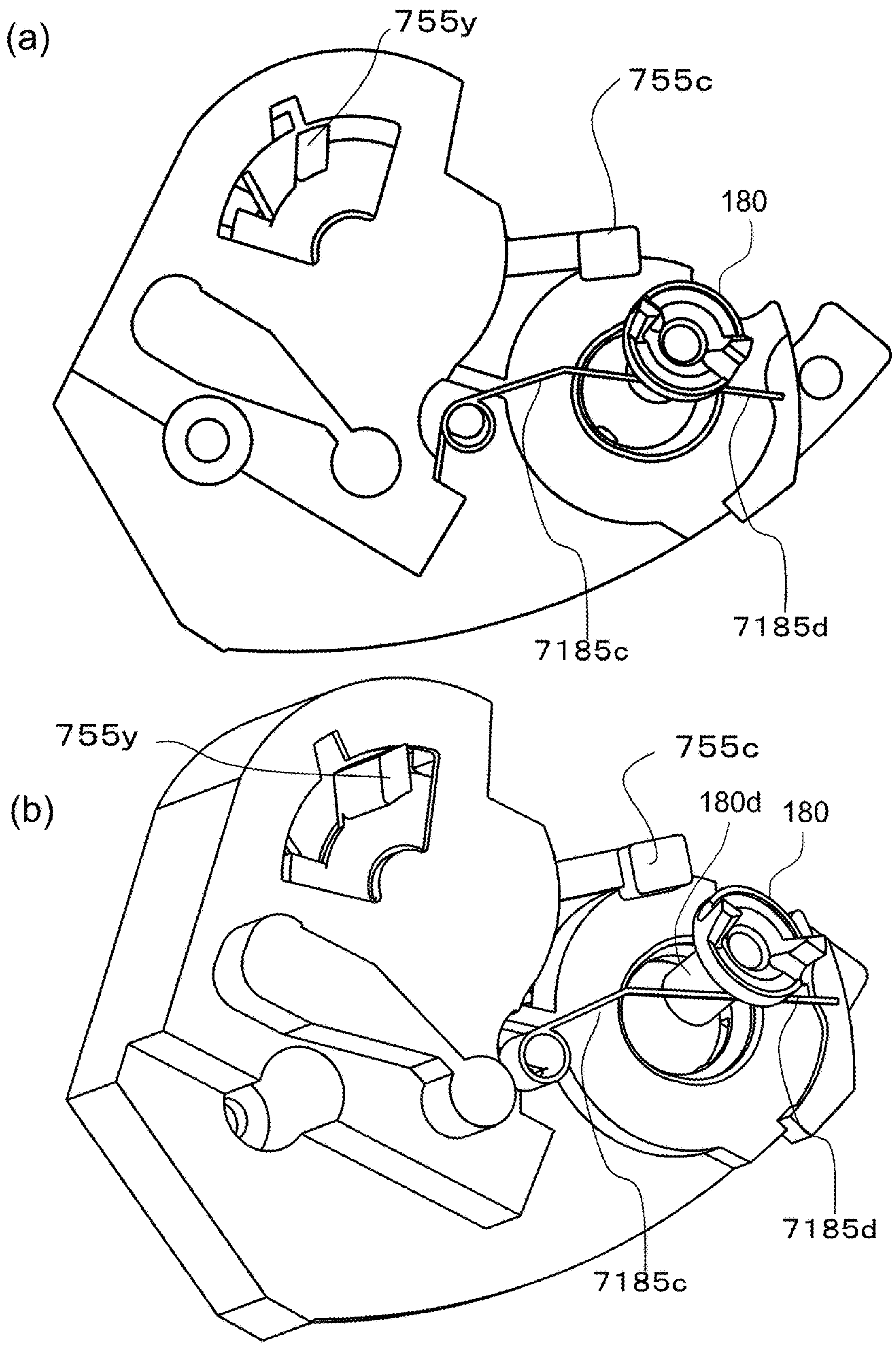

FIG. 66, parts (a) and (b), show the first inclination attitude D1 of the coupling member 180 in the seventh embodiment of the present invention.

Figure 67:
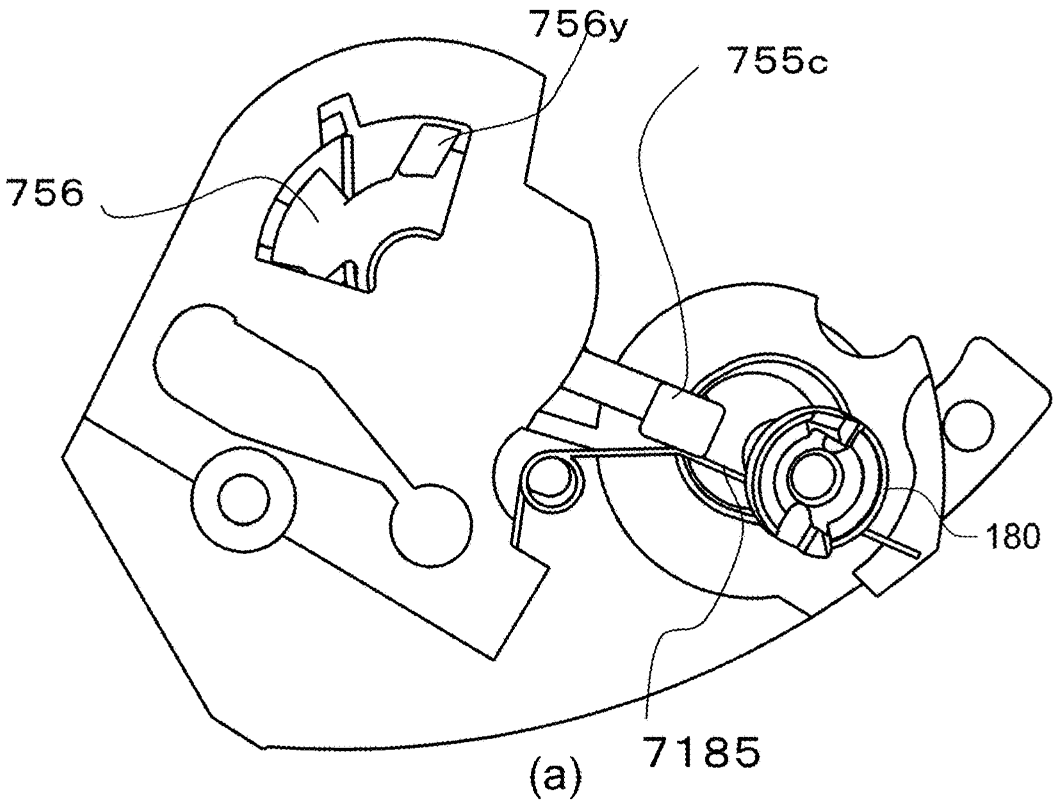
Figure 67:
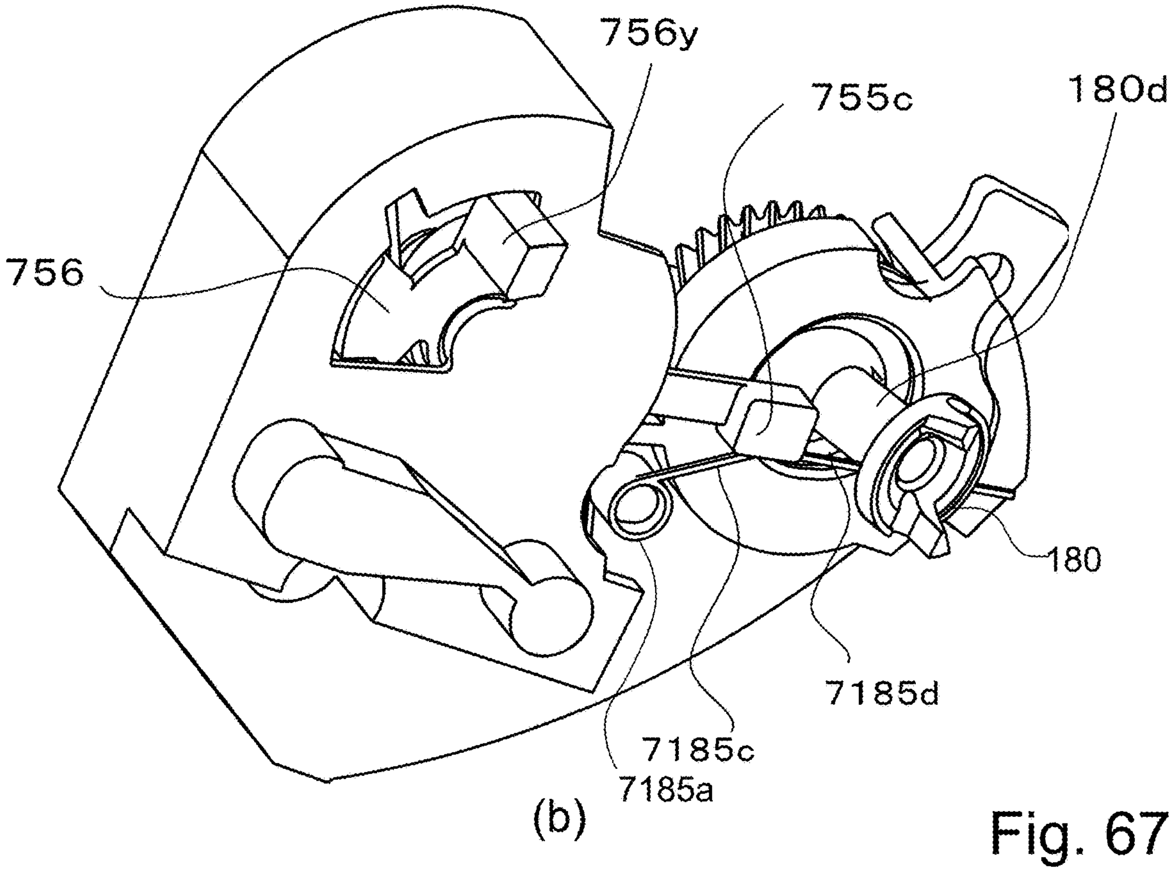

FIG. 67, parts (a) and (b), show the state of the coupling member 180 taking the second inclination attitude D2 in the seventh embodiment of the present invention.

Figure 68:
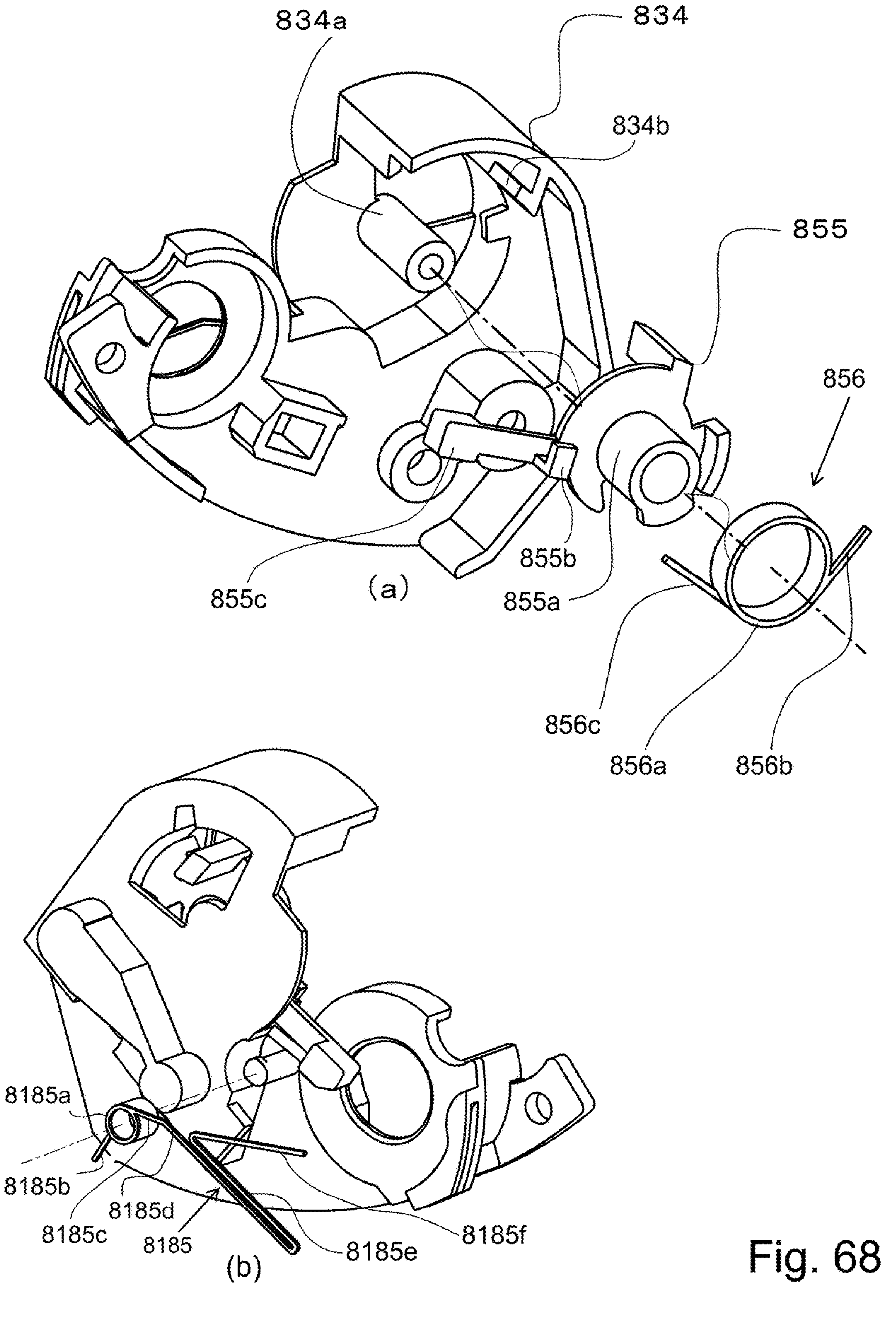

FIG. 68, parts (a) and (b), show a state for assembling a coupling spring 8185, a coupling lever 855 and a coupling lever spring 856 to a development side cover 834 in the eighth embodiment of the present invention.

Figure 69:
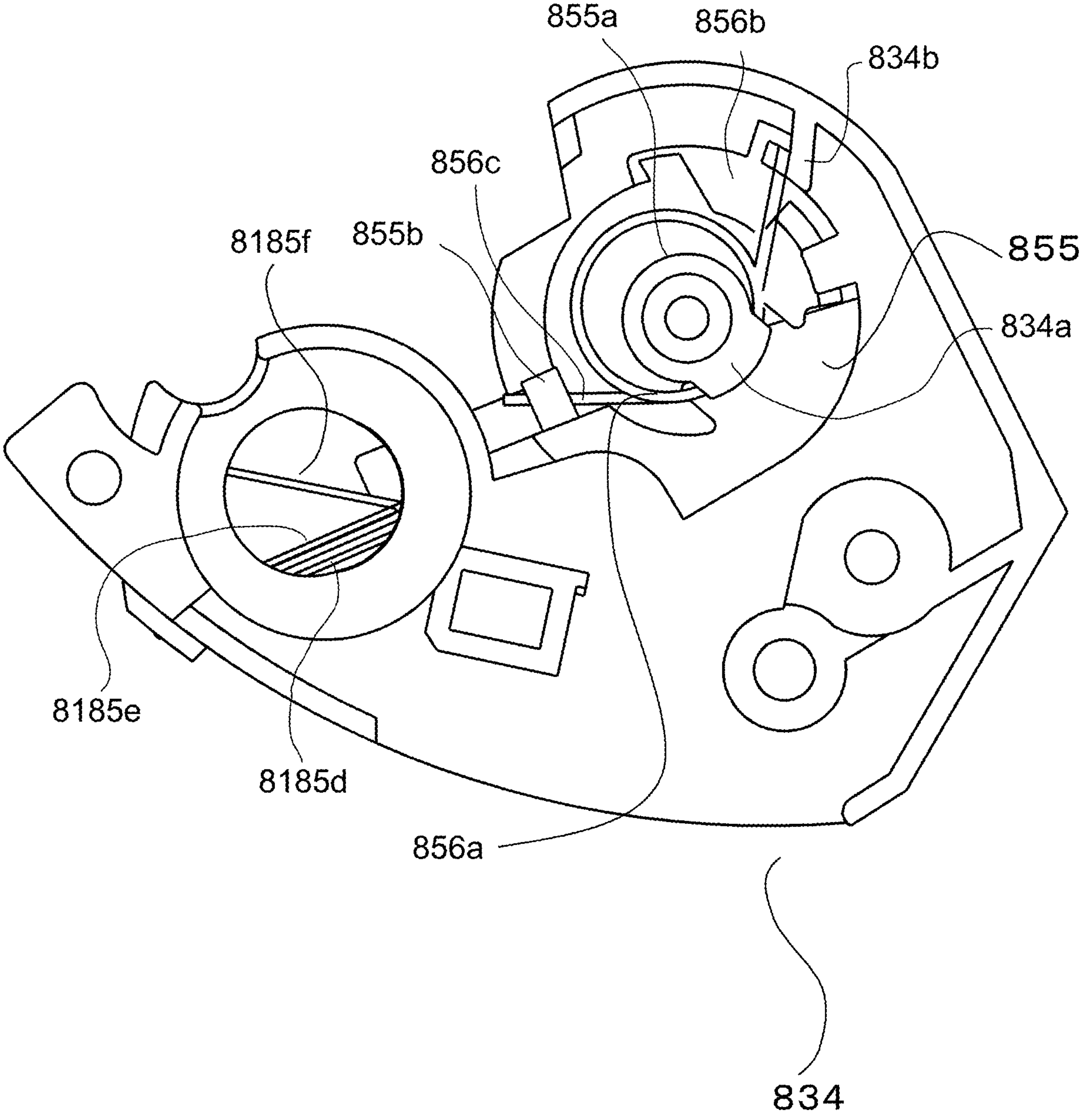

FIG. 69 shows a state as seen from the driving side, in which a lever 855, a lever spring 856 and a coupling spring 8185 are to the development side cover 834 in the eighth embodiment of the present invention.

Figure 70:
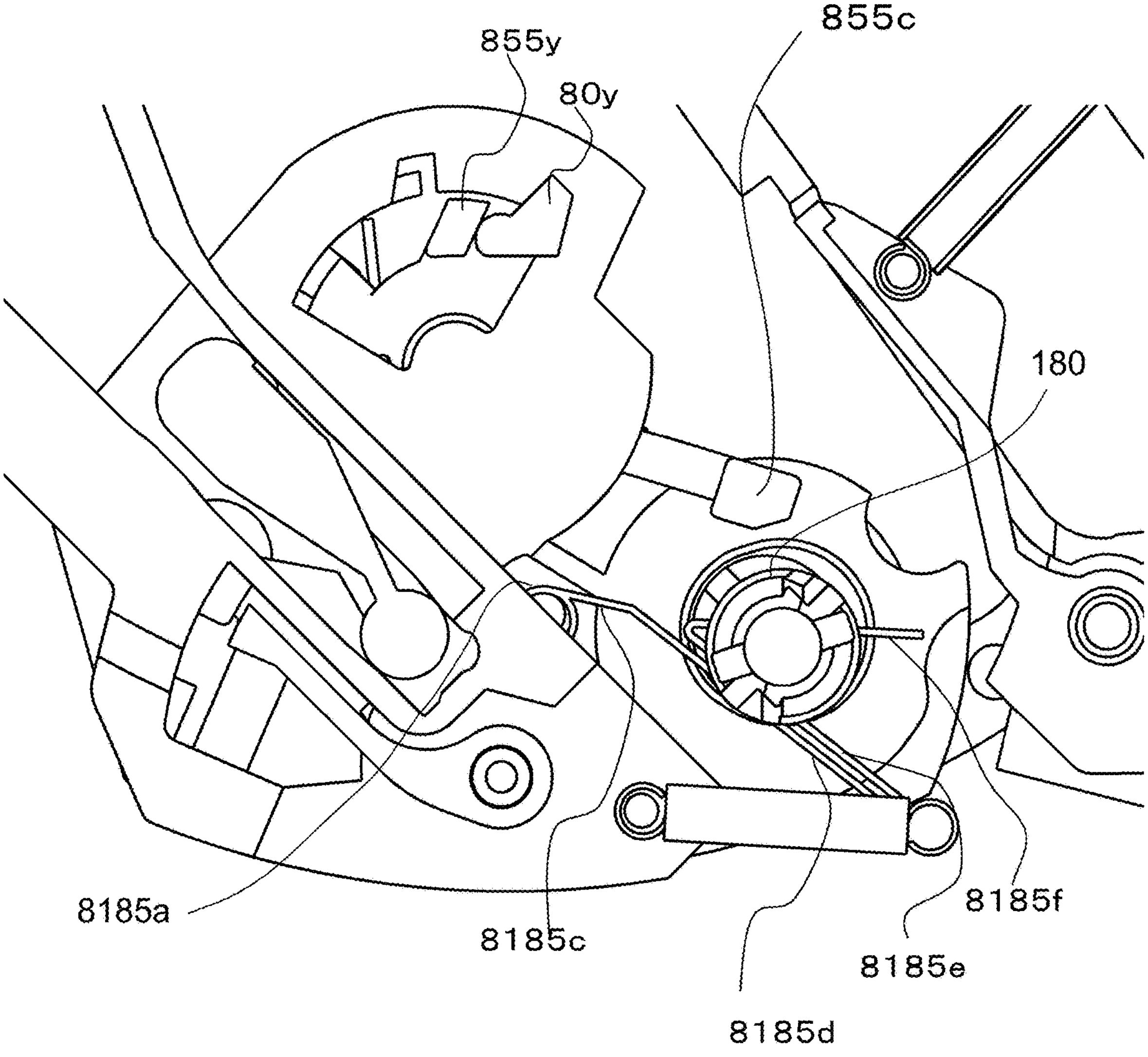

FIG. 70 shows a state in which the developing cartridge B1 is operable for image formation in the main assembly A1, in the eighth embodiment of the present invention.

Figure 71:
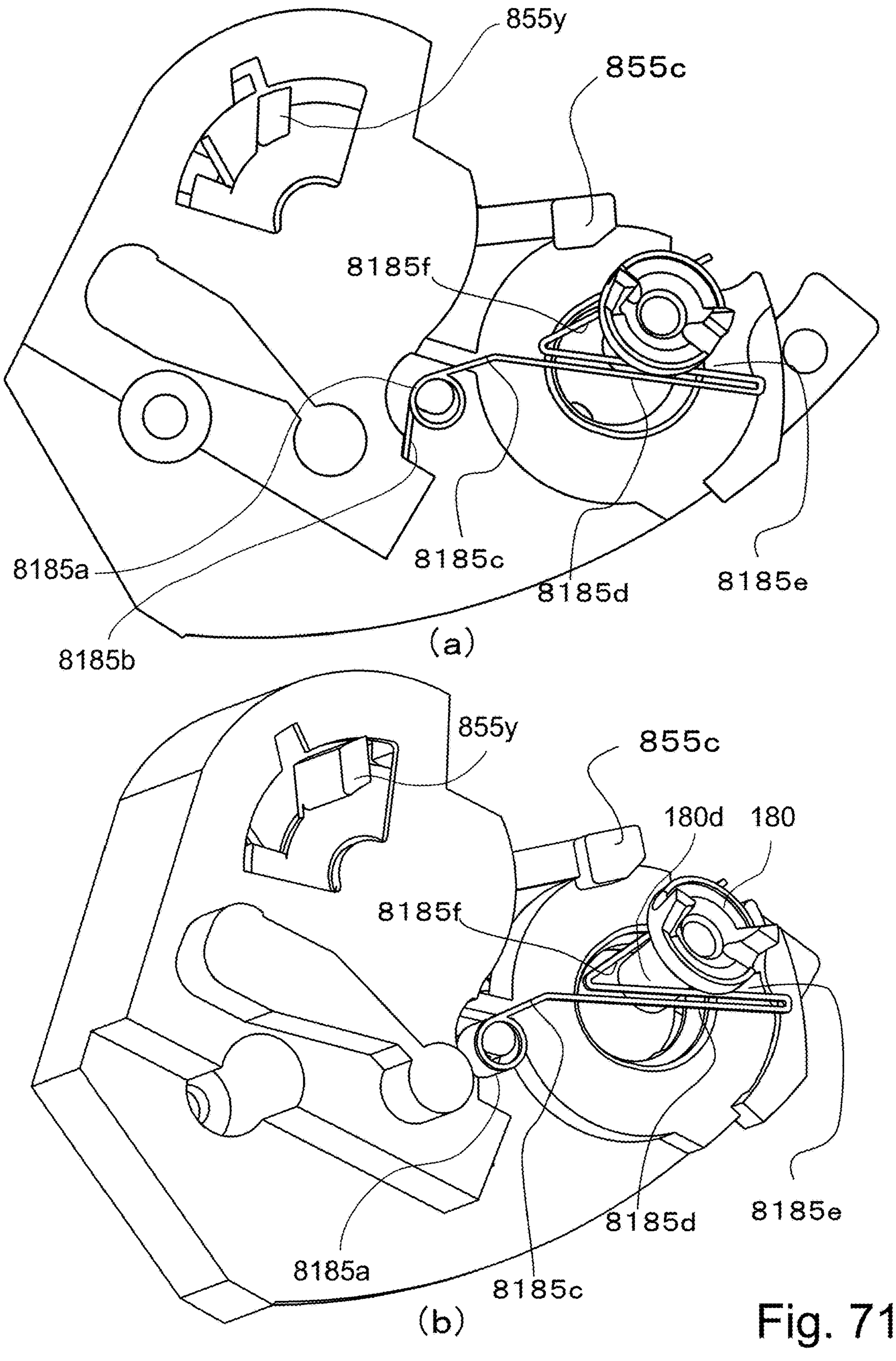

FIG. 71, parts (a) and (b), show the first inclination attitude D1 of the coupling member 180 in the eighth embodiment of the present invention.

Figure 72:
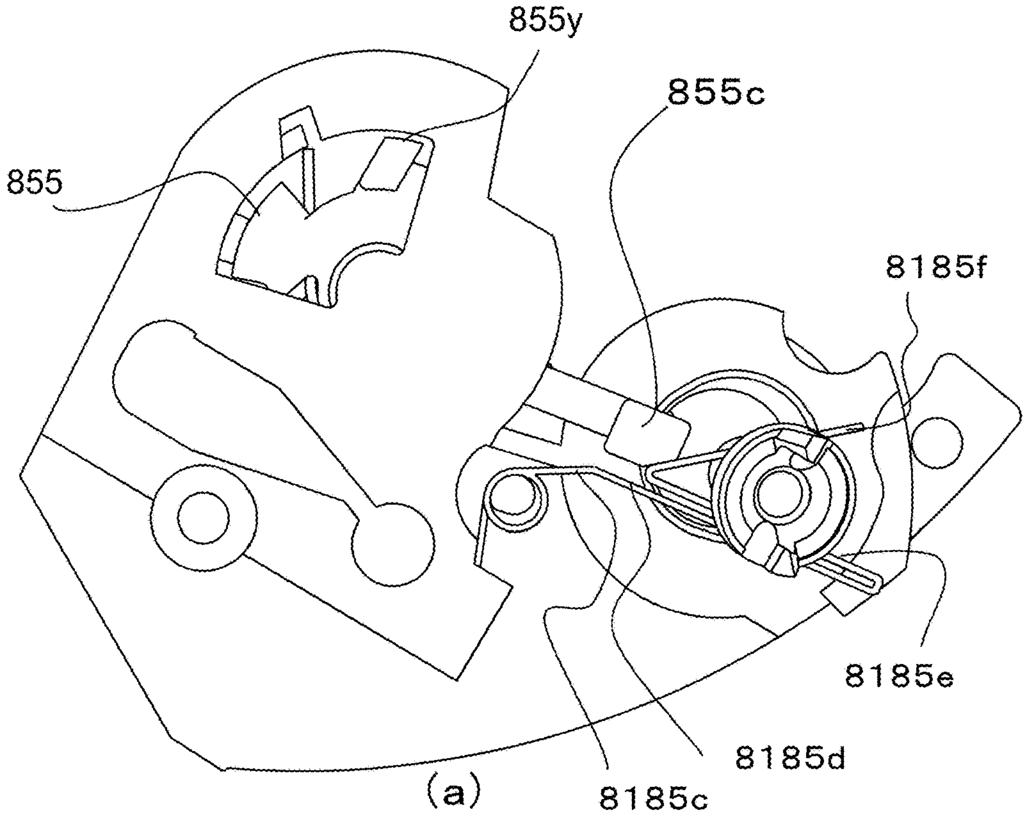
Figure 72:
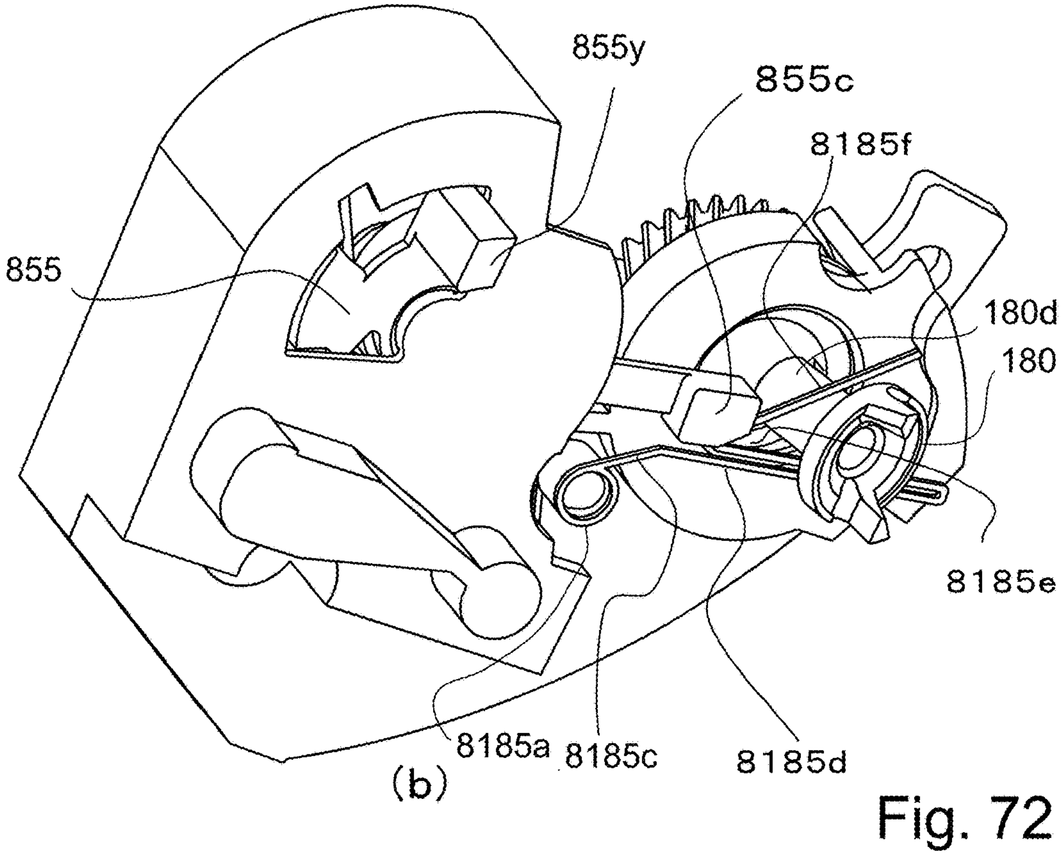

FIG. 72, parts (a) and (b), show a state in which the coupling member 180 takes the second inclination attitude D2 in the eighth embodiment of the present invention.

Figure 73:
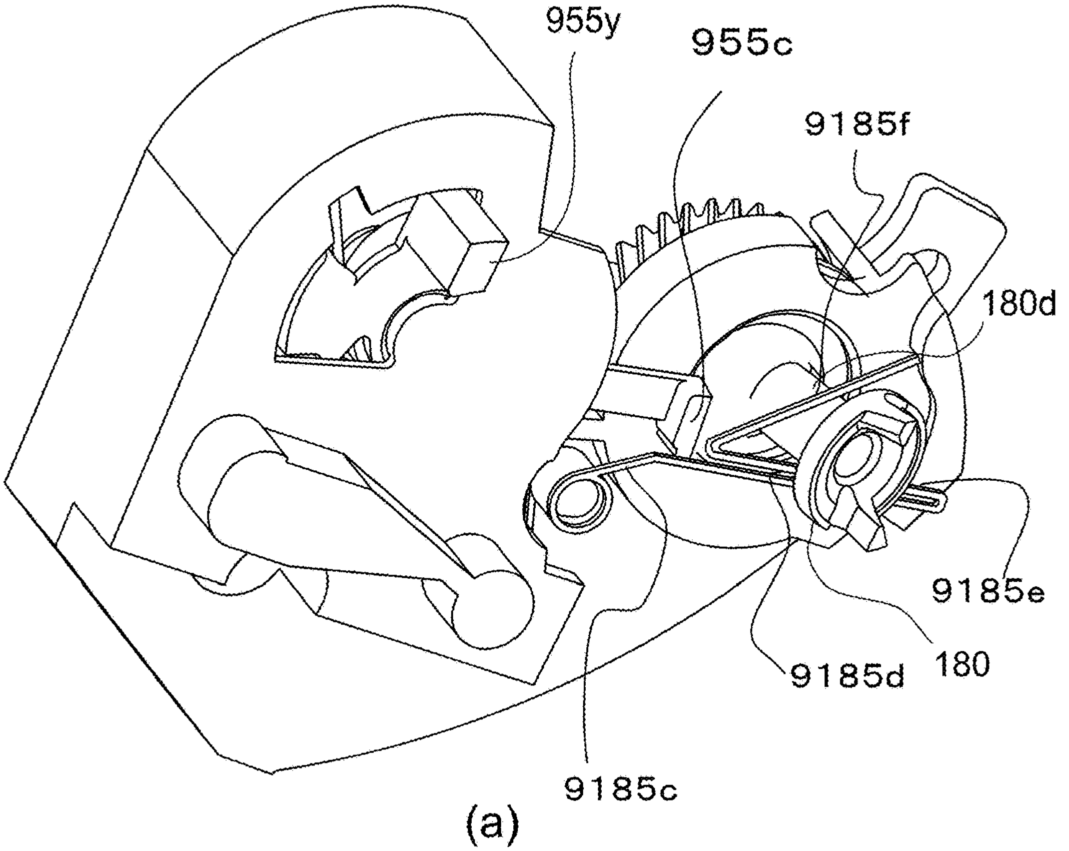
Figure 73:
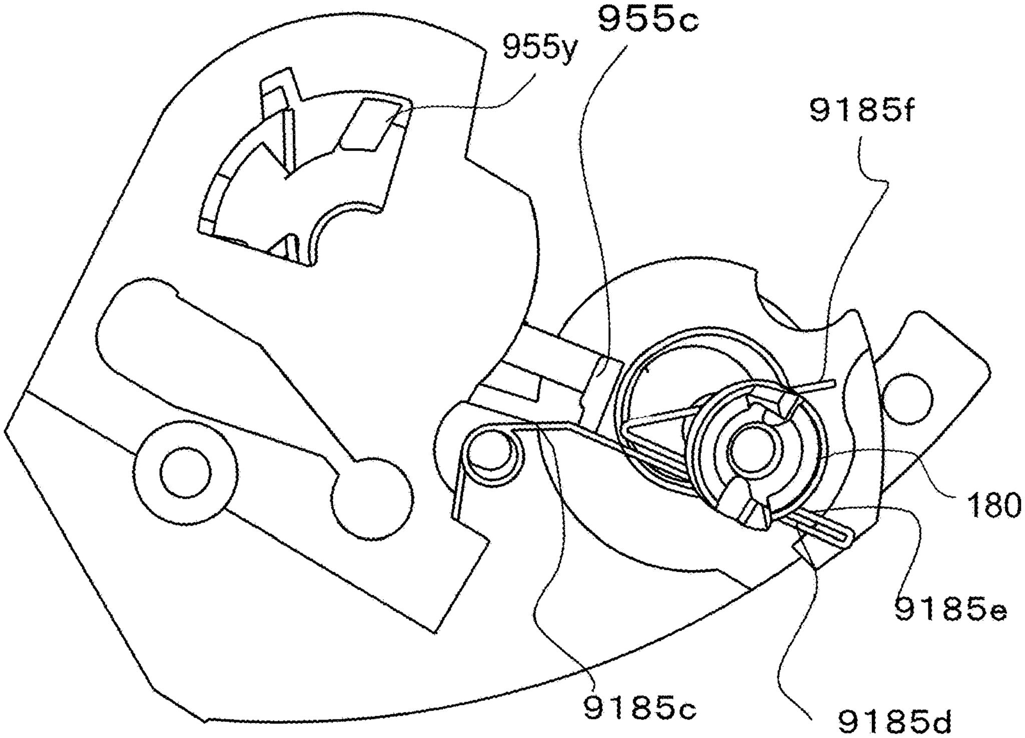

FIG. 73, parts (a) and (b), show a state in which the coupling member 180 takes the second inclination attitude D2 in a ninth embodiment of the present invention.

Figure 74:
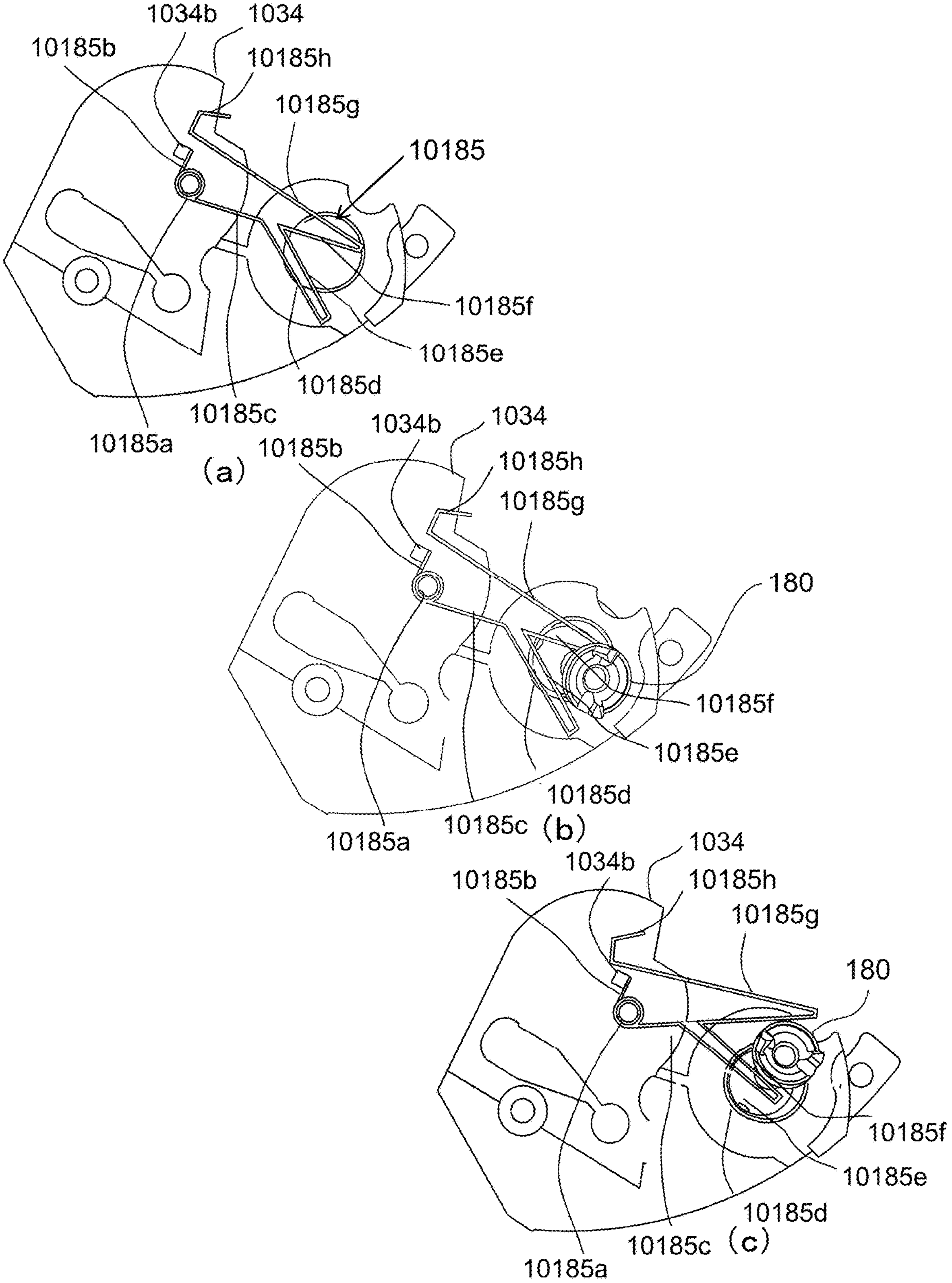

Part (a) of FIG. 74 shows a coupling spring 10185 mounted to a development side cover 1034, part (b) of FIG. 74 shows the second inclination attitude D2 of the coupling member 180, and part (c) of FIG. 74 shows the first inclination attitude D1 of the coupling member 180, in a tenth embodiment of the present invention.

Figure 75:
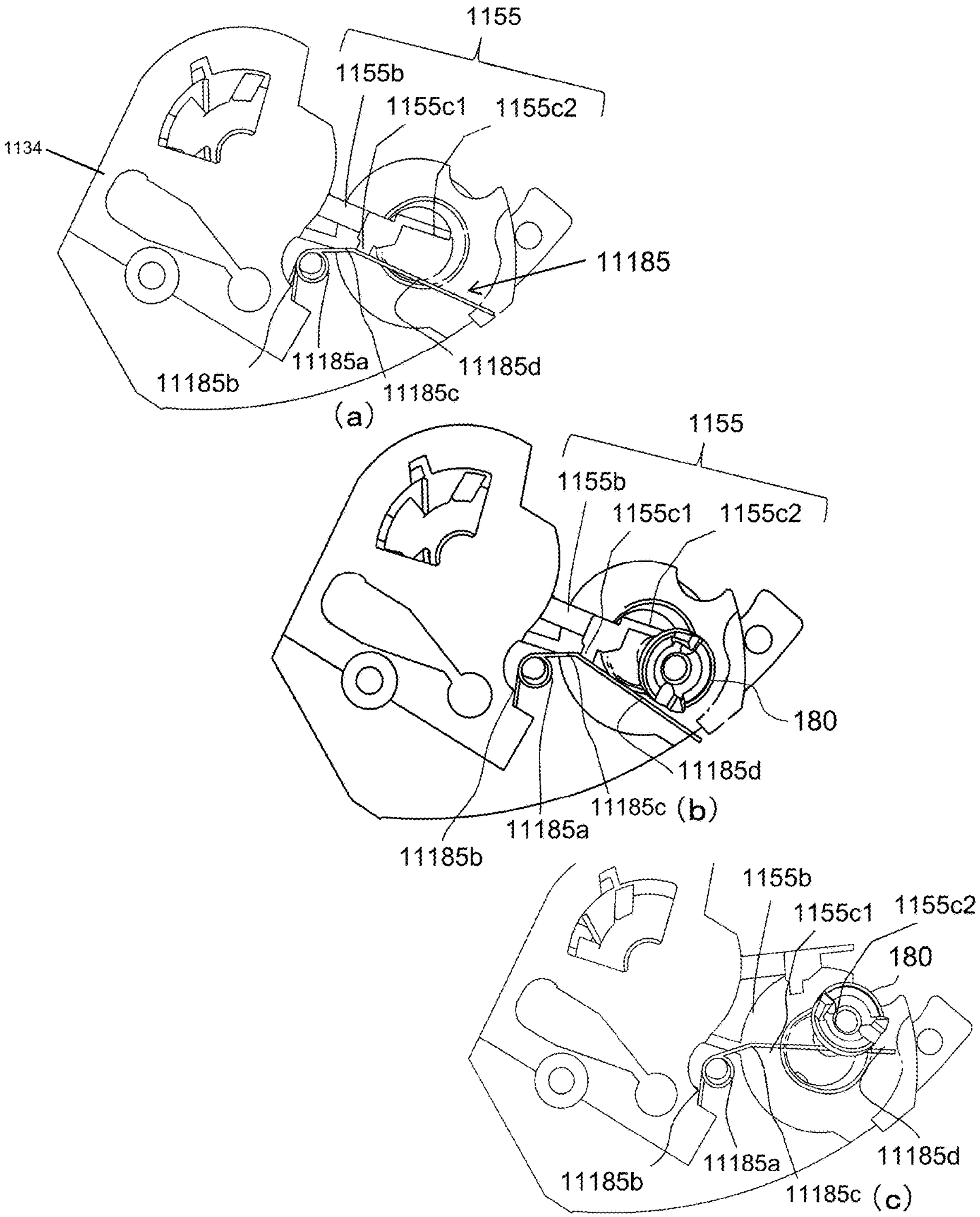

Part (a) of FIG. 75 shows a coupling spring 11185 and a lever 1155 mounted to a development side cover 1134, part (b) of FIG. 75 shows the second inclination attitude D2 of the coupling member 180, and part (c) of FIG. 75 shows the first inclination attitude D1 of the coupling member 180, in an eleventh embodiment of the present invention.

Figure 76:
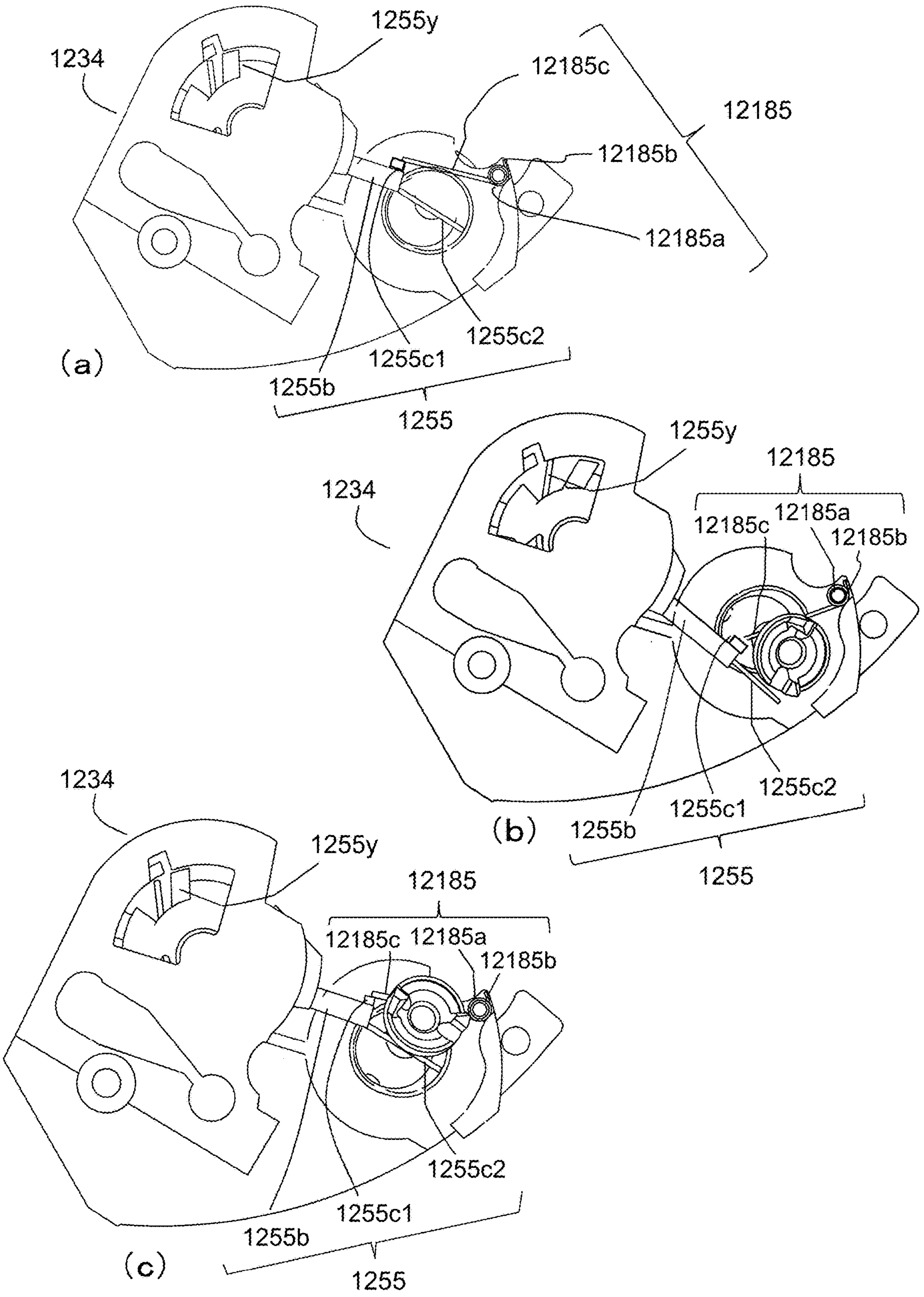

Part (a) of FIG. 76 shows a coupling spring 12185 and a lever 1255 mounted to a development side cover 1234, part (b) of FIG. 76 shows the second inclination attitude D2 of the coupling member 180, and part (c) of FIG. 76 shows the first inclination attitude D1 of the coupling member 180, in a twelfth embodiment of the present invention

DESCRIPTION OF THE EMBODIMENTS

A cartridge and an image forming apparatus according to the present invention will be described in conjunction with the accompanying drawings. The following description will be made as to a drum cartridge and a developing cartridge which are detachably mountable to the above-described main assembly of the image forming apparatus. In the following description, a longitudinal direction of the drum cartridge or the developing cartridge is a direction of a rotational axis L1 of the photosensitive drum or a direction of a rotational axis L9 of the developing roller, respectively. The rotational axis L1 of the photosensitive drum and the rotational axis L9 of the developing roller are perpendicular to the feeding direction of the recording material. A widthwise direction of the drum cartridge or the developing cartridge is a direction substantially perpendicular to the rotational axis L1 of the photosensitive drum or a direction substantially perpendicular to the rotational axis L9 of the developing roller. In this embodiment, the direction in which the drum cartridge and the developing cartridge are mounted to and dismounted from the main assembly of the laser beam printer is a widthwise direction of the cartridges. The reference numerals in the following description are for the reference to the drawings and do not limit the structures.

Embodiment 1

Figure 2:
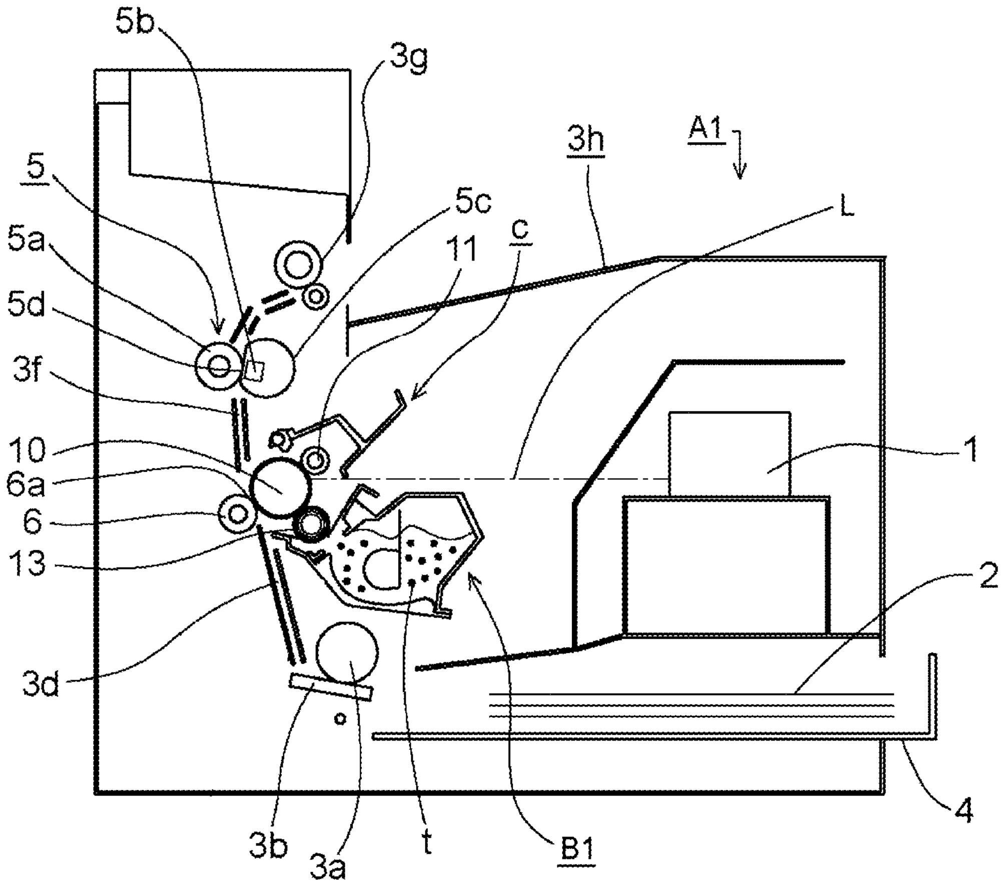
FIG. 2 is a schematic sectional side view of an electrophotographic image forming apparatus according to the first embodiment of the present invention.

(1) General Arrangement of an Image Forming Apparatus:

Referring first to FIG. 2, a general arrangement of the image forming apparatus according to an embodiment of the present invention will be described. FIG. 2 is a schematic sectional side view of the image forming apparatus.

The image forming apparatus shown in FIG. 2 forms a image on a recording material 2 with a developer t through an electrophotographic image forming process in accordance with image information supplied from external equipment such as a personal computer. The image forming apparatus comprises a main assembly A1, a developing cartridge B1 and a drum cartridge C. The developing cartridge B1 and the drum cartridge C are detachably mounted to the main assembly A1 by the user. That is, these cartridges are mountable to and dismountable from the main assembly A1. The recording material 2 is recording paper, label paper, an OHP sheet, textile or the like, for example. The developing cartridge B1 comprises a developing roller 13 and so on, and the drum cartridge C comprises a photosensitive drum 10 and a charging roller 11 and so on.

A surface of the photosensitive drum 10 is uniformly charged by the charging roller 11 supplied with a voltage from the main assembly A1. Then, a laser beam L modulated in accordance with image information is projected from an optical means 1 onto the charged photosensitive drum 10 so that an electrostatic latent image is formed on the photosensitive drum 10 in accordance with the image information. The electrostatic latent image is developed with the developer t by developing means which will be described hereinafter. As a result, a developer image is formed on the surface of the photosensitive drum 10.

On the other hand, the recording material 2 accommodated in a sheet feeding tray 4 is singled out by the function of a sheet feeding roller 3*a* and a separation pad 3*b* press-contacted thereto, in synchronism with the formation of the developer image. The recording material 2 is fed along a feeding guide 3*d* to a transfer roller 6 as transferring means. The transfer roller 6 is urged to contact the surface of the photosensitive drum 10.

Then, the recording material 2 passes through a transfer nip 6*a* formed between the photosensitive drum 10 and the transfer roller 6. At this time, the transfer roller 6 is supplied with a voltage having a polarity opposite to that of the developer image, so that the developer image is transferred from the surface of the photosensitive drum 10 onto the recording material 2.

The recording material 2 having the transferred developer image is fed into a fixing means 5 while being regulated by a feeding guide 3*f*. The fixing means 5 includes a driving roller 5*a* and a fixing roller 5*c* containing a heater 5*b*. When the recording material 2 passes through a nip 5*d* between the driving roller 5*a* and the fixing roller 5*c*, the recording material 2 receives heat and pressure, by which the developer image transferred onto the recording material 2 is fixed on the recording material 2. In this manner, the image is formed on the recording material 2.

Thereafter, the recording material 2 is fed by a pair of discharging rollers 3*g* to be discharged to the discharging portion 3*h*.

Figure 3:
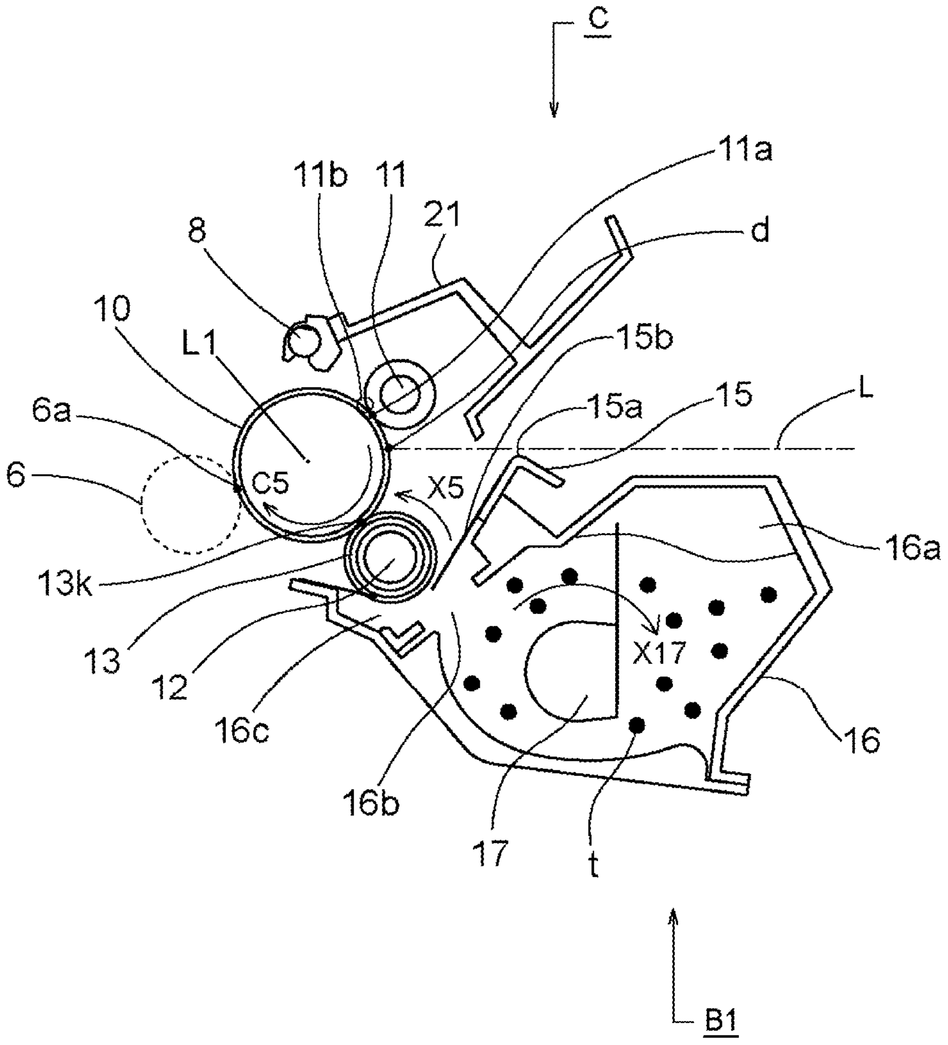
FIG. 3 is a schematic sectional view of the developing cartridge B1 and a drum cartridge C according to the first embodiment of the present invention.

(2) Electrophotographic Image Forming Process:

Referring to FIG. 3, an electrophotographic image forming process used in the embodiment of the present invention will be described. FIG. 3 is a schematic sectional view of the developing cartridge B1 and the drum cartridge C.

As shown in FIG. 3, the developing cartridge B1 includes a developing container 16 as a cartridge frame (or development side supporting frame), the developing roller 13 as the developing means, a developing blade 15 and so on. The drum cartridge C includes a drum frame 21 as a photosensitive member side supporting frame, the photosensitive drum 10, the charging roller 11 and so on.

The developer t is accommodated in a developer accommodating portion 16*a* of the developing container 16. A developer feeding member 17 rotatably supported by the developing container 16 rotates in a direction indicated by an arrow X17. By this, the developer t is discharged into a developing chamber 16*c* through the opening 16*b* of the developing container 16. The developing container 16 includes a developing roller 13 containing a magnet roller 12. More specifically, the developing roller 13 includes a shaft portion 13*e* and a rubber portion 13*d* (FIG. 6). The shaft portion 13*e* is made of electroconductive aluminum or the like and has an elongated cylindrical shape, and the longitudinally central portion is coated with the rubber portion 13*d*. The rubber portion 13*d* coats the shaft portion 13*e* so that the outer configuration thereof is coaxial with the shaft portion 13*e*. The developing roller 13 attracts the developer t onto the surface of the developing roller 13 in the developing chamber 16*c* by a magnetic force of the magnet roller 12. The developing blade 15 includes a supporting member 15*a* of metal plate and an elastic member 15*b* of urethane rubber and SUS plate or the like. The elastic member 15*b* is elastically contacted to the developing roller 13 at a predetermined contact pressure. By the developing roller 13 rotating in a rotational moving direction X5, an amount of the developer t deposited on the surface of the developing roller 13 is regulated. By this, the developer t is triboelectrically charged. That is, a developer layer is formed on the surface of the developing roller 13. The developing roller 13 supplied with the voltage from the main assembly A1 is rotated in the rotational moving direction X5 in contact with the photosensitive drum 10 to supply the developer t to the developing zone of the photosensitive drum 10.

In the case of a contact-type developing system as in this embodiment, if the developing roller 13 is always in contact with the photosensitive drum 10 (FIG. 3), there is a likelihood that the rubber portion 13*b* of the developing roller 13 deforms. For this reason, it is preferable that the developing roller 13 is kept spaced from the photosensitive drum 10 in the non-development period.

To an outer peripheral surface of the photosensitive drum 10, a charging roller 11 rotatably supported by a frame 21 is contacted and is urged toward the photosensitive drum 10. The charging roller 11 uniformly charges the surface of the photosensitive drum 10 by a voltage applied from the main assembly A1. The voltage applied to the charging roller 11 is selected so that a potential difference between the charging roller 11 and the surface of the photosensitive drum 10 is not less than a discharge start voltage. In this embodiment, a DC voltage of −1300V is applied as the charging bias voltage. By this, the surface of the photosensitive drum 10 is uniformly charged to the charged potential (dark portion potential) of −700V. In this embodiment, the charging roller 11 is rotated independently of the rotation of the photosensitive drum 10, as will be described in detail hereinafter. By the laser beam L emitted from the optical means 1, an electrostatic latent image is formed on the photosensitive drum 10. Thereafter, the developer t is transferred correspondingly to the electrostatic latent image on the photosensitive drum 10, by which the electrostatic latent image is visualized into a developed image on the photosensitive drum 10.

(3) Structure of Cleaner-Less System:

The cleaner-less system employed in this embodiment will be described.

In this embodiment, no cleaning member for removing, from the surface of the photosensitive drum 10, untransferred residual developer remaining on the photosensitive drum 10 without being transferred is provided.

As shown in FIG. 3, the photosensitive drum 10 is rotated in a direction indicated by an arrow C5. The untransferred residual developer remaining on the surface of the photosensitive drum 10 after the image transfer step is charged to a negative polarity by the discharge of the charging roller in an upstream gap 11*b*, similarly to the photosensitive drum 10. The upstream gap 11*b* exists at a position upstream of a charging nip 11*a* where the charging roller 11 and the photosensitive drum 10 are contacted to each other, with respect to the rotational direction C5 of the photosensitive drum 10. At this time, the surface of the photosensitive drum 10 is charged to −700V. The untransferred residual developer charged to the negative polarity passes through the charging nip 11*a* without depositing on the charging roller 11 because of the potential difference relationship (−700V of the surface potential of the photosensitive drum 10, and −1300V of the potential of the charging roller 11).

The untransferred residual developer having passed through the charging nip 11*a* reaches the laser projection position d. The amount of the untransferred residual developer is not so large as to block the laser beam L supplied from the optical means. Therefore, it does not influence the formation of the electrostatic latent image on the photosensitive drum 10. The untransferred residual developer which has passed through the laser projection position d and which is in a non-exposed portion (the portion of the surface of the photosensitive drum 10 not exposed to the laser projection) is collected onto the developing roller 13 by an electrostatic force in the development nip 13*k* which is a contact portion between the developing roller 13 and the photosensitive drum 10. On the other hand, the untransferred residual developer in the exposed portion (the portion of the surface of the photosensitive drum 10 exposed to the laser projection) is not electrostatically collected and remains on the surface of the photosensitive drum 10. However, a part of such untransferred residual developer is collected by a physical force due to the peripheral speed difference between the developing roller 13 and the photosensitive drum 10.

In this manner, the untransferred residual developer remaining on the photosensitive drum 10 without being transferred onto the paper is mostly collected into the developing container 16. The untransferred residual developer collected in the developing container 16 is mixed with the developer t existing in the developing container 16 and is reused for the development.

In this embodiment, in order to pass the untransferred residual developer through the charging nip 11*a* without being deposited on the charging roller 11, the following two structures are employed.

The first is the provision of a light electrical discharging member 8 between the transfer roller 6 and the charging roller 11. The light electrical discharging member 8 is disposed upstream of the charging nip 11*a* with respect to a rotational direction (arrow C5) of the photosensitive drum 10. The light electrical discharging member 8 discharges, by light, the surface potential of the of the photosensitive drum 10 after the passage through the transfer nip 6*a* to stably discharge in the above-described upstream gap 11*b*. By the light electrical discharging member 8, the potential of the photosensitive drum 10 before the charging becomes about −150V over the length of the photosensitive drum 10. In this manner, the uniform discharging can be effected in the charging operation, so that the untransferred residual developer can be uniformly charged to the negative polarity.

The second is the provision of a predetermined peripheral speed difference between the charging roller 11 and the photosensitive drum 10. The reason for this is as follows. Most of the toner is charged to the negative polarity by the above-described discharge, but a small amount of the untransferred residual developer is not charged to the negative polarity. Such untransferred residual developer may be deposited on the charging roller 11 in the charging nip 11*a*. However, with the provision of the predetermined peripheral speed difference between the charging roller 11 and the photosensitive drum 10, a sliding action is provided between the photosensitive drum 10 and the charging roller 11, by which the above-described untransferred residual developer can be charged to the negative polarity. By this, the deposition of the untransferred residual developer on the charging roller 13 can be suppressed. In this embodiment, a charging roller gear 69 (FIG. 17, the detailed description will be made hereinafter) is provided at a longitudinal one end portion of the charging roller 11, and the gear 69 is engaged with a driving side flange 24 (FIG. 17, the detailed description will be made hereinafter) provided at the same longitudinal one end portion of the photosensitive drum 10. Therefore, the charging roller 11 is rotated by the rotation of the photosensitive drum 10. The peripheral speed of the surface of the charging roller 11 is 105-120% relative to the peripheral speed of the surface of the photosensitive drum 10.

(4) Structure of Developing Cartridge B1:

<General Arrangement of Developing Cartridge B1>

Figure 4:
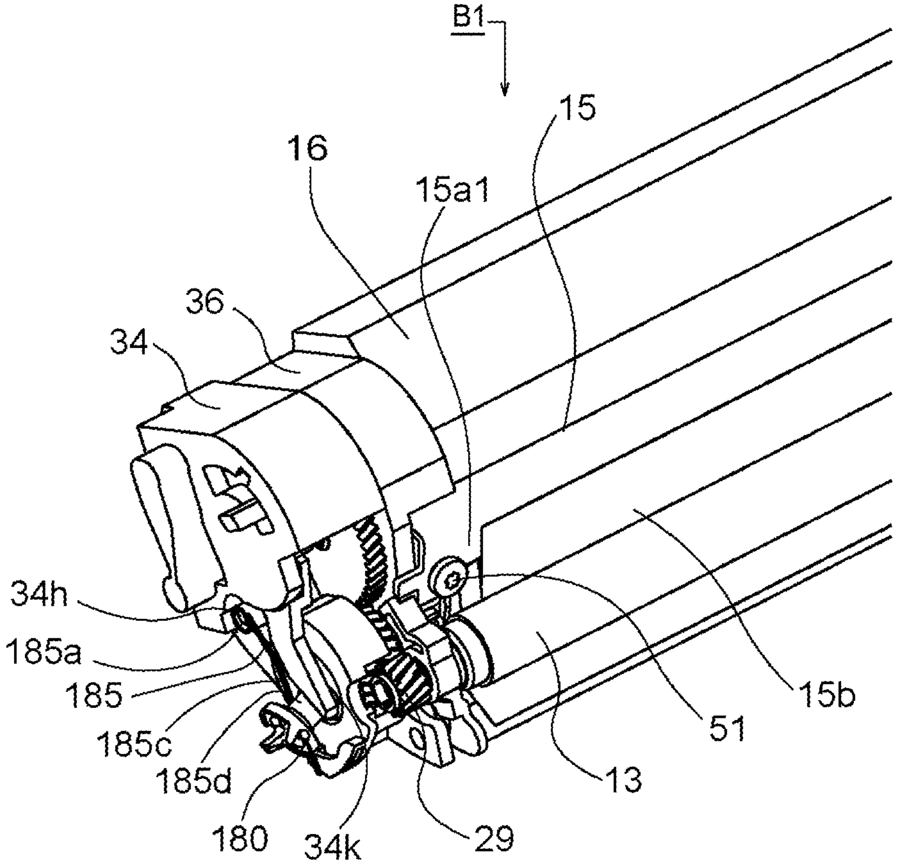
FIG. 4 is a schematic perspective view of the developing cartridge B1 according to the first embodiment of the present invention as seen from a driving side.
Figure 5:
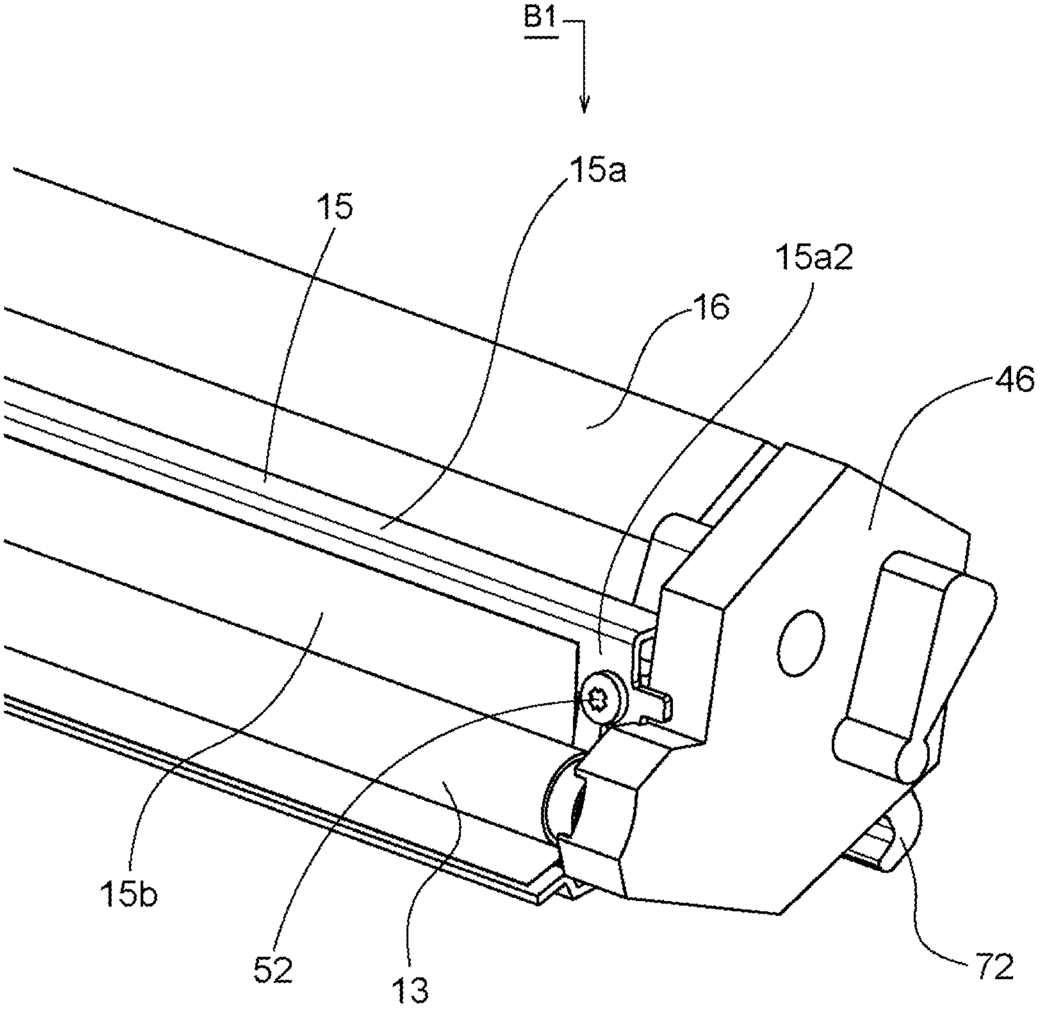
FIG. 5 is a schematic perspective view of the developing cartridge B1 according to the first embodiment of the present invention as seen from a non-driving side.

Referring to the drawings, the structure of the developing cartridge B1 according to an embodiment of the present invention will be described. In the following description, a side, with respect to the longitudinal direction, at which a rotational force is transmitted to the developing cartridge B1 from the main assembly A1 is called "driving side". The opposite side is called "non-driving side". FIG. 4 is a schematic perspective view of the developing cartridge B1 as seen from the driving side. FIG. 5 is a schematic perspective view of the developing cartridge B1 as seen from the non-driving side. Part (a) of FIG. 6 is a exploded schematic perspective view of the driving side of the developing cartridge B1 as seen from the driving side, and part (b) is a schematic perspective view thereof as seen from the non-driving side. Part (a) of FIG. 7 is a exploded schematic perspective view of the non-driving side of the developing cartridge B1 as seen from the non-driving side, and part (b) is a schematic perspective view thereof as seen from the driving side.

As shown in FIGS. 6 and 7, the developing cartridge B1 includes a developing roller 13 as a developer carrying member and the developing blade 15 and so on. The developing blade 15 is fixed on the developing container 16 by a screw 51 and a screw 52 at the driving side end portion 15*a*1 and the non-driving side end portion 15*a*2 with respect to the longitudinal direction of the supporting member 15*a*. In the opposite end portions of the developing container 16, there are provided a driving side developing device bearing 36 and a non-driving side developing device bearing 46, respectively. Each of the bearings (36, 46) is a part of the container or a frame in a broad sense, except in the case otherwise stated. The developing roller 13 is rotatably supported by a driving side end portion 13*a* engaged with a hole 36*a* of the driving side developing device bearing 36 and by a non-driving side end portion 13*c* engaged with a supporting portion 46*f* of the non-driving side bearing 46. In the driving side end portion 13*a* of the developing roller 13 (outside of the driving side developing device bearing 36 with respect to the longitudinal direction), a developing roller gear 29 is provided coaxially, along axis L0, with the developing roller 13, and they are engaged with each other so that the developing roller 13 and the developing roller gear 29 can be integrally rotated (FIG. 4).

The driving side developing device bearing 36 rotatably supports a drive input gear 27 at a position outside the developing container 16 with respect to the longitudinal direction. Drive input gear 27 is engaged with the developing roller gear 29. A coupling member 180 is provided coaxially with the drive input gear 27.

The driving side extreme end of the developing cartridge B1 is provided with a development side cover 34 as an end member. The development side cover 34 covers the drive input gear 27 and the longitudinally outside position. The coupling member 180 is projected in the longitudinal direction to the outside through the hole 34*a* of the development side cover 34. The coupling member 180 is engageable with a main assembly side driving member 100 provided in the main assembly A1 to receive the rotational force. The rotational force is transmitted to a rotational force receiving portion 27*d*1 (FIG. 8) of the drive input gear 27 and to a rotation receiving portion (unshown) through rotational force transmitting portions 180*c*1, 180*c*2 of the coupling member 180. As a result, the rotational force received by the coupling member 180 is transmitted to the developing roller 13 as a rotatable member through the drive input gear 27 and the developing roller gear 29. There is provided play between the rotational force receiving portions and the rotational force transmitting portions. That is, the coupling member 180 is rotatable without rotating the drive input gear 27. By the structure, the coupling member 180 is movable (rotatable, swingable or whirling) to any angle.

The driving side developing device bearing 36 is provided with a first movable member. The first movable member includes a driving side contacting and spacing lever 70 as a first main assembly portion and a driving side development urging spring 71 as a first elastic portion. The non-driving side developing device bearing 46 is provided with a second movable member. The second movable member includes a non-driving side contacting and spacing lever 72 as a second main assembly portion and a non-driving side development urging spring 73 as a second elastic portion. The coupling member 180 and the neighborhood structures thereof will be described in detail.

As shown in FIG. 6, in the driving side of the developing cartridge B1, the coupling member 180, the drive input gear 27, the elastic member (coupling spring 185) as an urging member are provided. In other words, the spring 185 is an urging elastic member. The coupling member 180 is engaged with the main assembly side driving member 100 provided in the main assembly A1 to receive the rotational force.

More particularly, as shown in part (b) of FIG. 8, the coupling member 180 includes a free end portion 180*a* as a first end portion, a connection end portion (supported portion (portion-to-be-supported)) 180*b* as a second end portion, a guide portion 180*d* as a connecting portion for connecting the free end portion 180*a* and the connection end portion 180*b*. The free end portion 180*a* is provided with rotational force receiving portions 180*a*1, 180*a*2, and an expanding portion having a conical portion 180*g* as a recess. The supported portion 180*b* includes rotational force transmitting portions 180*c*1 and 180*c*2.

On the hand, the main assembly side driving member 100 as a main assembly side driving shaft includes a projection 100*g* (FIG. 14) provided at a free end portion with respect to the axis L4 and rotational force applying portions 100*a*1 and 100*a*2 projecting in a direction perpendicular to the axis L4 at a rear side of the free end.

The free end portion 180*a* (rotational force receiving portions 180*a*1, 180*a*2) of the coupling member 180 is projected outwardly beyond a driving side end portion 27*a* of the drive input gear 27 in the longitudinal direction of the developing cartridge B1. When the main assembly side driving member 100 rotates about the rotational axis L4 in a direction indicated by an arrow X6 (forward rotating direction), the rotational force applying portion 100*a*1 abuts to the rotational force receiving portion 180*a*1, and the rotational force applying portion 100*a*2 abuts to the rotational force receiving portion 180*a*2. By this, the rotational force is transmitted from the main assembly side driving member 100 to the coupling member 180.

A maximum outer diameter of at least a part the connecting portion 180*d* in a cross section (in a plane perpendicular to the rotational axis of the coupling portion 180) is smaller than a distance between the rotational force receiving portion 180*a*1 and the rotational force receiving portion 180*a*2. In other words, a maximum rotation radius of the at least a part of the connecting portion 180*d* in the cross section is smaller than a distance between a radially inside of the rotational force receiving portion 180*a*1 and the rotational axis of the coupling member.

As shown in part (b) of FIG. 8 and part (e) of FIG. 8, the supported portion 180*b* of the coupling member 180 has a substantially spherical shape. The supported portion 180*b* is movably (pivotably, swingably) supported by a supporting portion 27*b* of an inner surface of the drive input gear 27. The rotational force transmitting portion 180*c*1 contacts the rotational force receiving portion 27*d*1 of the drive input gear 27. Similarly, the rotational force transmitting portion 180*c*2 contacts another rotational force receiving portion (unshown) of the drive input gear 27. By this, the drive input gear 27 is driven by the coupling member 180 receiving the driving force from the main assembly side driving member 100 as the main assembly driving shaft, so that the drive input gear 27 rotates in the forward direction X6 about the rotational axis L3.

As shown in part (c) of FIG. 8, the rotational axis L4 of the main assembly side driving member 100 and the rotational axis L3 of the drive input gear 27 are coaxial with each other. However, as shown in part (d) of FIG. 8, the rotational axis L4 of the main assembly side driving member 100 and the rotational axis L3 of the drive input gear 27 may be slightly deviated from the co-axial position to a parallel position. In such a case, the rotational force can be transmitted from the main assembly side driving member 100 to the coupling member 180 with the rotational axis L2 of the coupling member 180 inclined relative to the rotational axis L3 of the drive input gear 27. Furthermore, the rotational axis L3 of the drive input gear 27 may be slightly deviated with an angle from the co-axis relative to the rotational axis L4 of the main assembly side driving member 100. In such a case, the rotational force can be transmitted from the main assembly side driving member 100 to the coupling member 180 with the rotational axis L2 of the coupling member 180 inclined relative to the rotational axis L4 of the main assembly side driving member 100.

In addition, as shown in part (a) of FIG. 8, the drive input gear 27 is provided integrally with the gear portion 27*c*, which may be a helical gear or a spur gear coaxial with the rotational axis L3 of the drive input gear 27. The gear portion 27*c* is engaged with the gear portion 29*a* of the developing roller gear 29. Because the developing roller gear 29 rotates integrally with the developing roller 13, the rotational force of the drive input gear 27 is transmitted to the developing roller 13 through the developing roller gear 29. Then, the developing roller 13 rotates in the rotational moving direction X5 about the rotational axis L9.

<Assembling of Driving-Side Side Cover and Peripheral Parts>

The description will be made as to the development side cover 34 and the movable member (coupling lever 55 and coupling lever spring 56) provided at the driving side end portion of the developing cartridge B1. The lever 55 is the movable member in the narrow sense, and the combination of the lever 55 and the spring 56 is the movable member in the broad sense. In other words, the spring 55 is an elastic member for movement.

FIG. 9 is a schematic perspective view and a side view illustrating the assembling of the lever 55 and the spring 56 to the development side cover 34.

The lever 55 and the spring 56 are mounted to the inside of the development side cover 34 with respect to the longitudinal direction of the developing cartridge B1. The lever 55 is supported movably relative to the cover 34. A cylindrical lever positioning boss 34*m* of the cover 34 is engaged with a hole portion 55*c* of the lever 55. As a result, the lever 55 is supported so as to be rotatable relative to the cover 34 about a rotational axis L11. The spring 56 is a coil spring having one end portion engaged with the lever 55 and the other end engaged with the cover 34. More particularly, an operation arm 56*a* of the spring 56 is engaged with a spring hook portion 55*b* of the lever 55, and a fixed arm 56*c* of the spring 56 is engaged with a spring hook portion 34*s* of the cover 34 (part (c) of FIG. 9).

To the outside of the cover 34 of the developing cartridge B1 with respect to the longitudinal direction, a coupling spring 185 is mounted (part (b) of FIG. 10).

The mounting of the lever 55 and the spring 56 on the cover 34 will be described. First, the cylindrical boss 55*a* of the lever 55 and the cylindrical portion 56*d* of the spring 56 are engaged with each other (part (a) of FIG. 9). At this time, the operation arm 56*a* of the spring 56 is engaged with the spring hook portion 55*b* of the lever 55. In addition, the fixed arm 56*c* of the spring 56 is deformed in the direction of an arrow X11 about the rotational axis L11. Then, the hole portion 55*c* of the lever 55 is fitted around the lever positioning boss 34*m* of the cover 34 (parts (a)-(b) of FIG. 9). In this fitting movement, the retaining portion 55*d* of the lever 55 does not interfere with the portion-to-be-retained 34*n* of the cover 34. More particularly, as shown in part (b) of FIG. 9, as seen in the longitudinal direction of the developing cartridge B1, the retaining portion 55*d* of the lever 55 and the portion-to-be-retained 34*n* of the development side cover 34 are not overlapped with each other.

In the state shown in part (b) of FIG. 9, the fixed arm 56*c* of the spring 56 is deformed in the direction of the arrow X11, as described hereinbefore. When the fixed arm 56*c* of the spring 56 is released, as shown in part (b) of FIG. 9, the fixed arm 56*c* is engaged with the spring hook portion 34*s* of the development side cover 34, so that the urging force provided by the deformation of the fixed arm 56*c* of the spring 56 is received by the spring hook portion 34*s*, as shown in part (c) of FIG. 9. As a result, the fixed arm 56*c* of the spring 56 receives a reaction force in the direction of the arrow X11 from the spring hook portion 34*s* of the cover 34. Furthermore, the lever 55 receives an urging force from the spring 56 at the spring hook portion 55*b*. Therefore, the lever 55 rotates about the rotational axis L11 in the direction indicated by the arrow X11, so that a rotation regulating portion 55*y* of the lever 55 is prevented in the rotation at the position where it abuts to a regulating surface 34*y* of the development side cover 34 (parts (a)-(c) of FIG. 9). Thus, the assembling of the lever 55 and the spring 56 to the cover 34 is completed.

At this time, the retaining portion 55*d* of the lever 55 is overlapped with the portion-to-be-retained 34*n* of the cover 34, as seen in the longitudinal direction of the developing cartridge B1. Thus, the movement of the lever 55 in the longitudinal direction is limited, and only the rotation about the rotational axis X11 is permitted. Part (d) of FIG. 9 is a sectional view of the retaining portion 55*d* of the coupling lever 55.

<Assembling of Development Side Cover 34>

As shown in FIG. 10, the movable member (coupling lever 55 and coupling lever spring 56) is mounted on the development side cover 34. The development side cover 34 is fixed at a position outside of the driving side developing device bearing 36 with respect to the longitudinal direction of the developing cartridge B1. More particularly, a positioning portion 34*r*1 of the development side cover 34 and a positioned portion (portion to be positioned) 36*e*1 of the driving side bearing 36 are engaged with each other, and a positioning portion 34*r*2 and a positioned portion (portion to be positioned) 36*e*2 are engaged with each other. By this, the position of the development side cover 34 is determined relative to the driving side developing device bearing 36.

The fixing of the development side cover 34 to the driving side developing device bearing 36 may be made by screw, adhesive material or the like, and the fixing method is not limited to a particular one.

Figure 1:
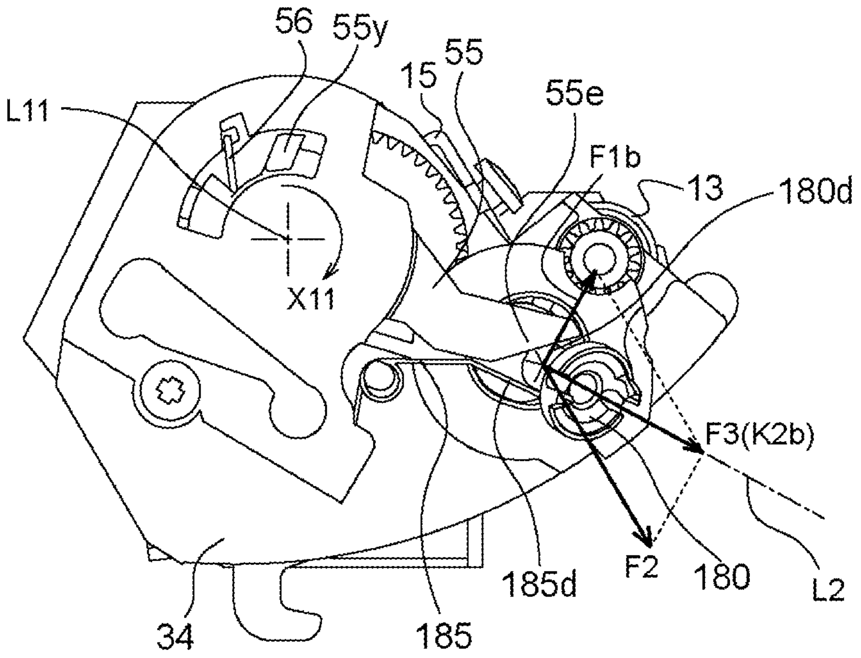
FIG. 1, parts (a) and (b), are side views of a developing cartridge B1 per se (spontaneous state) according to a first embodiment of the present invention before the developing cartridge B1 is mounted to a main assembly A1.
Figure 1:
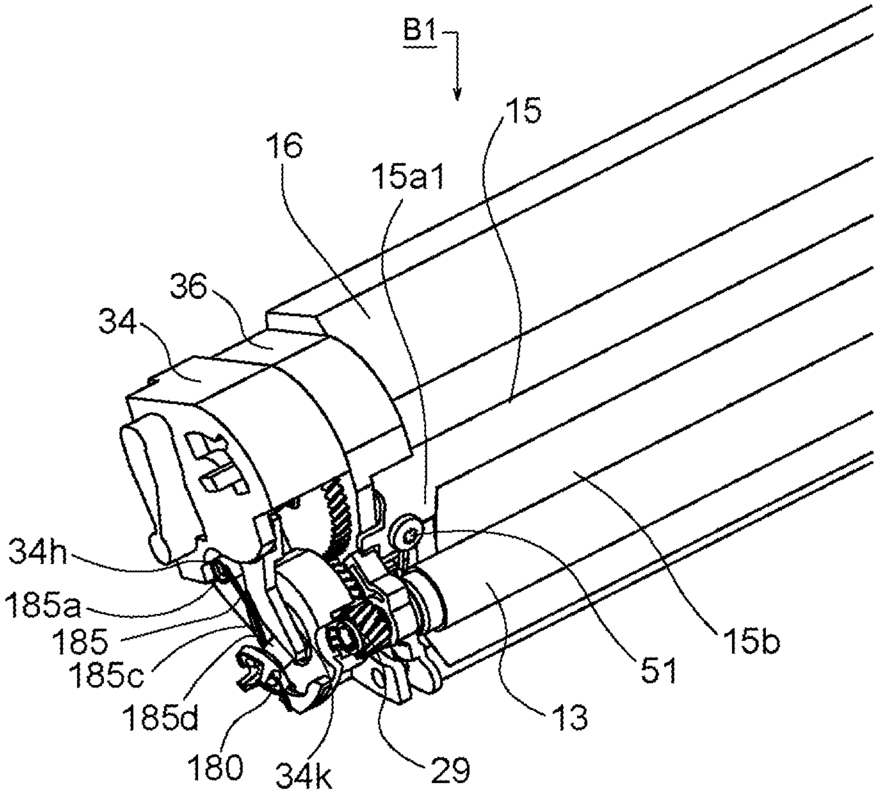

When the development side cover 34 is assembled, the rotational force receiving portion 180*a*1 of the coupling member 180, the rotational force receiving portion 180*a*2, the portion-to-be-guided 180*d* and so on are exposed through the hole 34*a* of the development side cover 34 to the outside with respect to the longitudinal direction of the developing cartridge B1 (FIGS. 4 and 6). The portion-to-be-guided 180*d* of the coupling member 180 is contacted by a guide portion 55*e*, as the movable portion, of the coupling lever 55 as the movable member. As described hereinbefore, the coupling lever 55 is urged by the urging force about the rotational axis L11 in the direction of the arrow X11. By this, the coupling member 180 receives an urging force F2 from the coupling lever 55 (FIG. 1).

In addition, the coupling spring 185 is provided on the development side cover 34. The spring 185 is a coil spring, and has one end portion contacted to the development side cover 36 and the other end portion contacted to the coupling member 180. More particularly, a positioning portion 185*a* of the spring 185 is supported by a spring supporting portion 34*h* of the development side cover 34. The fixed arm 185*b* of the coupling spring 185 is fixed to the spring engaging portion 34*j* of the development side cover 34 (FIG. 10(*b*)). Furthermore, the operation arm 185*c* of the coupling spring 185 is contacted to the portion-to-be-guided 180*d* of the coupling member 180. The operation arm 185*c* of the coupling spring 185 applies an urging force about a rotational axis X12 of the positioning portion 185*a* in the direction indicated by an arrow L12. By this, the coupling member 180 receives the urging force F1*b* from the coupling spring 185 (FIG. 10).

The coupling member 180 receiving the urging force F2 from the coupling lever 55 and the urging force F1*b* from the coupling spring 185 is held in the attitude (rotational axis L2) inclined relative to the rotational axis L3 of the drive input gear 27 (part (b) of FIG. 10). The structure and the function of the force with which the inclination attitude of the coupling member 180 is maintained at this time will be described in <Relationship of forces applied to the coupling member 180 in second inclination attitude D2> hereinafter.

<Basic Operation of Coupling Member 180>

Referring to FIG. 16, the basic operation of the coupling member 180 in the state of the developing cartridge B1 will be described.

Part (a) of FIG. 16 is an enlarged view illustrating the relationship between the coupling member 180, the drive input gear 27 and the driving side developing device bearing 36 in the longitudinal section. Part (b) of FIG. 16 is a perspective view of the driving side developing device bearing 36. Part (c) of FIG. 16 is a perspective view of the drive input gear 27.

The supported portion 180*b* of the coupling member 180 is provided in an inside 27*t* of the drive input gear 27. The supported portion 180*b* is sandwiched between a regulating portion 27*s* of the drive input gear 27 and a coupling regulating portion 36*s* of the driving side developing device bearing 36. A diameter R180 of the supported portion 180*b* of the coupling member 180 has the following relationship relative to a width r27 of the regulating portion 27*s* of the drive input gear 27 as measured in the direction X180 and a width r36 of the coupling regulating portion 36*s* of the driving side developing device bearing 36 as measured in the direction X180.

The diameter R180 of the supported portion 180*b*>the width r27 of the regulating portion 27*s* of the drive input gear 27 as measured in the direction X180.

The diameter R180 of the supported portion 180*b*>the width r36 of the coupling regulating portion 36*s* of the driving side developing device bearing 36 as measured in the direction X180.

With this structure, the coupling member 180 is limited in the longitudinal direction indicated by an arrow Y180 by the supported portion 180*b* contacting the regulating portion 27*s* of the drive input gear 27 or the coupling regulating portion 36*s* of the driving side developing device bearing 36. In the perpendicular direction indicated by an arrow X180, the coupling member 180 is limited by the supported portion 180*b* limited in the range of the inside 27*t* of the drive input gear 27. That is, the coupling member 180 is limited both in the longitudinal direction Y180 and in the direction perpendicular thereto X180, but it can be inclined about the center 180*s* of the supported portion 180 in the direction R180.

<Inclination Attitude of Coupling Member 180>

An inclining operation of the coupling member 180 will be described.

As described hereinbefore, the coupling member 180 receives the driving force from the main assembly side driving member 100 of the main assembly A1 and is rotatable about the rotation axis L2. The rotational axis L2 of the coupling member 180 during the drive transmission is set so as to be co-axial with the rotational axis L3 of the drive input gear 27. It has been described that depending on the variation or the like of the part dimensions, the rotational axis L2 of the coupling member 180 may not be coaxial with the rotational axis L3 of the drive input gear 27, that is, they may be slightly deviated.

With the structure of this embodiment, the rotational axis L2 of the coupling member 180 is capable of taking a reference attitude, referred to in this description hereinafter as "D0," a first inclination attitude, referred to in this description hereinafter as "D1," and a second inclination attitude, referred to in this description hereinafter as "D2."

Referring to part (a) of FIG. 8 and part (a) of FIG. 16, the reference attitude (drive-transmittable attitude) will be described. In the reference attitude (herein referred to as "D0"), the rotational axis L2 of the coupling member 180 is coaxial or parallel with the rotational axis L3 of the drive input gear 27. At this time, the developing cartridge B1 (developing roller 13) is in the main assembly A1 and is positioned at a developing position (contacting position) capable of developing a latent image on the photosensitive drum. In this embodiment, the rotational axis L2 of the coupling member 180 at the time of the reference attitude D0 taken is offset (not co-axial) relative to the rotational axis of the developing roller 13. By this, the length of the developing cartridge B1 can be shortened. However, the rotational axis L2 and the rotational axis of the developing roller 13 may be made coaxial without offset.

Referring to FIG. 11, the first inclination attitude (at-spaced attitude) will be described. The first inclination attitude (herein referred to as "D1") is taken in the state that the developing cartridge B1 is in the main assembly A1 and the developing roller 13 is in a retracted position (spacing position) retracted from the photosensitive drum 10, and in this attitude, the coupling member 180 is directed in a predetermined direction. More particularly, the coupling member is directed toward the main assembly side driving member 100 as the main assembly driving shaft. That is, when the developing cartridge B1 (developing roller 13) is in the retracted position (spacing position), the free end portion 180*a* (rotational force receiving portions 180*a*1, 180*a*2) of the coupling member 180 is directed toward the main assembly side driving member 100 of the main assembly A1 (spaced state and contact state or the like will be described in detail hereinafter). In other words, as seen along the rotational axis of the developing roller 13, the rotational axis of the coupling member 180 is inclined substantially toward the developing roller 13 (photosensitive drum 10) in this attitude. The rotational axis of the coupling member 180 at this time is −5° (hereinafter "θ3") away in the clockwise direction (+) from a reference line connecting a pivoting center (inclination center) of the coupling member 180 and the rotational axis of the developing roller 13. In other words, the absolute value of the angle θ3 is approx. 5°. The angle θ3 may be any between approx. −30° and +20°. Therefore, the angle between the rotational axis of the coupling member 180 and the line connecting the pivoting center of the coupling member 180 and the rotational axis of the developing roller 13 is satisfactory if it is within approx. 30°.

When the coupling member 180 takes the first inclination attitude D1 (at-spaced attitude), the angle between the rotational axis L2 of the coupling member and the rotational axis of the developing roller 13 (or the rotational axis L3 of the drive input gear 27) is preferably any within the range of approx. 20° to approx. 60°. In this embodiment, the angle is approx. 35°.

Referring to FIG. 12, the second inclination attitude (at-mounting attitude) will be described. The second inclination attitude (herein referred to as "D2") is taken in the process of mounting the developing cartridge B1 to the main assembly A1 along a mounting path, and in this attitude, the free end portion 180*a* of the coupling member 180 is directed toward the main assembly side driving member 100 (the attitude or the like in the mounting operation will be described in detail hereinafter). The rotational axis of the coupling member 180 at this time is −70° (hereinafter "θ4") away in the clockwise direction (+) from a reference line connecting a pivoting center of the coupling member 180 and the rotational axis of the developing roller 13. The angle θ4 may be any between approx. 45° and 95°. As seen along the rotational axis of the developing roller 13, the inclining directions of the coupling member (rotational axis) in the first inclination attitude D1 (at-spaced attitude) and the second inclination attitude D2 (at-mounting attitude) are substantially crossed with each other. That is, the attitudes D1 and D2 may be substantially the same or substantially opposite directions relative to the reference D0. More particularly, the angle formed between the first inclination attitude D1 (at-spaced attitude) and the second inclination attitude D2 (at-mounting attitude) is preferably a value in the range of approx. 20° to approx. 150°. Furthermore, the angle between the rotational axis L2 of the coupling member 180 (hereinafter "θ5") may be any in the range of approx. 30° to approx. 120°. In this embodiment, the angle θ5 is substantially 75°. In this embodiment, as seen along the rotational axis of the developing roller 13, the rotational axis of the coupling member 180 is inclined approximately to the opposite side from the developing blade 15. In other words, as seen along the rotational axis of the developing roller 13, the rotational axis L2 of the coupling member 180 is inclined in the direction substantially perpendicular to the direction toward the developing roller.

When the coupling member 180 takes the second inclination attitude D2 (at-mounting attitude), the angle between the rotational axis L2 of the coupling member and the rotational axis (or the rotational axis L3 of the drive input gear 27) of the developing roller 13 is preferably a value in the range of approx. 20° to approx. 60°. In this embodiment, the angle is approx. 35°.

An engaging relation between the coupling member 180 and the driving side developing device bearing 36 will be described. FIG. 13 shows a relationship between the driving side developing device bearing 36 and the coupling member 180.

Part (a) of FIG. 13 is a perspective view showing the positions of a bearing 36 and the coupling member 180. Part (b) of FIG. 13 is a view of the bearing 36 as seen from a driving side. Part (c) of FIG. 13 is a sectional view taken along a line KA of part (b) of FIG. 13, and part (d) of FIG. 13 is a sectional view taken along a line KB of part (b) of FIG. 13.

As shown in part (a) of FIG. 13, the coupling member 180 is provided with a phase regulation boss 180*e* as a positioned portion (projected portion) coaxial with the rotational axis L2, at a end portion opposite from the free end portion 180*a*. On the other hand, the bearing 36 is provided with a phase regulating portion 36*kb* in the form of a recess. Particularly, the phase regulating portion 36*kb* is provided with a first inclination regulating portion 36*kb*1 recessed in a direction of an arrow K1*a* from the center of the rotational axis L3 of the drive input gear 27, and a second inclination regulating portion 36*kb*2 recessed in the direction of an arrow K2*a*. The first inclination regulating portion 36*kb*1 functions as an at-spaced positioning portion for determining the position of the coupling member 180 in the at-spaced attitude. The second inclination regulating portion 36*kb*2 functions as an at-mounting positioning portion for determining the position of the coupling member 180 in the at-mounting attitude. The phase regulation boss 180*e* of the coupling member 180 as the positioned portion is disposed in the phase regulating portion 36*kb* of the driving side developing device bearing 36. That is, the position of the phase regulation boss 180*e* of the coupling member 180 is regulated by the phase regulating portion 36*kb* of the driving side developing device bearing 36. In other words, the phase regulation boss 180*e* of the coupling member 180 is movable in the phase regulating portion 36*kb* of the driving side developing device bearing 36, and particularly to the first inclination regulating portion 36*kb*1 and the second inclination regulating portion 36*kb*2. When the phase regulation boss 180*e* of the coupling member 180 is moved to the first inclination regulating portion 36*kb*1, the free end portion 180*a* (rotational force receiving portions 180*a*1, 180*a*2) of the coupling member 180 and the portion-to-be-guided 180*d* is inclined in the direction indicated by an arrow K1*b* which is opposed to the direction of the arrow K1*a*. Thus, at this time, the coupling member 180 takes the first inclination attitude D1. When the phase regulation boss 180*e* of the coupling member 180 moved to the second inclination regulating portion 36*kb*2, the free end portion 180*a* of the coupling member 180 and the portion-to-be-guided 180*d* as the connecting portion are inclined in the direction of an arrow K2*b* which is opposed to the arrow K2*a*. Thus, the coupling member 180 takes the second inclination attitude D2. The angle between the arrow K1*b* and the arrow K2*b* (the angle between the first inclination regulating portion 36*kb*1 and the second inclination regulating portion 36*kb*2) is preferably approx. 30°-approx. 120°. In this embodiment, it is approx. 75°. This second inclination attitude D2 (at-mounting attitude) is substantially the same as the at-dismounting attitude with which the coupling member 180 and the main assembly side driving member 100 are disengaged from each other when the developing cartridge B1 is dismounted. The above-described at-mounting positioning portion functions also as an at-dismounting positioning portion.

<Relationship of Forces Applied to the Coupling Member 180 in the Reference Attitude D0>

Referring to FIGS. 22 and 23, the reference attitude D0 of the coupling member 180 will be described.

FIG. 23 shows the positions of the coupling lever 55 and the coupling member 180 when the mounting of the developing cartridge B1 to the main assembly A is completed. That is, this Figure shows the state in which the developing cartridge B1 has been completely inserted to the end in the main assembly A. Part (a) of FIG. 23 is a side view as seen in the driving side, part (b) of FIG. 23 is a side view as seen in a direction of arrow X20 of part (a) of FIG. 23, and part (c) of FIG. 23 is a side view of a section as seen from the non-driving side direction.

When the mounting of the developing cartridge B1 to the main assembly A1 is completed, the coupling member 180 is engaged with the main assembly side driving member 100. At this time, the rotational axis L2 of the coupling member 180, the rotational axis L4 of the main assembly side driving member 100 and the rotational axis L3 of the development input gear 27 are coaxial with each other. In other words, the rotational force receiving portion 180*a* of the coupling member 180 and the rotational force applying portion 100*a* of the main assembly side driving member 100 are engageable with each other (FIG. 8).

Referring to FIG. 14, the motion of the coupling member 180 until the coupling member 180 becomes coaxial with the main assembly side driving member 100 will be described. FIG. 14 are sectional views illustrating the attitudes of the coupling member until coupling member 180 becomes coaxial with the main assembly driving member 100. Part (a) of FIG. 14 is a sectional view in the state that the coupling member 180 is out of contact from the main assembly driving member 100, and part (b) of FIG. 14 is a sectional view at the instance when the coupling member contacts to the main assembly driving member 100. Part (c) of FIG. 14 is a sectional view in the state that the coupling member 180 is coaxial with the main assembly side driving member 100.

As shown in part (a) of FIG. 14, in the state that the coupling member 180 is not contacted to the main assembly driving member 100, it is inclined toward the main assembly side driving member 100 (downstream with respect to the mounting direction) about the center 180*s* of the supported portion 180*b* of the coupling member 180. With this attitude maintained, the coupling member 180 advances toward the main assembly driving member 100 in the direction of the arrow X60 (FIG. 14). Then, the recessed conical portion

180*g* inside an annular portion 180*f* and the projection 100*g* of the free end of the main assembly side driving member 100 are engaged to each other. When the coupling member 180 further advances in the direction of the arrow X60 (FIG. 14), the inclination of the coupling member 180 decreases about the center 180*s* of the supported portion 180*b* of the coupling member 180. As a result, the rotational axis L2 of the coupling member 180, the rotational axis L4 of the main assembly side driving member 100 and the rotational axis L3 of the input gear 27 become coaxial with each other. The force applied to the coupling member 180 in this series of motion will be described in detail hereinafter.

The state in which the rotational axis L2 of the coupling member 180 and the rotational axis L3 of the development input gear 27 are coaxial with each other represents the reference attitude D0 coupling member 180. The inclination angle θ2 of the coupling member 180 at this time is preferably 0°, but the drive transmission is possible if the inclination angle θ2 is within substantially 15°. At this time, the phase regulation boss 180*e* of the coupling member 180 separates from the second inclination regulating portion 36*kb*2 of the driving side developing device bearing 36 and does not contact any part of the phase regulating portion 36*b* of the driving side developing device bearing 36 (part (c) of FIG. 23). The guide portion 55*e* of the coupling lever 55 as the movable portion is held in the state that it is completely retracted from the portion-to-be-guided 180*d* of the coupling member 180 (part (a) of FIG. 23). Thus, the coupling member 180 contacts the two parts, namely the coupling spring 185 and the main assembly side driving member 100, by which the inclination angle (θ2) is determined. In such a case, even in the case that the mounting of the developing cartridge B1 to the main assembly A1 is completed, the inclination angle (θ2) of the coupling member 180 may not be θ2=0°.

Referring to FIG. 15, the inclination attitude (reference attitude D0) of the development coupling 180 at the time when the mounting of the developing cartridge B1 to the main assembly A1 is completed will be described.

FIG. 15 shows the state of engagement between the coupling member 180 and the main assembly side driving member 100. Part (a) of FIG. 15 and part (b) of FIG. 15 are a side view and a sectional view in the state that the rotational axis L3 of the drive input gear 27 and the rotational axis L4 of the main assembly side driving member 100 are coaxial with each other, and with the rotational axis L2 of the coupling member 180.

The portion-to-be-guided 180*d* of the coupling member 180 receives an urging force (part (d) of FIG. 23) in the direction of an arrow F1 from the coupling spring 185. At this time, the conical portion 180*g* is in contact with the projection 100*g* at points 180*g*1 and 180*g*2. As a result, the attitude of the coupling member 180 relative to the main assembly side driving member 100 is regulated by the points 180*g*1 and 180*g*2 of the conical portion 180*g*. That is, the rotational axis L2 of the coupling member 180 is coaxial with the rotational axis L4 of the main assembly side driving member 100.

When the main assembly side driving member 100 of the main assembly A1 rotates in the state, the rotational force applying portion 100*a* of the main assembly A1 and the rotational force receiving portion 180*a* of the coupling member 180 are engaged to each other, so that the driving force is transmitted from the main assembly A1 to the coupling member 180 (FIG. 8).

In part (c) of FIG. 15, the rotational axis L3 of the drive input gear 27 and the rotational axis L4 of the main assembly side driving member 100 are coaxial with each other, but the rotational axis L2 of the coupling member 180 is inclined. Depending on the variations of the dimensions of the parts, the point 180*g*2 of the conical portion 180*g* does not contact the projection 100*g* of the main assembly side driving member 100, although the point 180*g*1 of the conical portion 180*g* contacts to the projection 100*g*. That is, by the portion-to-be-guided 180*d* of the coupling member 180 receiving the urging force from the coupling spring 185 in the direction of the arrow F1, the rotational axis L2 of the coupling member 180 may incline. Therefore, in part (c) of FIG. 15, the point 180*g*1 of the conical portion 180*g* of the coupling member 180 contacts the projection 100*g* of the main assembly side driving member 100, so that the attitude of the coupling member 180 is regulated. That is, the rotational axis L2 of the coupling member 180 is inclined relative to the rotational axis L4 of the main assembly side driving member 100. In other words, the inclination angle (θ2) coupling member 180 is not θ2=0°.

Part (d) of FIG. 15 shows the state in which the rotational axis L2 of the coupling member 180 is inclined when the rotational axis L3 of the drive input gear 27 and the rotational axis L4 of the main assembly side driving member 100 are not coaxial with each other because of the variation of the dimensions of the parts. Also in this case, the guide portion 180*d* of the coupling member 180 receives the coupling spring 185 as in the case shown in part (c) of FIG. 15. By this, the rotational axis L2 of the coupling member 180 slightly inclines. That is, the inclination angle (θ2) of the coupling member 180 is not θ2=0°. However, similarly to the case of part (c) of FIG. 15, the point 180*g*1 of the conical portion 180*g* of the coupling member 180 contacts to the projection 100*g* of the main assembly side driving member 100, by which the attitude of the coupling member 180 is regulated.

In any case of the states shown in parts (c) and (d) of FIG. 15, when the main assembly side driving member 100 of the main assembly A1 is rotated, the rotational force applying portion 100*a* of the main assembly A1 and the rotational force receiving portion 180*a* of the coupling member 180 are engaged with each other. And, the driving force is transmitted from the main assembly A1 to the coupling member 180.

As described above, in the state that the mounting of the developing cartridge B1 to the main assembly A1 is completed, the rotational axis L2 of the coupling member 180 may be coaxial or not coaxial with the rotational axis L3 of the drive input gear 27. In any case, however, when the main assembly side driving member 100 of the main assembly A1 rotates, the rotational force applying portion 100*a* of the main assembly A1 is brought into engagement with the rotational force receiving portion 180*a* of the coupling member 180, so that the driving force is transmitted from the main assembly A1 to the coupling member 180 (FIG. 15(*a*)). The attitude in which the mounting of the developing cartridge B1 to the main assembly A1 is completed such that the coupling member 180 is capable of receiving the driving force from the rotational force applying portion 100*a* of the main assembly A1 is called the reference attitude D0. The inclination angle is selected so that the rotational force applying portion 100*a* of the main assembly side driving member 100 is not disengaged from the rotational force receiving portion 180*a* of the coupling member 180. That is, the inclination angle θ2 is within substantially 15°.

The first inclination attitude D1 of the coupling member 180 and the second inclination attitude D2 thereof will be described in detail.

<Relationship of the Forces Applied to the Coupling Member 180 in the First Inclination Attitude D1>

Referring to FIG. 11, the relationship of the forces applied to the coupling member 180 in the first inclination attitude D1 will be described.

Part (a) of FIG. 11 is a side view of the developing cartridge B1 in the state that the mounting of the developing cartridge B1 to the main assembly A1 is completed and the photosensitive drum 10 and the developing roller 13 are spaced from each other.

Part (b) of FIG. 11 is a sectional view showing the position of the phase regulation boss 180*e* of the coupling member 180 in the phase regulating portion 36*kb* of the driving side developing device bearing 36 as seen in the direction from the non-driving side toward the driving side of the developing cartridge B1.

Part (c) of FIG. 11 is a sectional view taken at the position of the portion-to-be-guided 180*d* as the portion-to-be-urged of the portion-to-be-guided 180*d* of the coupling member 180 and as seen from the driving side in the longitudinal direction of the developing cartridge B1.

The coupling lever 55 receives an urging force for the rotation in the direction of the arrow X11 about the rotational axis L11, from the coupling lever spring 56 (FIG. 10). When the developing cartridge B1 is in the mounted position in the main assembly A1, the movement in the direction of the arrow X11 is limited by an abutting portion 80*y* provided in the main assembly A1. More particularly, by the contact between the abutting portion 80*y* and the rotation regulating portion 55*y* of the coupling lever 55, the position of the coupling lever 55 is limited against the urging force of the coupling lever spring 56. The abutting portion 80*y* is integral with a driving side swing guide 80 (part (b) of FIG. 21). At this time, the guide portion 55*e* of the coupling lever 55 is in the position retracted from the portion-to-be-guided 180*d* of the coupling member 180. In the first inclination attitude D1 in the embodiment, the guide portion 55*e* is spaced from the coupling member 180 and placed in a first movement position (retracted position). In other words, by the guide portion 55*e* placed in this position, the coupling member 180 is permitted to take the first inclination attitude D1 by the urging portion 185*d*. However, the guide portion 55*e* at this time may be contacted to the coupling member 180. As regards the contact between the coupling lever 55 and the abutting portion 80*y*, the detailed description will be made in the description of the mounting and dismounting process of the developing cartridge B1 hereinafter.

On the other hand, to the portion-to-be-guided 180*d* of the coupling member 180, a guide portion 185*d* as the urging portion of the coupling spring 185 as the urging member contacts, and a force Fla is applied (the guide portion 185*d* directly urges the portion-to-be-guided 180*d*). Thus, the portion-to-be-guided 180*d* of the coupling member 180 receives a force in the direction of inclination in arrow Fla direction (part (c) of FIG. 11). In other words, the coupling member 18 receives the force almost inclining toward the developing roller 13. At this time, the phase regulation boss 180*e* of the coupling member 180 is guided by a guide portion 36*kb*1*a*, a guide portion 36*kb*1*b* and a guide portion 36*kb*1*c* of the driving side developing device bearing 36. As a result, the boss 180*e* moves to the first inclination regulating portion 36*kb*1. That is, the phase regulation boss 180*e* of the coupling member 180 inclines in the direction of the arrow K1*a* (part (b) of FIG. 11), but the free end portion 180*a* of the coupling member 180 and the portion-to-be-guided 180*d* as the connecting portion incline in the direction of the arrow K1*b* (part (a) of FIG. 11). The position of the movable member (lever 55) or the guide portion 55*e* as the movable portion is called the first movement position or retracted position (the position retracted from a reference position which will be described hereinafter). The attitude of the coupling member 180 at this time is the first inclination attitude (at-spaced attitude) D1 of the coupling member 180. When the position of the movable member (lever 55) or the guide portion 55*e* as the movable portion in the image forming operation (part (a) of FIG. 16) is called a movement reference position, the first movement position and the movement reference position are the same in this embodiment.

The inclining direction of the guide portion 185*d* as the urging portion of the coupling spring 185 may be perpendicular to the inclining direction of the coupling member 180 (K1*b* in part (a) of FIG. 11). The inclining direction of the coupling member 180 (K1*b* in FIG. 11) is in the direction of causing the phase regulation boss 180*e* of the coupling member 180 to abut to the first inclination regulating portion 36*kb*1. By doing so, the urging force of the coupling spring 185 necessary for retaining the coupling member 180 in the first inclination attitude D1 can be reduced. However, this is not necessary if the coupling member 180 can be retained in the first inclination attitude D1 by properly adjusting the urging force of the coupling spring 185, for example.

<Relationship of Forces Applied to Coupling Member 180 in the Second Inclination Attitude D2>

Referring to FIG. 12, the relationship of the forces applied to the coupling member 180 in the second inclination attitude D2 will be described.

FIG. 12 shows a state before the developing cartridge B1 is mounted to the main assembly A1. Part (a) of FIG. 12 is a side view of the developing cartridge B1 per se (spontaneous state). Part (b) of FIG. 12 is a sectional view showing a position of the phase regulation boss 180*e* of the coupling member 180 in the phase regulating portion 36*kb* of the driving side developing device bearing 36 as seen from the non-driving side of the developing cartridge B1. Part (c) of FIG. 12 is a sectional view of the portion-to-be-guided 180*d* of the coupling member 180 as seen from the driving side in the longitudinal direction of the developing cartridge B1. At this time, the guide portion 55*e* of the coupling lever 55 and the guide portion 185*d* of the coupling spring 185 are contacted to the portion-to-be-guided 180*d* of the coupling member 180. In this state, the rotation regulating portion 55*y* of the coupling lever 55 is not contacted to the abutting portion 80*y* (part (a) of FIG. 11) of the main assembly A (part (a) of FIG. 12). Therefore, the coupling lever 55 receives an urging force from the coupling lever spring 56 in the direction of rotation about the rotational axis L11 in the direction of the arrow X11. As a result, the guide portion 55*e* contacts the portion-to-be-guided 180*d* of the coupling member 180.

As described hereinbefore, the portion-to-be-guided 180*d* as the connecting portion of the coupling member 180 receives the force in the direction of inclination to the direction of the arrow F3. At this time, the phase regulation boss 180*e* of the coupling member 180 in the form of a projection is guided by a guide portion 36*kb*2*a*, a guide portion 36*kb*2*b* and a guide portion 36*kb*2*c* of the driving side developing device bearing 36. As a result, the boss 180*e* moves to the second inclination regulating portion 36*kb*2. That is, the boss 180*e* of the coupling member 180 is inclined in the direction of the arrow K2*a* (part (b) of FIG. 12). On the other hand, the rotational force receiving portion 180*a* and the portion-to-be-guided 180*d* of the coupling member 180 are inclined in the direction of the arrow K2*b*

(part (a) of FIG. 12). The position of the guide portion 55*e* as the movable member (lever 55) or the movable portion is called a second movement position (urging position or movement reference position). At this time, the guide portion 55*e* urges the portion-to-be-guided 180*d* of the coupling member 180. In other words, the guide portion 55*e* inclines the coupling member downwardly against an elastic force of the spring 185. The attitude of the coupling member 180 at this time is called second inclination attitude D2 of the coupling member.

(5) Overview of Drum Cartridge C:

Referring to FIG. 17, the structure of the drum cartridge C will be described. Part (a) of FIG. 17 is a schematic perspective view of the drum cartridge C as seen from the non-driving side. Part (b) of FIG. 17 is a schematic perspective view with the frame 21, a drum shaft reception 30 and a drum shaft 54 or the like (unshown) omitted, for the convenience of the illustration of the peripheral portions of the photosensitive drum 10 and a charging roller 11. As shown in FIG. 17, the drum cartridge C includes the photosensitive drum 10, the charging roller 11 and so on. The charging roller 11 is rotatably supported by charging roller bearings 67*a* and 67*b*, and is urged to the photosensitive drum 10 by a charging roller urging members 68*a* and 68*b*. To a driving side end portion 10*a* of the photosensitive drum 10, the driving side flange 24 is integrally fixed, and to a non-driving side end portion 10*b* of the photosensitive drum 10, a non-driving side flange 28 is integrally fixed. The driving side flange 24 and the non-driving side flange 28 are mounted coaxially with the photosensitive drum 10. In this embodiment, the driving side flange 24 and the non-driving side flange 28 are fixed to the photosensitive drum 10 by clamping, bonding or the like. To the driving side end portion of the drum frame 21, the drum bearing 30 is fixed, and to the non-driving side end portion, the drum shaft 54 is fixed, by means of screws, bonding, press-fitting or the like. The driving side flange 24 integrally fixed to the photosensitive drum 10 is rotatably supported by the drum bearing reception 30. The non-driving side flange 28 integrally fixed to the photosensitive drum 10 is rotatably supported by the drum shaft 54.

One longitudinal end portion of the charging roller 11 is provided with the charging roller gear 69, which is engaged with the gear portion 24*g* of the driving side flange 24. A driving side end portion 24*a* of the drum flange 24 is capable of receiving the rotational force from the main assembly A1 (unshown). By this, the charging roller 11 is rotated by the rotation of the photosensitive drum 10. As described hereinbefore, the peripheral speed of the surface of the charging roller 11 is approx. 105-120% relative to the peripheral speed of the surface of the photosensitive drum 10.

(6) Mounting and Dismounting Structure of Developing Cartridge B1 Relative to Main Assembly A1:

Referring to the drawings, the mounting method of the developing cartridge B1 to the main assembly A1 will be described.

FIG. 18 is a schematic perspective view of the main assembly A1 as seen from the non-driving side, and FIG. 19 is a schematic perspective view of the main assembly A1 as seen from the driving side. FIG. 20 is an illustration of the process of mounting the developing cartridge B1 to the main assembly A1, as seen from the driving side.

As shown in FIG. 18, the non-driving side development bearing 46 is provided at the non-driving side of the developing cartridge B1. The non-driving side developing device bearing 46 is provided with a portion-to-be-guided 46*d*. The portion-to-be-guided 46*d* includes a positioning portion 46*b* and a rotation preventing portion 46*c*.

As shown in FIG. 19, the non-driving side of the developing cartridge B1 is provided with a driving-side side cover 34. The driving-side side cover 34 is provided with a portion-to-be-guided 34*d*. The portion-to-be-guided 34*d* includes a positioning portion 34*b* and a rotation preventing portion 34*c*.

As shown in FIG. 18, on the other hand, the driving side of the main assembly A1 is provided with a driving-side side plate 90 constituting a part of a casing of the main assembly A1. The driving-side side plate 90 is provided with the driving side guiding member 92 and the driving side swing guide 80.

The driving side swing guide 80 is movable (swingable) together with the developing cartridge B1 in the main assembly A1. The details of the driving side swing guide 80 will be described hereinafter.

The driving side guiding member 92 includes a first guide portion 92*a*, a second guide portion 92*b* and a third guide portion 92*c*. The first guide portion 92*a* of the driving side guiding member 92 includes a mounting-and-dismounting path X1*a* extending along a mounting-and-dismounting path of the developing cartridge B1. The second guide portion 92*b* of the driving side guiding member 92 includes a groove configuration portion of a mounting-and-dismounting path X1*b* extending along the mounting-and-dismounting path of the developing cartridge B1. The third guide portion 92*c* of the driving side guiding member 92 includes a groove configuration portion of a mounting-and-dismounting path X1*c* extending along the mounting-and-dismounting path of the drum cartridge C.

The driving side swing guide 80 is provided with a first guide portion 80*a* and a second guide portion 80*b*. The first guide portion 80*a* of the driving side swing guide 80 includes a groove configuration extending along a mounting-and-dismounting path X2*a* of the developing cartridge B1 on an extension of the first guide portion 92*a* of the driving side guiding member 92. The second guide portion 80*b* of the driving side swing guide 80 includes a groove configuration portion extending along a mounting-and-dismounting path X2*b* of the developing cartridge B1 on an extension of the second guide portion 92*b* of the driving side guiding member 92.

As shown in FIG. 19, the non-driving side of the main assembly A1 is provided with a non-driving-side side plate 91 constituting a part of the casing of the main assembly A1. The non-driving side plate 91 is provided with a non-driving side guiding member 93 and a non-driving side swing guide 81. The non-driving side swing guide 81 is movable (swingable) similarly to the driving side swing guide 80. The non-driving side guiding member 93 includes a first guide portion 93*a* and a second guide portion 93*b*.

The first guide portion 93*a* of the driving side guiding member 93 is provided with a groove configuration portion of a mounting-and-dismounting path XH1*a* extending along the mounting-and-dismounting path of the developing cartridge B1. The second guide portion 93*b* of the driving side guiding member 93 includes a groove configuration portion of a mounting-and-dismounting path XH3 extending along the mounting-and-dismounting path of the drum cartridge C. The non-driving side swing guide 81 includes a guide portion 81*a*. The guide portion 81*a* of the non-driving side swing guide 81 includes a groove configuration portion of a mounting-and-dismounting path XH2*a* extending along the mounting-and-dismounting path of the developing cartridge B1 on an extension of the first guide portion 93*a* of the non-driving side guiding member 93.

The details of the driving side swing guide 80 and the non-driving side swing guide 81 will be described hereinafter.

<Mounting of Developing Cartridge B1 to Main Assembly Device A1>

The mounting method of the developing cartridge B1 to the main assembly A1 will be described. As shown in FIGS. 18 and 19, the opening and closing main assembly cover 94 provided at a top portion of the main assembly A1 is rotated in an opening direction D1, by which the inside of the main assembly A1 is exposed.

Thereafter, the portion-to-be-guided 46*d* (FIG. 18) of the non-driving side bearing 46 of the developing cartridge B1 is brought into engagement with the first guide portion 93*a* (FIG. 19) of the non-driving side guiding member 93 of the main assembly A1. Simultaneously, the portion-to-be-guided 34*d* (FIG. 19) of the development side cover 34 of the developing cartridge B1 is brought into engagement with the first guide portion 92*a* (FIG. 18) of the driving side guiding member 92 of the main assembly A1. By this, the developing cartridge B1 is inserted into the main assembly A1 along the mounting-and-dismounting path X1*a* and the mounting-and-dismounting path XH1*a* provided by the first guide portion 92*a* of the driving side guiding member 92 and the first guide portion 93*a* of the non-driving side guiding member 93.

When the developing cartridge B1 is inserted into the main assembly A1, the coupling member 180 is in the above-described second inclination attitude D2, as described hereinbefore. The coupling member 180 is inserted to the second guide portion 92*b* of the driving side guiding member 92, while keeping the second inclination attitude D2. More particularly, there is a gap between the coupling member 180 and the second guide portion 92*b* of the driving side guiding member 92, and the coupling member 180 keeps the second inclination attitude D2 in the process of the developing cartridge B1 being inserted into the main assembly A1 along the mounting-and-dismounting paths.

The developing cartridge B1 inserted into the main assembly A1 along the mounting-and-dismounting paths X1*a*, XH1*a* is further inserted into the main assembly A1 along the mounting-and-dismounting paths X2*a*, XH2*a* provided by the first guide portion 80*a* of the driving side swing guide 80 and the guide portion 81*a* of the non-driving side swing guide 81. In more detail, the portion-to-be-guided 34*d* provided on the development side cover 34 is relayed from the first guide portion 92*a* of the driving side guiding member 92 to the first guide portion 80*a* of the driving side swing guide 80, with the mounting process. Similarly, in the non-driving side, the portion-to-be-guided 46*d* provided on the non-driving side developing device bearing 46 is relayed from the first guide portion 93*a* of the non-driving side guiding member 93 to the guide portion 81*a*, with the mounting process.

The coupling member 180 provided on the driving side end portion of the developing cartridge B1 is relayed from the second guide portion 92*b* of the driving side guiding member 92 to the second guide portion 80*b* of the driving side swing guide 80 while keeping the second inclination attitude D2. Similarly to the above-described, there is a gap between the coupling member 180 and the second guide portion 80*b* of the driving side swing guide 80.

<Positioning of Developing Cartridge B1>

The description will be made as to the positioning of the developing cartridge B1 by the driving side swing guide 80 and the non-driving side swing guide 81 inside the main assembly A1. The driving side and the non-driving side have fundamentally the same structures, and therefore, the driving side of the developing cartridge B1 will be described. FIG. 20 shows the states of the developing cartridge B1 and the driving side swing guide 80 in the process of mounting the developing cartridge B1 to the main assembly A1.

Part (a) of FIG. 20 shows the state in which the portion-to-be-guided 34*d* provided on the development side cover 34 is guided by the first guide portion 80*a* of the driving side swing guide 80, and the developing cartridge B1 is on the mounting-and-dismounting path X2.

Part (b) of FIG. 20 shows the state in which the developing cartridge B1 is further advanced from the position shown in part (a) of FIG. 20, and in which the positioning portion 34*b* of the portion-to-be-guided 34*d* of the development side cover 34 contacts, at a point P1, a positioning portion 82*a* of a driving side urging member 82 provided on the driving side swing guide 80.

FIG. 21 is a schematic perspective view illustrating a driving side swing guide 80 and a peripheral configuration of the driving side urging member 82. Part (a) of FIG. 21 is a perspective view as seen from the driving side, and part (b) of FIG. 21 is a perspective view as seen from the non-driving side. Part (c) of FIG. 21 is an exploded perspective view of the driving side swing guide 80, the driving side urging member 82 and a driving side urging spring 83. Parts (d) and (e) of FIG. 21 is an enlarged detailed illustration around the driving side urging member 82.

As shown in parts (a) and (b) of FIG. 21, the driving side urging member 82 further includes a hole portion 82*b*, a seat 82*c* and a regulating portion 82*d* in addition to the positioning portion 82*a*. As shown in part (c) of FIG. 21, the hole portion 82*b* is engaged the with a boss portion 80*c* of the driving side swing guide 80 and is supported rotatably about the boss portion 80*c*. Furthermore, to the seat 82*c* the, one end portion 83*c* of the driving side urging spring 83 which is a compression spring is contacted. As shown in part (d) of FIG. 21, the other end portion 83*d* of the driving side urging spring 83 contacts the seat 80*d* of the driving side swing guide 80. By this, the driving side urging member 82 is applied by the urging force F82 in the rotational direction of an arrow Ra1 about the boss portion 80*c* of the driving side swing guide 80. The driving side urging member 82 is limited in the rotation in the direction of the arrow Ra1 by the regulating portion 82*d* thereof abutting to the rotation regulating portion 80*e* provided on the driving side swing guide 80. As shown in part (e) of FIG. 21, the driving side urging member 82 supported rotatably by the driving side swing guide 80 is rotatable in the direction of an arrow Ra2 against the urging force F82 of the driving side urging spring 83. It is rotatable in the direction of the arrow Ra2 to a position where a top end portion 82*e* of the driving side urging member 82 does not project beyond a guide surface 80*w* of the driving side swing guide 80.

Part (c) of FIG. 20 shows a state in which the developing cartridge B1 is further advanced from the position shown in part (a) of FIG. 20. In this state, the portion-to-be-guided 34*d* of the development side cover 34 integral with the positioning portion 34*b* and the rotation preventing portion 34*c* contacts a front side inclined surface 82*w* of the driving side urging member 82, so that driving side urging member 82 is pressed down in the direction indicated by an arrow Ra2. In more detail, the portion-to-be-guided 34*d* of the development side cover 34 contacts and the front side inclined surface 82*w* of the driving side urging member 82 to press the driving side urging member 82, so that the driving side urging member 82 rotates in the clockwise direction (arrow Ra2 direction) about the boss portion 80*c* of the driving side swing guide 80 against the urging force F82 of the driving side urging spring 83. Part (c) of FIG. 20 shows the state in which the positioning portion 34*b* of the driving-side side cover 34 contacts the top end portion 82*e* of the driving side urging member 82. At this time, the regulating portion 82*d* of the driving side urging member 82 is spaced from the rotation regulating portion 80*e* of the driving side swing guide 80.

Part (d) of FIG. 20 shows a state in which the developing cartridge B1 is further advanced from the position of part (c) of FIG. 20, and in which the positioning portion 34*b* of the driving-side side cover 34 contacts a positioning portion 80*f* of the driving side swing guide 80. As described hereinbefore, the driving side urging member 82 receives the urging force F82 in the rotational direction of the arrow Ra1 about the boss portion 80*c* of the driving side swing guide 80. Therefore, a rear side inclined surface 82*s* of the driving side urging member 82 urges the positioning portion 34*b* of the driving-side side cover 34 by the urging force F4. As a result, the positioning portion 34*b* contacts the positioning portion 80*f* of the driving side swing guide 80 at the point P3 without space therebetween. By this, the driving side of the developing cartridge B1 is positioned to the driving side swing guide 80.

The positioning between the positioning portion 46*d* of the non-driving side developing device bearing 46 and the non-driving side swing guide 81 is similar to the positioning in the driving side (therefore, the description will be omitted). By this, the developing cartridge B1 is positioned in place by the driving side swing guide 80 and the non-driving side swing guide 81.

<Operation of Coupling Member 180 in the Mounting Process of Developing Cartridge B1>

Referring to FIGS. 22, 23 and 24, the operation of the coupling member 180 in the mounting process of the developing cartridge B1 W illustration be described.

In the state before mounting the developing cartridge B1 to the main assembly A1, the coupling member 180 is in the second inclination attitude D2. The developing cartridge B1 is inserted into the main assembly A1 while the coupling member 180 keeps the second inclination attitude D2. Part (a) of FIG. 22 shows the state in which the developing cartridge B1 is mounted to the main assembly A1, and it is in the mounting-and-dismounting path X2*a* provided by the driving side swing guide 80 and the non-driving side swing guide 81. Part (e) of FIG. 22 is a view of the elements shown in part (a) of FIG. 22, as seen in a direction of an arrow X50. Also when the developing cartridge B1 is on the mounting-and-dismounting path X2*a*, the coupling member 180 takes the second inclination attitude D2. At this time, the rotational force receiving portion 180*a* of the coupling member 180 is directed toward the main assembly side driving member 100 of the main assembly A1 (mounting direction of developing cartridge B1). In other words, in this embodiment, the rotational axis L2 of the coupling member 180 is directed substantially opposite from the developing blade 15. In other words, as the developing cartridge B1 is seen in the direction from the driving side toward the non-driving side along the rotational axis of the developing roller 13, it will suffice if the rotational axis L2 of the coupling member 180 is within approx. 35°-approx. 125° away in the clockwise direction from a line connecting the rotational axis of the developing roller and the pivoting center of the coupling member 180. In this embodiment, the angle is aprox. 80°. More specifically, the second inclination regulating portion 36*kb*2 of the driving side developing device bearing 36 is formed such that before the coupling member 180 contacts to the main assembly side driving member 100, the coupling member 180 inclines toward the main assembly side driving member 100 about the center 180*s* of the supported portion 180*b* (FIGS. 13 and 16 and FIG. 12).

Part (b) of FIG. 22 shows a state in which the developing cartridge B1 is inserted to the mounting-and-dismounting path X2*a* from the position shown in part (a) of FIG. 22. Part (f) of FIG. 22 is a view of the elements shown in part (b) of FIG. 22, as seen in a direction of an arrow X50. At this time, the annular portion 180*f* of the coupling member 180 contacts the main assembly side driving member 100. From the state shown in part (a) of FIG. 22 to the state shown in part (b) of FIG. 22, the coupling member 180 keeps the inclination toward the main assembly side driving member 100. Therefore, the coupling member 180 can be easily engaged with the main assembly side driving shaft 100. The coupling member 180 keeps the second inclination attitude D2 by the portion-to-be-guided 180*d* receiving the resultant force F3 from the coupling lever 55 and the coupling spring 185 (FIG. 12).

For the explanation, a angle formed between the rotational axis L3 of the drive input gear 27 and the rotational axis L2 of the coupling member 180 (inclination angle) when the coupling member 180 takes the second inclination attitude D2 is θ2*a* (part (b) of FIG. 22).

Part (c) of FIG. 22 shows a state in which the developing cartridge B1 is inserted to the mounting-and-dismounting path X2*a* from the position shown in part (b) of FIG. 22. Part (g) of FIG. 22 is a view of the elements shown in part (c) of FIG. 22, as seen in a direction of an arrow X50. FIG. 24 is a sectional view showing a force relation toward the coupling member 180 at the time when the annular portion 180*f* of the coupling member 180 contacts to the main assembly side driving member 100.

In part (b) of FIG. 22, the rotation regulating portion 55*y* of the coupling lever 55 contacts the abutting portion 80*y* of the driving side swing guide 80. From the state shown in part (b) of FIG. 22 to the state shown in part (c) of FIG. 22, the annular portion 180*f* of the coupling member 180 contacts the main assembly side driving member 100. As a result, the inclination angle of the coupling member 180 is θ 2*b* (≤θ 2*a*). In more detail, the coupling member 180 receives the force F100 at the contact position from the main assembly side driving member 100. When the force F100 is directed against the force F3 which is received by the coupling member 180 before, and is larger than the force F3, the inclination angle of the coupling member 180 decreases. That is, the rotational axis L2 of the coupling member 180 becomes relatively closer to a line parallel with the rotational axis L3 of the drive input gear 27. That is, the inclination angle of the coupling member 180 about the center 180*s* of the supported portion 180*b* changes toward the arrow X181, and θ2*b*<θ2*a* (parts (b) of FIGS. 16 and 22, part (c) of FIG. 22, and part (a) of FIG. 24). At this time, the coupling member 180 contacts to the four parts, namely, the coupling lever 55, the coupling spring 185, the main assembly side driving member 100 and the phase regulating portion 36*kb* of the driving side developing device bearing 36, so that the inclination angle (θ2*b*) is determined.

As shown in part (b) of FIG. 24, when the force received by the coupling member 180 from the main assembly side driving member 100 at the contact portion 180*f* is directed against the force F3, but is smaller than the force F3, or when the force is not directed against the force F3, the inclination angle of the coupling member 180 does not change. That is, 02*b*-02*a*, and therefore, the main assembly side driving member 100 moves in the direction of the rotational axis L4 within the range of play determined by the part dimension variation within the tolerance.

Part (d) of FIG. 22 shows a state in which the developing cartridge B1 is further inserted in the direction of the mounting-and-dismounting path X2*a* from the position shown in part (c) of FIG. 22. Part (h) of FIG. 22 is a view of the elements shown in part (d) of FIG. 22, as seen in a direction of an arrow X50. At this time, the rotation regulating portion 55*y* of the coupling lever 55 contacts the abutting portion 80*y* of the driving side swing guide 80. Therefore, with the insertion of the developing cartridge B1 in the direction of the mounting-and-dismounting path X2*a*, the coupling lever 55 rotates relatively in a direction of an arrow X11*b* about the rotational axis L11 in the developing cartridge B1. At this time, the guide portion 55*e* of the coupling lever 55 also rotates in the direction of the arrow X11*b* about the rotational axis L11. As a result, the inclination angle of the coupling member 180 decreases along the guide portion 55*e* of the coupling lever 55 as the coupling member 180 receives the urging force of the coupling spring 185 ($\theta 2c < \theta 2b$). At this time, the coupling member 180 contacts the three parts, namely the coupling spring 185, the main assembly side driving member 100 and the phase regulating portion 36*kb* of the driving side developing device bearing 36, so that the inclination angle ($\theta 2c$) is determined.

FIG. 23 shows a state in which the developing cartridge B1 is further inserted in the direction of the mounting-and-dismounting path X2*a* from the position shown in part (d) of FIG. 22 and in which the mounting of the developing cartridge B1 to the main assembly A1 is completed. At this time, the coupling member 180 is in engagement with the main assembly side driving member 100 and takes the reference attitude D0 (inclination angle of coupling member 180 is) $\theta 2=0°$.

At this time, the phase regulation boss 180*e* of the coupling member 180 is disengaged from the second inclination regulating portion 36*kb*2 of the driving side developing device bearing 36, and does not contact any part of the phase regulating portion 36*b* of the driving side developing device bearing 36 (part (c) of FIG. 23). The guide portion 55*e* of the coupling lever 55 is kept in the state completely retracted from the portion-to-be-guided 180*d* of the coupling member 180. Thus, the coupling member 180 contacts the two parts, namely the coupling spring 185 and the main assembly side driving member 100, by which the inclination angle ($\theta 2$) is determined (as described hereinbefore regarding the reference attitude D0 of the coupling member 180)

<Operation of Coupling Member 180 in Dismounting Process of Developing Cartridge B1>

The description will be made as to the operation of the coupling member 180 in the dismounting process of the developing cartridge B1 from the main assembly A1.

The operation in the dismounting of the developing cartridge B1 from the main assembly device A1 is the opposite from the in the mounting process.

First, the user rotates the main assembly cover 94 of the main assembly A1 in the opening direction D1 to expose the inside of the main assembly A1, similarly to the case of the mounting (FIGS. 18 and 19). At this time, the developing cartridge B1 is in the state that the developing roller 13 and the photosensitive drum 10 are in contact with each other by the driving side swing guide 80 and the non-driving side swing guide 81 (unshown).

The developing cartridge B1 is moved in the dismounting direction along the mounting and dismounting track XH2 of the driving side swing guide 80 and the non-driving side swing guide 81.

With the movement of the developing cartridge B1, the abutting portion 80*y* of the driving side swing guide 80 having been in contact with the rotation regulating portion 55*y* of the coupling lever 55 moves (from the position shown in part (d) of FIG. 22 to the position shown in part (c) of FIG. 22). With this operation, the coupling lever 55 rotates in the direction of the arrow X11 about the rotational axis L11. When the developing cartridge B1 is further moved, the coupling lever 55 rotates in the direction of the arrow X11, by which the guide portion 55*e* of the coupling lever 55 is brought into contact to the portion-to-be-guided 180*d* of the coupling member 180 (the state shown in part (c) of FIG. 22). The coupling member 180 receiving the urging forces from the coupling lever 55 and the coupling spring 185 starts to move toward the second inclination attitude D2. Finally, the phase regulation boss 180*e* of the coupling member 180 is regulated by the guide portion 36*kb*2*a*, the guide portion 36*kb*2*b* and the guide portion 36*kb*2*c* of the driving side developing device bearing 36 so as to engage with the second inclination regulating portion 36*kb*2. The coupling member 180 is kept in the second inclination attitude D2.

Thereafter, the developing cartridge B1 is moved in the dismounting direction on the mounting and dismounting track XH1 provided by the driving side guiding member 92 and the non-driving side guiding member 93, and is taken out of the main assembly device A1.

As described in the foregoing, in this embodiment, the developing cartridge B1 is provided with a movable member (coupling lever 55 and coupling lever spring 56) in the broad sense in order to apply the urging force to the coupling member 180. By this, the coupling member 180 is capable of inclining to the second inclination attitude D2. That is, the inclining direction of the coupling member 180 caused by the coupling lever 55 can be the direction of the mounting-and-dismounting path X2*a* of the developing cartridge B1. Furthermore, the rotation of the coupling lever 55 is interrelated with the mounting and dismounting operation of the developing cartridge B1 by the user.

As described in the foregoing, in this embodiment, the developing cartridge B1 is provided with the coupling lever 55 and the coupling lever spring 56 to apply the urging force to the coupling member 180. With this structure, the coupling member 180 is capable of taking the second inclination attitude D2 inclined by the urging forces of the coupling lever 55 as the movable member in the narrow sense and the coupling spring 85 as the urging member, and the first inclination attitude D1 inclined only by the urging force of the coupling spring 85 as the urging member. In addition, the coupling member 180 is capable of engaging with the main assembly side driving member 100 in the mounting process of the developing cartridge B1, by making the direction of inclination provided by the urging forces of the coupling lever 55 and the coupling spring 85 the same as the mounting and dismounting direction of the developing cartridge. In addition, the rotation of the coupling lever 55 is interrelated with the developing cartridge B1 mounting and dismounting operation by the user.

(7) Contacting and Spacing Lever as Movable Member:

Referring to part (a) of FIG. 25, the driving side contacting and spacing lever 70 as the driving side movable member will be described. Part (a) of FIG. 25 is a sectional view of the developing cartridge B1 as seen from the driving side, illustrating the driving side contacting and spacing lever 70 and peripheral configuration thereof.

As shown in part (a) of FIG. 25, driving side contacting and spacing lever 70 comprises a first contact surface 70*a*, a second contact surface 70*b*, a third contact surface 70*c*, a supported portion 70*d*, a driving side regulating abutment 70*e* and a first projected portion 70*f*. The supported portion 70*d* of the driving side contacting and spacing lever 70 is rotatably supported by a supporting portion 36*c* of the driving side developing device bearing 36. More particularly, by the engagement between the hole of the supported portion 70*d* of the driving side contacting and spacing lever 70 with a boss of the supporting portion 36*c* of the driving side developing device bearing 36, the driving side contacting and spacing lever 70 is rotatably (arrow N9 direction) supported about the boss of the supporting portion 36*c*. In this embodiment, the supporting portion 36*c* of the driving side developing device bearing 36 is parallel with a rotational axis L9 of the developing roller 13. The driving side contacting and spacing lever 70 is rotatable in a plane perpendicular to the rotational axis L9 of the developing roller 13.

The driving side contacting and spacing lever 70 contacts one end portion 71*d* of the driving side development urging spring 71 as a first elastic portion which is a compression spring at a third contact surface 70*c*. The other end portion 71*e* of the driving side development urging spring 71 contacts a contact surface 36*d* of the driving side developing device bearing 36. As a result, the driving side contacting and spacing lever 70 receives the force in the direction of an arrow N16 from the driving side development urging spring 71 at the third contact surface 70*c*. The urging direction of the driving side development urging spring 71 is such as to urge the first contact surface 70*a* of the driving side contacting and spacing lever 70 away from the developing roller 13 (N16). The spontaneous state of the developing cartridge B1, that is, the state before the developing cartridge B1 is mounted to the main assembly A1, the driving side regulating abutment 70*e* is in contact with a regulating portion 36*b* provided on the driving side developing device bearing 36.

Referring to part (b) of FIG. 25, the 72 as the non-driving side movable member will be described. The non-driving side and the driving side have the similar structures.

Part (b) of FIG. 25 is a side view of the developing cartridge B1 as seen from the non-driving side. However, for the convenience of the illustration of the non-driving side contacting and spacing lever 72, some parts are omitted.

As shown in part (b) of FIG. 25, the non-driving side contacting and spacing lever 72 comprises a non-driving side first contact surface 72*a*, a non-driving side second contact surface 72*b*, a non-driving side third contact surface 72*c*, a supported portion 72*d*, a non-driving side regulating abutment 72*e* and a non-driving side first projected portion 72*f*. By the supporting portion 46*f* of the non-driving side developing device bearing 46, the supported portion 72*d* of the non-driving side contacting and spacing lever 72 is supported. More particularly, by the engagement between the hole of the supported portion 72*d* of the non-driving side contacting and spacing lever 72 and the boss of the supporting portion 46*f* of the non-driving side developing device bearing 46, the non-driving side contacting and spacing lever 72 is supported rotatably about the boss of the supporting portion 46*f* (arrow NH9 direction). In this embodiment, the supporting portion 46*f* of the non-driving side developing device bearing 46 is parallel with the rotational axis L9 of the developing roller 13. That is, the non-driving side development contacting and spacing lever 72 is rotatable in a plane perpendicular to the rotational axis L9 of the developing roller 13.

The non-driving side contacting and spacing lever 72 contacts one end portion 73*e* of the non-driving side development urging spring 73 as the second elastic portion which is a compression spring, at the non-driving side third contact surface 72*c*. The other end portion 73*d* of the non-driving side development urging spring 73 contacts a contact surface 46*g* of the non-driving side developing device bearing 46. As a result, the non-driving side contacting and spacing lever 72 receives the force FH10 in the direction of an arrow NH16 from the non-driving side development urging spring 73 at the non-driving side third contact surface 72*c*. The direction of the urging force provided by the non-driving side development urging spring 73 is such that the first contact surface 72*a* of the non-driving side contacting and spacing lever 72 is away from the developing roller 13 (arrow NH16). In the spontaneous state of the developing cartridge B1, that is, before the developing cartridge B1 is mounted to the main assembly A1, the non-driving side regulating abutment 72*e* is in contact with a regulating portion 46*e* provided on the non-driving side developing device bearing 46.

The urging force F10 of the driving side development urging spring 71 and the urging force FH10 of the non-driving side development urging spring 73 are different from each other. The driving side third contact surface 70*c* and the non-driving side third contact surface 72*c* are provided at different angles. They may be properly selected in consideration with the properties of the peripheral structures such that an urging force of the developing roller 13 to the photosensitive drum 10 is proper, as will be described hereinafter. In this embodiment, the influence of the moment M6 (part (a) of FIG. 29) applied to the developing cartridge 13 when the driving force is received from the main assembly A1 to rotate the developing roller 13 is taken into consideration, and the following is satisfied: F10<FH10.

That is, the urging force in the non-driving side is larger than the urging force in the driving side.

The driving side contacting and spacing lever 70 is disposed in a side opposite from the side where the photosensitive drum 10 is provided, with respect to a line Z30 passing through the center 13*z* of the developing roller 13 in parallel with the mounting direction X2 (FIG. 18) of the developing cartridge B1 to the main assembly A1 (lower side in this embodiment). The first projected portion 70*f* of the driving side contacting and spacing lever 70 is projected beyond outer configurations of the developing container 16, the driving side developing device bearing 36 and the development side cover 34 (FIG. 10), as seen in the longitudinal direction. The projecting direction (arrow M2) of the first projected portion 70*f* crosses with a moving direction (arrows N9, N10) of the driving side contacting and spacing lever 70 and an arrow N6 direction (part (a) of FIG. 29) in which the developing cartridge B1 is movable.

The first projected portion 70*f* has the first contact surface 70*a* in the side opposite from the developing roller 13 as seen from the supported portion 70*d* of the driving side contacting and spacing lever 70. Although the details will be described hereinafter, when the developing roller 13 is to be pressed against the photosensitive drum 10, a second contact surface 150*b* of the driving side device urging member 150 and the first contact surface 70*a* of the driving side contacting and spacing lever 70 contact to each other (part (a) of FIG. 29).

The free end of the first projected portion 70*f* is provided with a spacing force receiving portion 70*g* projecting toward the developing roller 13 and crossing with the projecting direction (arrow M2) of the first projected portion 70*f*. The spacing force receiving portion 70*g* has the second contact surface 70*b*. Although the details will be described hereinafter, when the developing roller 13 is to be spaced from the photosensitive drum 10 (FIG. 30), a first contact surface 150*a* of the driving side device urging member 150 and the second contact surface 70*b* of the driving side contacting and spacing lever 70 are contacted to each other.

Referring to part (b) of FIG. 25, the configuration of the non-driving side contacting and spacing lever 72 will be described in detail. Similarly to the above-described driving side, the non-driving side contacting and spacing lever 72 is provided in a side opposite from the side where the photosensitive drum 10 is provided, with respect to a line Z30 passing through the center 13*z* of the developing roller 13 and parallel with the mounting direction X2 of the developing cartridge B1 to the main assembly A1 (lower side in this embodiment). A first projected portion 72*f* of the non-driving side contacting and spacing lever 72 projects beyond the outer configurations of the developing container 16 and the non-driving side developing device bearing 46 as seen in the longitudinal direction. The projecting direction (arrow MH2) of the first projected portion 72*f* crosses with the moving direction (arrows NH9, NH10) of the non-driving side contacting and spacing lever 72 and an arrow M1 (part (a) of FIG. 29) which is a moving direction of the developing cartridge B1.

The first projected portion 72*f* has the first contact surface 72*a* in a side opposite from the developing roller 13 as seen from the supported portion 72*d* of the non-driving side contacting and spacing lever 72. Although the details will be described hereinafter, when the developing roller 13 is pressed against the photosensitive drum 10, a second contact surface 151*b* of the non-driving side device urging member 151 and the first contact surface 72*a* of the non-driving side contacting and spacing lever 72 contact to each other (FIG. 31).

The free end of the first projected portion 72*f* is provided with a spacing force receiving portion 72*g* projecting toward the developing roller 13 and crossing with the projecting direction (arrow M3) of the first projected portion 72*f* from the developing container 16. The spacing force receiving portion 72*g* has the second contact surface 72*b*. Although the details will be described hereinafter, when the developing roller 13 is spaced from the photosensitive drum 10 (FIG. 31), a first contact surface 151*a* of the urging member 151 and the second contact surface 72*b* of the non-driving side contacting and spacing lever 72 contact to each other.

Referring to FIG. 26, the positions of the driving side contacting and spacing lever 70 and the non-driving side contacting and spacing lever 72 will be described. FIG. 26 is a front view of the developing cartridge B1 as seen from the developing roller 13. In this Figure, the parts in the neighborhood of a supporting portion 36*a* of the driving side developing device bearing 36 supporting a driving side supported portion 13*a* of the developing roller 13, the supporting portion 46*f* of the non-driving side developing device bearing 46 supporting a non-driving side supported portion 13*c* of the developing roller 13 are shown in sectional view. As described in the foregoing, the driving side contacting and spacing lever 70 is provided at the driving side end portion with respect to the longitudinal direction of the developing cartridge B1. The non-driving side contacting and spacing lever 72 is provided at the non-driving side end portion with respect to the longitudinal direction of the developing cartridge B1. The driving side contacting and spacing lever 70 and the non-driving side contacting and spacing lever 72 are rotatable independently from each other (arrows N9 and N10 in part (a) of FIG. 25, and arrows NH9 and NH10 in part (b) of FIG. 25).

The driving side supported portion 13*a* of the developing roller 13 is supported by the supporting portion 36*a* of the driving side developing device bearing 36 at the position outside a driving side end portion L13*bk* of the image formation range L13*b* with respect to the longitudinal direction of the developing roller 13. The non-driving side supported portion 13*c* of the developing roller 13 is supported by the supporting portion 46*f* of the non-driving side developing device bearing 46 at the position outside of the non-driving side end portion L13*bh* of the image formation range L13*b*, with respect to the longitudinal direction. The driving side contacting and spacing lever 70 and the non-driving side contacting and spacing lever 72 are at least partly overlapped with a total length L13*a* of the developing roller 13. Furthermore, they are provided outside the image formation range L13*b* of the developing roller 13.

In other words, the driving side contacting and spacing lever 70 and the driving side supported portion 13*a* of the developing roller 13 are at least partly overlapped with an area L14*k* sandwiched between the driving side end portion L13*bk* of the image forming region L13*b* and a driving side end portion L13*ak* of the total length L13*a* of the developing roller 13. Therefore, the driving side contacting and spacing lever 70 and the driving side supported portion 13*a* of the developing roller 13 are placed close to each other in the longitudinal direction.

In addition, the non-driving side contacting and spacing lever 72 and the driven side supported portion 13*c* of the developing roller 13 at least partly overlap with an area L14*h* sandwiched between the non-driving side end portion L13*bh* of the image forming region L13*b* and a non-driving side end portion L13*ah* of the total length L13*a* of the developing roller 13. Therefore, the non-driving side contacting and spacing lever 72 and the driving side supported portion 13*c* of the developing roller 13 are placed close to each other in the longitudinal direction of the developing roller 13.

In this embodiment, as the structure for contacting and spacing the developing roller 13, the rotatable lever (70, 72) is used, but this structure is not restricted to the present invention, if it is capable of contacting and spacing the developing roller 13, and it may be a slidable member, for example. In this embodiment, as the structure for contacting and spacing the developing roller 13, the spring (71, 73) is used, but another elastic member such as rubber or the like may be used. In addition, such an elastic member may not be used, if the accuracy relative to the contact spacing mechanism of the main assembly is assured.

(Contacting and Spacing Structure)

(Developing Device Pressing and Spacing Structure in the Main Assembly of the Apparatus)

The developing device pressing and a spacing structure in the main assembly of the apparatus will be described.

Part (a) of FIG. 27 is an exploded perspective view of the driving-side side plate 90 of the main assembly A1 as seen from the non-driving side, and part (b) of FIG. 27 is a side view thereof as seen from the non-driving side. Part (a) of FIG. 28 is an exploded perspective view of the non-driving-side side plate 91 of the main assembly A1 as seen from the driving side, and part (b) of FIG. 28 is a side view thereof as seen from the driving side.

As shown in FIG. 27, the main assembly A1 includes the driving side guiding member 92 and the driving side swing guide 80 for mounting and dismounting the developing cartridge B1 relative to the main assembly A1. The driving side guiding member 92 and the driving side swing guide 80 guide the driving side portion-to-be-guided 34*d* of the developing cartridge B1 when the developing cartridge B1 is mounted to the main assembly (FIG. 19).

As shown in part (a) of FIG. 27, a positioned portion (portion to be positioned) 92*d* and a rotation regulated portion (portion to be regulated in rotation) 92*e* are supported by a positioning portion 90*a* in the form of a hole provided in the driving-side side plate 90 and a rotation regulating portion 90*b*, respectively. The driving side guiding member 92 is positioned and fixed relative to the driving-side side plate 90 by fixing means such as a screw (unshown) or the like. In addition, the driving side swing guide 80 is supported by a cylindrical supported projection 80*g* engaging with a supporting portion 90*c* in the form of a hole provided in the driving-side side plate 90. Therefore, the driving side swing guide 80 is supported so as to be rotatable in the direction of an arrow N5 and in the direction of an arrow N6 relative to the driving-side side plate 90.

In the foregoing description, the supporting portion 90*c* provided in the driving side plate 90 is in the form of the hole (recess), and correspondingly, the supported projection 80*g* provided on the driving side swing guide 80 is in the form of a projection, but this is not limiting to the present invention, and the projection and the recess may be interchanged.

In addition, between a projection 80*h* of the driving side swing guide 80 and a projection 90*d* of the driving-side side plate 90, there is provided driving side urging means 76 which is a tension spring. The driving side swing guide 80 is urged by the driving side urging means 76 in the direction of decreasing than the distance between the projection 80*h* of the driving side swing guide 80 and the projection 90*d* of the driving-side side plate 90 (arrow N6 direction).

In addition, the main assembly A1 includes the driving side device urging member 150 for contacting and spacing the developing roller 13 relative to the surface of the photosensitive drum 10. The driving side device urging member 150 is supported by a bottom plate (unshown) so as to be movable in directions indicated by arrow N7 and arrow N8.

On the other hand, as shown in FIG. 28, the main assembly A1 includes the non-driving side guiding member 93 and the non-driving side swing guide 81 for mounting and dismounting the developing cartridge B1 relative to the main assembly A1. The non-driving side guiding member 93 and the non-driving side swing guide 81 guide the non-driving side portion-to-be-guided 46*d* of the developing cartridge B1 when the developing cartridge B1 is mounted into the main assembly (FIG. 19).

As shown in part (a) of FIG. 28, a positioned portion 93*d* in the form of a boss projected from the non-driving side guiding member 93 and a rotation regulated portion 93*e* are supported by a positioning portion 91*a* in the form of a hole provided in the non-driving-side side plate 91 and a rotation regulating portion 91*b*, respectively. By the structure, the non-driving side guiding member 93 is supported by the non-driving-side side plate 91. The non-driving side guiding member 93 is positioned and fixed relative to the non-driving-side side plate 91 by fixing means such as a screw (unshown). Furthermore, a cylindrical supported projection 81*g* of the non-driving side swing guide 81 is engaged with a supporting portion 91*c* in the form of a hole provided in the non-driving-side side plate 91. By this, the non-driving side swing guide 81 is supported by the non-driving-side side plate 91 rotatably (arrow N5 and arrow N6).

In the foregoing description, the supporting portion 91*c* provided on the non-driving-side side plate 91 is in the form of a hole (recess), and the supported projection 81*g* provided on the non-driving side swing guide 81 is in the form of a projection. However, this recess and projection structure is not limiting, and the recess and the projection may be interchanged.

Furthermore, a non-driving side urging means 77 in the form of a tension spring is provided between a projection 81*h* of the non-driving side swing guide 81 and a projection 91*d* of the non-driving-side side plate 91. The non-driving side swing guide 81 is urged by the non-driving side urging means 77 in the direction of decreasing the distance between the projection 81*h* of the non-driving side swing guide 81 and the projection 91*d* of the non-driving side guiding member 91 (arrow N6 direction).

Similarly to the driving side, the main assembly A1 includes the non-driving side device urging member 151 for contacting and spacing the developing roller 13 relative to the surface of the photosensitive drum 10. The non-driving side device urging member 151 is supported by the bottom plate (unshown) of the main assembly A so as to be movable in the directions indicated by the arrow N7 and the arrow N8.

<Developing Device Pressing and the Spacing Relative to the Photosensitive Drum>

The pressing and spacing of the developing roller 13 relative to the photosensitive drum 10 will be described.

<Pressing Mechanism>

The structure of the developing roller 13 will be described.

Part (a) of FIG. 29 is a side view showing in the state in which the developing roller 13 in the developing cartridge B1 supported by the driving side swing guide 80 is contacted to the photosensitive drum 10. Part (c) of FIG. 29 is a detailed illustration of the parts around the driving side contacting and spacing lever 70 shown in part (a) of FIG. 29, in which the driving side swing guide 80 and the development side cover 34 are omitted for better illustration.

In this embodiment, a so-called contact-type developing system is employed in which the developing roller 13 carrying the developer t is directly contacted to the photosensitive drum 10 to develop the electrostatic latent image on the photosensitive drum 10.

The developing roller 13 includes the shaft portion 13*e* and the rubber portion 13*d*. The shaft portion 13*e* is made of electroconductive aluminum or the like and has an elongated cylindrical shape, and the longitudinally central portion is coated with the rubber portion 13*d* (FIG. 6). The rubber portion 13*d* coats the shaft portion 13*e* so that the outer configuration thereof is coaxial with the shaft portion 13*e*. In the cylinder of the shaft portion 13*e*, the magnet roller 12 is provided. The rubber portion 13*d* carries the developer t at the peripheral surface thereof, and the shaft portion 13*e* is supplied with a bias voltage. By contacting the rubber portion 13*d* carrying the developer t to the surface of the photosensitive drum 10, the electrostatic latent image is developed on the photosensitive drum 10.

A mechanism for pressing the developing roller 13 to the photosensitive drum 10 at a predetermined contact pressure will be described.

As described above, the driving side swing guide 80 is supported swingably relative to the driving-side side plate 90 in the directions of the arrow N5 and the arrow N6. The non-driving side swing guide 81 is supported swingably relative to the non-driving-side side plate 91 in the directions of the arrow N5 and the arrow N6. As described above, the developing cartridge B1 is positioned relative to the driving side swing guide 80 and the non-driving side swing guide 81. Therefore, the developing cartridge B1 is swingable in the main assembly A1 in the directions indicated by the arrow N5 and the arrow N6 (FIG. 31).

In such a state, as shown in part (a) of FIG. 29 and part (c) of FIG. 29, the second contact surface 150*b* of the urging member 150 and the first contact surface 70*a* of the driving side contacting and spacing lever 70 contact to each other. By this, the lever 70 is rotated in the direction of the arrow N9 in part (c) of FIG. 29 against the urging force of the driving side development urging spring 71. The third contact surface 70*c* of the lever 70 compresses a spring 71 and receives an urging force F10*a* from the spring 71. As a result, the lever 70 is applied by a moment M10 in a direction of an arrow N10. Because of the contact between the second contact surface 150*b* of the urging member 150 and the first contact surface 70*a* of the lever 70, the first contact surface 70*a* of the lever 70 receive a force F11 from the second contact surface 150*b* of the driving side device urging member 150 so that a moment balancing with the moment M10 is applied to the lever 70. Therefore, the developing cartridge B1 receives the external force F11. As described hereinbefore, between the projection 80*h* of the driving side swing guide 80 and the projection 90*d* of the driving-side side plate 90, the driving side urging means 76 is provided, and a urging force is applied in a direction of an arrow N12. Therefore, to the developing cartridge B1 positioned by the driving side swing guide 80, the external force F12 in the direction of the arrow N12 is applied.

That is, the developing cartridge B1 receives the moment M6 in such a direction (arrow N5) that the developing roller 13 approaches to the photosensitive drum 10 by the force F11 imparted by the driving side development urging spring 71 and the force F12 imparted by the driving side urging means 76. By this, the elastic layer 13*d* of the developing roller 13 is pressed against the photosensitive drum 10 at a predetermined pressure.

Part (a) of FIG. 31 is a side view showing the state in which the developing roller 13 of the developing cartridge B1 supported by the non-driving side swing guide 81 is in contact with the photosensitive drum 10. Part (c) of FIG. 31 shows the details of the parts in the neighborhood of the driving side contacting and spacing lever 72 of part (a) of FIG. 31, in which the non-driving side swing guide 81 and the non-driving side developing device bearing 46 are partly omitted for better illustration.

The non-driving side has the structure similar to the driving side, and as shown in part (a) of FIG. 31 and part (c) of FIG. 31, the developing cartridge B1 receives the external forces FH11 and FH12 by the non-driving side development urging spring 73 and the non-driving side urging means 77. By this, the developing cartridge B1 receives such a moment (M6) that the developing roller 13 approaches to the photosensitive drum 10 (arrow N6). As a result, the elastic layer 13*d* of the developing roller 13 can be pressed against the photosensitive drum 10 at a predetermined pressure.

As shown to part (b) of FIG. 29, the third contact surface 70*c* of the driving side contacting and spacing lever 70 contacted to one end portion 70*d* of the driving side development urging spring 71 is disposed between the supported portion 70*d* of the driving side contacting and spacing lever 70 and the first contact surface 70*a* with respect to a projecting direction M2. That is, the relationship between a distance W10 from the supported portion 70*d* to the third contact surface 70*c* and a distance W11 from the supported portion 70*d* to the first contact surface 70*a* is as follows:

$$W10<W11.$$

Therefore, if the movement distance of the first contact surface 70*a* is W12, a movement distance W13 of the third contact surface 70*c* satisfies, $$W13<W12,$$

where W13=W12*x* (W10/W11).

Therefore, if there is an error in the positional accuracy of the driving side device urging member 150, the change in the compression amount of the driving side development urging spring 71 is smaller than the error of the positional accuracy of the driving side device urging member 150. As a result, the accuracy of the urging force for press-contacting the developing roller 13 to the photosensitive drum 10 can be improved. The structures in the non-driving side are similar, and therefore, similar effect can be provided.

As described hereinbefore, in the longitudinal direction, the driving side contacting and spacing lever 70 and the non-driving side contacting and spacing lever 72 are at least overlapped with the range of the total length L13*a* of the developing roller 13 (FIG. 26). Therefore, the positional difference in the longitudinal direction between the first contact surfaces 70*a* and 72*a* of the driving side contacting and spacing lever 70 receiving the external force F11 (part (a) of FIG. 29) and the non-driving side space lever 72 receiving the external force FH11 (FIG. 31) and the driving side supported portion 13*a* and the non-driving side supported portion 13*c* of the developing roller 13 can be reduced. As a result, the moment applied to the driving side developing device bearing 36 and the non-driving side developing device bearing 46 can be suppressed. Therefore, the developing roller 13 can be efficiently press-contacted to the photosensitive drum.

The rotational motions of the driving side contacting and spacing lever 70 and the non-driving side contacting and spacing lever 72 (arrows N9 and N10 in part (a) of FIG. 29, and arrows NH9, NH10 in FIG. 31) can be made independently from each other. Therefore, the position of the driving side device urging member 150 in the direction of the arrows N7, N8 and the position of the non-driving side device urging member 151 in the direction of the arrows NH7, NH8 when the developing roller 13 is press-contacted to the photosensitive drum 10 can be independently determined. Furthermore, it is unnecessary that the directions of the rotation of the driving side contacting and spacing lever 70 and the non-driving side contacting and spacing lever 72 (arrows N9, N10 in part (a) of FIG. 29, and arrows NH9, NH10 in FIG. 31) are the same. As a result, the magnitudes and the directions of the urging forces F11 and FH11 for urging the developing roller 13 to the photosensitive drum 10 in the driving side and the non-driving side can be properly set, respectively. In addition, even when there is a relative error between the positions of the driving side device urging member 150 and the non-driving side device urging member 151, the urging forces F11, FH11 are not influence by that. As a result, the contact pressure between the photosensitive drum 10 and the developing roller 13 can be made precise.

A position of the developing cartridge B1 with which the developing roller 13 contacts the photosensitive drum 10 and the electrostatic latent image on the photosensitive drum 10 can be developed is called developing position (contacting position). On the other hand, the position of the developing cartridge B1 with which the developing roller 13 is spaced from the photosensitive drum 10 is called retracted position (spacing position). The developing cartridge B1 is capable of selecting the developing position (contacting position) and the retracted position (spacing position), by a mechanism which will be described hereinafter.

<Spacing Mechanism>

Part (a) of FIG. 30 is an illustration of the state of the developing cartridge B1 when the developing roller 13 and the photosensitive drum 10 shift from the contact state to the spaced state. Part (c) of FIG. 30 is a detailed illustration of the parts around the driving side contacting and spacing lever 70 shown in part (a) of FIG. 30, in which the driving side swing guide 80 and the development side cover 34 are omitted for better illustration.

Part (b) of FIG. 30 is an illustration of the spaced state of the developing cartridge B1, in which the photosensitive drum 10 and the developing roller 13 are spaced from each other. Part (c) of FIG. 30 is a detailed illustration of the parts around the driving side contacting and spacing lever 70 shown in part (a) of FIG. 30, in which the driving side swing guide 80 and the development side cover 34 are omitted for better illustration.

In the case of a contact-type developing system as in this embodiment, if the developing roller 13 is always in contact with the photosensitive drum 10 (FIG. 29), there is a likelihood that the rubber portion 13*b* of the developing roller 13 deforms. For this reason, it is preferable that the developing roller 13 is kept spaced from the photosensitive drum 10 in the non-development period. Therefore, it is preferable that the state in which the developing roller 13 contact the photosensitive drum 10 as shown in FIG. 29, and the state in which the developing roller 13 is spaced from the photosensitive drum 10 as shown in part (b) of FIG. 30 can be taken.

The driving side contacting and spacing lever 70 is provided with a surface-to-be-spaced 70*g* projecting toward the developing roller 13. The surface-to-be-spaced 70*g* is engageable with the first 150*a* provided on a driving side device urging member 82 of the main assembly A1 the. The driving-side urging member 150 receives a driving force from a motor (unshown) to move in the directions of the arrow N7 and the arrow N8.

The description will be made as to the operation of shifting to the spaced state in which the developing roller 13 is spaced from the photosensitive drum 10. In the contact state between the developing roller 13 and the photosensitive drum 10 shown in FIG. 29, the first 150*a* and the surface-to-be-spaced 70*g* are spaced from each other by a gap 85.

On the other hand, part (a) of FIG. 30 shows the state in which the driving-side urging member 150 has moved in the direction of the arrow N8 by a distance 86, in which the first 70*a* of the driving side contacting and spacing lever 70 and the second 150*b* of the driving-side urging member 150 are spaced from each other. At this time, the driving side contacting and spacing lever 70 receives the urging force F10 from the driving side development urging spring 71 and rotates about the supported portion 70*d* in the direction of the arrow N10, so that a regulating abutment 70*e* of the driving side contacting and spacing lever 70 and the regulating portion 36*b* of the driving side bearing member 36 are contacted to each other. By this, the attitude of the driving side contacting and spacing lever 70 is determined definitely.

Part (b) of FIG. 30 shows the state in which the driving-side urging member 150 has moved in the direction of the arrow N8 by a distance 87. By the movement of the driving-side urging member 150 in the direction of the arrow N8, the surface-to-be-spaced 70*g* of the driving side contacting and spacing lever 70 and the first 150*a* of the driving-side urging member 150 contact to each other. At this time, the regulating abutment 70*e* of the driving side contacting and spacing lever 70 and the regulating portion 36*b* of the driving side bearing member 36 contact each other, and therefore, the developing cartridge B1 is moved in the direction of the arrow N8. The position of the developing cartridge B1 is determined by the driving side swing guide 80 supported swingably in the directions of the arrow N5 and the arrow N6. Therefore, by the driving-side urging member 150 moving in the direction of the arrow N8, the developing cartridge B1 is moved in the direction of the arrow N5. At this time, the developing roller 13 is spaced from the photosensitive drum 10 by a gap 88.

The structures in the non-driving side are the same as those described above, and as shown in parts (b) and (d) of FIG. 31, the non-driving-side urging member 151 is moved in the direction of the arrow N7 by a distance 8*h*7 in the state that the non-driving side contacting and spacing lever 72 and the non-driving-side urging member 151 are in contact with each other. By this, the developing cartridge B1 rotates in the direction of the arrow N5 about the supported projection 81*g* of a swing guide 81. As a result, the developing roller 13 is spaced from the photosensitive drum 10 by the distance 88.

As described above, depending on the positions of the driving-side urging member 150 and the non-driving-side urging member 151 provided in the main assembly A1, the contact state or the spaced state between the photosensitive drum 10 and the developing roller 13, that is, the developing position (contacting position) and the retracted position (spacing position) of the developing cartridge B1 can be selected as desired.

When the position changes from the contact state between the developing roller 10 and the photosensitive drum 13 shown in part (a) of FIG. 29 to the spaced state between the developing roller 10 and the photosensitive drum 13 shown in part (b) of FIG. 30, the driving side swing guide 80 and the developing cartridge B1 integrally rotate. Therefore, the guide portion 55*e* of the coupling lever 55 is maintained in the retracted state from the portion-to-be-guided 180*d* of the coupling member 180 (part (b) of FIG. 30).

Furthermore, in this embodiment, as shown in part (b) of FIG. 30, when the developing roller 13 is spaced from the photosensitive drum 10, the portion-to-be-guided 180*d* of the coupling member 180 is out of contact from the lever 55 but is in contact with the guide portion 185*d* of the coupling spring 185. By this, the coupling member 180 receives the force F1 to take the above-described first inclination attitude D1.

<Movement of the Coupling Member in Interrelation with the Operation from the Contact State to the Spaced State>

Referring to FIG. 32 and FIG. 33, the description will be made as to the movement of the coupling member 180 in interrelation with the contacting operation and the spacing operation between the photosensitive drum 10 and the developing roller 13.

First, the release operation between the coupling member 180 and the main assembly side driving member 100 at the time when the developing cartridge B1 (developing roller 13) changes from the spaced state to the contact state will be described.

FIG. 32 illustrates an engagement state between the coupling member 180 and the main assembly driving member 100 in a contacted-developing-device-state and a spaced-developing-device-state.

FIG. 33 is an illustration of the engagement states of the coupling member 180 and the main assembly driving member 100 in the contacted-developing-device-state and the spaced-developing-device-state.

During the image forming operation, the driving side contacting and spacing lever 70 is urged by the urging force F11 by the driving-side urging member 150, as shown in part (a) of FIG. 33. The developing roller 13 of the developing cartridge B1 is in the contacted-developing-device-state in which it is in contact with the photosensitive drum 10 at a predetermined pressure. As shown in part (a) of FIG. 32, the attitude of the coupling member 180 is the reference attitude D0. At this time, the developing cartridge B1 is in the engaging position in which a rotational force receiving portion 180*a* of the coupling member 180 is engaged with the rotational force applying portion 100*a* of the main assembly side driving member 100, and the drive transmission (rotation of the motor (unshown)) from the main assembly side driving member 100 to the coupling member 180 is enabled.

In addition, the guide portion 55*e* of the coupling lever 55 is kept completely retracted from the portion-to-be-guided 180*d* of the coupling member 180 (FIG. 11). This is because, as described above, the rotation regulating portion 55*y* of the coupling lever 55 contacts to the abutting portion 80*y* of the driving side swing guide 80, and therefore, the rotation in the direction of the arrow X11 about the rotational axis L11 thereof is limited (FIG. 11).

Then, the description will be made as to the attitude of the coupling member 180 in the process of shifting of the developing cartridge B1 from the contacted-developing-device-state to the spaced-developing-device-state.

As shown in part (b) of FIG. 33, when the image forming operation is completed, the driving-side urging member 150 and the non-driving-side urging member 151 (unshown) move in the direction of the arrow N8. When the driving-side urging member 150 moves in the direction of the arrow N8, the driving side contacting and spacing lever 70 rotates in the direction of the arrow N10 by the urging force of the driving side development urging spring 71 (part (b) of FIG. 33). When the driving-side urging member 150 in the direction indicated by the arrow N8 moves further from the state in which the contact regulating portion 70*e* of the driving side contacting and spacing lever 70 and the positioning portion 36*b* of the driving side developing device bearing 36 contact to each other, the developing cartridge B1 and the driving side swing guide 80 integrally move in the direction indicated by the arrow N5 about the supported projection 80*g* of the driving side swing guide 80.

The above-described description applies to the non-driving side, the this, the developing cartridge B1 and the non-driving side swing guide 81 integrally move in the direction of the arrow N5 about the supported projection 81*g* of the driving side swing guide 81.

By this, the spaced-developing-device-state in which the developing roller 13 is spaced from the photosensitive drum 10 is established. The developing cartridge B1 and the driving side swing guide 80 integrally move. Therefore, even in the state shown in part (b) of FIG. 33, the guide portion 55*e* of the coupling lever 55 is kept completely retracted from the portion-to-be-guided 180*d* of the coupling member 180. This is because, as described above, the abutting portion 80*y* is integral with the driving side swing guide 80 (FIG. 21). And then the hand, the coupling member 180 receives the urging force from the coupling spring 185. Therefore, as shown in part (b) of FIG. 32, with the movement of the developing cartridge B1 from the contact state to the spaced state, the axis L2 of the coupling member 180 gradually inclines from the reference attitude D0 toward the first inclination attitude D1. Then, the developing cartridge B1 further rotates in the direction indicated by the arrow N5, and the inclination movement of the coupling member 180 is completed when the state shown in part (c) of FIG. 33 is established. At this time, as described hereinbefore, the phase regulation boss 180*e* of the coupling member 180 engages with the first inclination regulating portion 36*kb*1 of the driving side developing device bearing 36 (FIG. 11), so that the axis L2 of the coupling member 180 is kept in the first inclination attitude D1. As described in the foregoing, in the first inclination attitude D1 of the coupling member 180, the rotational force receiving portion 180*a* of the coupling member 180 is directed toward the main assembly side driving member 100 of the main assembly A1. In other words, as seen along the rotational axis of the developing roller 13, the coupling member 180 is inclined toward the developing roller 13. In the state shown in part (c) of FIG. 33, the developing cartridge B1 is in the release position for disengaging the rotational force receiving portion 180*a* from the rotational force applying portion 100*a* of the main assembly driving member 100. Therefore, the force from the motor (unshown) is not transmitted from the main assembly driving member 100 to the coupling member.

In this embodiment, the state shown in part (a) of FIG. 33 is the attitude of the developing cartridge B1 for the image forming operation. The coupling member 180 is engaged with the main assembly driving member 100, and the driving force can be applied from the main assembly A1. As described hereinbefore, in the process of the movement of the developing cartridge B1 from the position shown in part (a) of FIG. 33 than that of the position shown in part (b) of FIG. 33 and the position shown in part (c) of FIG. 33, the coupling member 180 is disengaged from the main assembly driving member 100. In other words, when the developing cartridge B1 moves from the contact state to the spaced state, the drive input from the main assembly A1 to the developing cartridge B1 is shut off. While the developing roller 13 of the developing cartridge B1 is spacing from the photosensitive drum 10, the main assembly driving member 100 of the main assembly A1 continues to rotate. Therefore, the developing roller 13 can be spaced from the photosensitive drum 10 while rotating.

<Movement of the Coupling Member in Interrelation with the Operation from the Spaced State to the Contact State>

The description will be made as to an engaging operation between the coupling member 180 and the main assembly side driving member 100 when the developing cartridge B1 (developing roller 13) moves from the contact state to the spaced state.

The development contacting operation of the developing cartridge B1 is the opposite to the above-described developing device spacing operation. In the state shown in part (b) of FIG. 33, the developing cartridge B1 is in the release position in which the rotational force receiving portion 180*a* as the free end portion of the coupling member 180 is disengaged from the rotational force applying portion 100*a* of the main assembly driving member 100. In the state shown in part (b) of FIG. 33, the driving-side urging member 150 and the non-driving-side urging member 151 have moved in the direction indicated by the arrow N7, from the state shown in part (c) of FIG. 33. By the urging force of the above-described driving side urging means 76 (FIG. 32 and FIG. 33), the developing cartridge B1 and the driving side swing guide 80 integrally rotate in the direction of the arrow N6. The same applies to the non-driving side. By this, the developing cartridge B1 shifts from the spaced state to the contact state. Shown in part (b) of FIG. 32 is the state of partway of the movement of the developing cartridge B1 from the spaced state to the contact state. In addition, the annular portion 180*f* of the coupling member 180 is in contact with the main assembly side driving member 100. More particularly, the conical portion 180*g* as the recess provided inside the annular portion 180*f* of the coupling member 180 contacts the projection 100*g* provided at the free end of the shaft of the main assembly side driving member 100. From the state shown in part (c) of FIG. 32 to the state shown in part (b) of FIG. 32, the rotational axis L2 of the coupling member 180 keeps inclined toward the main assembly side driving member 100, and therefore, the coupling member 180 can easily engage with the main assembly side driving shaft 100.

When the driving-side urging member 150 and the non-driving-side urging member 151 is further moved in the direction of the arrow N7 from the state shown in part (b) of FIG. 32, the engagement between the coupling member 180 and the main assembly driving member 100 is completed as shown in part (a) of FIG. 32. At this time, the developing cartridge B1 is placed in the engaging position in which the rotational force receiving portions 180*a*1, 180*a*2 of the free end portion 180*a* of the coupling member 180 are engaged with the rotational force applying portions 100*a*1, 100*a*2 of the main assembly driving member 100, and the coupling member 180 takes the reference attitude D0. The process of the change of the attitude of the coupling member 180 from the first inclination attitude D1 to the reference attitude D0 is similar to the process of the change of the attitude of the coupling member 180 from the second inclination attitude D2 to the reference attitude D0 at the time when the developing cartridge B1 is mounted to the main assembly A1 (FIG. 22).

In this embodiment, before the state shown in part (b) of FIG. 33 at which the engagement between the coupling member 180 and the main assembly driving member 100 starts, the main assembly driving member 100 is started to rotate by a driving signal of the main assembly A1. By this, in midstream of the movement of the developing cartridge B1 from the state shown in part (c) of FIG. 33 to the state shown in part (b) of FIG. 33 and part (a) of FIG. 33, the coupling member 180 engages with the main assembly driving member 100 to receive the driving force. In other words, partway of the movement of the developing cartridge B1 from the spaced state to the contact state, the driving force is applied to the developing cartridge B1 from the main assembly A1. Before the contact of the developing roller 13 and the photosensitive drum 10 contact to each other, the main assembly driving member 100 of the main assembly A1 has already rotated. As a result, the developing roller 13 which already rotates can be brought into contact to the photosensitive drum 10.

If only one motor is provided in the main assembly A1, it is necessary for the drive transmission mechanism to be provided with a clutch mechanism for selectively disconnecting the drive transmission for transmitting the rotational force to the developing roller 13 from the motor, in order to disconnect the transmission of the rotational force to the developing roller 13 while transmitting the rotational force to the photosensitive drum 10. However, according to this embodiment, the engagement and the disengagement between the coupling member 180 and the main assembly side driving member 100 are established in the process of the movement of the developing cartridge B1 from the contact state to the spaced state and in the process of the movement from the spaced state to the contact state. For this reason, it is unnecessary to provide a clutch mechanism in the main assembly A1 or the developing cartridge B1, and therefore, the low cost and space saving are accomplished in the developing cartridge B1 and the main assembly A1.

According to this embodiment, even in the case that the mounting and dismounting directions relative to the main assembly A1 of the electrophotographic image forming apparatus are different from the development space/space directions, the coupling member is engageable both in the mounting of the developing cartridge B1 and in the contacting operation of the developer carrying member to the photosensitive member in the main assembly A1. Or, the switching of the inclination attitude of the coupling member 180 is interrelated with the mounting and dismounting operation by the user, by which the usability property upon the mounting and dismounting of the developing cartridge B1 is not affected. With such structures, the latitude in the design of the electrophotographic image forming apparatus A1 can be improved, and the structure of the electrophotographic image forming apparatus can be simplified, downsizing and cost-reduced.

Embodiment 2

In Embodiment 1, the developing cartridge B901 and the drum cartridge C901 are respective members, but such a structure is not restrictive to the present invention. For example, the present invention is applicable to a process cartridge P integrally including the developing cartridge B901 and the drum cartridge C901.

Referring to FIGS. 34, 35, 36, 37, 38, 39, 40, 41 and 42, the embodiment of the present invention using a process cartridge will be described. With respect to this embodiment, the description will be made as to the structures different from those of the foregoing embodiment, and the detailed description is omitted by using the similar names of parts as in the foregoing embodiment in the case that the have the similar structures and functions. More particularly, in Embodiment 1, the coupling lever 955 and the coupling lever spring 956 are provided on the driving-side side cover 34, but in Embodiment 2, they are provided on the driving side drum bearing 930. In addition, the coupling spring 985 is provided on the driving side developing device bearing 936 similarly to Embodiment 1.

The details will be described.

FIG. 34 shows the coupling lever 955 and the coupling lever spring 956 provided on the driving side drum bearing 930.

FIG. 35 is a perspective view illustrating assembling of the developing cartridge B901 and the drum cartridge C901 integrally with each other into a process cartridge P.

FIG. 36 is a view illustrating a swing motion of the developing cartridge B901 relative to the drum cartridge C901, as seen from the driving side.

FIG. 37 illustrates attitudes of the coupling lever 955 and the coupling member 980 in the process cartridge P.

As regards in the developing cartridge B901, the drum cartridge C901 and the electrophotographic image forming process operations are the same as with Embodiment 1, and therefore, the description thereof is omitted.

<Assembling of Coupling Lever 955 and Coupling Lever Spring 956 on Driving Side Drum Bearing 930>

First, the description will be made as to the structures of the driving side drum bearing 930, the coupling lever 955 and the coupling lever spring 956 provided on the driving side end portion of the drum frame 921.

As shown in FIG. 34, the coupling lever 955 and the coupling lever spring 956 are provided on the inside of the driving side drum bearing 930 with respect to the longitudinal direction of the process cartridge P. More particularly, a lever positioning boss 930*m* of the driving side drum bearing 930 is engaged with a hole portion 955*c* of the coupling lever 955, so that the coupling lever 955 is supported by the driving side drum bearing 930 rotatably about a rotational axis L911. The coupling lever spring 956 is a twisted coil spring and has one end engaged with the coupling lever 955 and the other end engaged with the driving side drum bearing 930. More particularly, an operation arm 956*a* of the spring 956 is engaged with a spring hook portion 955*b* of the lever 955. A fixed arm 956*c* of the spring 956 is engaged with a spring hook portion 930*s* of the driving side drum bearing 930 (part (c) of FIG. 34).

The assembling of the lever 955 and the spring 956 to the driving side drum bearing 930 will be described. First, a positioning portion 956*d* of the spring 956 is placed coaxially with a cylindrical boss 955*a* of the lever 955 (part (a) of FIG. 34). At this time, the operation arm 956*a* of the spring 956 is engaged with the spring hook portion 955*b* of the lever 955. In addition, the fixed arm 956*c* of the spring 956 is deformed in the direction of an arrow X911 about the rotational axis L911. Then, the hole portion 955*c* of the lever 955 is fitted around the lever positioning boss 930*m* of the driving side drum bearing 930 (parts (a) and (b) of FIG. 34). In the fitting, a retaining portion 955*d* of the lever 955 and a portion-to-be-retained 930*n* of the driving side drum bearing 930 are not interfered with each other by the positions thereof. More particularly, as shown in part (b) of FIG. 34, as seen in the longitudinal direction, the retaining portion 955*d* of the lever 955 and the portion-to-be-retained 930*n* of the driving side drum bearing 930 are not overlapped with each other.

In the state shown in part (b) of FIG. 34, as described hereinbefore, the fixed arm 956*c* of the spring 956 is deformed in the direction of the arrow X911. From the state shown in part (b) of FIG. 34, the deformation of the fixed arm 956*c* of the spring 956 is released by which the fixed arm 956*c* is engaged with the spring hook portion 930*s* of the driving side drum bearing 930, as shown in part (c) of FIG. 34 (parts (c) and (d) of FIG. 34) By the foregoing, the assembling of the lever 955 and the spring 956 to the driving side drum bearing 930 is completed.

At this time, the retaining portion 955*d* of the lever 955 is overlapped with the portion-to-be-retained 930*n* of the driving side drum bearing 930 as seen in the longitudinal direction of the process cartridge P. That is, the lever 955 is prevented in the movement in the longitudinal direction but is permitted in the rotation about the rotational axis X911.

<Unification of the Developing Cartridge B901 and the Drum Cartridge C901>

The description will be made as to the unification of the developing cartridge B901 and the drum cartridge C901 into the process cartridge P.

As shown in FIG. 35, the drum cartridge C901 is provided with the photosensitive drum 910, a drum coupling member 992CM, the charging roller 911 and so on, the structures thereof and the supporting structures therefor are the same as with Embodiment 1, and therefore, the description is omitted.

The driving side end portion of the frame 921 is provided with the driving side drum bearing 930, and the non-driving side end portion thereof is provided with the non-driving side drum bearing 931, these bearings are fixed by a screw, bonding, press-fitting or the like. A supported portion 992*f* of a driving side flange 992 integrally fixed to the photosensitive drum 910 is supported rotatably by a hole portion 930*a* of the driving side drum bearing 930, and a supported portion 928*f* (unshown) of a non-driving side flange 928 is supported by the drum shaft 954 rotatably coaxially with a hole portion 931*a* of the non-driving side drum bearing 931.

In the developing cartridge B901, a boss 936*r* provided on the driving side developing device bearing 936 is rotatably supported by a hole 930*r* provided in the driving side drum bearing 930. In addition, a boss 946*r* provided on the non-driving side developing device bearing 946 is rotatably supported by the hole 931*r* provided in the non-driving side drum bearing 931. By such structures, the developing cartridge B901 is swingable relative to the drum cartridge C901 about the boss 936*r* of the driving side developing device bearing 936 and the boss 946*r* of the non-driving side developing device bearing 946 (FIG. 36). The developing cartridge B901 in the spontaneous state is always urged to the drum cartridge C901 by an urging member (twisted coil spring, for example) so that the developing roller 913 is urged in the direction of contacting to or being close to the photosensitive drum 910 (unshown). The method for urging the developing cartridge B901 may be such that a spring is provided between the drum cartridge C901 and the developing cartridge B901 or such that the weight of the developing cartridge B901 per se is utilized, but the method is not limited to a particular method.

On the other hand, in the state of the process cartridge P, a guide portion 955*e* of the coupling lever 955 is contacted to a portion-to-be-guided 980*d* of the coupling member 980 by the urging force of the coupling lever spring 956. With such a structure, in the process cartridge P, similarly to Embodiment 1, the position of the coupling member 980 is determined by contacting to three members, namely, the coupling lever 955, the coupling spring 985 and the phase regulating portion 936*kb* of the driving side developing device bearing 936 (part (c) and (d) of FIG. 37).

Similarly to Embodiment 1, the attitude of the coupling member 980 is capable of taking three attitudes also in this embodiment.

In other words, in a reference attitude D900 (drive-transmittable attitude), the rotational axis L2 of the coupling member 980 is coaxial with or in parallel with a rotational axis L3 of the drive input gear 27.

In a first inclination attitude D901 (at-spaced attitude), the developing roller 13 is spaced from the photosensitive drum 10 (retracted position (spacing position)) in the state that the process cartridge P is in the main assembly A1, in which the coupling member 180 is directed toward the main assembly side driving member 100 as the main assembly driving shaft (part (a) of FIG. 37)

In a second inclination attitude D902 (at-mounting attitude), the rotational force receiving portion 980*a* and the supported portion 980*b* of the coupling member 980 are directed toward the main assembly side driving member 100 of the main assembly A91 (part (c) of FIG. 37), when the process cartridge P is mounted to the main assembly A91.

The structures and the forces applied to the parts at the time when the coupling member 980 takes the inclination attitudes are the same as with Embodiment 1. Therefore, the detailed description is omitted.

(6) Mounting and Dismounting Structure of the Process Cartridge P Relative to the Main Assembly A91:

Referring to FIG. 38, the mounting method of the process cartridge P to the main assembly A91 will be described.

FIG. 38 is a schematic perspective view of the main assembly A91 as seen from the non-driving side, and FIG. 39 is a schematic perspective view of the main assembly A91 as seen from the driving side. FIG. 40 is an illustration of the process cartridge P when it is being mounted to the main assembly A91. FIG. 41 is an illustration of the process cartridge P when the mounting to the main assembly A91 is completed.

As shown in FIG. 38, a non-driving side bearing 931 is provided in the non-driving side of the process cartridge P. The non-driving side drum bearing 931 is provided with a portion-to-be-guided 931*d*. The portion-to-be-guided 931*d* includes a positioning portion 931*b* and a rotation preventing portion 931*c*.

As shown in FIG. 39 a driving-side drum bearing 930 is provided with a portion-to-be-guided 930*d*. The portion-to-be-guided 930*d* includes a positioning portion 930*b* and a rotation preventing portion 930*c*.

On the other hand, as shown in FIGS. 38 and 39, in the driving side of the main assembly A91, there is provided a driving-side side plate 990 constituting a part of the casing. The driving-side side plate 990 is provided with a driving side guiding member 992. A non-driving-side side plate 991 is provided with a non-driving side guiding member 993. The driving side guiding member 992 includes a guide portion 992*c*, and the non-driving side guiding member 993 includes a guide portion 993*c*. The guide portion 992*c* of the driving side guiding member 992 and the guide portion 993*c* of the non-driving side guiding member 993 are provided with grooves extending along a mounting-and-dismounting path X903 of the process cartridge P. The driving side guiding member 992 further includes an abutting portion 992*y* having a function similar to that of the abutting portion 80*y* of the driving side swing guide 80 in Embodiment 1.

<Mounting of the Process Cartridge P to the Main Assembly Device A1>

The mounting method of the process cartridge P to the main assembly A91 will be described. As shown in FIGS. 38 and 39, an opening and closing main assembly cover 941 provided at an upper portion of the main assembly A91 is rotated in an opening direction D91. By this, the inside of the main assembly A91 is exposed.

The non-driving side drum bearing 931 is provided in the non-driving side of the process cartridge P. The portion-to-be-guided 931*d* of the non-driving side drum bearing 931 (FIGS. 36, 38) is engaged with the guide portion 993*c* (FIGS. 36, 39) of the non-driving side guiding member 993 of the main assembly A91, and the portion-to-be-guided 930*d* (FIG. 39) of the driving side drum bearing 930 of the process cartridge P is engaged with the guide portion 992*c* (FIG. 38) of the driving side guiding member 992 of the main assembly A91. By this, the process cartridge P is inserted into the main assembly A91 along a mounting-and-dismounting path X903 provided by the guide portion 992*c* on the driving side guiding member 992 and the guide portion 993*c* of the non-driving side guiding member 993. When the process cartridge P is mounted to the main assembly A91, the coupling member 980 is inserted into the main assembly A91 while keeping the second inclination attitude D902, similarly to Embodiments 1. The positioning structure of the process cartridge P relative to the main assembly A91 is fundamentally similar to that of Embodiment 1.

The detailed descriptions as to the positioning step is omitted because it is similar to that of Embodiment 1, but it is pointed that the positioning portion 930*b* of the driving side drum bearing 930 receives the urging force from the driving side urging member 982. By this, the positioning portion 930*b* contacts to a positioning portion 992*f* of the driving side guiding member 992 (FIG. 41). A drive urging member 982 of this embodiment has the structure similar to that of the driving side urging member 82 of Embodiment 1, and the function thereof is similar, too, and therefore, the detailed description is omitted.

In the non-driving side, similarly to the driving side, the non-driving side of the process cartridge P is positioned to the driven side guiding member 993. By this, the driving side drum bearing 930 of the process cartridge P is positioned to the driving side guiding member 992, and the non-driving side drum bearing 931 is positioned to the non-driving side guiding member 993 (FIG. 41).

<Operation of Coupling Member 980 in Mounting Process of Process Cartridge P>

The operation of the coupling member 980 in the mounting process of the process cartridge P will be described.

The operation of the coupling member 980 in the mounting process of the process cartridge P is similar to that of Embodiment 1. Therefore, the detailed description is omitted, but the brief description will be made.

In the second inclination attitude D902 of the coupling member 980, the rotational force receiving portion 980*a* of the coupling member 980 is directed toward the main assembly side driving member 100 of the main assembly A91 (downstream in the mounting direction) (FIG. 40) when the process cartridge P is on the mounting-and-dismounting path X903.

In the mounting process of the process cartridge P, the coupling member 980 keeps the second inclination attitude D2 by the urging force applied from the coupling lever 956 and the coupling spring 985. When the process cartridge P is inserted in the mounting direction X903 beyond the contact timing between the annular portion 980*f* of the coupling member 980 and the main assembly side driving member 100 described in Embodiment 1, the rotation regulating portion 955*y* of the coupling lever 955 is brought into contact to the abutting portion 992*y* of the driving side guiding member 992. When the process cartridge P is further inserted in the mounting direction X903, the coupling lever 955 rotates in a direction of an arrow X912 about the rotation axis X911, so that the guide portion 955*e* is completely retracted from the portion-to-be-guided 980*d* of the coupling member 980, similarly to Embodiments 1 (FIGS. 34 and 40). Then, the coupling member 980 is engaged with the main assembly side driving member 100 and becomes coaxial with a rotational axis of the development input gear 27. In other words, the rotational force receiving portion 980*a* of the coupling member 980 and the rotational force applying portion 100*a* of the main assembly side driving member 100 are engageable with each other. The attitude of the coupling member 980 at this time is the reference attitude D900. At this time, a phase regulation boss 980*e* of the coupling member 980 is disengaged from the second inclination regulating portion 936*kb*2 of the driving side developing device bearing 936, and does not contact any part of the phase regulating portion 936*b* of the driving side developing device bearing 936 (part (c) of FIG. 23 in Embodiment 1).

<Operation of Coupling Member 980 in the Dismounting Process of Process Cartridge P>

The operation of the coupling member 980 in the dismounting process of the process cartridge P from the main assembly A91 will be described.

The operation in the dismounting of the process cartridge P from the main assembly device A1 is opposite the above-described mounting process, and the structures are similar to those of Embodiment 1, and therefore, only brief description will be made.

First, the user rotates the main assembly cover 94 of the main assembly A91 in the opening direction D91 (FIGS. 38 and 39) to expose the inside of the main assembly A91, similarly to the case of the mounting. At this time, the process cartridge P is maintained in the contact attitude in which the developing roller 13 contacts the photosensitive drum 10 by a structure (unshown).

The process cartridge P is moved in the dismounting direction along the mounting and dismounting track X903 provided by the driving side guiding member 992 and the non-driving side guiding member 993.

With the movement of the process cartridge P, the abutting portion 992*y* of the driving side guiding member 992 contacting the rotation regulating portion 955*y* of the coupling lever 955 is moved. With this operation, the coupling lever 955 rotates in the direction of the arrow X911 about the rotational axis X911, so that the guide portion 955*e* of the coupling lever 955 contacts to the portion-to-be-guided 980*d* of the coupling member 980. Finally, the phase regulation boss 980*e* of the coupling member 980 is regulated by the guide portion 936*kb*2*a*, the guide portion 936*kb*2*b* and the guide portion 936*kb*2*c* of the driving side developing device bearing 936 so as to engage with the second inclination regulating portion 936*kb*2. The coupling member 980 is kept in the second inclination attitude D902.

Thereafter, the process cartridge P is moved along the X903 until it is taken out of the main assembly device A1.

As described in the foregoing, in the process cartridge of this embodiment, coupling member 980 can be inclined to the second inclination attitude D902, similarly to Embodiments 1. The effects of Embodiment 1 can also be provided.

<Movement of Coupling Member in Interrelation with the Contacting and Spacing Operation>

The description will be made as to the movement of the coupling member in interrelation with the development pressing and developing device spacing operations of the developing cartridge B901 relative to the photosensitive drum 10. The development pressing and developing device spacing structures and the development pressing and development spacing mechanisms of the developing roller 13 relative to the photosensitive drum in this embodiment are similar to those of Embodiment 1. Therefore, the description thereof is omitted.

FIG. 42 is a view as seen from the driving side in the development pressing and spacing developing-device-state of the developing cartridge B901 of the process cartridge P relative to the photosensitive drum 10.

When the contact state between the developing roller 10 and the photosensitive drum 13 shown in part (a) of FIG. 42 changes to the spaced state between the developing roller 10 and the photosensitive drum 13 shown in part (b) of FIG. 42, the developing cartridge B901 swings about a boss 930*r* of the driving side developing device bearing 930 and a boss 946*r* of the non-driving side developing device bearing 946. At this time, the direction of the spacing operation of the developing cartridge B901 is such that it is away from the guide portion 955*e* and the coupling lever 955. As described hereinbefore, the driving side drum bearing 930 is positioned in the fixed relative to the driving side guiding member 992. For this reason, in the contacting and spacing operations, the coupling lever 955 maintains the state at the time of completion of the mounting. That is, the contacting and spacing operations of the developing cartridge B901 are carried out while the guide portion 955*e* of the coupling lever 95 is kept retracted from the coupling member 980.

When the developing roller 13 is spaced from the photosensitive drum 10 as shown in part (b) of FIG. 42, the portion-to-be-guided 980*d* of the coupling member 980 and the guide portion 185*d* of the coupling spring 185 are contacted to each other, similarly to Embodiment 1. By this, the coupling member 980 takes the first inclination attitude D901.

Therefore, also with the structure of this embodiment, the movement of the coupling member 980 in the contacting and spacing operations permits the engagement and disengagement relative to the main assembly side driving member 100 in this embodiment, similarly to Embodiment 1. Therefore, the detailed description is omitted.

As described in the foregoing, the coupling member is engageable both at the time of the mounting of the process cartridge P and at the time of the movement of the developing roller 13 from the retracted position (spacing position) to the developing position (contacting position) in the main assembly A91. In addition, the switching of the inclination attitude of the coupling member 980 is interrelated with the mounting and dismounting operation by the user, and therefore, the usability property upon the mounting and dismounting of the process cartridge P is not adversely affected. Furthermore, the latitude in the design of the electrophotographic image forming apparatus A1 is enhanced, and the structure of the electrophotographic image forming apparatus can be simplified, downsized and cost-reduced.

Embodiment 3

In this embodiment, the structure by which the coupling member 180 takes the reference attitude D0, the first inclination attitude D1 (at-spaced attitude) or the second inclination attitude D2 (at-mounting attitude) is different from that of Embodiment 1, as will be described in conjunction with FIG. 43 to FIG. 47. More particularly, the structures of the development side cover 34, the coupling lever 55, the coupling lever spring 56, the coupling spring 185 and the members concerned with them are different from those of Embodiment 1, as will be described. As regards the other structures of Embodiment 1, they are employed also in this embodiment, and therefore, the detailed description thereof is omitted.

FIG. 43 is a schematic perspective view of a state of a coupling spring 3185 as the urging member (or elastic member), a coupling lever 355 as the movable member (or urging member) and a coupling lever spring 356 as the urging member (or elastic member) for applying an urging force to a lever 355 before being mounted to a development side cover 334. In other words, it is an exploded schematic perspective view of the driving side extreme end of the developing cartridge B1 in this embodiment as seen from the driving side. The movable member in a broad sense includes the lever 355 and the lever spring 356, similarly to Embodiment 1.

The side cover 334 includes a projection 334*s* as a spring mounting portion for mounting one end of the lever spring 356. The side cover 334 also includes a projection 334*h* as a spring mounting portion for mounting a part of the coupling spring 3185. The side cover 334 includes a supporting portion 334*m* for movably (rotatably) supporting a supported portion 355*c* of the lever 355. The supporting portion 334*m* is a substantially cylindrical surface. The supported portion 355*c* is a substantially cylindrical surface provided at an outer periphery of one end of the lever 355 and is slidable relative to the supporting portion 334*m*.

A guide portion 355*a* as the movable portion provided at one end of the lever 355 as the movable member is for guiding the coupling member 180 as will be described hereinafter, and includes a narrow portion 355*a*1 having a relatively small width and a wide portion 355*a*2 having a relatively large width. The width of the narrow portion **355*a*1 is small in order to determine an inclining direction of the coupling member 180 with high precision. In other words, the narrow portion 355*a*1 is capable of functioning as the movable portion for determining the inclining direction of the coupling member 180. The reason why the width increases in the direction from the narrow portion 355*a*1 to the wide portion 355*a*2 is that the rotation of the coupling member 180 is not disturbed during the rotation transmission operation. In place of the phase regulating portion 36*kb* in Embodiment 1, the guide portion 355*a* may be used as a phase regulating means for the coupling member 180**.

FIG. 44 shows the state in which the coupling lever 355, the coupling lever spring 356 and the coupling spring 3185 are mounted to the development side cover 334. Part (a) of FIG. 44 is a perspective view as seen from the non-driving side, and part (b) of FIG. 44 is a front view as seen from the non-driving side. Part (c) of FIG. 44 is a front view as seen from the driving side.

As shown in FIG. 44, the lever 355 is mounted to the side cover 334 movably (rotatably) in the direction indicated by an arrow. The lever spring 356 is provided between the side cover 334 and the lever 355. As described hereinbefore, one end of the lever spring 356 is mounted to the projection **334*s*, and the other end of the spring 356 is mounted to the projection 355*t* as the spring mounting portion for the lever 355. The lever 355 is urged by the spring 356 in the counterclockwise direction (parts (a) and (b) of FIG. 44 (clockwise direction in part (c) of FIG. 44). As a result, the abutting portion 355*n* of the lever 355 abuts to the abutting portion 334*n* of the side cover 334, by which the position of the lever 355 relative to the side cover 334** is determined.

In addition, the projection **334*h* of the cover 334 as the spring supporting portion supports a supported portion 3185*a* of the coupling spring 3185 as the elastic member. One end 3185*b* of the spring 3185 is locked on the projection 334*b* as a locking portion. The spring 3185 includes free end portions (first free end portion 3185*c* and second free end portion 3185*d*) as an urging portion or guide portion. The free end portions (first free end portion 3185*c* and second free end portion 3185) are swingable relative to the supported portion 3185*a* by the elastic thereof. The second free end portion 3185*d* is provided at a free end side of the first free end portion 3185*c* and is bent from the first free end portion 3185*c***.

FIG. 45 shows the state in which the developing cartridge B1 is set in the main assembly A1 and is capable of image forming operation. That is, it is the state in which the mounting of the developing cartridge B1 to the main assembly A1 has been completed. At this time, the coupling member 180 is engaged with the main assembly side driving member 100 and takes the reference attitude D0 (inclination angle of the coupling member 180) θ2=0°, similarly to Embodiment 1. At this time, a rotation regulating portion **355*y* of the coupling lever 355 is urged by the abutting portion 80*y* of the main assembly A1. The coupling lever 355 is in the position rotated in the counterclockwise direction from the position shown in FIG. 47 which will be described hereinafter. As a result, as seen along the rotational axis of the developing roller, the narrow portion 355*a*1 is between the rotational axis of the developing roller 13 and the wide portion 355*a*2 (FIG. 45**).

FIG. 46 shows the first inclination attitude D1 (at-spaced attitude) of the coupling member 180 in this embodiment. Part (a) of FIG. 46 is a front view as seen from the driving side, and part (b) of FIG. 46 is a perspective view as seen from the driving side. In the first inclination attitude D1, the coupling member 180 is inclined toward the main assembly side driving member 100 as the main assembly driving shaft when the developing roller 13 is retracted from the photosensitive drum 10 (retracted position (spacing position) of the developing cartridge B1) in the main assembly A1. That is, when the developing cartridge B1 (developing roller 13) is in the retracted position (spacing position), a free end portion **180*a* (rotational force receiving portions 180*a*1, 180*a*2) of the coupling member 180 is directed toward the main assembly side driving member 100 of the main assembly A1. In other words, as seen along the rotational axis of the developing roller 13, the rotational axis of the coupling member 180 is approximately inclined toward the developing roller 13 (photosensitive drum 10) (part (a) of FIG. 46). An angular relationship of θ3 as the developing cartridge B1 is seen from the driving side toward the non-driving side along the rotational axis of the developing roller 13 when the first inclination attitude D1 is taken in this embodiment is similar to the Embodiment 1. At this time, the coupling member 180 is urged by the second free end portion 3185*d* as well as by the first free end portion 3185*c***.

When the coupling member 180 takes the first inclination attitude D1 (at-spaced attitude), the angle between the rotational axis L2 of the coupling member and the rotational axis of the developing roller 13 (or the rotational axis L3 of the drive input gear 27) is preferably any within the range of approx. 20° to approx. 60°. In this embodiment, the sample is approx. 35°.

FIG. 47 shows the state in which the coupling member 180 takes the second inclination attitude D2 (at-mounting attitude). Part (a) of FIG. 47 is a front view as seen from the driving side, and part (b) of FIG. 47 is a perspective view as seen from the driving side. At this time, the narrow portion **355*a*1 is downstream of the wide portion 355*a*2 with respect to the mounting direction. The coupling member 180 is urged by the first free end portion 3185*c*. By this, the guide portion 180*d* of the coupling member 180 is positioned by the narrow portion 355*a*1. As a result, the coupling member 180 is inclined toward the downstream with respect to the mounting direction. In other words, the arm portion 3185*c* applies the force for inclining the coupling member 180 to the coupling member, and the guide portion 355*a* determines the inclining direction of the coupling member 180**.

In this embodiment, similarly to Embodiment 1, the rotational axis L2 of the coupling member 180 in the second inclination attitude D2 (at-mounting attitude) is directed substantially opposite to the direction toward the developing blade 15. In this embodiment, the angular relationship of the angle θ4 as the developing cartridge B1 is seen along the rotational axis of the developing roller 13 in the direction from the driving side toward the non-driving side in the case of the second inclination attitude D1 is the same as in Embodiment 1.

In addition, the angle θ5 between the rotational axis L2 of the coupling member 180 and a line connecting the rotational axis of the developing roller and the pivoting center of the coupling member 180 as the developing cartridge B1 is seen along the rotational axis of the developing roller 13 in the direction from the driving side toward the non-driving side is the same as in Embodiment 1.

In addition, the angle between the rotational axis L2 of the coupling member and the rotational axis of the developing roller 13 (or the rotational axis L3 of the drive input gear 27) at the time of the second inclination attitude D2 is preferably in the range between approx. 20° and approx. 60°, and is approx. 35° in this embodiment, similarly to Embodiment 1.

Embodiment 4

In this embodiment, the structure by which the coupling member 180 takes the reference attitude D0, the first inclination attitude D1 (at-spaced attitude) or the second inclination attitude D2 (at-mounting attitude) is different from that of Embodiment 1, as will be described in conjunction with FIG. 48 to FIG. 52. As regards the other structures of Embodiment 1, they are employed also in this embodiment, and therefore, the detailed description thereof is omitted. In Embodiment 3, the coupling spring 3185 is provided on the development side cover 334, but in this embodiment, a coupling spring 4185 is provided on a coupling lever 455, as is different from Embodiment 3.

FIG. 48 is a schematic perspective view of a state of a coupling lever spring 456 as an urging member (or elastic member), the coupling lever 455 as a movable member before being mounted to a development side cover 434, and the state of coupling spring 4185 as the urging member (or elastic member) before being mounted to the coupling lever 455. In other words, it is an exploded schematic perspective view of the driving side extreme end of the developing cartridge B1 in this embodiment as seen from the driving side. The movable member in a broad sense includes the lever 455 and the lever spring 456, similarly to Embodiments 1 and 3.

The side cover 434 includes a projection 434*s* as a spring mounting portion for mounting one end of the lever spring 456. The side cover 434 also includes a projection 434*h* as a spring mounting portion for mounting a part of the coupling spring 4185. The side cover 434 includes a supporting portion 434*m* for movably (rotatably) supporting a supported portion 455*c* of the lever 455. The supporting portion 434*m* is a substantially cylindrical surface. The supported portion 455*c* is a substantially cylindrical surface provided at an outer periphery of one end of the lever 455 and is slidable relative to the supporting portion 434*m*.

A guide portion 455*a* as a movable portion provided at one end portion of the lever 455 has the same structure as in Embodiment 3. That is, it includes a narrow portion 455*a*1 and a wide portion 455*a*2 which function similarly to Embodiment 3. That is, the narrow portion 455*a*1 functions as the movable portion in the narrow sense.

FIG. 49 shows the state in which the coupling lever 455 and the coupling lever spring 456 are mounted to the development side cover 434, And the coupling spring 4185 is mounted to the coupling lever 455. Part (a) of FIG. 49 is a perspective view as seen from the non-driving side, and part (b) of FIG. 49 is a front view as seen from the non-driving side. Part (c) of FIG. 49 is a front view as seen from the driving side.

As shown in FIG. 49 the lever 455 is movably (rotatably) mounted to the side cover 434 similarly to Embodiment 3. The lever spring 456 is provided between the side cover 434 and the lever 455. As described hereinbefore, one end of the lever spring 456 is mounted to the projection 434*s*, and the other end of the spring 456 is mounted to the projection 455*t* as the spring mounting portion for the lever 455. The lever 455 is urged by the spring 456 in the counterclockwise direction (part (a) of FIG. 49 (clockwise direction in part (c) of FIG. 49). As a result, the abutting portion 455*n* of the lever 455 abuts to the abutting portion 434*n* of the side cover 434, by which the position of the lever 455 relative to the side cover 434 is determined.

In addition, the projection 455*h* of the lever 455 as the spring supporting portion supports the portion 4185 of the coupling spring 4185*a* as the elastic member. One end 4185*b* of the spring 4185 is locked on the projection 445*b* as a locking portion. The spring 4185 includes free end portions (first free end portion 4185*c* and second free end portion 4185*d*) as an urging portion or guide portion. The free end portions (first free end portion 4185*c* and second free end portion 4185) are swingable relative to the supported portion 4185*a* by the elastic thereof. The second free end portion 4185*d* is provided at a free end side of the first free end portion 4185*c* and is bent from the first free end portion 4185*c*.

FIG. 50 shows the state in which the developing cartridge B1 is set in the main assembly A1 and is capable of image forming operation. That is, it is the state in which the mounting of the developing cartridge B1 to the main assembly A1 has been completed. At this time, the coupling member 180 is engaged with the main assembly side driving member 100 and takes the reference attitude D0 (inclination angle of the coupling member 180) θ2=0°, similarly to Embodiment 1. At this time, a rotation regulating portion 455*y* of the coupling lever 455 is urged by the abutting portion 80*y* of the main assembly A1. The coupling lever 455 is in the position rotated in the counterclockwise direction from the position shown in FIG. 52 which will be described hereinafter. As a result, as seen along the rotational axis of the developing roller, the narrow portion 455*a*1 is between the rotational axis of the developing roller 13 and the wide portion 455*a*2, similarly to Embodiment 3.

FIG. 51 shows the first inclination attitude D1 (at-spaced attitude) of the coupling member 180 in this embodiment. Part (a) of FIG. 51 is a front view as seen from the driving side, and part (b) of FIG. 51 is a perspective view as seen from the driving side. In the first inclination attitude D1, the coupling member 180 is inclined toward the main assembly side driving member 100 as the main assembly driving shaft when the developing roller 13 is retracted from the photosensitive drum 10 (retracted position (spacing position) of the developing cartridge B1) in the main assembly A1. That is, when the developing cartridge B1 (developing roller 13) is in the retracted position (spacing position), a free end portion 180*a* (rotational force receiving portions 180*a*1, 180*a*2) of the coupling member 180 is directed toward the main assembly side driving member 100 of the main assembly A1. In other words, as seen along the rotational axis of the developing roller 13, the rotational axis of the coupling member 180 is approximately inclined toward the developing roller 13 (photosensitive drum 10). An angular relationship of θ3 as the developing cartridge B1 is seen from the driving side toward the non-driving side along the rotational axis of the developing roller 13 when the first inclination attitude D1 is taken in this embodiment is similar to the Embodiment 1. At this time, the coupling member 180 is urged by the second free end portion 4185*d* and the first free end portion 4185*c*.

When the coupling member 180 takes the first inclination attitude D1 (at-spaced attitude), the angle between the rotational axis L2 of the coupling member and the rotational axis of the developing roller 13 (or the rotational axis L3 of the drive input gear 27) is preferably any within the range of approx. 20° to approx. 60°. In this embodiment, the sample is approx. 35°.

FIG. 52 shows the second inclination attitude D2 (at-mounting attitude) of the coupling member 180 in this embodiment. Part (a) of FIG. 52 is a front view as seen from the driving side, and part (b) of FIG. 52 is a perspective view as seen from the driving side. The narrow portion **455*a*1 is downstream of the wide portion 455*a*2 with respect to the mounting direction. The coupling member 180 is urged by the first free end portion 4185*c*. By this, the guide portion 180*d* of the coupling member 180 is positioned to the narrow portion 455*a*1. As a result, the coupling member 180 is inclined toward the downstream with respect to the mounting direction. In other words, the arm portion 4185*c* applies the force for inclining the coupling member 180 to the coupling member, and the guide portion 455*a* determines the inclining direction of the coupling member 180**.

In this embodiment, similarly to Embodiment 1, the rotational axis L2 of the coupling member 180 in the second inclination attitude D2 (at-mounting attitude) is directed substantially opposite to the direction toward the developing blade 15. In this embodiment, the angular relationship of the angle θ4 as the developing cartridge B1 is seen along the rotational axis of the developing roller 13 in the direction from the driving side toward the non-driving side in the case of the second inclination attitude D1 is the same as in Embodiment 1.

In addition, the angle θ5 between the rotational axis L2 of the coupling member 180 and a line connecting the rotational axis of the developing roller in the pivoting center of the coupling member 180 as the developing cartridge B1 is seen along the rotational axis of the developing roller 13 in the direction from the driving side toward the non-driving side is the same as in Embodiment 1.

In addition, the angle between the rotational axis L2 of the coupling member and the rotational axis of the developing roller 13 (or the rotational axis L3 of the drive input gear 27) at the time of the second inclination attitude D2 is preferably in the range between approx. 20° and approx. 60°, and is approx. 35° in this embodiment, similarly to Embodiment 1.

Embodiment 5

In this embodiment, the structure by which the coupling member 180 takes the reference attitude D0, the first inclination attitude D1 (at-spaced attitude) or the second inclination attitude D2 (at-mounting attitude) are different from those in Embodiment 1, as will be described in conjunction with FIG. 53 to FIG. 57. More particularly, the structures of the development side cover 34, the coupling lever 55, the coupling lever spring 56, the coupling spring 185 and the members concerned with them are different from those of Embodiment 1, as will be described. As regards the other structures of Embodiment 1, they are employed also in this embodiment, and therefore, the detailed description thereof is omitted.

FIG. 53 is a schematic perspective view of a state of a spring 5185 as an urging member (first elastic member) and a spring 555 as a movable member (second elastic member) before being mounted to a development side cover 534. In other words, it is an exploded schematic perspective view of the driving side extreme end of the developing cartridge B1 in this embodiment as seen from the driving side.

The side cover 534 includes a projection **534*m* as a supporting portion (spring mounting portion) for mounting the mounting portion 555*a* of the spring 555. The side cover 534 further includes a projection 534*s* as a locking portion for locking a portion-to-be-locked 555*b* of the second spring 555. Furthermore, the side cover 534 includes a projection 534*h* as the supporting portion (spring mounting portion) for mounting a part of the spring 5185. An arm portion 555*c* as the movable portion (urging portion) of the spring 555 functions to urge (or guide) the coupling member 180. In other words, the arm portion 555*c* as the movable portion urges the coupling member 180 against the force by the arm portion 5185*d* as the urging portion so as to move the coupling member 180 together with the arm portion 5185*d*. By this, the inclining direction of the coupling member 180** is changed.

FIG. 54 shows the development side cover 534 to which the spring 555 and the spring 5185 are mounted, as seen from the driving side.

As shown in FIG. 54, the mounting portion **555*a* is mounted to the development side cover 534 such that the arm portion 555*c* is movable (rotatable). In addition, the projection 534*h* of the cover 534 as the spring supporting portion supports the projection 5185*a* as the mounting portion for the spring 5185. One end portion 5185*b* of the spring 5185 is locked on the locking portion 534*b*. The spring 5185 includes free end portions (first free end portion 5185*c* and second free end portion 5185*d*) as the urging portion. The free end portion (5185*c* and 5185*d*) of the spring 5185 as the urging portion is swingable about the projection 534*h*. The second free end portion 5185*d* is provided at a free end side of the first free end portion 5185*c* and is bent from the first free end portion 5185*c***.

FIG. 55 shows the state in which the developing cartridge B1 is operable for the image forming operation, in the main assembly A1. That is, it is the state in which the mounting of the developing cartridge B1 to the main assembly A1 has been completed. At this time, the coupling member 180 is engaged with the main assembly side driving member 100 and takes the reference attitude D0 (inclination angle of the coupling member 180) θ2=0°, similarly to Embodiment 1. At this time, a rotation regulating portion **555*y* of the coupling lever 555 is urged by the abutting portion 80*y* of the main assembly A1, and by the urging force, the arm portion 555*c* of the spring 555 is rotated in the counterclockwise direction about the supporting portion 555*a* together with the arm portion 555*d* and the rotation regulating portion 555*y*. As a result, in the completed mounting step, the arm portion 555*c* is away from the coupling member 180** as seen along the rotational axis of the developing roller.

FIG. 56 shows the first inclination attitude D1 (at-spaced attitude) of the coupling member 180 in this embodiment. Part (a) of FIG. 56 is a front view as seen from the driving side, and part (b) of FIG. 56 is a perspective view as seen from the driving side. In the first inclination attitude D1, the coupling member 180 is inclined toward the main assembly side driving member 100 as the main assembly driving shaft when the developing roller 13 is retracted from the photosensitive drum 10 (retracted position (spacing position) of the developing cartridge B1) in the main assembly A1. That is, when the developing cartridge B1 (developing roller 13) is in the retracted position (spacing position), a free end portion **180*a* (rotational force receiving portions 180*a*1, 180*a*2) of the coupling member 180 is directed toward the main assembly side driving member 100 of the main assembly A1. In other words, as seen along the rotational axis of the developing roller 13, the rotational axis of the coupling member 180 is inclined substantially toward the developing roller 13 (photosensitive drum 10) in this attitude. An angular relationship of θ3 as the developing cartridge B1 is seen from the driving side toward the non-driving side along the rotational axis of the developing roller 13 when the first inclination attitude D1 is taken in this embodiment is similar to the Embodiment 1. At this time, the coupling member 180 is urged by the second free end portion 5185*d***.

When the coupling member 180 takes the first inclination attitude D1 (at-spaced attitude), the angle between the rotational axis L2 of the coupling member and the rotational axis of the developing roller 13 (or the rotational axis L3 of the drive input gear 27) is preferably any within the range of approx. 20° to approx. 60°. In this embodiment, the sample is approx. 35°. FIG. 57 shows the state in which the coupling member 180 takes the second inclination attitude D2 (at-mounting attitude). Part (a) of FIG. 57 is a front view as seen from the driving side, and part (b) of FIG. 57 is a perspective view as seen from the driving side. The coupling member 180 is urged by the second free end portion 5185*d*. The guide portion 180*d* of the coupling member 180 is positioned by the arm portion 555*c*. As a result, the coupling member 180 is inclined toward the downstream with respect to the mounting direction. In other words, in this embodiment, similarly to Embodiment 1, the rotational axis L2 of the coupling member 180 is directed substantially in the direction away from the developing blade 15. Namely, in this embodiment, the angular relationship of the angle θ4 as the developing cartridge B1 is seen along the rotational axis of the developing roller 13 in the direction from the driving side toward the non-driving side in the case of the second inclination attitude D1 is the same as in Embodiment 1.

As shown in FIG. 57, in this embodiment, the force applied by the arm portion 555*c* to the coupling member 180, that is, toward the lower left is made larger than the force applied by the arm portion 5185*d* to the coupling member, that is, toward the upper right.

In addition, the angle θ5 between the rotational axis L2 of the coupling member 180 and a line connecting the rotational axis of the developing roller and the pivoting center of the coupling member 180 as the developing cartridge B1 is seen along the rotational axis of the developing roller 13 in the direction from the driving side toward the non-driving side is the same as in Embodiment 1.

In addition, the angle between the rotational axis L2 of the coupling member and the rotational axis of the developing roller 13 (or the rotational axis L3 of the drive input gear 27) at the time of the second inclination attitude D2 is preferably in the range between approx. 20° and approx. 60°, and is approx. 35° in this embodiment, similarly to Embodiment 1.

Embodiment 6

In this embodiment, the structure by which the coupling member 180 takes the reference attitude D0, the first inclination attitude D1 (at-spaced attitude) or the second inclination attitude D2 (at-mounting attitude) is different from the start of Embodiment 1, as will be described in conjunction with FIG. 58 to FIG. 62. More particularly, the structures of the development side cover 34, the coupling lever 55, the coupling lever spring 56, the coupling spring 185 and the members concerned with them are different from those of Embodiment 1, as will be described. As regards the other structures of Embodiment 1, they are employed also in this embodiment, and therefore, the detailed description thereof is omitted. In this embodiment, a rotatable member 656 and a spring 655 are used in place of the spring 555 of Embodiment 5.

FIG. 58 is a schematic perspective view of a state of a spring 6185 as an urging member (first elastic member) and a spring 655 as a movable member (second elastic member) before being mounted to a development side cover 634. In other words, it is an exploded schematic perspective view of the driving side extreme end of the developing cartridge B1 in this embodiment as seen from the driving side. The spring 6185 as the urging member (elastic member) illustrated in FIGS. 60-62 is similar to the spring 5185 of FIG. 54, and is omitted in FIG. 58. The movable member in the broad sense includes the spring 655 and the rotatable member 656.

A side cover 634 includes a supporting portion 634*a* for supporting the rotatable member 656 as a supported member. In more detail the supporting portion 634*a* rotatably supports the supported portion 656*a*1 provided on the supported member 656. The supporting portion 634*a* has a substantially cylindrical surface, and the supported portion 656*a*1 has a substantial cylindrical surface corresponding to the supporting portion 634*a*. The rotatable member 656 includes a spring mounting portion 656*a*2 as a supporting portion for mounting a mounting portion 655*a* of the spring 655 as the movable member (elastic member). The side cover 634 includes a locking portion 634*s* for locking a portion-to-be-locked 655*b* of the spring 655. In addition, an arm portion 655*c* as the movable portion (guide portion) of the coupling lever 655 is locked with a locking portion 656*b* of the rotatable member 656, and urges (or guides) the coupling member 180. In other words, the arm portion 655*c* as the movable portion urges the coupling member 180 against the force by the arm portion 6185*d* as the urging portion so as to move the coupling member 180 together with the arm portion 6185*d*. By this, the inclining direction of the coupling member 180 is changed.

FIG. 59 shows the spring 655 as the urging member (elastic member), the rotatable member 656 and the spring 6185 as the urging member (elastic member) which are mounted to the side cover 634, as seen from the non-driving side.

As shown in FIG. 59, the supported member 656 is movably (rotatably) mounted to the side cover 634. A projection 656*a* as the supporting portion for the rotatable member 656 supports the supported portion 655*a* of the spring 655. One end portion 655*b* of the spring 655 is locked with the locking portion 634*s* of the development side cover 634. The spring 655 includes a free end portion 655*c* as the movable portion. The free end portion 655*c* of the spring 655 is swingable about the projection 656*a*.

FIG. 60 shows the state in which the developing cartridge B1 is operable for the image forming operation, in the main assembly A1. That is, it is the state in which the mounting of the developing cartridge B1 to the main assembly A1 has been completed. At this time, the coupling member 180 is engaged with the main assembly side driving member 100 and takes the reference attitude D0 (inclination angle of the coupling member 180) θ2=0°, similarly to Embodiment 1. At this time, a rotation regulating portion 656*y* of the rotatable member 656 is urged by the abutting portion 80*y* of the main assembly A1, so that the arm portion 655*c* as the movable portion (urging portion) of the spring 655 and the rotatable member 656 rotate in the counterclockwise direction about the supporting portion 634*a*. That is, as seen along the rotational axis of the developing roller, the arm portion 655*c* is spaced from the coupling member 180.

FIG. 61 shows the first inclination attitude D1 (at-spaced attitude) of the coupling member 180 in this embodiment. Part (a) of FIG. 61 is a front view as seen from the driving side, and part (b) of FIG. 46 is a perspective view as seen from the driving side. In the first inclination attitude D1, the coupling member 180 is inclined toward the main assembly side driving member 100 as the main assembly driving shaft when the developing roller 13 is retracted from the photosensitive drum 10 (retracted position (spacing position) of the developing cartridge B1) in the main assembly A1. That is, when the developing cartridge B1 (developing roller 13)

is in the retracted position (spacing position), a free end portion 180*a* (rotational force receiving portions 180*a*1, 180*a*2) of the coupling member 180 is directed toward the main assembly side driving member 100 of the main assembly A1. In other words, as seen along the rotational axis of the developing roller 13, the rotational axis of the coupling member 180 is approximately inclined toward the developing roller 13 (photosensitive drum 10) (part (a) of FIG. 61). An angular relationship of θ3 as the developing cartridge B1 is seen from the driving side toward the non-driving side along the rotational axis of the developing roller 13 when the first inclination attitude D1 is taken in this embodiment is similar to the Embodiment 1. This time, the coupling member 180 is urged by the second free end portion 6185*d* as the urging portion or the guide portion.

When the coupling member 180 takes the first inclination attitude D1 (at-spaced attitude), the angle between the rotational axis L2 of the coupling member and the rotational axis of the developing roller 13 (or the rotational axis L3 of the drive input gear 27) is preferably any within the range of approx. 20° to approx. 60°. In this embodiment, the sample is approx. 35°. FIG. 62 shows the second inclination attitude D2 (at-mounting attitude) of the coupling member 180 in this embodiment. Part (a) of FIG. 62 is a front view as seen from the driving side, and part (b) of FIG. 62 is a perspective view as seen from the driving side. The coupling member 180 is urged by the second free end portion 6185*d* as the urging portion (or guide portion). By this, a guide portion 180*d* of the coupling member 180 is positioned to the arm portion 655*c* as the urging portion (or guide portion). As a result, the coupling member 180 is inclined toward the downstream with respect to the mounting direction. In other words, in this embodiment, similarly to Embodiment 1, the rotational axis L2 of the coupling member 180 is directed substantially in the direction away from the developing blade 15. In this embodiment, the angular relationship of the angle θ4 as the developing cartridge B1 is seen along the rotational axis of the developing roller 13 in the direction from the driving side toward the non-driving side in the case of the second inclination attitude D1 is the same as in Embodiment 1.

In addition, the angle θ5 between the rotational axis L2 of the coupling member 180 and a line connecting the rotational axis of the developing roller in the pivoting center of the coupling member 180 as the developing cartridge B1 is seen along the rotational axis of the developing roller 13 in the direction from the driving side toward the non-driving side is the same as in Embodiment 1.

As shown in FIG. 62, in this embodiment, too, the force toward the lower left applied to the coupling member 180 by the arm portion 655*c* is made larger than the force toward the upper right applied to the coupling member by the arm portion 6185*d*.

In addition, the angle between the rotational axis L2 of the coupling member and the rotational axis of the developing roller 13 (or the rotational axis L3 of the drive input gear 27) at the time of the second inclination attitude D2 is preferably in the range between approx. 20° and approx. 60°, and is approx. 35° in this embodiment, similarly to Embodiment 1.

Embodiment 7

In this embodiment, the structure by which the coupling member 180 takes the reference attitude D0, the first inclination attitude D1 (at-spaced attitude) or the second inclination attitude D2 (at-mounting attitude) is different from that of Embodiment 1, as will be described in conjunction with FIG. 63 to FIG. 67. More particularly, the structures of the development side cover 34, the coupling lever 55, the coupling lever spring 56, the coupling spring 185 and the members concerned with them are different from those of Embodiment 1, as will be described. As regards the other structures of Embodiment 1, they are employed also in this embodiment, and therefore, the detailed description thereof is omitted. In Embodiment 1, the lever 55 urges the coupling member 180, but in this embodiment, a lever 755 urges a spring 7185 not the coupling member 180.

FIG. 63 is a schematic perspective view of a coupling spring 7185 as an urging member (or elastic member), a coupling lever 755 as a movable member or urging member (or movable member) and a coupling lever spring 756 as an urging member (or elastic member) for applying an urging force to the lever 755, before being mounted to the development side cover 734. In other words, it is an exploded schematic perspective view of the driving side extreme end of the developing cartridge B1 as seen from the non-driving side. The movable member in the broad sense includes the lever 755 and the spring 756.

The side cover 734 includes a supporting portion 734*a* for supporting the lever 755. More in detail, the supporting portion 734*a* rotatably supports a supported portion 755*a*1 provided on the lever 755. The supporting portion 734*a* is cylindrical, and a supported portion 755*a* is cylindrical correspondingly to the supporting portion 734*a*. The lever 755 includes a spring mounting portion 755*a*2 as a supporting portion for mounting a mounting portion 756*a* of the spring 756 as the elastic member. The side cover 734 includes a locking portion 734*s* for locking a portion-to-be-locked 756*b* of the spring 756. An arm portion 755*c* as an urging portion (or guide portion) of the lever 755 functions to urge (guide) an arm portion 7185*d* as an urging portion of the spring 7185. In other words, the arm portion 755*c* moves the arm portion 7185*d* to change an inclining direction of the coupling member without contacting the coupling member 180.

FIG. 64 shows the state in which the lever 755, the spring 756 and the spring 7185 have been mounted to the side cover 734, as seen from the non-driving side.

As shown in FIG. 64, to the side cover 734, the lever 755 is movably (rotatable) mounted. A spring supporting portion 755*a* of the lever 755 supports a supported portion 756*a* of the coupling lever spring 756 as the elastic member. One end portion 756*b* of the spring 756 is locked with the locking portion 734*b* of the development side cover 734. Other end portion 756*c* of the spring 756 is locked with a locking portion 755*b* of the lever 755. Therefore, the coupling lever 755 is urged in the clockwise direction by the spring 756.

FIG. 65 shows the state in which the developing cartridge B1 is operable for the image forming operation, in the main assembly A1. That is, it is the state in which the mounting of the developing cartridge B1 to the main assembly A1 has been completed. At this time, the coupling member 180 is engaged with the main assembly side driving member 100 and takes the reference attitude D0 (inclination angle of the coupling member 180) θ2=0°, similarly to Embodiment 1. At this time, a rotation regulating portion 755*y* of the lever 755 is urged by the abutting portion 80*y* of the main assembly A1, so that the lever 755 (arm portion 755*c*) rotates in the clockwise direction about a supporting portion 734*a*. As a result, as seen along a rotational axis of the developing roller, the arm portion 755*c* is spaced from the spring 7185.

FIG. 66 shows the first inclination attitude D1 of the coupling member 180 (at-spaced attitude) in this embodiment. Part (a) of FIG. 66 is a front view as seen from the driving side, and part (b) of FIG. 66 is a perspective view as seen from the driving side. In the first inclination attitude D1, the coupling member 180 is inclined toward the main assembly side driving member 100 as the main assembly driving shaft when the developing roller 13 is retracted from the photosensitive drum 10 (retracted position (spacing position) of the developing cartridge B1) in the main assembly A1. That is, when the developing cartridge B1 (developing roller 13) is in the retracted position (spacing position), a free end portion 180*a* (rotational force receiving portions 180*a*1, 180*a*2) of the coupling member 180 is directed toward the main assembly side driving member 100 of the main assembly A1. In other words, as seen along the rotational axis of the developing roller 13, the rotational axis of the coupling member 180 is approximately inclined toward the developing roller 13 (photosensitive drum 10) (part (a) of FIG. 66). An angular relationship of θ3 as the developing cartridge B1 is seen from the driving side toward the non-driving side along the rotational axis of the developing roller 13 when the first inclination attitude D1 is taken in this embodiment is similar to the Embodiment 1. At this time, the coupling member 180 is urged by the second free end portion 7185*d* as the urging portion.

When the coupling member 180 takes the first inclination attitude D1 (at-spaced attitude), the angle between the rotational axis L2 of the coupling member and the rotational axis of the developing roller 13 (or the rotational axis L3 of the drive input gear 27) is preferably any within the range of approx. 20° to approx. 60°. In this embodiment, the sample is approx. 35°.

FIG. 67 shows the second inclination attitude D2 (at-mounting attitude) of the coupling member 180 in this embodiment. Part (a) of FIG. 62 is a front view as seen from the driving side, and part (b) of FIG. 62 is a perspective view as seen from the driving side. At this time, the second free end portion 7185*d* as the urging portion is urged by the arm portion 755*c* as the movable portion. The coupling member 180 is positioned to the second free end portion 7185*d* urged downwardly to the arm portion 755*c* by the weight of itself. The guide portion 180*d* of the coupling member 180 is positioned by the arm portion 7185*d*. As a result, the coupling member 180 is inclined toward the downstream with respect to the mounting direction. In other words, in this embodiment, similarly to Embodiment 1, the rotational axis L2 of the coupling member 180 is directed substantially in the direction away from the developing blade 15. In this embodiment, the angular relationship of the angle θ4 as the developing cartridge B1 is seen along the rotational axis of the developing roller 13 in the direction from the driving side toward the non-driving side in the case of the second inclination attitude D1 is the same as in Embodiment 1. In this embodiment, the guide portion 180*d* of the coupling member 180 in the second inclination attitude D2 is contacted to the second free end portion 7185*d*, but it may be spaced. In such a case, the attitude of the coupling member 180 in the second inclination attitude D2 is determined by the phase regulation boss 180*e* and the inclination regulating portion 36*kb*2*b*, as with Embodiment 1.

In addition, the angle θ5 between the rotational axis L2 of the coupling member 180 and a line connecting the rotational axis of the developing roller and the pivoting center of the coupling member 180 as the developing cartridge B1 is seen along the rotational axis of the developing roller 13 in the direction from the driving side toward the non-driving side is the same as in Embodiment 1. In other words, as the developing cartridge B1 is seen along the rotational axis of the developing roller 13 from the driving side toward the non-driving side, the rotational axis L2 of the coupling member 180 is clockwisely inclined from the line connecting the rotational axis of the developing roller and the pivoting center of the coupling member 180 by an angle in the range between approx. 35° and approx. 125°. In this embodiment, the angle is substantially 80°.

In the state shown in FIG. 67, the force by the arm portion 755*c* toward the lower left is larger than the force applied by the arm portion 7185*d* to the coupling member toward the upper right.

In addition, the angle between the rotational axis L2 of the coupling member and the rotational axis of the developing roller 13 (or the rotational axis L3 of the drive input gear 27) at the time of the second inclination attitude D2 is preferably in the range between approx. 20° and approx. 60°, and is approx. 35° in this embodiment, similarly to Embodiment 1.

Embodiment 8

In this embodiment, the structure by which the coupling member 180 takes the reference attitude D0, the first inclination attitude D1 (at-spaced attitude) or the second inclination attitude D2 (at-mounting attitude) is different from that of Embodiment 1, as will be described in conjunction with FIG. 68 to FIG. 72. The structures of the side cover 34, the coupling lever 55, the coupling lever spring 56, the coupling spring 185 and the members concerned with them of Embodiment 1 are different from those of Embodiment 1, as will be described. More particularly, the spring 7185 is further improved. The other structures of Embodiment 7 are employed in this embodiment, and therefore, the description thereof is omitted.

FIG. 68 is an exploded schematic perspective view of the driving side extreme end of the developing cartridge B1 according to this embodiment, as seen from the driving side. The description will be made as to the portions different from Embodiment 7. More particularly, the description will be made as to the coupling spring 8185 as the urging member (or elastic member). The structure for mounting the spring 8185 to the development side cover 834 is the same, but the structure of the free end portion side of the mounting portion 8185*a* is different. The spring 8185 includes a first connecting portion 8185*c* and a second connecting portion 8185*d*. There is provided a first coupling contact portion 8185*e* folded back from the second connecting portion 8185*d*. Furthermore, there is provided a second coupling contact portion 8185*f* reversely folded from the first coupling contact portion 8185*e*. The first and second coupling contact portions 8185*e* and 8185*f* function as an urging portion for inclining the coupling member 180.

FIG. 69 shows a state in which a lever 855, a lever spring 856 and the coupling spring 8185 are mounted to the development side cover 834, as seen from the driving side. The movable member in the broad sense includes the lever 855 and the spring 856.

As shown in FIG. 69, the lever 855 as the movable member or urging member (or rotatable member) is movably (rotatably) mounted to the side cover 834. A spring supporting portion 855*a* of the lever 855 supports a supported portion 856*a* of the lever spring 856 as the elastic member. One end portion 856*b* of the spring 856 is locked with a locking portion 834*b* of the side cover 834. Other end portion 856*c* of the spring 856 is locked with a locking portion 855*b* of the lever 855. Therefore, the lever 855 is urged counterclockwisely by the spring 856.

FIG. 70 shows the state in which the developing cartridge B1 is operable for the image forming operation, in the main assembly A1. That is, it is the state in which the mounting of the developing cartridge B1 to the main assembly A1 has been completed. At this time, the coupling member 180 is engaged with the main assembly side driving member 100 and takes the reference attitude D0 (inclination angle of the coupling member 180) θ2=0°, similarly to Embodiment 1. At this time, a rotation regulating portion 855y of the lever 855 is urged by the abutting portion 80y of the main assembly A1, so that the lever 855 (arm portion 855c as the movable portion (or urging portion) rotates in the counter-clockwise direction about a supporting portion 834a. As a result, as seen along a rotational axis of the developing roller, the arm portion 855c is spaced from the spring 7185.

FIG. 71 shows the first inclination attitude D1 (at-spaced attitude) of the coupling member 180 in this embodiment. Part (a) of FIG. 71 is a front view as seen from the driving side, and part (b) of FIG. 71 is a perspective view as seen from the driving side. In the first inclination attitude D1, the coupling member 180 is inclined toward the main assembly side driving member 100 as the main assembly driving shaft when the developing roller 13 is retracted from the photosensitive drum 10 (retracted position (spacing position) of the developing cartridge B1) in the main assembly A1. That is, when the developing cartridge B1 (developing roller 13) is in the retracted position (spacing position), a free end portion 180a (rotational force receiving portions 180a1, 180a2) of the coupling member 180 is directed toward the main assembly side driving member 100 of the main assembly A1. In other words, as seen along the rotational axis of the developing roller 13, the rotational axis of the coupling member 180 is approximately inclined toward the developing roller 13 (photosensitive drum 10) (part (a) of FIG. 71). An angular relationship of θ3 as the developing cartridge B1 is seen from the driving side toward the non-driving side along the rotational axis of the developing roller 13 when the first inclination attitude D1 is taken in this embodiment is similar to the Embodiment 1. At this time, the coupling member 180 it sandwiched between the first coupling contact portion 8185e and the second coupling contact portion 8185f.

when the coupling member 180 takes the first inclination attitude D1 (at-spaced attitude), the angle between the rotational axis L2 of the coupling member and the rotational axis of the developing roller 13 (or the rotational axis L3 of the drive input gear 27) is preferably any within the range of approx. 20° to approx. 60°. In this embodiment, the sample is approx. 35°.

FIG. 72 shows the second inclination attitude D2 (at-mounting attitude) of the coupling member 180 in this embodiment. Part (a) of FIG. 72 is a front view as seen from the driving side, and part (b) of FIG. 72 is a perspective view as seen from the driving side. At this time, the second coupling contact portion 8185f is urged by the arm portion 855c as the movable portion. The coupling member 180 is positioned to the first coupling contact portion 8185e by the second coupling contact portion 8185f downwardly urged by the arm portion 855c. The guide portion 180d of the coupling member 180 is positioned by the arm portion 8185d. As a result, the coupling member 180 is inclined toward the downstream with respect to the mounting direction.

Similarly to Embodiments 1, the rotational axis L2 of the coupling member 180 is directed substantially opposite from the developing blade 15 in this embodiment, too. In this embodiment, the angular relationship of the angle θ4 as the developing cartridge B1 is seen along the rotational axis of the developing roller 13 in the direction from the driving side toward the non-driving side in the case of the second inclination attitude D1 is the same as in Embodiment 1.

In addition, the angle θ5 between the rotational axis L2 of the coupling member 180 and a line connecting the rotational axis of the developing roller and the pivoting center of the coupling member 180 as the developing cartridge B1 is seen along the rotational axis of the developing roller 13 in the direction from the driving side toward the non-driving side is the same as in Embodiment 1.

In addition, the angle between the rotational axis L2 of the coupling member and the rotational axis of the developing roller 13 (or the rotational axis L3 of the drive input gear 27) at the time of the second inclination attitude is preferably in the range between approx. 20° and approx. 60°, and is approx. 35° in this embodiment, similarly to Embodiment 1.

Embodiment 9

In this embodiment, the structure for positioning the coupling member 180 in the reference attitude D0, the first inclination attitude D1 (at-spaced attitude) and the second inclination attitude D2 (at-mounting attitude) is different from that of Embodiment 1, as will be described in conjunction with FIG. 73. In this embodiment, the configuration of an arm portion 855 of Embodiment 8 is modified so that it is urged to a second connecting portion 9185d not to the contact portion 9185f of the second coupling. Therefore, a first coupling contact portion 9185e and a second coupling contact portion 9185f function as an urging portion full inclining the coupling member 180. An arm portion 955c as the urging portion determines the inclining direction of the coupling 180, similarly to the foregoing embodiment. The other structures are similar to those of Embodiment 8, and therefore, the description is omitted.

Embodiment 10

In this embodiment, the structure for positioning the coupling member 180 in the reference attitude D0, the first inclination attitude D1 (at-spaced attitude) and the second inclination attitude D2 (at-mounting attitude) are different from that of Embodiment 1, as will be described in conjunction with FIG. 74. In the foregoing embodiment, the urging portion and the movable portion are separate members, but in this embodiment, the urging portion 10185e and the movable portion 10185g are provided as a single part (single spring). Part (a) of FIG. 74 shows a coupling spring 10185 mounted to the development side cover 1034.

Part (b) of FIG. 74 shows a second inclination attitude D2 of the coupling member 180. In this state, a movable portion 10185f urges the coupling member 180, but the urging portion 10185e is spaced from the coupling member 180. However, the urging portion 10185e may also contact the coupling member 180.

Part (c) of FIG. 74 shows a first inclination attitude D1 of the coupling member 180. In this state, the urging portion 10185e urges the coupling member 180, but the movable portion 10185f is spaced from the coupling member 180. However, the movable portion 10185f may also contact the coupling member 180.

A mounting portion 10185a, a locking portion 10185b and a connecting portion 10185d are similar to those of Embodiment 9, and therefore, the description thereof are omitted.

A connecting portion 10185g connects the force receiving portion 10185h for receiving the force from the main assembly and the movable portion 10185f.

Embodiment 11

In this embodiment, the structure for positioning the coupling member 180 in the reference attitude D0, the first inclination attitude D1 (at-spaced attitude) and the second inclination attitude D2 (at-mounting attitude) are different from that of Embodiment 1, as will be described in conjunction with FIG. 75. This embodiment is a modification of Embodiment 9. Part (a) of FIG. 75 shows a coupling spring 11185 and a lever 1155 to a development side cover 1134.

Part (b) of FIG. 75 shows a second inclination attitude D2 of the coupling member 180. In this state, a second movable portion 1155*c*2 urges the coupling member 180, but an urging portion 11185*d* is spaced from the coupling member 180. At this time, a first movable portion 1155*c*1 urges the urging portion 11185*d*. At this time, the urging portion 11185*d* may contact the coupling member 180.

Part (c) of FIG. 75 shows a first inclination attitude D1 of the coupling member 180. In this state, the urging portion 11185*d* urges the coupling member 180, but a movable portion 1155*c*2 is spaced from the coupling member 180. However, the second movable portion 1155*c*2 may also contact the coupling member 180.

Embodiment 12

In a alternative structure, a movable portion contacts at least one of a coupling member and an urging member when the first inclination attitude D1 is taken, and it does not contact the coupling member when the second inclination attitude D2*s* is taken.

Part (a) of FIG. 76 of Embodiment 12 shows a development side cover 1234, and a lever 1255 as a movable member and a spring 12185 as the urging member which are mounted to the development side cover 1234.

As shown in part (b) of FIG. 76 of Embodiment 12, in the second inclination attitude D2, the structure is such that a second movable portion 1255*c*2 as the movable portion of the lever 1255 is not contacted to a lower part of the portion-to-be-guided 180*d* of the coupling member 180.

At this time, an urging portion 12185*c* of a spring 121185 as the urging member urges the portion-to-be-guided 180*d*.

By this, the coupling member 180 takes the second inclination attitude D2.

In other words, in the second inclination attitude D2, only the urging portion 12185*c* contacts in the portion-to-be-guided 180*d*, but the second movable portion 1255*c*2 as the movable portion does not contact the portion-to-be-guided 180*d*.

Part (c) of FIG. 76 shows the state in which the force receiving portion 1255*y* of the levers 1255 has rotated from the position shown in part (b) of FIG. 76 counterclockwisely by receiving the force from the main assembly of the apparatus.

At this time, a first movable portion 1255*c*1 urges the urging portion 12185*c* upwardly, so that the urging portion 12185*c* is retracted from the portion-to-be-guided 180*d*.

At this time, the second movable portion 1255*c*2 urges the portion-to-be-guided 180*d*.

As a result, the coupling member 180 takes the first inclination attitude D1.

The structures of the mounting portion 12185*a* of the spring 12185 and the force receiving portion 1255*y* for receiving the force from the main assembly and so on are similar to those of the embodiments, and therefore, the description is omitted.

OTHER THE EMBODIMENTS

First, the structures of the Embodiments 3-12 are usable with the process cartridge of Embodiment 2.

In all of the described embodiments, a part of the spring (185, 985, 3185, 4185, 5185, 6185, 7185, 8185, 9185, 10185) has been used as the urging portion. However, as described in the example of the movable member (55+56, 955+956, 355+356, 455+456, 655+656, 755+756, 855+866, 955), the urging portion may be constituted by another member (resin material or the like). For example, a resin material member is fixed to a free end portion of the spring (185, 985, 3185, 4185, 5185, 6185, 7185, 8185, 9185, 10185, 11185, 12185) as the urging member and is used as the urging portion or the guide portion for urging or guiding the coupling member. In addition, as with the lever 656 of Embodiment 6, a base portion is provided with a rotatable member for mounting the spring (185, 985, 3185, 4185, 5185, 6185, 7185, 8185, 9185) as the urging member to the development side cover.

In all of the above-described embodiments, the elastic member has been the twisting spring or the coil spring, but the present invention is not limited to such examples, and the use can be made with a resin material spring, a leaf spring and/or rubber or the like.

The configuration of the coupling member 180 is not limited to the above-described examples, but may be a barrel configuration not having a thin portion such as the connecting portion 180*d*. However, using the connecting portion 180*d* can downsize the cartridge.

In addition, the coupling member 180 may be made movable in the axial direction of the developing roller 13 in which an elastic member (spring or the like) or the like is provided at the rear side of the coupling member 180. In such a case, the pivoting angle of the coupling member 180 can be reduced.

As shown in part (b) of FIG. 11 and part (b) of FIG. 12, the two leftwardly projected parts are provided between the guide portion 36*kb*1*b* and the guide portion 36*kb*2*b*. However, such projections may not be provided, and the portion between the guide portion 36*kb*1*b* and the guide portion 36*kb*2*b* may be made linear or recessed. In such a case, the boss 180*e* can easily move between the guide portion 36*kb*1*b* and the guide portion 36*kb*2*b*. That is, the configuration of the hole portion 36*a* may be any if it is substantially triangular shape. These modifications are applicable to the other embodiments.

INDUSTRIAL APPLICABILITY

According to the present invention, there is provided a cartridge in which a coupling member is engageable with a main assembly driving shaft when the cartridge is mounted to a main assembly and when the developer carrying member is moved from a retracted position to a developing position.

REFERENCE NUMERALS

A1, A91: main assembly of apparatus
B1, B901: developing cartridge
C, C901: drum cartridge
P: process cartridge
1: optical means
2, recording material
3*a*: sheet feeding roller
3*b*: separation pad

3*c*: registration roller
3*d*: feeding guide
3*e*: feeding guide
3*f*: feeding guide
3*g*: discharging roller
3*h*: discharging portion
4: sheet feeding tray
5: fixing means
5*a*: driving roller
5*b*: heater
5*c*: fixing roller
6: transfer roller
6*a*: transfer nip
7: pick-up roller
8: feeding guide
9: press-contact member transfer roller
10: photosensitive drum
11: charging roller
12: magnet roller
13: developing roller
13*a*: driving side end portion
13*c*: non-driving side end portion
15: developing blade
15*a*: supporting member
15*a*1: driving side end portion
15*a*2: non-driving side end portion
15*b*: elastic member
16: developing container
16*a*: developer accommodating portion
16*b*: opening
16*c*: developing chamber
17: developer feeding member
21: drum frame
27: drive input gear
29: developing roller gear
34, 934: development side cover
34*a*: hole
36, 936: driving side developing device bearing
36*a*: hole
936*r*: boss
46, 946: non-driving side developing device bearing
46*f*: supporting portion
946*r*: boss
51, 52: screw
70: movable member
71: urging member
80: driving side swing guide
80*y*: abutting portion
81: non-driving side swing guide
90: driving-side side plate
92, 992: driving side guiding member
992*y*: abutting portion
93, 993: non-driving side guiding member
94: main assembly cover
100, 900: main assembly side driving member
150: slider member
180, 980: coupling member
180*c*1, 980*c*1: rotational force transmitting portion
185, 985: coupling spring
55, 955: coupling lever
55*e*, 955*e*: guide portion
55*b*, 955*b*: spring hook portion
55*y*, 955*y*: rotation regulating portion
56, 956: coupling lever spring
L: laser beam
Y: recording material
t: developer
X5: rotational moving direction.

The invention claimed is:

1. An image forming apparatus comprising:

(1) a photosensitive drum;

(2) a developing cartridge including:

(2-1) a developing roller configured to supply toner to the photosensitive drum and to rotate about a rotational axis, and (2-2) a guided portion protruding from an end surface of the developing cartridge in a direction of the rotational axis;

(3) a main assembly to which the developing cartridge is mountable in a mounting direction crossing the rotational axis and from which the developing cartridge is dismountable in a dismounting direction opposite to the mounting direction, in a state in which the photosensitive drum is inside the main assembly, the main assembly including:

(3-1) a main assembly frame provided with an opening portion through which the developing cartridge passes when the developing cartridge is mounted to and dismounted from the main assembly;

(3-2) a first guide portion provided on a side surface portion of the main assembly frame, which crosses the rotational axis, the first guide portion including a first receiving portion located in a vicinity of the opening portion and a delivery portion located below the first receiving portion; and (3-3) an opening and closing member configured to open and close the opening portion; and (4) a moving unit including a second guide portion, the moving unit being configured to move to a guide position, in the main assembly frame, for guiding the developing cartridge, the second guide portion including a second receiving portion located in a vicinity of the delivery portion of the first guide portion when the moving unit is in the guide position and a positioning portion, wherein the first guide portion guides the guided portion of the developing cartridge delivered from the first receiving portion to the delivery portion when the developing cartridge is mounted the main assembly being in a state in which the moving unit is located at the guide position, wherein the second guide portion receives, from the second receiving portion thereof, the guided portion of the developing cartridge delivered from the delivery portion of the first guide portion, and guides the guided portion of the developing cartridge to the positioning portion thereof, wherein the positioning portion of the second guide portion positions the developing cartridge with respect to the second guide portion by contacting the guided portion of the developing cartridge, and wherein the first guide portion is not in contact with the guided portion of the developing cartridge in a state in which the positioning portion of the second guide portion is in contact with the guided portion of the developing cartridge.

2. The image forming apparatus according to claim 1, wherein the moving unit includes a pressing member pressing the developing cartridge so that the guided portion of the developing cartridge is in contact with the positioning portion of the second guide portion, and wherein the pressing member is supported so as to move with respect to the second guide portion.

3. The image forming apparatus according to claim 2, wherein the moving unit includes a pressing spring, and wherein the pressing member presses the developing cartridge by a pressing force of the pressing spring.

4. The image forming apparatus according to claim 1, further comprising:

a transfer roller configured to contact the photosensitive drum so as to form a transfer nip portion for transferring a toner image from the photosensitive drum to a sheet;

a feeding roller configured to feed the sheet stacked on a feeding tray toward the transfer nip portion;

a fixing unit including a fixing nip portion configured to fix the toner image onto the sheet by heating the sheet on which the toner image is transferred in the transfer nip portion while conveying the sheet; and a discharge roller configured to discharge the sheet on which the toner image is fixed by the fixing unit to an outside of the image forming apparatus, wherein a direction in which the feeding roller feeds the sheet is opposite to a direction in which the discharge roller discharges the sheet.

5. The image forming apparatus according to claim 4, wherein the fixing nip portion is located above the transfer nip portion.

6. The image forming apparatus according to claim 1, wherein the second guide portion is a groove provided in a wall of the moving unit and extending in the mounting direction of the developing cartridge, and wherein the positioning portion is an end surface of the groove in the mounting direction.

7. The image forming apparatus according to claim 6, wherein as viewed in the direction of the rotational axis, the second receiving portion is open upward.

8. The image forming apparatus according to claim 1, wherein as viewed in the direction of the rotational axis, the delivery portion of the first guide portion is located at a position closer to the photosensitive drum than the first receiving portion is.

9. The image forming apparatus according to claim 1, wherein in a state in which the moving unit is located at the guide position, as viewed in the direction of the rotational axis, the second receiving portion of the second guide portion is located below the delivery portion of the first guide portion.

* * * * *